United States Patent
Kim et al.

(10) Patent No.: US 9,002,714 B2
(45) Date of Patent: Apr. 7, 2015

(54) METHOD FOR CONTROLLING ELECTRONIC APPARATUS BASED ON VOICE RECOGNITION AND MOTION RECOGNITION, AND ELECTRONIC APPARATUS APPLYING THE SAME

(75) Inventors: Jung-geun Kim, Suwon-si (KR); Yoo-tai Kim, Yongin-si (KR); Seung-dong Yu, Hwaseong-si (KR); Sang-jin Han, Gunpo-si (KR); Hee-seob Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/567,354

(22) Filed: Aug. 6, 2012

(65) Prior Publication Data

US 2013/0033643 A1 Feb. 7, 2013

Related U.S. Application Data

(60) Provisional application No. 61/515,459, filed on Aug. 5, 2011.

(30) Foreign Application Priority Data

Oct. 13, 2011 (KR) .......................... 10-2011-0104840

(51) Int. Cl.
*G10L 15/22* (2006.01)
*H04N 21/422* (2011.01)
*G06F 3/01* (2006.01)
(Continued)

(52) U.S. Cl.
CPC .......... *H04N 21/42203* (2013.01); *G06F 3/017* (2013.01); *H04N 21/4223* (2013.01); *H04N 21/431* (2013.01); *G06F 3/04895* (2013.01); *G06F 3/0482* (2013.01)

(58) Field of Classification Search
USPC .................................................. 704/270, 275
See application file for complete search history.

(56) References Cited

U.S. PATENT DOCUMENTS 5,917,490 A 6/1999 Kuzunuki et al.
6,351,222 B1 2/2002 Swan et al.
(Continued)

FOREIGN PATENT DOCUMENTS

EP 0926588 A2 6/1999
EP 2 268 005 A2 12/2010
(Continued)

OTHER PUBLICATIONS

Communication dated Oct. 15, 2012 issued by the European Patent Office in counterpart European Patent Application No. 12179312.9.
(Continued)

*Primary Examiner* — Susan McFadden
(74) *Attorney, Agent, or Firm* — Sughrue Mion, PLLC

(57) ABSTRACT

A method for controlling an electronic apparatus which uses voice recognition and motion recognition, and an electronic apparatus applying the same are provided. In a voice task mode, in which voice tasks are performed according to recognized voice commands, the electronic apparatus displays voice assistance information to assist in performing the voice tasks. In a motion task mode, in which motion tasks are performed according to recognized motion gestures, the electronic apparatus displays motion assistance information to aid in performing the motion tasks.

30 Claims, 149 Drawing Sheets

(51) Int. Cl.
  *H04N 21/4223* (2011.01)
  *H04N 21/431* (2011.01)
  *G06F 3/0489* (2013.01)
  *G06F 3/0482* (2013.01)

(56) References Cited

U.S. PATENT DOCUMENTS

| | | | |
|---|---|---|---|
| 6,428,449 B1 * | 8/2002 | Apseloff | 482/3 |
| 6,508,706 B2 * | 1/2003 | Sitrick et al. | 463/1 |
| 6,545,669 B1 * | 4/2003 | Kinawi et al. | 345/173 |
| 7,254,543 B2 | 8/2007 | Ibaraki et al. | |
| 7,426,467 B2 * | 9/2008 | Nashida et al. | 704/275 |
| 7,468,742 B2 * | 12/2008 | Ahn et al. | 348/207.99 |
| 7,685,252 B1 | 3/2010 | Maes et al. | |
| 7,844,921 B2 | 11/2010 | Ike et al. | |
| 8,060,227 B2 * | 11/2011 | Stefik | 700/94 |
| 8,064,704 B2 | 11/2011 | Kim et al. | |
| 8,194,049 B2 | 6/2012 | Oki | |
| 8,294,669 B2 | 10/2012 | Partridge et al. | |
| 8,296,151 B2 | 10/2012 | Klein et al. | |
| 8,499,320 B2 * | 7/2013 | Yeh et al. | 725/37 |
| 8,610,744 B2 | 12/2013 | Harris | |
| 8,706,415 B2 | 4/2014 | Su et al. | |
| 2002/0052746 A1 | 5/2002 | Handelman | |
| 2003/0046087 A1 | 3/2003 | Johnston et al. | |
| 2004/0243529 A1 | 12/2004 | Stoneman | |
| 2004/0263377 A1 | 12/2004 | Risi et al. | |
| 2005/0132420 A1 | 6/2005 | Howard et al. | |
| 2005/0177359 A1 | 8/2005 | Lu et al. | |
| 2007/0033055 A1 | 2/2007 | Tanaka | |
| 2007/0113182 A1 | 5/2007 | Hollemans | |
| 2007/0130547 A1 | 6/2007 | Boillot | |
| 2007/0252898 A1 | 11/2007 | Delean | |
| 2008/0052643 A1 | 2/2008 | Ike et al. | |
| 2008/0320521 A1 | 12/2008 | Beadle et al. | |
| 2009/0128505 A1 | 5/2009 | Partridge et al. | |
| 2009/0158190 A1 | 6/2009 | Higginson | |
| 2009/0228841 A1 | 9/2009 | Hildreth | |
| 2009/0284496 A1 | 11/2009 | Oki | |
| 2009/0288118 A1 | 11/2009 | Chang | |
| 2010/0058252 A1 | 3/2010 | Ko | |
| 2010/0076763 A1 | 3/2010 | Ouchi et al. | |
| 2010/0079498 A1 | 4/2010 | Zaman et al. | |
| 2010/0107069 A1 | 4/2010 | Shiga | |
| 2010/0127847 A1 | 5/2010 | Evans et al. | |
| 2010/0138797 A1 | 6/2010 | Thorn | |
| 2010/0138798 A1 | 6/2010 | Wilson et al. | |
| 2010/0151946 A1 | 6/2010 | Wilson et al. | |
| 2010/0153996 A1 | 6/2010 | Migos et al. | |
| 2010/0204953 A1 | 8/2010 | Onishi et al. | |
| 2010/0229125 A1 | 9/2010 | Cha | |
| 2010/0235781 A1 | 9/2010 | Friedlander et al. | |
| 2010/0241431 A1 | 9/2010 | Weng et al. | |
| 2010/0251158 A1 | 9/2010 | Geppert et al. | |
| 2010/0257475 A1 | 10/2010 | Smith et al. | |
| 2010/0302281 A1 | 12/2010 | Kim | |
| 2010/0306712 A1 | 12/2010 | Snook et al. | |
| 2010/0306716 A1 | 12/2010 | Perez | |
| 2010/0332129 A1 | 12/2010 | Balardeta et al. | |
| 2010/0333163 A1 | 12/2010 | Daly | |
| 2011/0026765 A1 | 2/2011 | Ivanich et al. | |
| 2011/0032071 A1 | 2/2011 | Tondering | |
| 2011/0034208 A1 | 2/2011 | Gu et al. | |
| 2011/0040563 A1 | 2/2011 | Hsu et al. | |
| 2011/0050477 A1 | 3/2011 | Choi et al. | |
| 2011/0060592 A1 | 3/2011 | Kang et al. | |
| 2011/0070878 A1 | 3/2011 | Kim | |
| 2011/0071734 A1 | 3/2011 | Van Wiemeersch et al. | |
| 2011/0184730 A1 | 7/2011 | LeBeau et al. | |
| 2011/0191367 A1 | 8/2011 | Wook et al. | |
| 2011/0193939 A1 | 8/2011 | Vassigh et al. | |
| 2011/0218696 A1 | 9/2011 | Okada et al. | |
| 2011/0219340 A1 | 9/2011 | Pathangay et al. | |
| 2011/0296353 A1 | 12/2011 | Ahmed et al. | |
| 2011/0298700 A1 | 12/2011 | Ito et al. | |
| 2011/0310005 A1 | 12/2011 | Chen et al. | |
| 2011/0313768 A1 | 12/2011 | Klein et al. | |
| 2012/0044139 A1 | 2/2012 | Kim et al. | |
| 2012/0069168 A1 | 3/2012 | Huang et al. | |
| 2012/0110456 A1 | 5/2012 | Larco et al. | |
| 2012/0124516 A1 | 5/2012 | Friedman | |
| 2012/0127072 A1 | 5/2012 | Kim | |
| 2012/0188164 A1 | 7/2012 | Dey et al. | |
| 2012/0239396 A1 | 9/2012 | Johnston et al. | |
| 2012/0249890 A1 | 10/2012 | Chardon et al. | |
| 2012/0257035 A1 | 10/2012 | Larsen | |
| 2012/0259639 A1 | 10/2012 | Yeh et al. | |
| 2012/0260168 A1 | 10/2012 | Friedlander et al. | |
| 2012/0280915 A1 | 11/2012 | Kyllonen et al. | |
| 2012/0293513 A1 | 11/2012 | Krishnaswamy | |
| 2013/0010207 A1 | 1/2013 | Valik et al. | |
| 2013/0033422 A1 | 2/2013 | Choi et al. | |
| 2013/0035941 A1 | 2/2013 | Kim et al. | |
| 2013/0035942 A1 | 2/2013 | Kim et al. | |
| 2013/0050458 A1 | 2/2013 | Kim et al. | |
| 2013/0113738 A1 | 5/2013 | Lee et al. | |
| 2013/0159001 A1 | 6/2013 | Stifelman et al. | |

FOREIGN PATENT DOCUMENTS

| | | |
|---|---|---|
| JP | 9-322086 A | 12/1997 |
| JP | 11184669 A | 7/1999 |
| JP | 2000-112610 A | 4/2000 |
| JP | 2002101315 A | 4/2002 |
| JP | 2002-287793 A | 10/2002 |
| JP | 2004-336597 A | 11/2004 |
| JP | 2005-208798 A | 8/2005 |
| JP | 2007-34525 A | 2/2007 |
| JP | 200852590 A | 3/2008 |
| JP | 2009-129449 A | 6/2009 |
| JP | 2010-45730 A | 2/2010 |
| JP | 2010-72507 A | 4/2010 |
| JP | 2010103721 A | 5/2010 |
| JP | 2010-182014 A | 8/2010 |
| JP | 2011-81541 A | 4/2011 |
| JP | 2011-118725 A | 6/2011 |
| KR | 10-2001-0015934 A | 3/2001 |
| KR | 10-2007-0030398 A | 3/2007 |
| KR | 10-2007-0055210 A | 5/2007 |
| KR | 10-2008-0029730 A | 4/2008 |
| KR | 1020090022465 A | 3/2009 |
| KR | 10-2009-0084212 A | 8/2009 |
| KR | 10-2010-0030737 A | 3/2010 |
| KR | 10-2010-0032699 A | 3/2010 |
| KR | 10-0948600 B1 | 3/2010 |
| KR | 10-2010-0062012 A | 6/2010 |
| KR | 10-2010-0101389 A | 9/2010 |
| KR | 10-2011-0027362 A | 3/2011 |
| KR | 10-2011-0130951 A | 12/2011 |
| WO | 2008/069519 A1 | 6/2008 |
| WO | 2008/093683 A1 | 8/2008 |
| WO | 2008/149482 A1 | 12/2008 |
| WO | 2009067670 A1 | 5/2009 |

OTHER PUBLICATIONS

Communication dated Oct. 11, 2012 issued by the European Patent Office in counterpart European Patent Application No. 12179311.1.
Communication dated Oct. 15, 2012 issued by the European Patent Office in counterpart European Patent Application No. 12179306.1.
Communication dated Oct. 11, 2012 issued by the European Patent Office in counterpart European Patent Application No. 12175763.7.
Ionescu, et al., "An Intelligent Gesture Interface for Controlling TV Sets and Set-Top Boxes", 6th IEEE International Symposium on Applied Computational Intelligence and Information, May 19, 2011, pp. 159-164, XP031944286.
International Search Report (PCT/ISA/210), dated Feb. 27, 2013, issued by the International Searching Authority in counterpart International Application No. PCT/KR2012/006170.
Written Opinion (PCT/ISA/237), dated Feb. 27, 2013, issued by the International Searching Authority in counterpart International Application No. PCT/KR2012/006170.

(56) References Cited

OTHER PUBLICATIONS

International Search Report (PCT/ISA/210), dated Jan. 2, 2013, issued by the International Searching Authority in counterpart International Application No. PCT/KR2012/006172.
Written Opinion (PCT/ISA/237), dated Jan. 2, 2013, issued by the International Searching Authority in counterpart International Application No. PCT/KR2012/006172.
International Search Report (PCT/ISA/210), dated Feb. 27, 2013, issued by the International Searching Authority in counterpart International Application No. PCT/KR2012/006169.
Written Opinion (PCT/ISA/237), dated Feb. 27, 2013, issued by the International Searching Authority in counterpart International Application No. PCT/KR2012/006169.
International Search Report (PCT/ISA/210), dated Feb. 22, 2013, issued by the International Searching Authority in counterpart International Application No. PCT/KR2012/006168.
Written Opinion (PCT/ISA/237), dated Feb. 22, 2013, issued by the International Searching Authority in counterpart International Application No. PCT/KR2012/006168.
International Search Report (PCT/ISA/210), dated Feb. 21, 2013, issued by the International Searching Authority in counterpart International Application No. PCT/KR2012/006164.
Written Opinion (PCT/ISA/237), dated Feb. 21, 2013, issued by the International Searching Authority in counterpart International Application No. PCT/KR2012/006164.
International Search Report (PCT/ISA/210), dated Mar. 21, 2013, issued by the International Searching Authority in counterpart International Application No. PCT/KR2012/009240.
Written Opinion (PCT/ISA/237), dated Mar. 21, 2013, issued by the International Searching Authority in counterpart International Application No. PCT/KR2012/009240.
Communication, dated Feb. 21, 2013, issued by the Korean Intellectual Property Office in counterpart Korean Application No. 10-2012-0040995.
Non-Final US Office Action, dated May 8, 2013, issued by the USPTO in related U.S. Appl. No. 13/567,427.
Non-Final US Office Action, dated Apr. 12, 2013, issued by the USPTO in related U.S. Appl. No. 13/683,172.
USPTO Office Action dated Nov. 7, 2013 issued in co-pending U.S. Appl. No. 13/567,427.
USPTO Office Action dated Nov. 8, 2013 issued in co-pending U.S. Appl. No. 13/567,342.
USPTO Office Action dated Nov. 13, 2013 issued in co-pending U.S. Appl. No. 13/683,172.
Communication from the Japanese Patent Office dated Nov. 26, 2013, in a counterpart Japanese application No. 2012-173305.
Communication, dated Apr. 22, 2014, issued by the Japanese Patent Office in counterpart Japanese Application No. 2012-173304.
Communication, dated Mar. 13, 2014, issued by the U.S. Patent and Trademark Office in counterpart U.S. Appl. No. 13/683,172.
Communication, dated Mar. 25, 2014, issued by the Japanese Patent Office in counterpart Japanese Application No. 2012-173305.
Communication, dated May 7, 2014, issued by the U.S. Patent and Trademark Office in counterpart U.S. Appl. No. 13/567,298.
Communication dated Oct. 22, 2013 issued by the Japanese Patent Office in counterpart Japanese Application No. 2012173304.
Communication dated Jun. 25, 2014 issued by the U.S. PTO in counterpart U.S. Appl. No. 13/567,427.
Communication dated Jun. 27, 2014 issued by the U.S. PTO in counterpart U.S. Appl. No. 13/683,172.
Communication dated Sep. 11, 2014 issued by the U.S. PTO in counterpart U.S. Appl. No. 13/683,172.
Communication dated Aug. 5, 2014 issued by the State Intellectual Property Office of P.R. China in counterpart Chinese Application No. 201210276986.6.
Communication dated Aug. 8, 2014 issued by the European Patent Office in counterpart European Application No. 12 175 763.7.
Communication dated Jan. 14, 2015, issued by the European Patent Office in counterpart European Application No. 12179306.1
Communication dated Jan. 30, 2015, issued by the United States Patent and Trademark Office in counterpart U.S. Appl. No. 13/683,172.
Communication dated Nov. 11, 2014 issued by the Australian Government IP Australia in counterpart Australian Patent Application No. 2012293063.
Communication dated Nov. 27, 2014 issued by the Australian Government IP Australia in counterpart Australian Patent Application No. 2012293065.
Communication dated Dec. 23, 2014 issued by the Australian Government IP Australia in counterpart Australian Patent Application No. 2012293060.
Communication dated Oct. 21, 2014 issued by the Japanese Patent Office in counterpart Japanese Patent Application No. 2012-173305.
Communication dated Nov. 6, 2014 issued by the Mexican Institute of Industrial Property in counterpart Mexican Patent Application No. MX/a/2014/001469.
Communication dated Oct. 29, 2014 issued by the United States Patent and Trademark Office in counterpart U.S. Appl. No. 13/567,427.
Communication dated Oct. 31, 2014 issued by the United States Patent and Trademark Office in counterpart U.S. Appl. No. 13/567,298.
Communication dated Dec. 29, 2014 issued by the United States Patent and Trademark Office in counterpart U.S. Appl. No. 13/567,485.
Communication dated Nov. 7, 2014 issued by the United States Patent and Trademark Office in counterpart U.S. Appl. No. 13/567,659.
Communication dated Jan. 28, 2015, issued by the European Patent Office in counterpart European Application No. 12175763.7.
Communication dated Jan. 28, 2015, issued by the European Patent Office in counterpart European Application No. 12179312.9.
Extended European Search Report (issuance date: Feb. 10, 2015) issued by the European Patent Office for European Patent Application No. 12191394.1 which was filed on Nov. 6, 2012.

* cited by examiner

FIG. 128

EXCITING DRUM
APPLICATION EXECUTION

FIG. 145

EXCITING DRUM APPLICATION EXECUTION

METHOD FOR CONTROLLING ELECTRONIC APPARATUS BASED ON VOICE RECOGNITION AND MOTION RECOGNITION, AND ELECTRONIC APPARATUS APPLYING THE SAME

CROSS-REFERENCE TO RELATED APPLICATION

This application claims the benefit of U.S. Patent Application No. 61/515,459, filed on Aug. 5, 2011, in the United States Patents and Trademark Office and Korean Patent Application No. 10-2011-0104840, filed on Oct. 13, 2011, in the Korean Intellectual Property Office, the disclosures of which are incorporated herein by reference.

BACKGROUND

1. Field

Methods and apparatuses consistent with exemplary embodiments relate to a method for controlling an electronic apparatus based on voice recognition and motion recognition, and an electronic apparatus applying the same, and more particularly, to a method for controlling an electronic apparatus, which facilitates user manipulation to perform a task of the electronic apparatus based on voice recognition and motion recognition, and an electronic apparatus applying the same.

2. Description of the Related Art

As multifunctional and enhanced electronic apparatuses have been developed, various user interfaces to control electronic apparatuses have been developed. For example, input methods using a remote controller, a mouse, and a touch pad have been applied to electronic apparatuses.

In recent years, a method for controlling an electronic apparatus using voice recognition and a method for controlling an electronic apparatus using motion recognition have been developed. However, a related-art control method using voice recognition or motion recognition corresponds to some simple functions of the control functions of the electronic apparatuses and does not consider user's manipulation convenience.

Therefore, a technique for providing a systematic and convenient user interface in an electronic apparatus using voice recognition or motion recognition is required.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a method for controlling an electronic apparatus, which provides a user interface capable of guiding a user to input a voice or a motion more easily, and an electronic apparatus applying the same.

One or more exemplary embodiments also provide a method for controlling an electronic apparatus, which systematically classifies functions corresponding to input of a voice or a motion, and provides an effective user interface suitable for the classified functions, and an electronic apparatus applying the same.

According to an aspect of an exemplary embodiment, there is provided a method for controlling of an electronic apparatus, comprising in a voice task mode in which at least one of first tasks is performed according to a recognized voice, displaying voice assistance information to perform the first tasks, recognizing a first voice corresponding to a first voice item from among at least one voice item displayed as the voice assistance information, performing a task corresponding to the first voice item from among the first tasks, in a motion task mode in which at least one of second tasks is performed according to a recognized motion, displaying motion assistance information to perform the second tasks, recognizing a first motion corresponding to a first motion item from among at least one motion item displayed as the motion assistance information, and performing a task corresponding to the first motion item from among the second tasks.

The performing the task corresponding to the first voice item may comprise displaying additional item information regarding the first voice item corresponding to the recognized first voice.

The performing the task corresponding to the first voice item may further comprise recognizing a second voice corresponding to the additional item information.

The performing the task corresponding to the first voice item may comprise performing a task corresponding to the first voice item and the recognized second voice from among the first tasks.

Each of the at least one voice item may be an utterable command.

The additional item information may comprise at least one of an additional command, a guide message, and an utterance example regarding the first voice item.

Each of the at least one motion item may comprise a motion image which indicates a motion recognizable in the motion task mode, and a text which indicates a task corresponding the recognizable motion.

At least one of the voice assistance information and the motion assistance information may comprise at least one of an image and a text which indicate a designated mode of the voice task mode and the motion task mode.

The additional item information may comprise at least one of an image and a text which indicate a designated mode of the voice task mode and the motion task mode.

The voice task mode may be changed to the motion task mode if a motion stand command (trigger motion) indicating a pre-set motion to enter the motion task mode is recognized, and the motion task mode may be changed to the voice task mode if a voice start command (trigger voice) indicating a pre-set voice to enter the voice task mode is recognized.

The first tasks and the second tasks may be different from each other, and if a third voice corresponding to at least one identifier of a channel name, a program name, and a channel number is recognized, the first tasks may comprise channel shortcut to reproduce a channel corresponding to the identifier, and if a second motion corresponding to one of channel-up and channel-down is recognized, the second tasks may comprise channel changing (i.e. channel zapping) to change a current channel to one of a previous channel and a next channel of the current channel to correspond to the one of the channel-up and the channel-down.

If the task corresponding to the first voice item is channel shortcut from among the first tasks, the additional item information may comprise at least one of a guide message and an utterance example regarding utterance of at least one identifier of a channel name, a program name, and a channel name.

The performing the task corresponding to the first voice item may comprise, if a third voice regarding the identifier corresponding to the additional item information is recognized, performing the channel shortcut to reproduce a channel corresponding to the identifier The performing the task corresponding to the first motion item may comprise, if the task corresponding to the first motion item is channel changing from among the second tasks, changing a current channel to one of a previous channel and a next channel of the current channel.

The first tasks and the second tasks may be different from each other, and if a fourth voice corresponding to one of pre-set levels is recognized, the first tasks may comprise volume level setting to set a volume level to the level corresponding to the recognized fourth voice, and, if a third motion corresponding to one of volume-up and volume-down is recognized, the second tasks may comprise volume level control indicating one of increasing a current volume by a pre-set level and reducing a current volume by a pre-set level to correspond to the one of the volume-up and the volume-down.

If the task corresponding to the first voice item is power off from among the first tasks, the additional item information may comprise at least one of a guide message asking a question as to whether to perform power off and an utterance example regarding an answer to the question.

The performing the task corresponding to the first voice item may comprise, if the task corresponding to the first voice item is mute from among the first tasks, controlling to perform the mute and displaying voice assistance information changed to have a second voice item corresponding to unmute from among the first tasks instead of the first voice item.

The at least one voice item displayed as the voice assistance information may be at least one voice item selected from among voice items corresponding to the first tasks according to at least one of an application, an on screen display (OSD), and a recognition candidate displayed along with the voice assistance information, and the recognition candidate may comprise at least one of a name which comprises at least one of a figure and a letter similar to the recognized voice, a command which is similar to the recognized voice, a task which corresponds to the similar command, a motion which is similar to the recognized motion, and a task which corresponds to the similar motion.

The at least one motion item displayed as the motion assistance information may be at least one motion item selected from among motion items corresponding to the second tasks according to at least one of an application, an OSD, and a recognition candidate displayed along with the motion assistance information, and the recognition candidate may comprise at least one of a name which comprises at least one of a figure and a letter similar to the recognized voice, a command which is similar to the recognized voice, a task which corresponds to the similar command, a motion which is similar to the recognized motion, and a task which corresponds to the similar motion.

The method may further comprise, if the voice task mode is changed to the motion task mode after a recognition candidate is displayed along with the voice assistance information in the voice task mode, continuously displaying the recognition candidate and changing the voice assistance information to the motion assistance information corresponding to the motion task mode and displaying the motion assistance information, and the recognition candidate may comprise at least one of a name which comprises at least one of a figure and a letter similar to the recognized voice, a command which is similar to the recognized voice, a task which corresponds to the similar command, a motion which is similar to the recognized motion, and a task which corresponds to the similar motion.

The continuously displaying the recognition candidate and changing the voice assistance information to the motion assistance information and displaying the motion assistance information may comprise displaying a focus on one recognition candidate from among the recognition candidate continuously displayed.

The method may further comprise, if the motion task mode is changed to the voice task mode after a recognition candidate is displayed along with the motion assistance information in the motion task mode, continuously displaying the recognition candidate and changing the motion assistance information to the voice assistance information corresponding to the voice task mode and displaying the voice assistance information, and the recognition candidate may comprise at least one of a name which comprises at least one of a figure and a letter similar to the recognized voice, a command which is similar to the recognized voice, a task which corresponds to the similar command, a motion which is similar to the recognized motion, and a task which corresponds to the similar motion.

The continuously displaying the recognition candidate and changing the motion assistance information to the voice assistance information and displaying the voice assistance information may comprise displaying an index comprising at least one of a figure and a letter corresponding to the recognition candidate continuously displayed.

The performing the task corresponding to the first voice item may comprise, if the first voice item is an item to display an item different from the at least one voice item from among voice items corresponding to the first tasks, displaying the different item.

The displaying the different item may comprise, if one of the displayed voice items is not recognized for a predetermined time, omitting driving of a timer to stop the voice task mode.

The recognizing the first voice corresponding to the first voice item may comprise providing at least one of visual feedback and auditory feedback indicating at least one of the first voice item and the task corresponding to the first voice item.

The recognizing the first motion corresponding to the first motion item may comprise providing at least one of visual feedback and auditory feedback indicating at least one of the first motion item and the task corresponding to the first motion item.

The recognizing the first voice corresponding to the first voice item may comprise providing at least one of visual feedback and auditory feedback corresponding to a level of recognition accuracy according to the recognition accuracy of the first voice.

The recognizing the first motion corresponding to the first motion item may comprise providing at least one of visual feedback and auditory feedback corresponding to a level of recognition accuracy according to the recognition accuracy of the first motion.

According to an aspect of an exemplary embodiment, there is provided an electronic apparatus, comprising a controller which, in a voice task mode in which at least one of first tasks is performed according to a recognized voice, controls to display voice assistance information to perform the first tasks, and, in a motion task mode in which at least one of second tasks is performed according to a recognized motion, controls to display motion assistance information to perform the second tasks, and the controller recognizes a first voice corresponding to a first voice item from among at least one voice item displayed as the voice assistance information in the voice task mode, and performs a task corresponding to the first voice item from among the first tasks, and the controller recognizes a first motion corresponding to a first motion item from among at least one motion item displayed as the motion assistance information in the motion task mode, and performs a task corresponding to the first motion item from among the second tasks.

According to an aspect of an exemplary embodiment, there is provided an electronic apparatus comprising, in a voice task mode in which at least one of first tasks is performed according to a recognized voice, displaying voice assistance information to perform the first tasks, recognizing a first voice corresponding to a first voice item from among at least one voice item displayed as the voice assistance information, displaying additional item information regarding the first voice item corresponding to the recognized first voice, recognizing a second voice corresponding to the additional item information, and performing a task corresponding to the first voice item and the recognized second voice from among the first tasks.

According to an aspect of an exemplary embodiment, there is provided an electronic apparatus, comprising a controller which, in a voice task mode in which at least one of first tasks is performed according to a recognized voice, controls to display voice assistance information to perform the first tasks, and the controller recognizes a first voice corresponding to a first voice item from among at least one voice item displayed as the voice assistance information, controls to display additional item information regarding the first voice item corresponding to the recognized first voice, recognizes a second voice corresponding to the additional item information, and performs a task corresponding to the first voice item and the recognized second voice from among the first tasks.

BRIEF DESCRIPTION OF THE DRAWING FIGURES

The above and/or other aspects will be more apparent by describing in detail exemplary embodiments, with reference to the accompanying drawings, in which:

FIGS. 127 to 129 are views and a flowchart to explain executing of an executable icon whose name is displayed partially according to an exemplary embodiment;

FIGS. 144 to 146 are views and a flowchart to explain a method for performing a voice task if an utterable command is displayed on a display screen according to an exemplary embodiment;

FIG. 14B is a flowchart to explain a method for displaying a candidate list according to an exemplary embodiment; and FIG. 14C is a flowchart to explain a UI to guide a voice recognition error according to an exemplary embodiment.

DETAILED DESCRIPTION OF EXEMPLARY EMBODIMENTS

Figure 1:
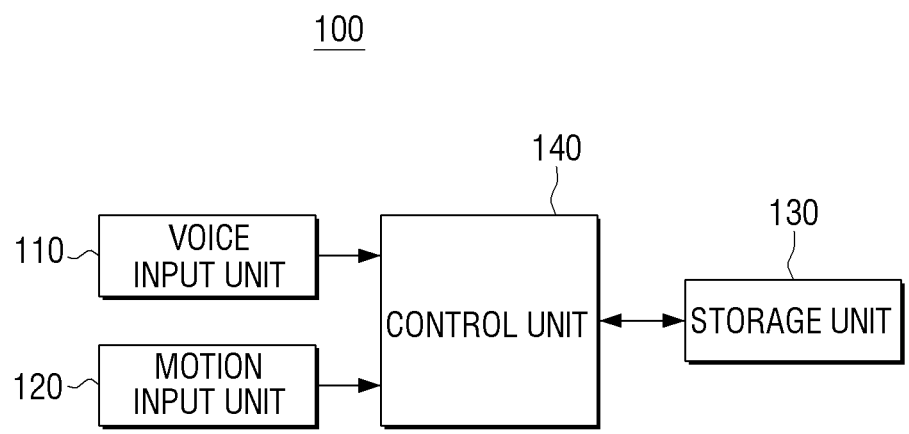
FIGS. 1 to 3 are block diagrams to explain configuration of an electronic apparatus according to various exemplary embodiments.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in an understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a schematic block diagram illustrating an electronic apparatus 100 according to an exemplary embodiment.

Referring to FIG. 1, the electronic apparatus 100 includes a voice input unit 110, a motion input unit 120, a storage unit 130, and a control unit 140. The electronic apparatus 100 may be realized by, but not limited to, a smart television (TV), a set-top box, a personal computer (PC), or a digital TV, which is connectable to an external network.

The voice input unit 110 receives input of a voice that is uttered by a user. The voice input unit 110 converts an input voice signal into an electric signal and outputs the electric signal to the control unit 140. For example, the voice input unit 110 may be realized by a microphone. Also, the voice input unit 110 may realized by an internal component in the electronic apparatus 100 or an external device. The external device voice input unit 110 may be connected to the electronic apparatus 100 through a wired or wireless connection or through a network.

The motion input unit 120 receives an image signal (for example, a continuous frame) that is obtained by photographing a user motion and provides the image signal to the control unit 140. For example, the motion input unit 120 may be realized by a unit including a lens and an image sensor. The motion input unit 120 may be realized by an internal component in the electronic apparatus 100 or an external device. The external device motion input unit 120 may be connected to the electronic apparatus 100 in a wired or wireless connection or over a network.

The storage unit 130 stores various data and programs for driving and controlling the electronic apparatus 100. The storage unit 130 stores a voice recognition module that recognizes a voice input through the voice input unit 110, and a motion recognition module that recognizes a motion input through the motion input unit 120.

The storage unit 130 may include a voice database and a motion database. The voice database refers to a database on which a predetermined voice and a voice task matched with the predetermined voice are recorded. The motion database refers to a database on which a predetermined motion and a motion task matched with the predetermined motion are recorded.

The control unit 140 controls the voice input unit 110, the motion input unit 120, and the storage unit 130. The control unit 140 may include a hardware processor such as a central processing unit (CPU), and a read only memory (ROM) and a random access memory (RAM) to store a module and data for controlling the electronic apparatus 100.

If a voice is input through the voice input unit 110, the control unit 140 recognizes the voice using the voice recognition module and the voice database. The voice recognition may be divided into isolated word recognition that recognizes an uttered voice by distinguishing words in accordance with a form of an input voice, continuous speech recognition that recognizes a continuous word, a continuous sentence, and a dialogic voice, and keyword spotting that is an intermediate type between the isolated word recognition and the continuous speech recognition and recognizes a voice by detecting a pre-defined keyword. If a user voice is input, the control unit 140 determines a voice section by detecting a beginning and an end of the voice uttered by the user from an input voice signal. The control unit 140 calculates energy of the input voice signal, classifies an energy level of the voice signal in accordance with the calculated energy, and detects the voice section through dynamic programming. The control unit 140 generates phoneme data by detecting a phoneme, which is the smallest unit of voice, from the voice signal within the detected voice section based on an acoustic model. The control unit 140 generates text information by applying a hidden Markov model (HMM) to the generated phoneme data. However, the above-described voice recognition method is merely an example and other voice recognition methods may be used. In the above-described method, the control unit 140 recognizes the user voice included in the voice signal.

If a motion is input through the motion input unit 120, the control unit 140 recognizes the motion using the motion recognition module and the motion database. The motion recognition divides an image (for example, a continuous frame) corresponding to the user motion input through the motion input unit 120 into a background and a hand area (for example, spreading out fingers or clenching fist by cupping hand), and recognizes a continuous hand motion. If a user motion is input, the control unit 140 stores a received image on a frame basis and senses an object (for example, a user's hand) of the user motion using a stored frame. The control unit 140 detects the object by sensing at least one of a shape, color, and a motion of the object included in the frame. The control unit 140 may trace the motion of the object using locations of the object included in the plurality of frames.

The control unit 140 determines the motion in accordance with a shape and a motion of the traced object. For example, the control unit 140 determines the user motion using at least one of a change in the shape, a speed, a location, and a direction of the object. The user motion includes a grab motion of clenching one hand, a pointing move motion of moving a displayed cursor with one hand, a slap motion of moving one hand in one direction at a predetermined speed or higher, a shake motion of shaking one hand horizontally or vertically, and a rotation motion of rotating one hand. The technical idea of the present disclosure may be applied to other motions. For example, the user motion may further include a spread motion of spreading one hand.

The control unit 140 determines whether the object leaves a predetermined area (for example, a square of 40 cm×40 cm) within a predetermined time (for example, 800 ms) in order to determine whether the user motion is the point move motion or the slap motion. If the object does not leave the predetermined area within the predetermined time, the control unit 140 may determine that the user motion is a pointing move motion. If the object leaves the predetermined area within the predetermined time, the control unit 140 may determine that the user motion is a slap motion. As another example, if the speed of the object is lower than a predetermined speed (for example, 30 cm/s), the control unit 140 may determine that the user motion is a pointing move motion. If the speed of the object exceeds the predetermined speed, the control unit 140 determines that the user motion is a slap motion.

As described above, the control unit 140 performs a task of the electronic apparatus 100 using the recognized voice and motion. The task of the electronic apparatus includes at least one of functions performed by the electronic apparatus 100, such as channel change, volume control, content replay (for example, a moving image, music or photo), or internet browsing.

A detailed method for controlling the electronic apparatus 100 by the control unit 140 will be explained below.

Figure 2:
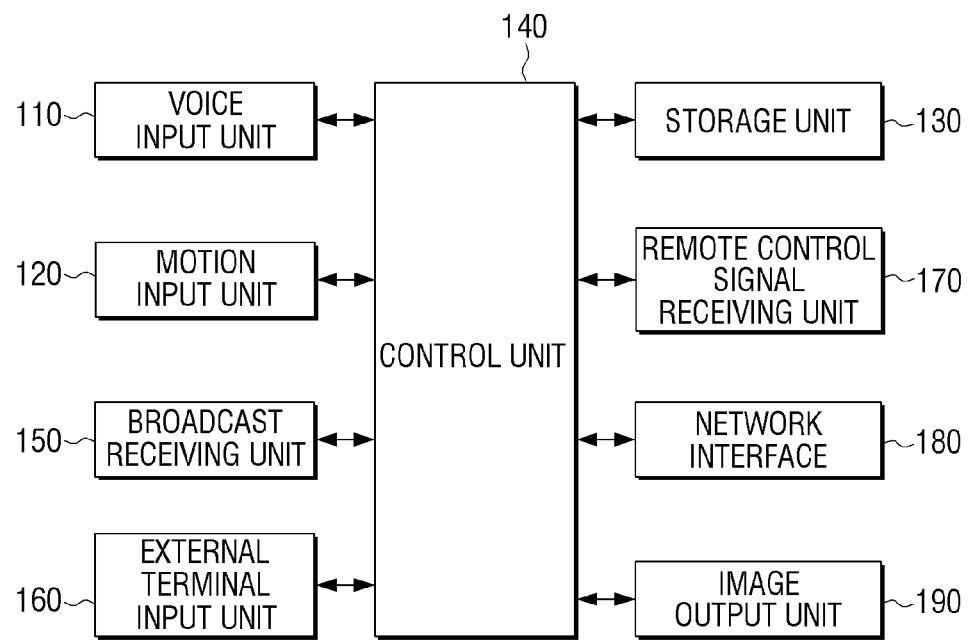

FIG. 2 is a block diagram illustrating an electronic apparatus 100 according to an exemplary embodiment. Referring to FIG. 2, the electronic apparatus 100 includes a voice input unit 110, a motion input unit 120, a storage unit 130, a control unit 140, a broadcast receiving unit 150, an external terminal input unit 160, a remote control signal receiving unit 170, a network interface unit 180, and an image output unit 190. As shown in FIG. 2, the electronic apparatus 100 may be realized by a set-top box, a personal computer, etc.

The voice input unit 110, the motion input unit 120, the storage unit 130, and the control unit 140 of FIG. 2 are the same as the voice input unit 110, the motion input unit 120, the storage unit 130, and the control unit 140 of FIG. 1 and thus a detailed description thereof is omitted.

The broadcast receiving unit 150 receives a broadcast signal from an external source in a wired or wireless manner. The broadcast signal includes a video, an audio, and additional data (for example, an electronic program guide (EPG)). The broadcast receiving unit 150 may receive a broadcast signal from various sources such as a ground wave broadcast, a cable broadcast, a satellite broadcast, an internet broadcast, etc.

The external terminal input unit 160 receives video data (for example, a moving image or a photo) and audio data (for example, music) from an external source. The external terminal input unit 160 may include at least one of a high definition multimedia interface (HDMI) input terminal, a component input terminal, a PC input terminal, a USB input terminal, etc. The remote control signal receiving unit 170 receives a remote control signal from an external remote controller. The remote control signal receiving unit 170 may receive a remote control signal in a voice task mode or a motion task mode of the electronic apparatus 100. The network interface unit 180 may connect the electronic apparatus 100 to an external apparatus (for example, a server) under control of the control unit 140. The control unit 140 may download an application from an external apparatus connected through the network interface unit 180 or may perform web browsing. The network interface unit 180 may provide at least one of Ethernet, a wireless LAN 182, Bluetooth, etc.

The image output unit 190 outputs the external broadcast signal received through the broadcast receiving unit 150, the video data input from the external terminal input unit 160, or the video data stored in the storage unit 130 to an external display apparatus (for example, a monitor or a TV). The image output unit 190 may include an output terminal such as HDMI, component, composite, Video Graphics Array (VGA), Digital Video Interface (DVI), S-Video, etc.

Figure 3:
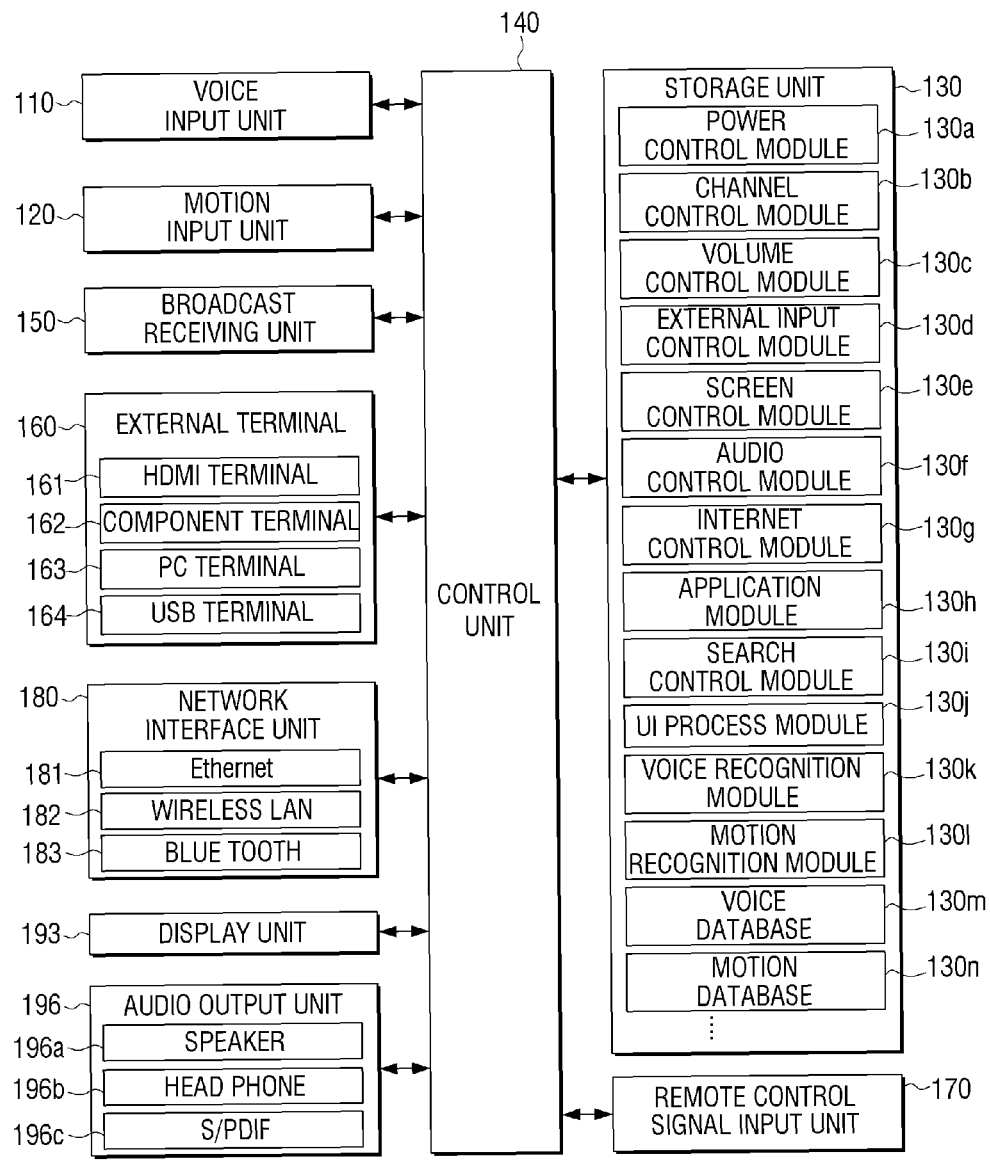

FIG. 3 is a block diagram illustrating an electronic apparatus 100 according to still another exemplary embodiment. As shown in FIG. 3, the electronic apparatus 100 includes a voice input unit 110, a motion input unit 120, a storage unit 130, a control unit 140, a broadcast receiving unit 150, an external terminal input unit 160, a remote control signal receiving unit 170, a network interface unit 180, a display unit 193, and an audio output unit 196. The electronic apparatus 100 may be, but not limited to, a digital TV.

The voice input unit 110, the motion input unit 120, the storage unit 130, the control unit 140, the broadcast receiving unit 150, the external terminal input unit 160, the remote control signal receiving unit 170, and the network interface unit 180 of FIG. 3 are the same as those having the same reference numerals in FIGS. 1 and 2, and thus a detailed description thereof is omitted.

The display unit 193 displays an image corresponding to a broadcast signal received through the broadcast receiving unit 150. The display unit 193 may display image data (for example, a moving image) input through the external terminal input unit 160 or video stored in the storage unit. The display unit 193 may display voice assistance information for performing a voice task and motion assistance information for performing a motion task under control of the control unit 140.

The audio output unit 196 outputs a audio corresponding to a broadcast signal under control of the control unit 140. The audio output unit 196 may include at least one of a speaker 196a, a headphone output terminal 196b, and an S/PDIF output terminal 163c. The storage unit 130 includes a power control module 130a, a channel control module 130b, a volume control mode 130c, an external input control module 130d, a screen control module 103e, an audio control module 130f, an internet control module 130g, an application module 130h, a search control module 130i, a user interface (UI) process module 130j, a voice recognition module 130k, a motion recognition module 130l, a voice database 130m, and a motion database 130n. Those modules 130a to 130n may be realized by software in order to perform a power control function, a channel control function, a volume control function, an external input control function, a screen control function, an audio control function, an internet control function, an application execution function, a search control function, and a UI process function. The control unit 140 performs a corresponding function by executing the software stored in the storage unit 130.

Hereinafter, various exemplary embodiments will be explained with reference to the accompanying drawings.

If a user voice is recognized through the voice recognition module 130k, the control unit 140 performs a voice task corresponding to the recognized user voice from among tasks that are controllable by a remote controller. If a user motion is recognized through the motion recognition module 130l, the control unit 140 performs a motion task corresponding to the recognized user motion from among the tasks that are controllable by the remote controller. The voice task and the motion task may be mapped by being classified by buttons on the remote controller.

The voice task refers to a task that is controllable in accordance with a voice recognized through the voice recognition module. For example, the voice task may include at least one of functions of turning off the electronic apparatus 100, channel shortcut, mute, changing an external terminal, setting a volume level, inputting texts, and reproducing/stopping an image. That is, various tasks having a name or an identifier that can be uttered by the user voice or a task requiring to input a text may be set as a voice task.

The motion task refers to a task that is controllable in accordance with a motion recognized through the motion recognition module. For example, the motion task may include channel changing, volume level control, screen navigation, slide bar control, and cursor pointing. That is, various tasks that can be controlled in phases in accordance with to a type and a direction of a user motion and a task using a cursor may be set as a motion task.

If a user voice is recognized through the voice recognition module, the control unit 140 performs a voice task directly corresponding to utterance included in the user voice.

For example, the control unit 140 recognizes a channel identifier from the voice uttered by the user. The channel identifier is to identify a channel and may include at least one of a channel name, a channel number, and a program name.

If a channel identifier is stored in the voice database stored in the storage unit 130 as described above, the control unit 140 performs a shortcut to a channel corresponding to the recognized channel identifier using the voice database. That is, if the user says "11", the control unit 140 confirms whether a voice task corresponding to "11" is recorded on the voice database. If the voice task corresponding to "11" is a channel shortcut function to select channel 11, the control unit 140 performs the shortcut to channel 11.

If a user motion is recognized through the motion recognition module, the control unit 140 performs a motion task corresponding to the user motion in accordance with a direction of the user motion.

For example, if a slap motion in an upward direction is recognized through the motion recognition module, the control unit 140 may confirm a motion task corresponding to the slap motion in the upward direction from the motion database and may perform channel changing to change a current channel to a channel a number of which is increased by a predetermined number (for example, 1). If a slap motion in a downward direction is recognized through the motion recognition module, the control unit 140 may identify a motion task corresponding to the slap motion in the downward direction from the motion database and may perform channel changing to change a current channel to a channel a number of which is decreased by a predetermined number (for example, 1).

Figure 4:
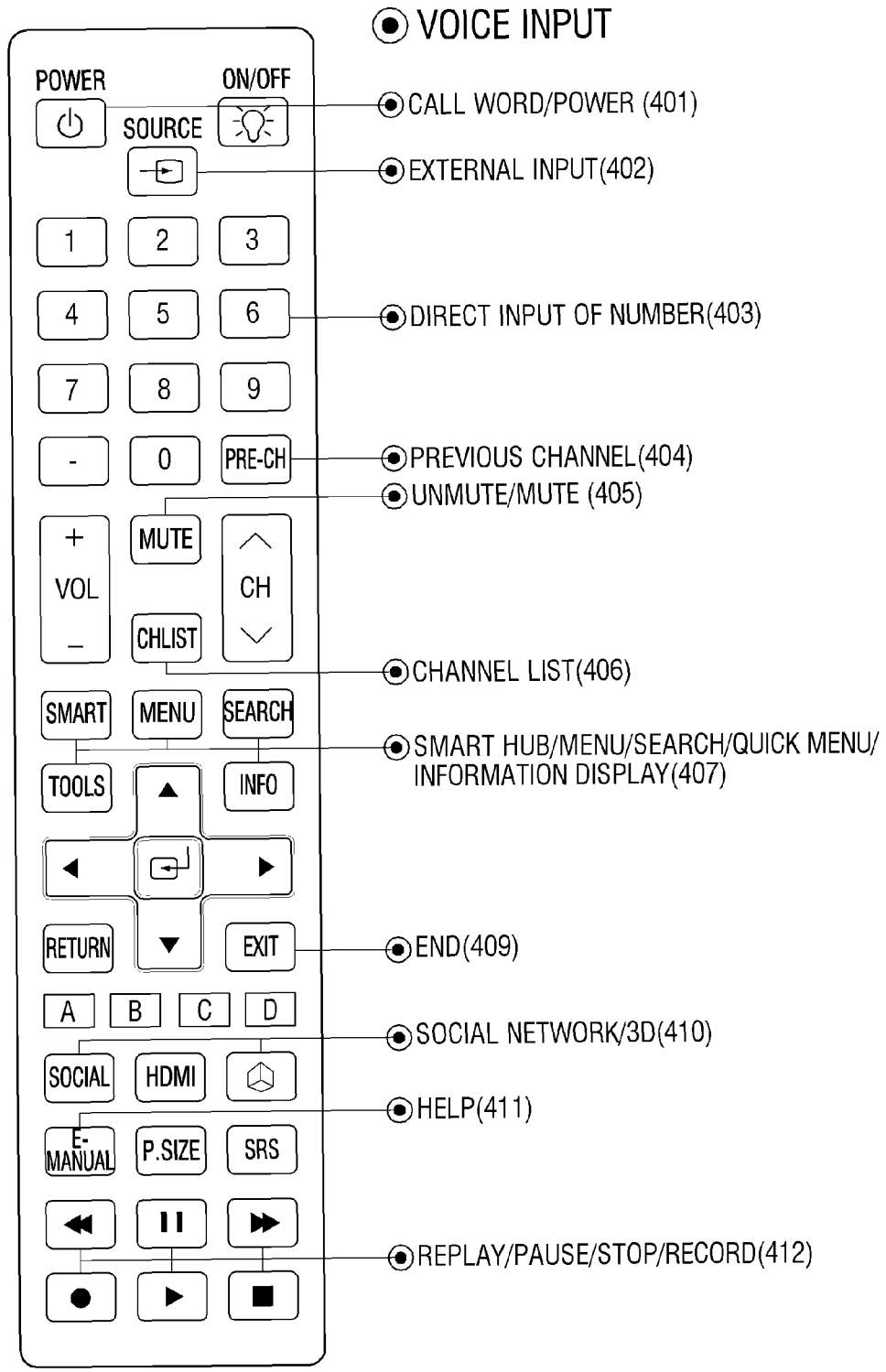
FIGS. 4 and 5 are views illustrating buttons of a remote controller corresponding to a voice task and a motion task.
Figure 5:
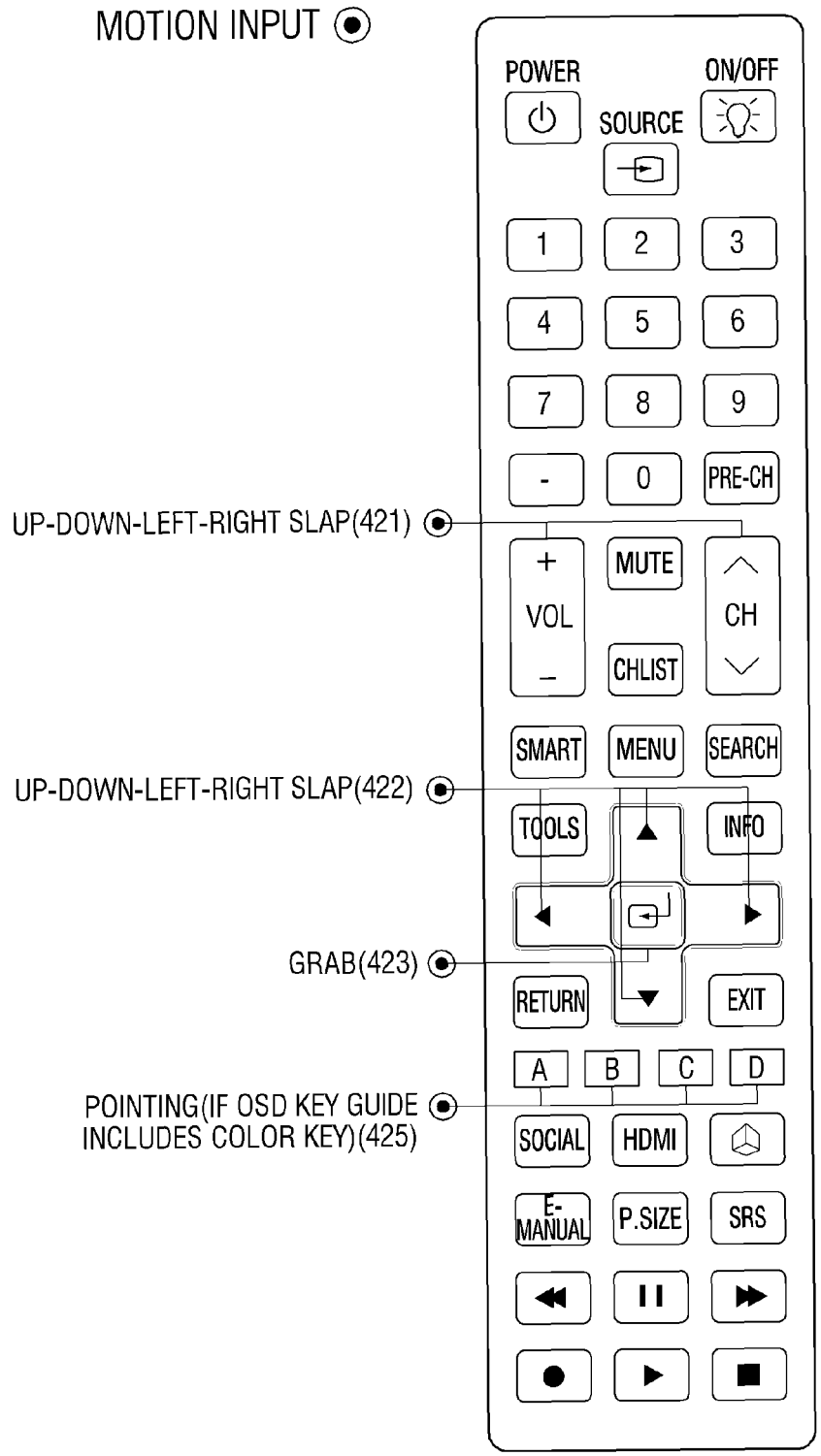

The voice tasks and the motion tasks may be mapped by being classified by buttons on a remote controller as shown in FIGS. 4 and 5.

FIG. 4 illustrates buttons on a remote controller corresponding to a command to perform at least one voice task. That is, a task performed if a voice input is recognized may correspond to a task that is performed by one of the buttons on the remote controller. For example, a task that is performed by a power button 401 on the remote controller corresponds to a task that is performed if a voice "call word" (for example, "Ginny") or "power" is recognized. Accordingly, an external input button 402 corresponds to a voice "external input". Also, a number button 403 corresponds to an uttered number. Also, a previous channel button 404 corresponds to a voice "previous channel". A mute button 405 corresponds to a voice "mute" or "unmute." Also, a channel list button 406 corresponds to a voice "channel list". A smart hub/menu/search/quick menu/information display button 407, a return button 408, an exist button 409, a social network/3D image providing button 410, a help button 411, and a replay/pause/stop/record button 412 correspond to voices corresponding to their respective names.

FIG. 5 illustrates buttons on a remote controller corresponding to a motion to perform at least one motion task. That is, a task that is performed if a motion input is recognized may correspond to a task that is performed in accordance with one of the buttons on the remote controller. For example, as shown in FIG. 5, a task that is performed in accordance with a volume up/down button and a channel up/down button 421 corresponds to a task that is performed if slap motions in upward, downward, right, and leftward directions are recognized. Accordingly, upward, downward, leftward, and rightward directions buttons 422 correspond to slap motions in upward, downward, leftward, and rightward directions. A selection button 423 may correspond to a grab motion. A function button 425 may correspond to a pointing motion of a corresponding key if on screen display (OSD) includes a key guide.

The voice task and the motion task may change settings of the electronic apparatus 100 independently without being combined with each other. That is, the voice task may change the settings of the electronic apparatus 100 using a user voice recognized by the voice recognition module 130$k$, and the motion task may change the settings of the electronic apparatus 100 using a user motion recognized by the motion recognition module 130$l$.

The control unit 140 recognizes one of the user voice and the user motion through one of the voice recognition module 130$k$ and the motion recognition module 130$l$. If a user voice is recognized through the voice recognition module 130$k$, the control unit 140 executes a content having a content identifier corresponding to the recognized user voice from among a plurality of contents having content identifiers, respectively. If a user motion is recognized through the motion recognition module 130$l$, the control unit 140 changes a plurality of contents in accordance with a direction of the user motion.

The content recited herein may be a broadcast content. In particular, if a user voice is recognized through the voice recognition module 130$k$, the control unit 140 changes a current broadcast channel to a broadcast channel having a broadcast channel identifier corresponding to the recognized user voice from among a plurality of broadcast channels having broadcast channel identifiers, respectively. The channel identifier may include at least one of a channel number, a channel name, and a program name.

If a user motion is recognized through the motion recognition module 130$l$, the control unit 140 changes a plurality of broadcast channels in phases in accordance with a direction of the user motion. The user motion may include a slap motion. For example, if the recognized user motion is a slap motion in an upward direction, the control unit 140 performs channel changing so that a current broadcast channel is changed to a broadcast channel a number of which is increased by a predetermined number. If the recognized user motion is a slap motion in a downward direction, the control unit 140 performs a channel changing so that a current broadcast channel is changed to a broadcast channel a number of which is decreased by a predetermined number.

The content may be one of an image content, a music content, and a photo content. If the content is one of the image content, the music content, and the photo content, the content identifier may be a name of the content.

If the content is one of the image content, the music content, and the photo content, the user motion may include a slap motion. For example, if the recognized user motion is a slap motion in a rightward direction, the control unit 140 may change a current content to a next content on a content list including a plurality of contents to be reproduced, and, if the recognized user motion is a slap motion in a leftward direction, the control unit 140 may change a current content to a previous content on the content list.

If a voice start command is recognized through the voice recognition module 130$k$, the control unit 140 changes a mode of the electronic apparatus 100 to a voice task mode in which the electronic apparatus 100 is controlled in accordance with a user voice recognized through the voice recognition module 130$k$. If a motion start command is recognized through the motion recognition module 130$l$, the control unit 140 changes a mode of the electronic apparatus 100 to a motion task mode in which the electronic apparatus 100 is controlled in accordance with a user motion recognized through the motion recognition module 130*l*.

Specifically, the control unit 140 may be operated in one of a remote control mode in which the electronic apparatus 100 is controlled by a remote controlling apparatus (for example, a remote controller), a voice task mode in which the electronic apparatus 100 is controlled in accordance with a voice, and a motion task mode in which the electronic apparatus 100 is controlled in accordance with a motion. If a command to start another mode is input, the control unit 140 may change a current mode to a corresponding mode.

If a voice start command (trigger voice) is recognized through the voice recognition module 130*k* while the electronic apparatus 100 is in the remote control mode or the motion task mode, the control unit 140 changes a mode of the electronic apparatus 100 to the voice task mode. The voice start command is a command that includes a word matched with an operation of entering the voice task mode. For example, if a word "Ginny" is set as a voice start command, the control unit 140 changes a mode of the electronic apparatus 100 to the voice task mode when the word "Ginny" is recognized. The word regarding the voice start command may be directly changed by the user in a configuration mode of the electronic apparatus 100 or may be a fixed command that is defined as default at the manufacturing time of the electronic apparatus 100.

In the voice task mode, the control unit 140 performs a voice task corresponding to a word included in the voice uttered by the user using the voice database.

The control unit 140 may maintain the voice task mode until a start command to return to the remote control mode, a mode canceling command, or a motion start command to change to a motion task mode is recognized. If no voice is recognized for a predetermined time (for example, 5 minutes) after the mode has been changed to the voice task mode, the control unit 140 may return to the remote control mode automatically.

If a motion start command (trigger motion) is recognized through the motion recognition module 130*l* in the general mode or the voice task mode, the control unit 140 may change a current mode to the motion task mode. The motion start command is a pre-set motion to enter the motion task mode. For example, if a motion of shaking one hand horizontally 3~4 times is set as a motion start command, the control unit 140 changes the mode to the motion task mode when such a motion is recognized. The motion regarding the motion start command may be directly changed by the user in a configuration mode or may be a fixed motion that is defined as default at the manufacturing time of the electronic apparatus 100.

In the motion task mode, the control unit 140 performs a motion task corresponding to the user motion using the motion database. The control unit 140 may maintain the motion task mode until a start command to return to the remote control mode, a mode canceling command, or a voice start command to change to the voice task mode is recognized. If no motion is recognized for a predetermined time (for example, 5 minutes) after the mode has been changed to the motion task mode, the control unit 140 may return to the remote control mode automatically.

The control unit 140 displays one of voice assistance information including a voice item to guide voice recognition and motion assistance information including a motion item to guide motion recognition. If one of commands corresponding to the voice items included in the voice assistance information is recognized, the control unit 140 performs a voice task corresponding to the recognized command. If one of motions corresponding to the motion item included in the motion assistance information is recognized, the control unit 140 performs a motion task corresponding to the recognized motion.

Specifically, if a voice start command is recognized through the voice recognition module 130*k*, the control unit 140 may control to display voice items regarding voice tasks that are controllable by the user voice. The voice items may display commands corresponding to the various voice tasks. Accordingly, if the user utters a certain command, the user can easily recognize which voice task will be performed and thus can perform the voice task more easily.

If a motion start command is recognized through the motion recognition module 130*l*, the control unit 140 may control to display a motion item regarding motion tasks that are controllable by the user motion. The motion item may display motions corresponding to the various motion tasks. Accordingly, if the user performs a certain motion, the user can easily recognize which motion task will be performed and thus can perform the motion task more easily.

The voice item or the motion item may be displayed on the same area of a display screen (for example, a lower portion of the screen). The area on which the voice item or the motion item is displayed may be overlapped with a displayed image. However, this is merely an example and the voice item and the motion item may be displayed on other locations or in other methods. For example, the voice item or the motion item may be displayed on a right portion or a left portion of the display screen.

The task of the electronic apparatus 100 may be divided into the voice task that is controlled by the user voice and the motion task that is controlled by the user motion as follows:

TABLE 1

| Voice Task | power control, channel shortcut, volume level setting, mute, external input change, searching, function execution (if an object name is definite), function cancellation, text input |
| Motion Task | channel changing, volume level control, function execution (if an object name is indefinite), reproduction control, slide bar control, cursor pointing |

The voice task shown in table 1 may be performed in the voice task mode which is executed by the voice start command, and the motion task shown in table 1 may be performed in the motion task mode which is executed by the motion start command.

Hereinafter, the voice tasks which are controlled in accordance with the user voice will be explained with reference to FIGS. 6 to 32, and the motion tasks which are controlled in accordance with the user motion will be explained with reference to FIGS. 33 to 58.

Figure 6:
FIGS. 6 to 32 are views to explain various examples of a method for performing a voice task.
Figure 7:
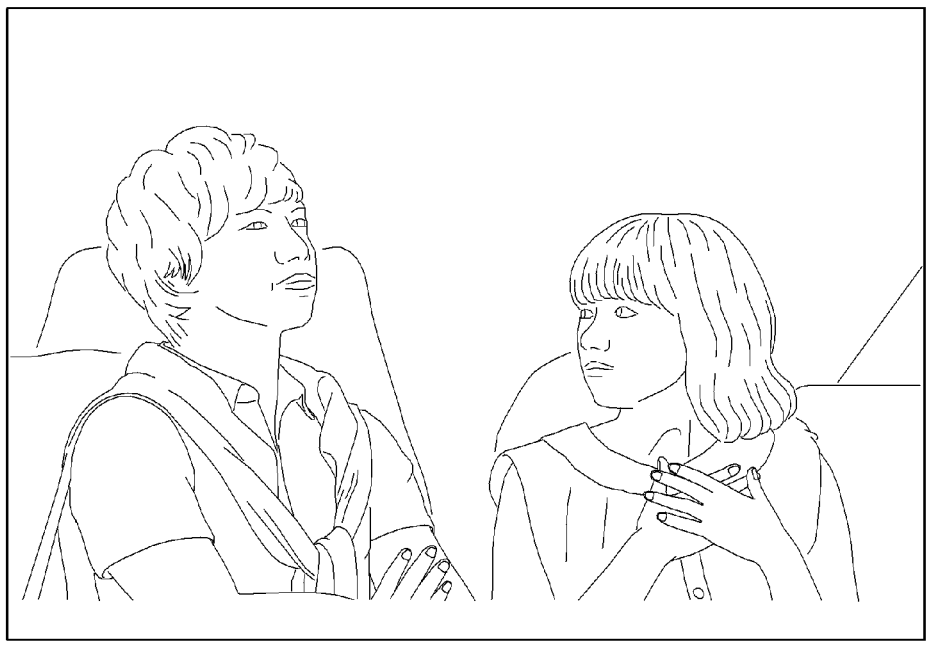

FIGS. 6 and 7 are views to explain power on using the voice recognition according to an exemplary embodiment. As shown in FIG. 6, in a standby mode in which an image is not output but power is supplied to the voice input unit 110 and the control unit 140, if "power on" is recognized through the voice recognition module 130*k*, the electronic apparatus 100 is turned on as shown in FIG. 7.

Figure 8:
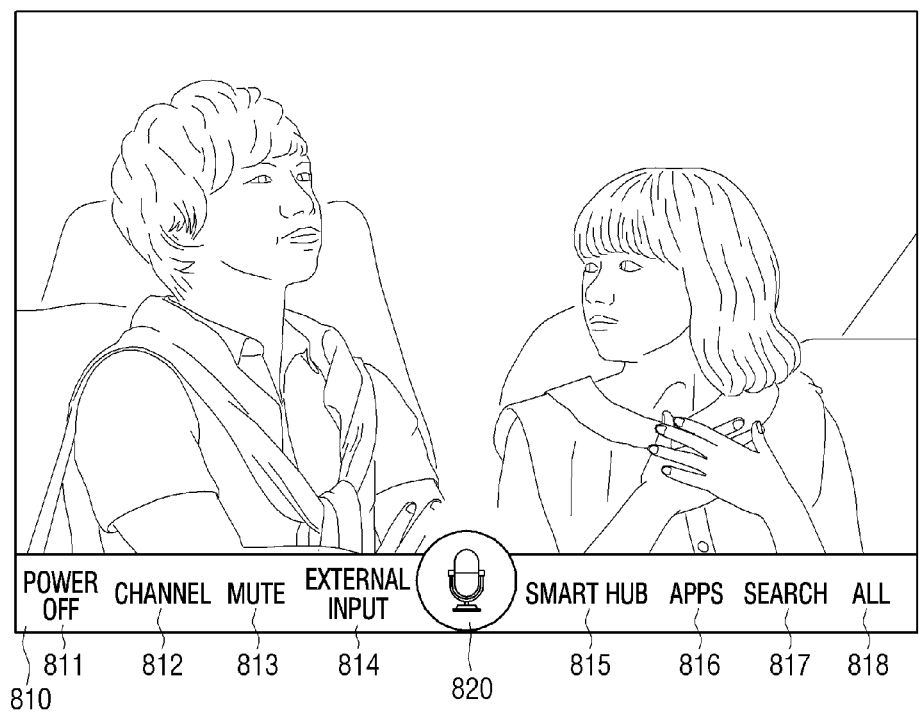
Figure 9:
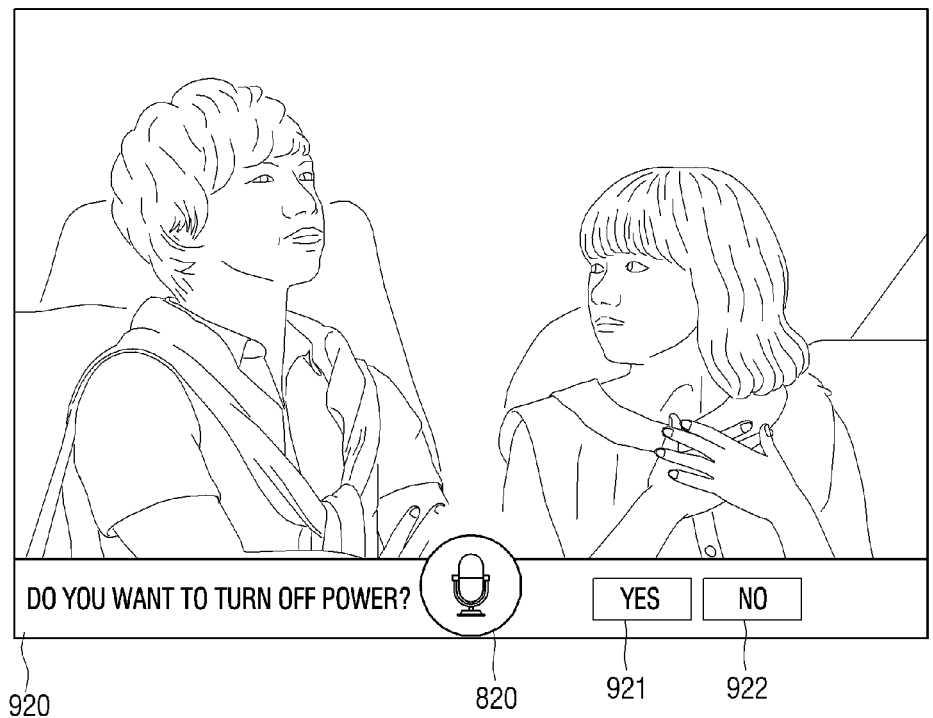
Figure 10:

FIGS. 8 to 10 are views to explain power off using voice recognition according to an exemplary embodiment. As shown in FIG. 8, if the electronic apparatus 100 enters the voice task mode and displays the voice assistance information on the lower portion of the display screen and "power off" corresponding to a voice item 811 is recognized through the voice recognition module 130*k*, the electronic apparatus 100 displays a guide area 920 to confirm whether to turn off the electronic apparatus 100 again on the voice guide information, as shown in FIG. 9. If "Yes" corresponding to a voice item 922 is recognized through the voice recognition module 130k, the electronic apparatus 100 is turned off as shown in FIG. 10.

Figure 11:
Figure 12:
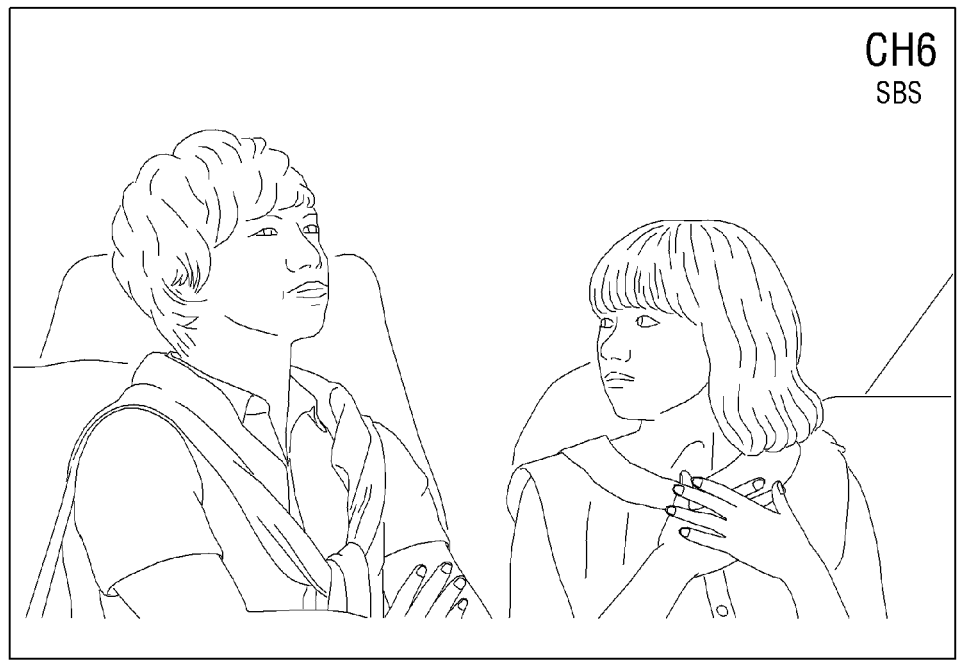

FIGS. 11 and 12 are views to explain smart power on using voice recognition according an exemplary embodiment. The smart power on is a function that turns on the electronic apparatus 100 and simultaneously changes a current channel to a channel desired by the user. As shown in FIG. 11, in the standby mode in which an image is not output but power is supplied to the voice input unit 110 and the control unit 140, if "Ginny" and "Channel 6" are continuously recognized through the voice recognition module 130k, the electronic apparatus 100 is turned on and displays channel 6 as shown in FIG. 12.

Figure 13:
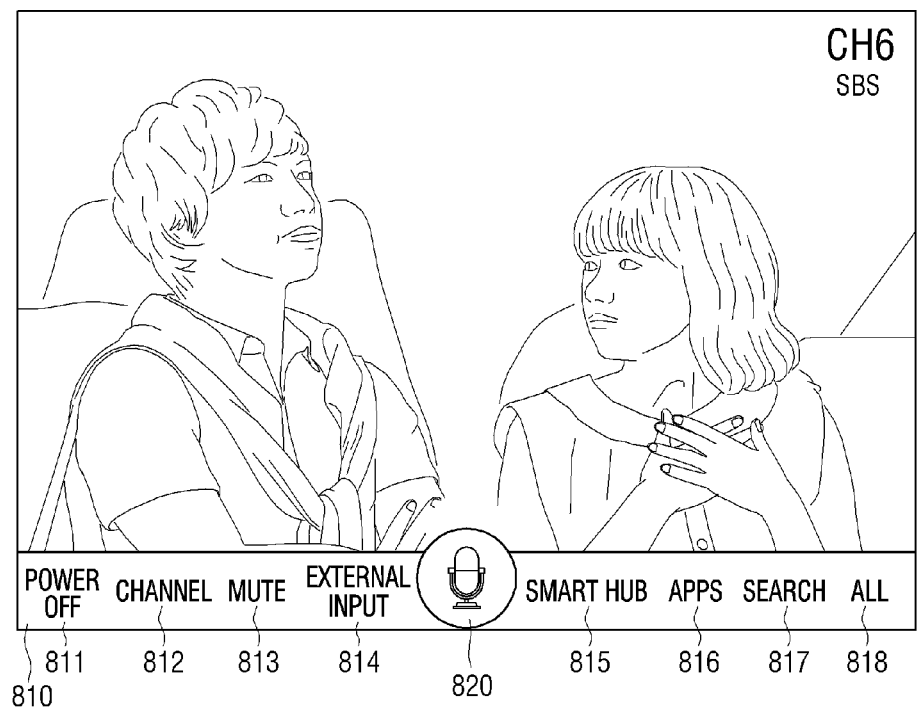
Figure 14:
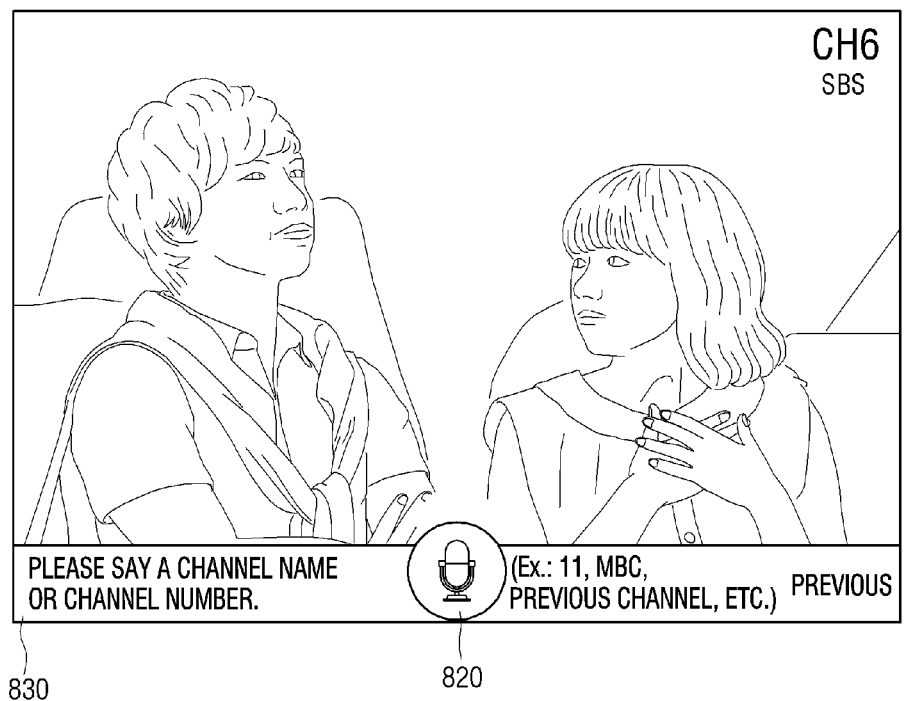

FIGS. 13 to 16 are views to explain channel shortcut using voice recognition including a channel number according to an exemplary embodiment. If the electronic apparatus 100 enters the voice task mode and displays the voice assistance information on the lower portion of the display screen and "channel" corresponding to a voice item 812 is recognized through the voice recognition module 130k as shown in FIG. 13, the electronic apparatus 100 displays a guide area 830 to guide a channel number and a channel name on the voice assistance information on the lower end of the display screen as shown in FIG. 14. If the guide area 830 is displayed and a voice "seven" is recognized through the voice recognition module 130k, the electronic apparatus 100 changes a channel to tune to channel 7.

Figure 15:
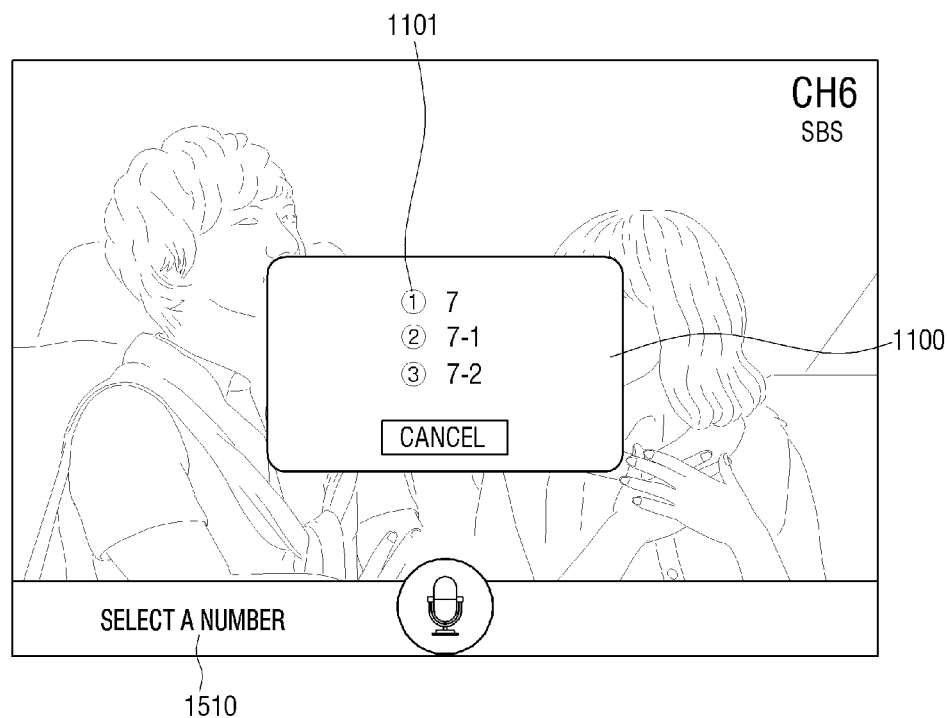

If there is a channel including "seven" recognized through the voice recognition module 130k or there is a candidate group similar to "seven", the electronic apparatus 100 displays a list of a voice candidate group 1100 and a candidate group selection guide 1510 to guide a way of inputting the voice candidate group, as shown in FIG. 15.

Figure 16:
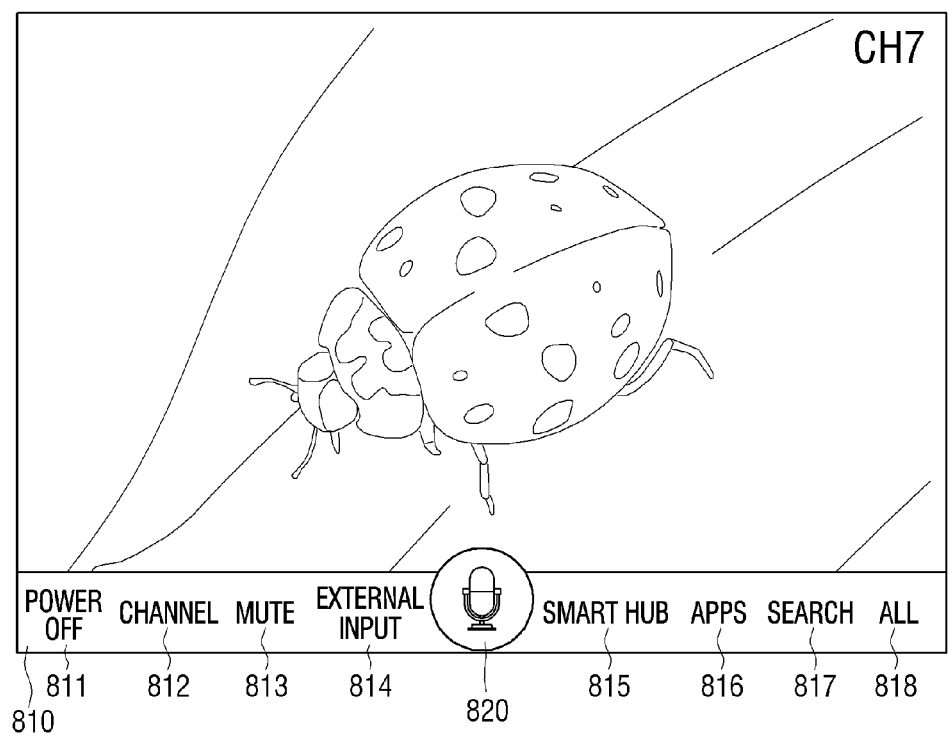

If the list of the voice candidate group 1100 is displayed and "number 1" corresponding to a number one item 1101 on the list of the voice candidate group is recognized through the voice recognition module 130k, the electronic apparatus 100 tunes to channel 7 as shown in FIG. 16.

Figure 17:
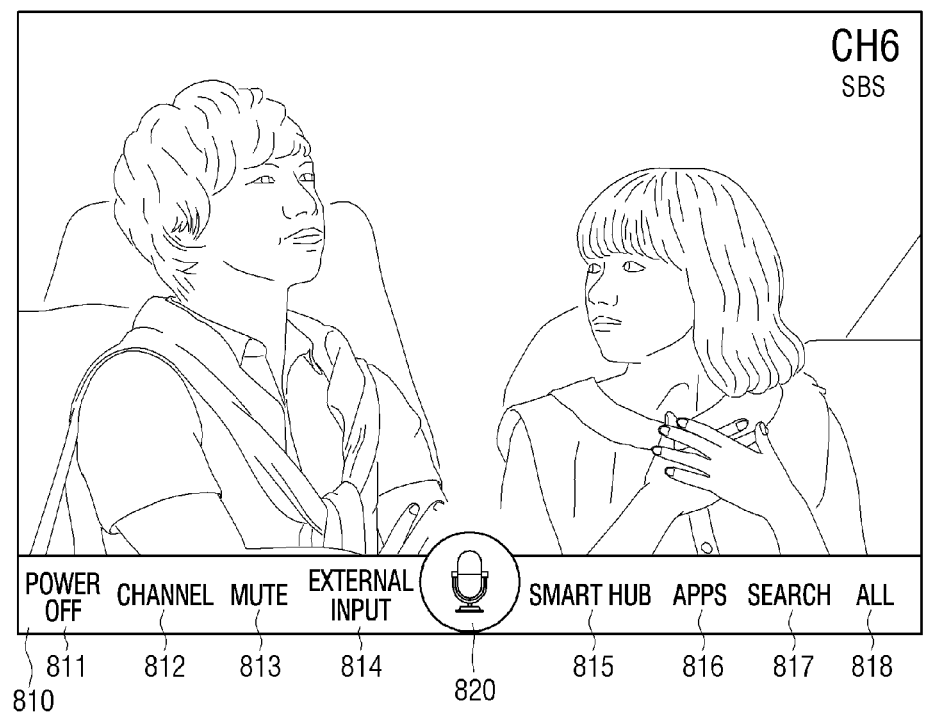
Figure 18:
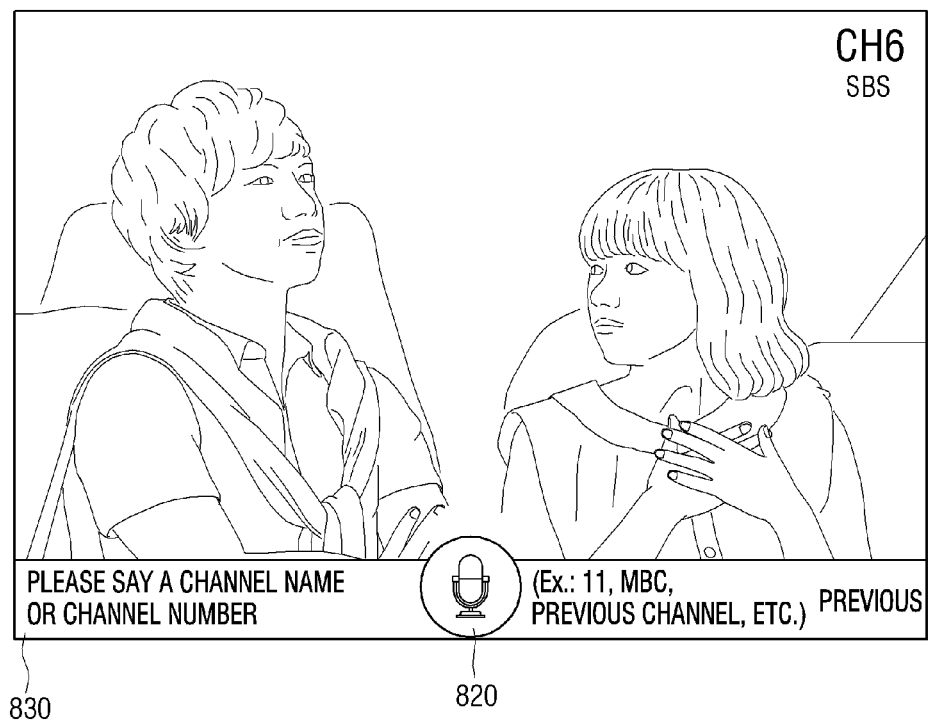
Figure 19:
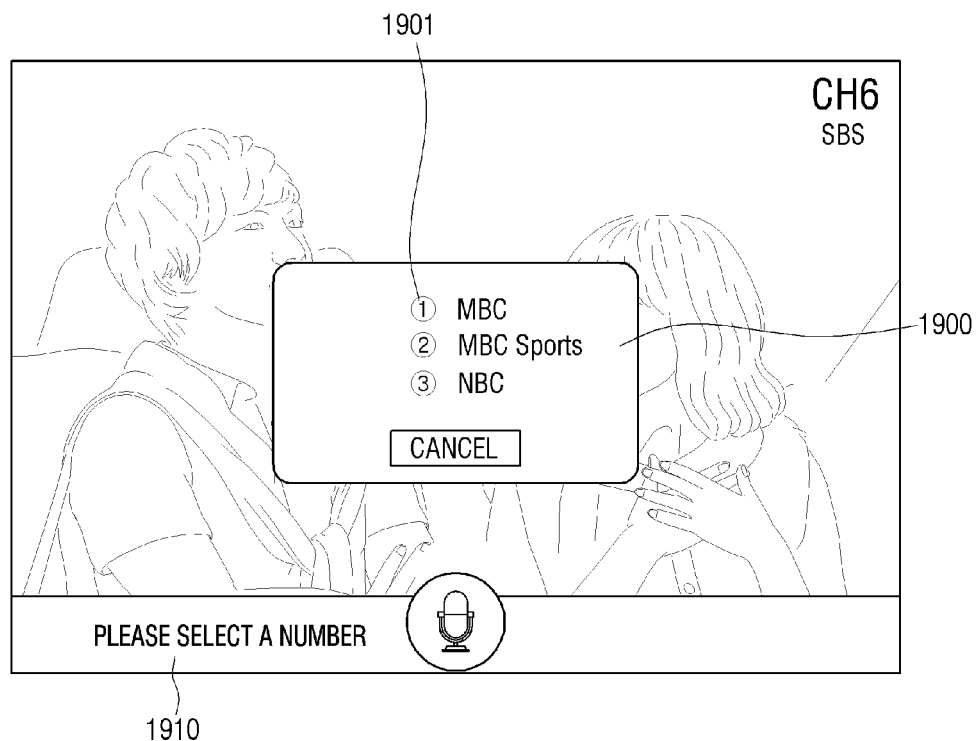
Figure 20:
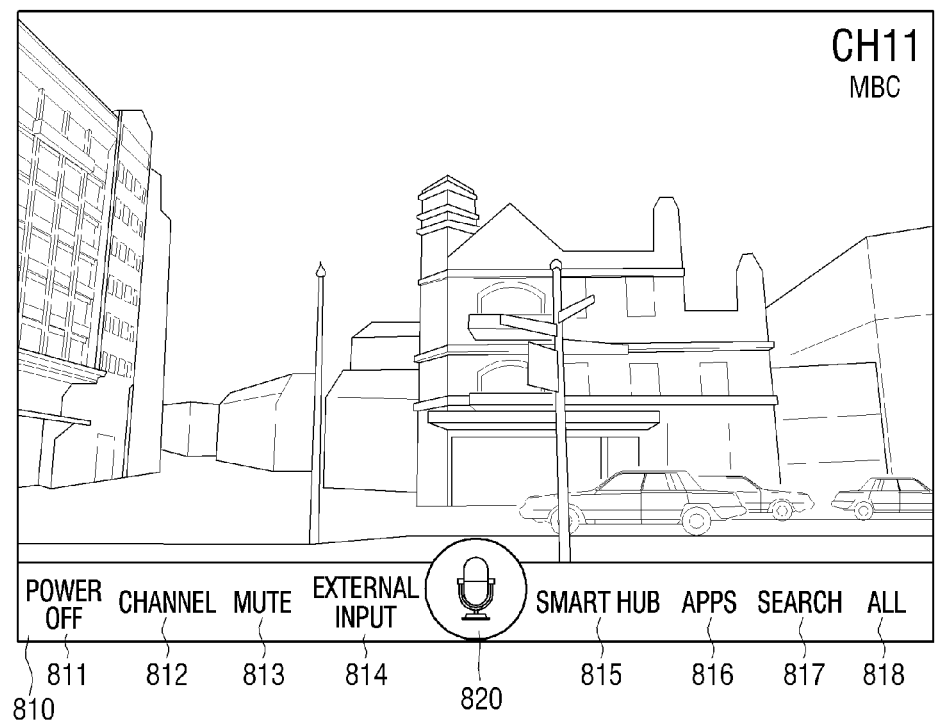

FIGS. 17 to 20 are views to explain channel shortcut using voice recognition including a channel name according to an exemplary embodiment. If the electronic apparatus 100 enters the voice task mode and displays the voice assistance information on the lower portion of the display screen and "channel" corresponding to the voice item 812 is recognized through the voice recognition module 130k as shown in FIG. 17, the electronic apparatus 100 displays the guide area 830 to guide a channel number and a channel name on the voice assistance information as shown in FIG. 18. If the guide area 830 is displayed and a voice "MBC" is recognized through the voice recognition module 130k, the electronic apparatus 100 tunes to channel 11 having the channel name "MBC" as shown in FIG. 20.

If there is a channel including "MBC" recognized through the voice recognition module 130k or there is a candidate group similar to "MBC," the electronic apparatus 100 displays a list of a voice candidate group 1900 and a candidate group selection guide 1910 to guide a way of inputting the voice candidate group as shown in FIG. 19. If the list of the voice candidate group 1900 is displayed and a voice "number 11" corresponding to a number one item 1901 on the list of the voice candidate group 1900 is recognized through the voice recognition module 130k, the electronic apparatus 100 tunes to channel 11 having the channel name "MBC" as shown in FIG. 20.

Figure 21:
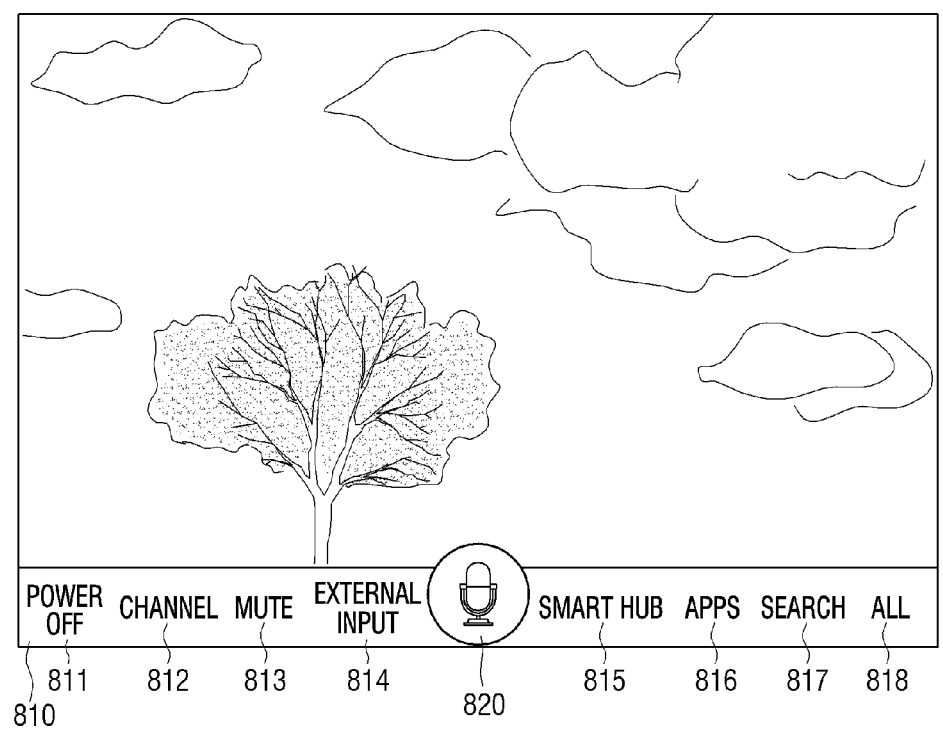
Figure 22:
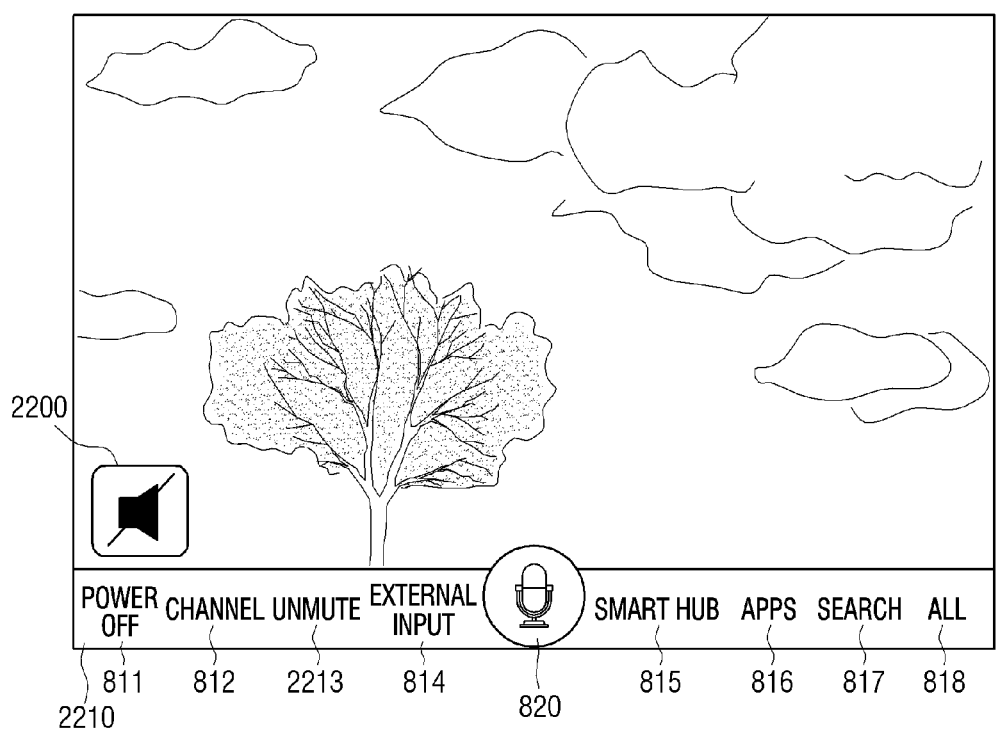
Figure 23:
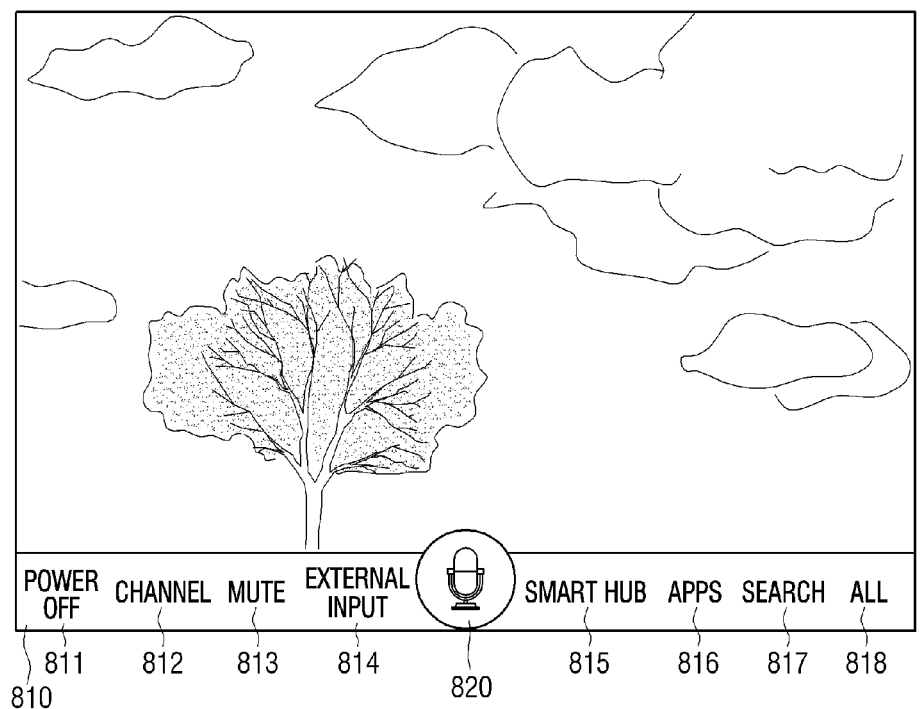

FIGS. 21 to 23 are views to explain mute using voice recognition according to an exemplary embodiment. As shown in FIG. 21, if the voice assistance information is displayed on the lower portion of the display screen and "mute" corresponding to a voice item 813 is recognized through the voice recognition module 130k, the electronic apparatus 100 controls the audio output unit 196 not to output audio. Also, as shown in FIG. 22, the electronic apparatus 100 displays a mute icon 2200 on the display screen. At this time, a guide area 2210 displays a unmute 2213 command instead of the mute 813 command.

If "unmute" is recognized through the voice recognition module 130k, the electronic apparatus 100 controls the audio output unit 196 to output an audio at a previous level that is effective before mute. Also, as shown FIG. 23, the electronic apparatus 100 deletes the mute icon 2200 on the display screen.

Figure 24:
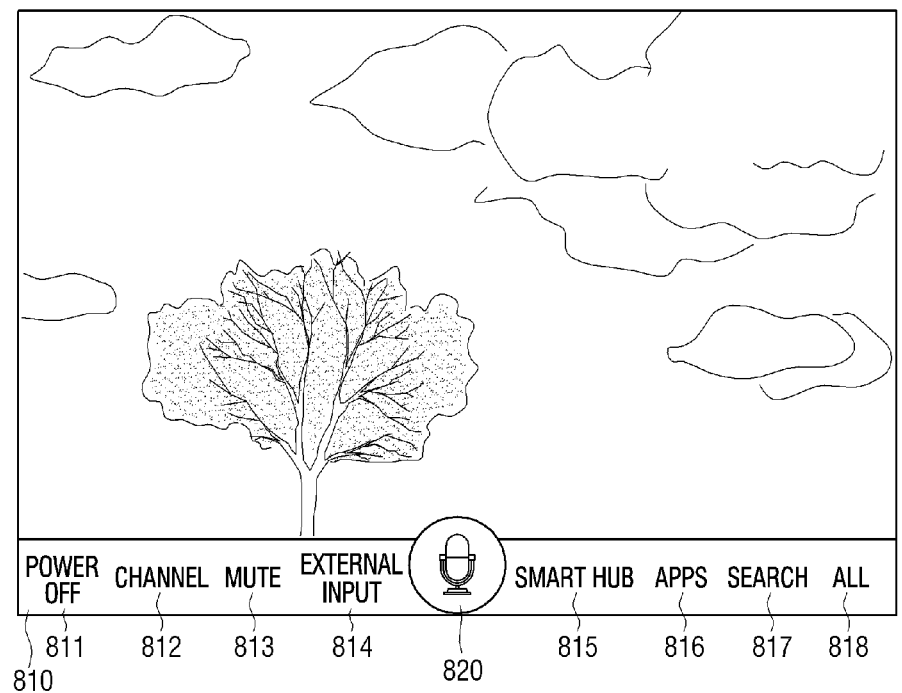
Figure 25:
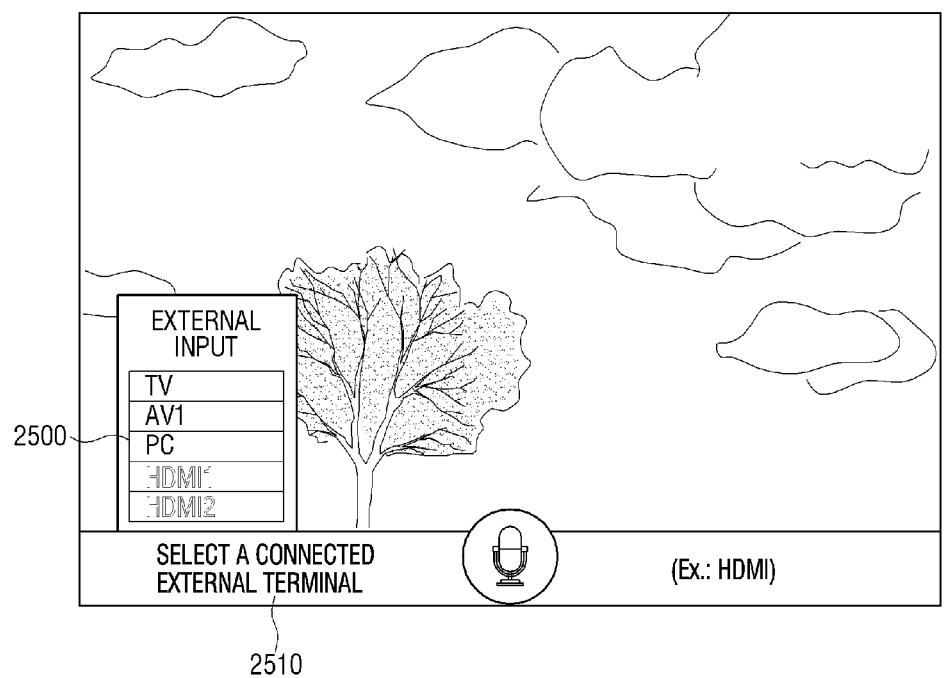
Figure 26:
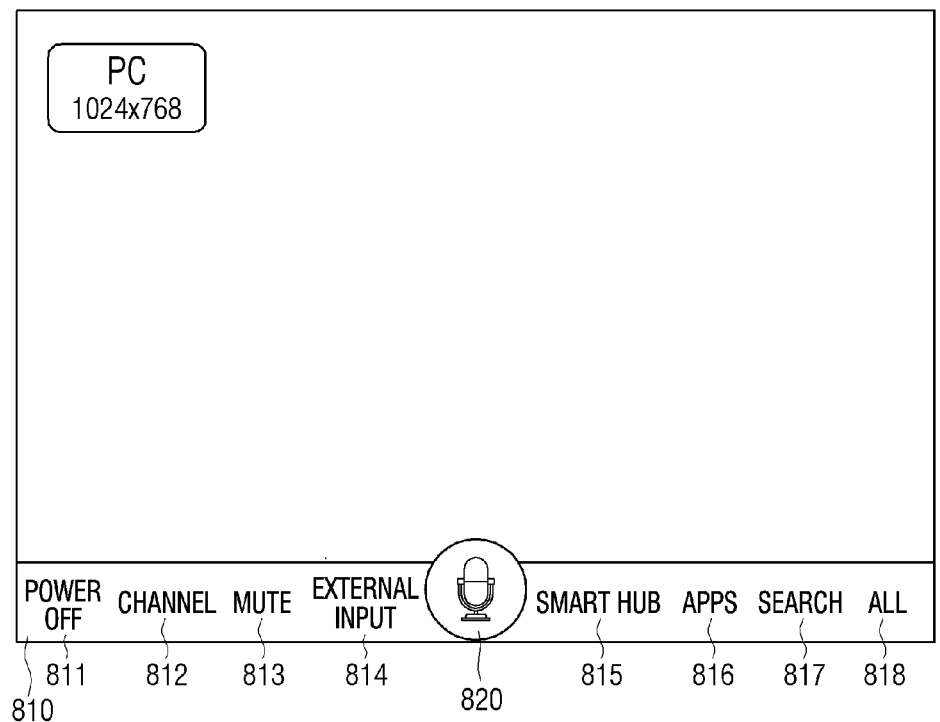

FIGS. 24 to 26 are views to explain external input change using voice recognition according to an exemplary embodiment. As shown in FIG. 24, if the electronic apparatus 100 enters the voice task mode and display the voice assistance information on the lower portion of the display screen, and "external input" corresponding to a voice item 814 is recognized through the voice recognition module 130k, the electronic apparatus 100 displays an external input list 2500 and a guide 2510 to guide selection of an external input as shown in FIG. 25. The external input list 2500 clearly displays a USB external terminal, an AV1 external terminal, and a PC external terminal, which are connected to the external terminal input unit 160, and faintly displays an HDMI 1 and an HDMI 2, which are not connected to the external terminal input unit 160. If the external input list 2500 is displayed and "PC" is recognized through the voice recognition module 130, the electronic apparatus 100 displays a connection state with the external input "PC" on the display screen.

Figure 27:
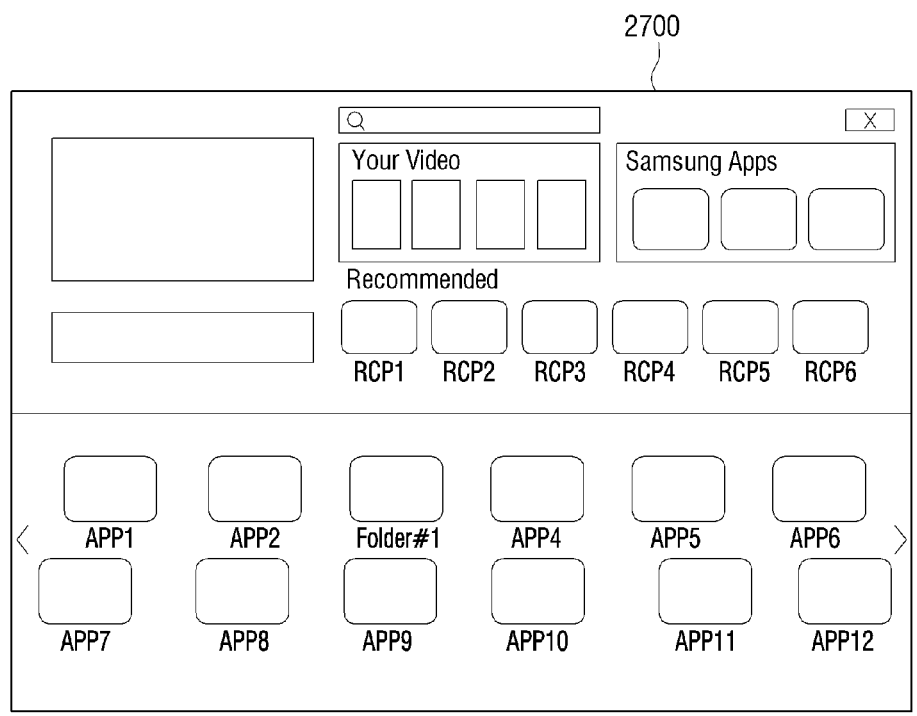
Figure 29:
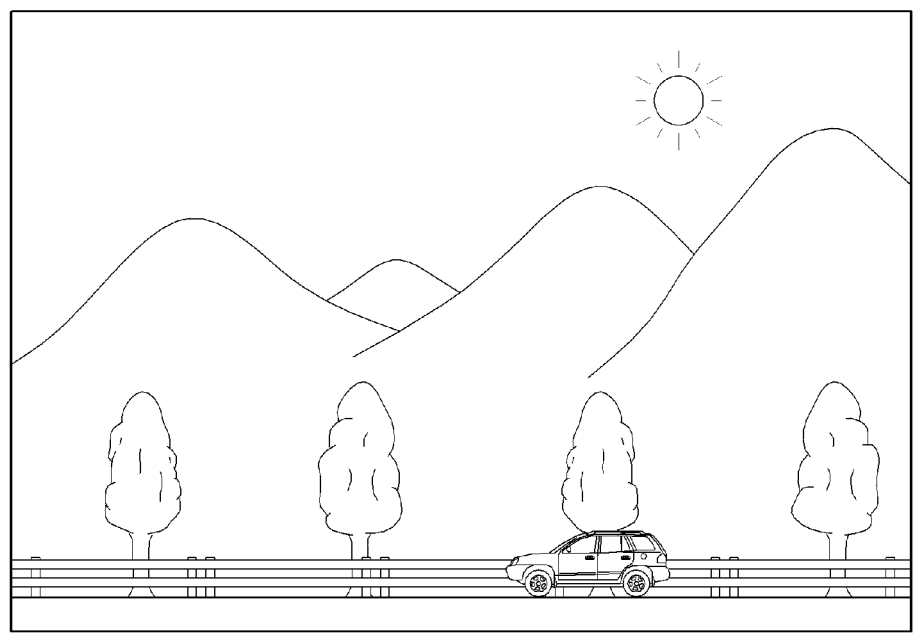

FIGS. 27 and 29 are views illustrating a function execution task having a definite name to be uttered according to an exemplary embodiment. As shown in FIG. 27, if a user command to display a content list to perform smart functions (for example, functions of accessing the Internet, executing an application, reproducing a moving image, and listening to music) is input, a smart hub 2700 is displayed. The smart hub 2700 is a UI serving as a hub of functions supported by the electronic apparatus 100 and is a UI that displays executable icons corresponding to a plurality of functions supported by the electronic apparatus 100 (for example, functions of viewing a video, listening to music, and accessing the Internet). Also, the smart hub 2700 is a UI that displays executable icons corresponding to contents stored in the storage unit 130 of the electronic apparatus 100 (for example, a photo, music, and a video), executable icons corresponding to contents received from external sources (for example, a photo, music, and a video), and executable icons corresponding to applications connectable to the outside (for example, an Internet browser).

Figure 28:
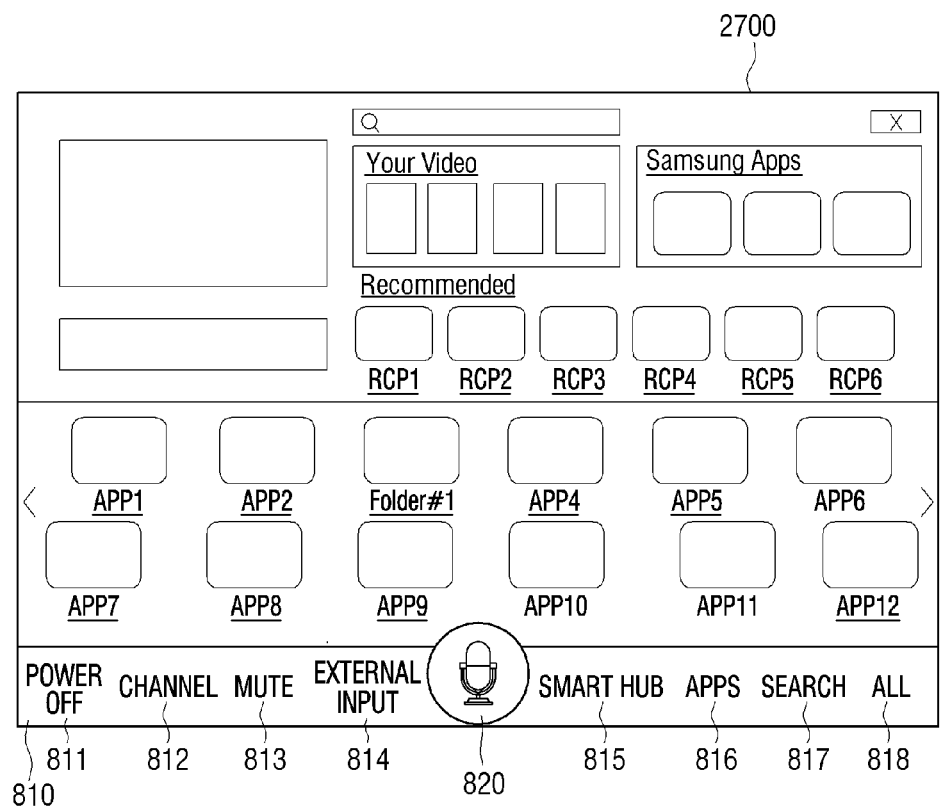

If "Ginny" is recognized through the voice recognition module 130k to enter the voice task mode, the electronic apparatus 100 displays a voice GUI on the lower portion of the display screen and enters the voice task mode as shown in FIG. 28. When entering the voice task mode, the electronic apparatus 100 underlines names of the executable icons of the smart hub 2700 so that the smart hub 2700 displays the executable icons selectable by the user voice.

As shown in FIG. 28, if the voice assistance information is displayed and a voice "your video" is recognized through the voice recognition module 130k, the electronic apparatus 100 executes a moving image included in "your video" of the smart hub 2700 as shown in FIG. 29. If one moving image is included in "your video", the moving image is promptly executed, and, if a plurality of moving images are included in "your video", a list of moving images included in "your video" is displayed.

Figure 30:
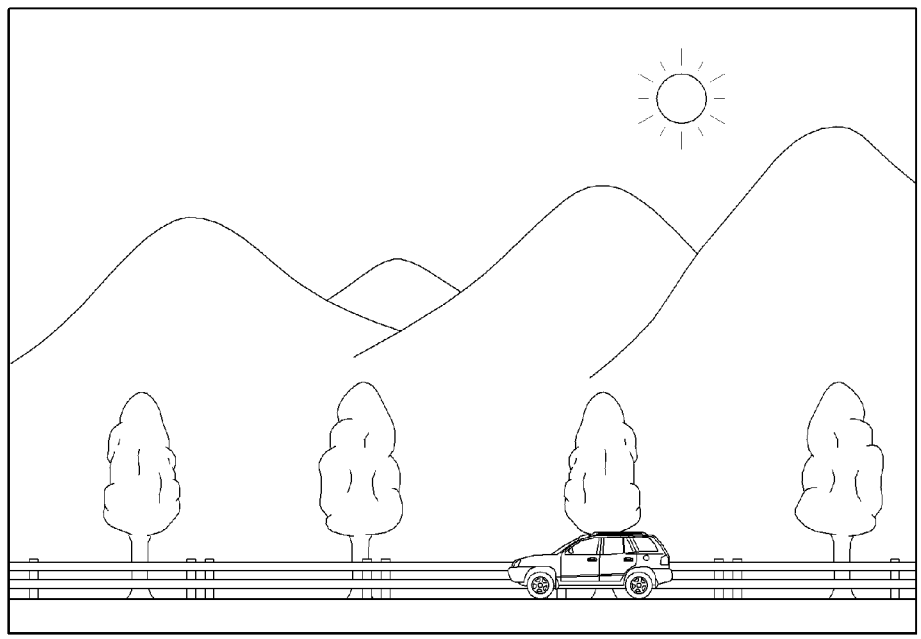
Figure 31:
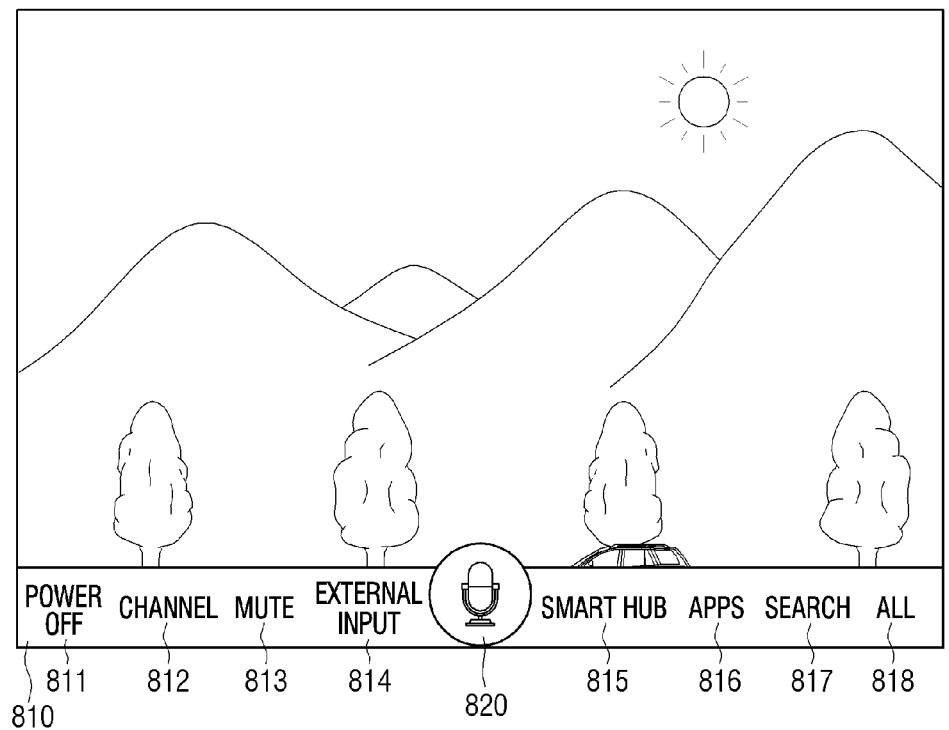
Figure 32:
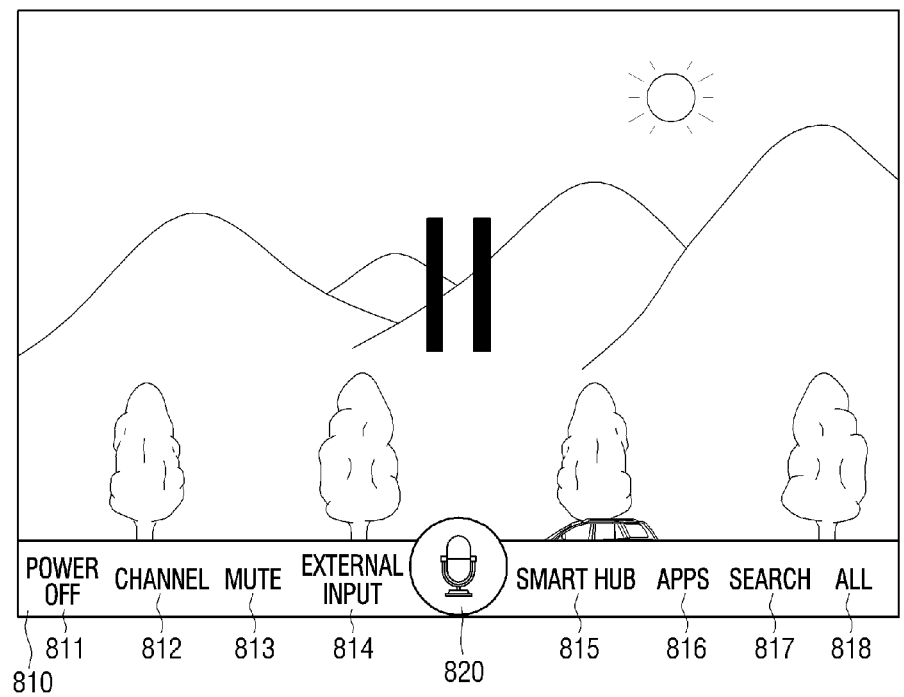

FIGS. 30 to 32 are views to explain an image reproducing function and an image stop function using voice recognition according to an exemplary embodiment. As shown in FIG. 30, if an image (for example, a moving image stored in the storage unit 130) is reproduced and "Ginny" is recognized through the voice recognition module 130*k* to enter the voice task mode, the electronic apparatus 100 enters the voice task mode and displays the voice assistance information on the lower portion of the display screen, as shown in FIG. 31.

In this state, if "pause" is recognized through the voice recognition module 130*k*, the electronic apparatus 100 temporarily stops reproducing the current image and displays a pause icon on the display screen as shown in FIG. 32. If "replay" is recognized through the voice recognition module 130*k*, the electronic apparatus 100 reproduces the paused image as shown in FIG. 31.

A pause/stop command may be displayed on the voice assistance information while the image is reproduced, and a reproducing command may be displayed while the image is paused.

As described above, since the voice task that is controlled in accordance with the user voice recognized through the voice recognition module 130*k* is a task that has an utterable identifier or a task that requires text input, the user can control the voice task through his/her voice more easily and more conveniently.

Figure 33:
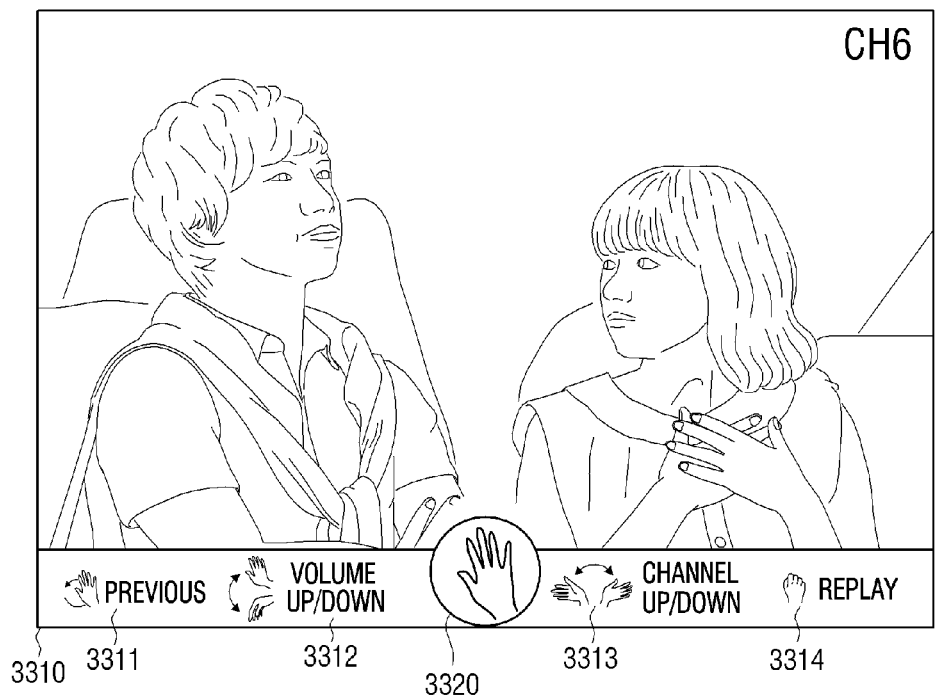
FIGS. 33 to 58 are views to explain various examples of a method for performing a motion task.
Figure 34:
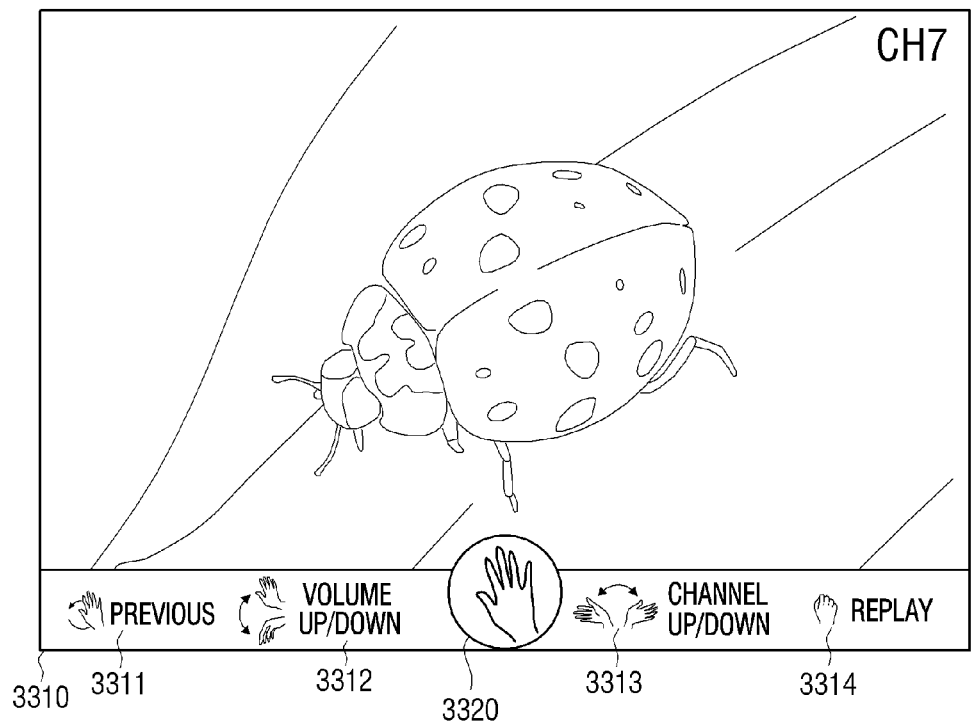

FIGS. 33 and 34 are views to explain channel changing using motion recognition according to an exemplary embodiment. If the electronic apparatus 100 enters the motion task mode and displays the motion assistance information on the lower portion of the display screen as shown in FIG. 33, and a slap motion of moving a user's hand in a rightward direction, which corresponds to a motion item 3313, is recognized through the motion recognition module 130*l*, the electronic apparatus 100 tunes to a next channel of a current channel, that is, channel 7, which is increased from current channel 6 by 1, as shown in FIG. 34. On the other hand, if channel 7 is displayed as shown in FIG. 34 and a slap motion of moving the user's hand in a leftward direction from a current location, which corresponds to the motion item 3313, is recognized, the electronic apparatus 100 tunes to a previous channel, that is, channel 6 which is decreased from current channel 7 by 1, as shown in FIG. 33.

Figure 35:
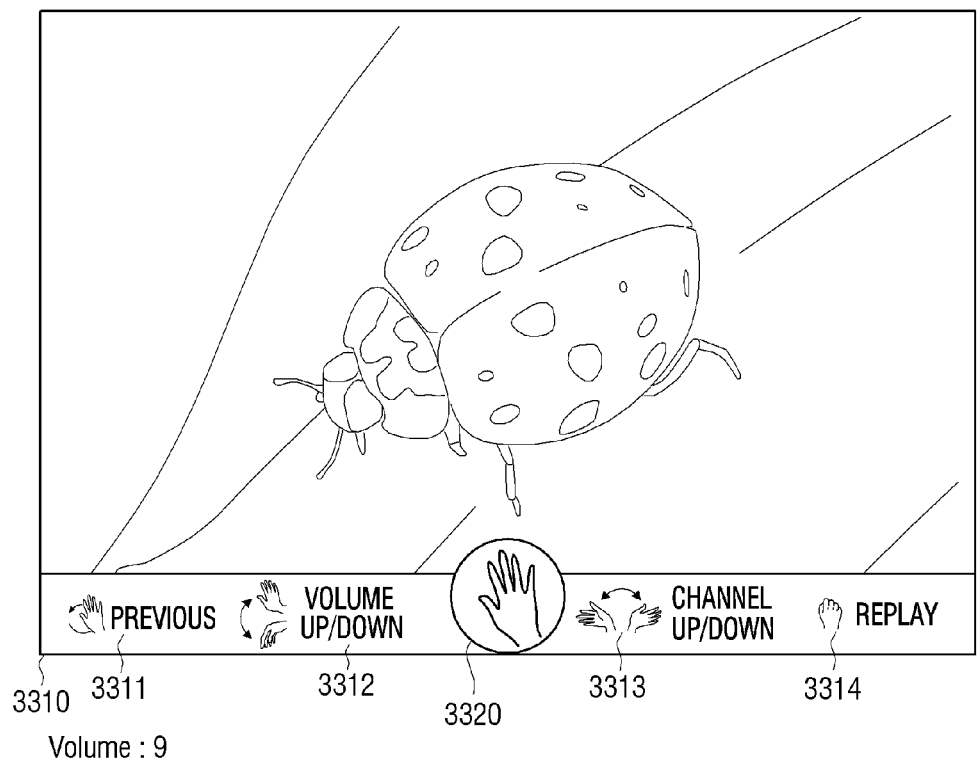
Figure 36:
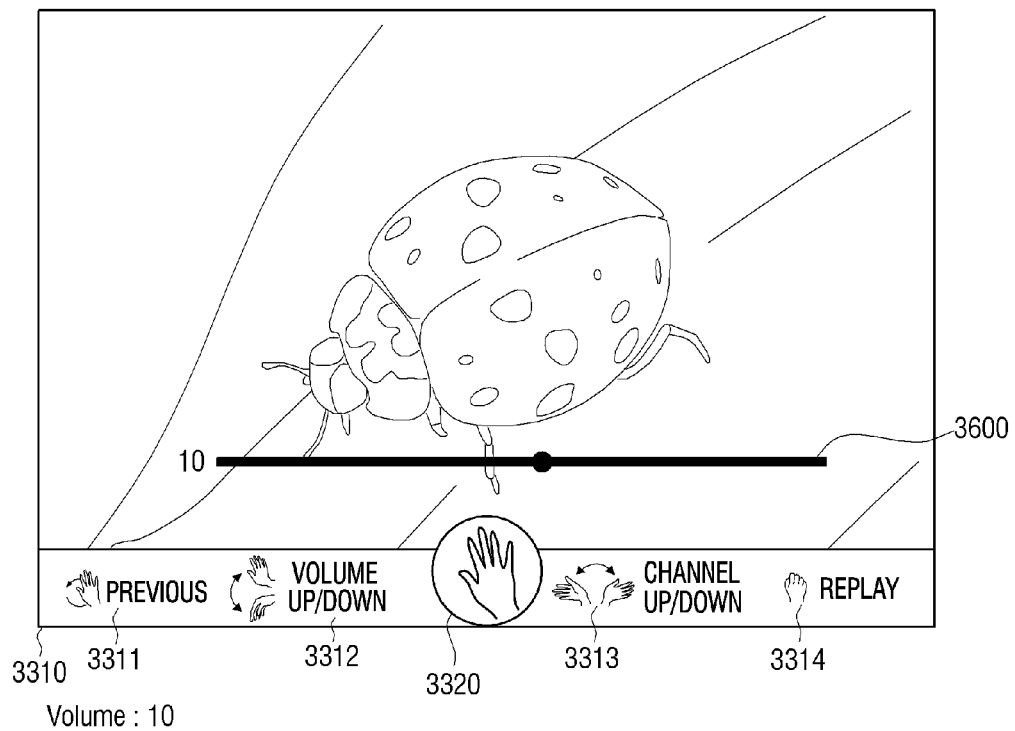
Figure 37:
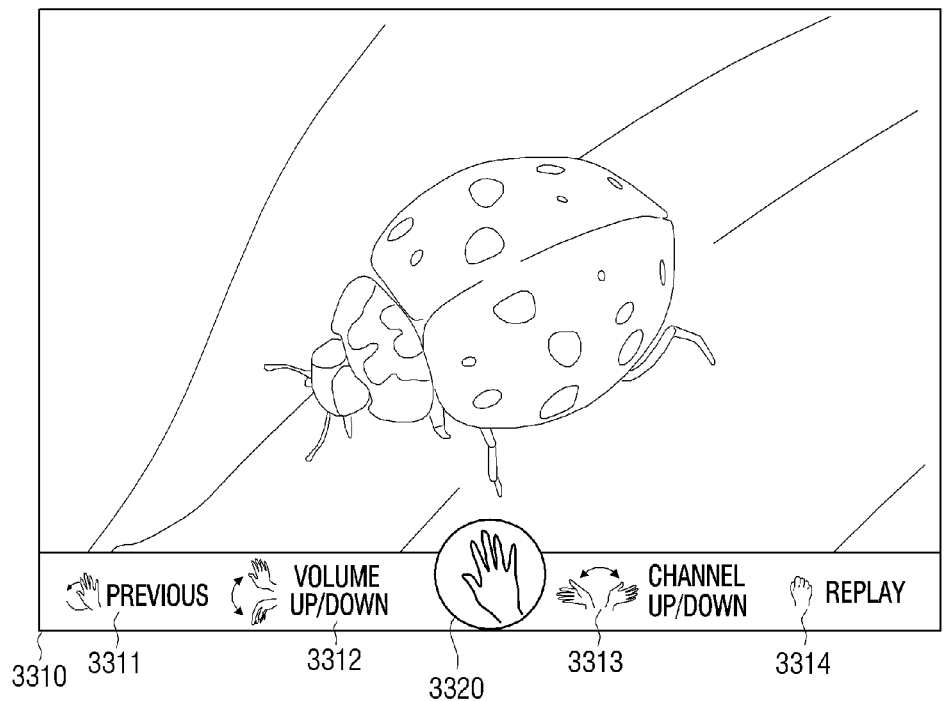

FIGS. 35 and 37 are views to explain volume level control using motion recognition according to an exemplary embodiment. If the electronic apparatus 100 enters the motion task mode and displays the motion assistance information on the lower portion of the display screen as shown in FIG. 35, and a slap motion of moving the user's hand in an upward direction, which corresponds to a motion item 3312, is recognized through the motion recognition module 130*l*, the electronic apparatus 100 displays a volume level control bar 3600 displaying a volume level and outputs a volume of a next level 10 which is increased from a current volume level 9 by one level as shown in FIG. 36. If no user motion is recognized for a predetermined time (for example, 5 seconds) after the volume level control bar 3600 has been displayed, the electronic apparatus 100 removes the volume level control bar 3600 from the display screen and outputs an audio in accordance with the controlled volume level.

Figure 38:
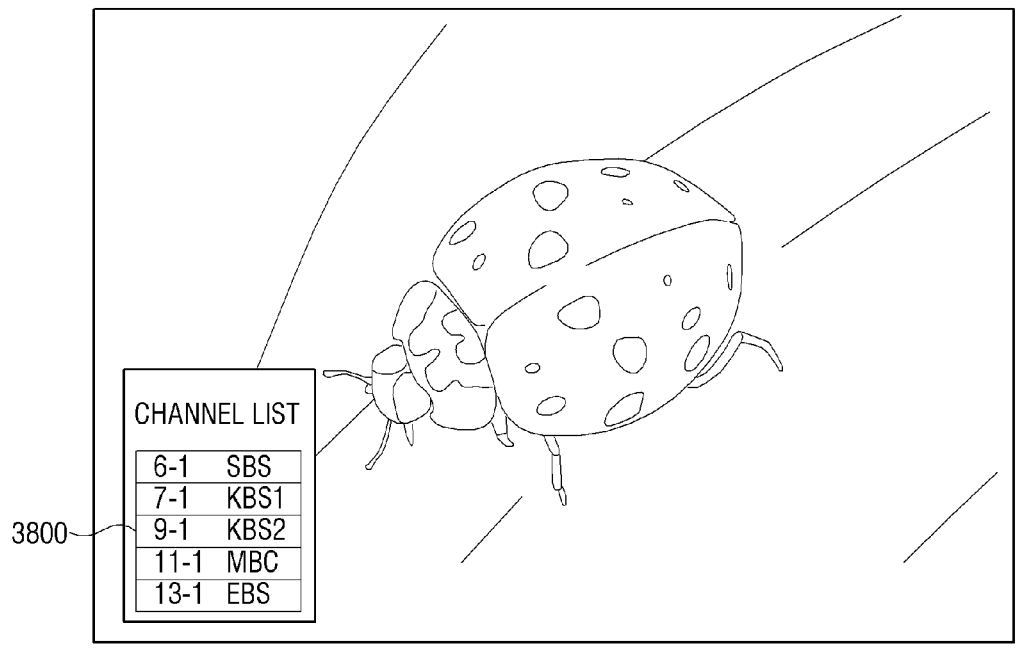
Figure 39:
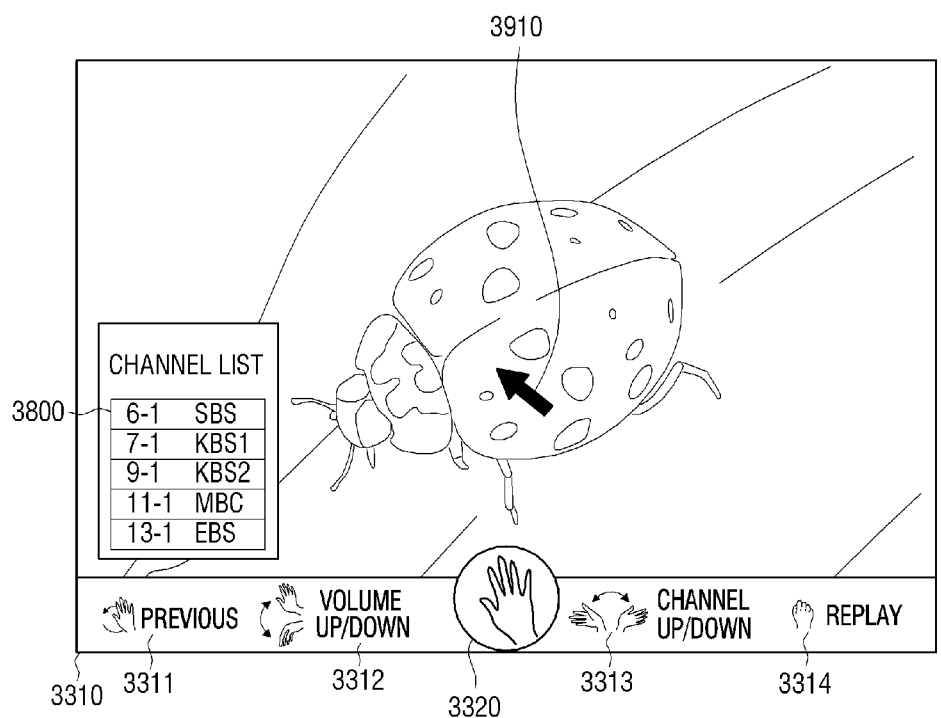

FIGS. 38 to 41 are views to explain channel change using a pointing motion of the user according to an exemplary embodiment. If the user inputs a command to generate a channel list 3800 (for example, a channel list button on a remote controller) in order to select a channel and the channel list 3800 is displayed on the display screen as shown in FIG. 38, and a motion to enter the motion task mode is recognized through the motion recognition module 130*l* (for example, shaking a user's hand 3~4 times), the electronic apparatus 100 generates a cursor 3910 and displays the motion assistance information on the lower portion of the display screen as shown in FIG. 39.

Figure 40:
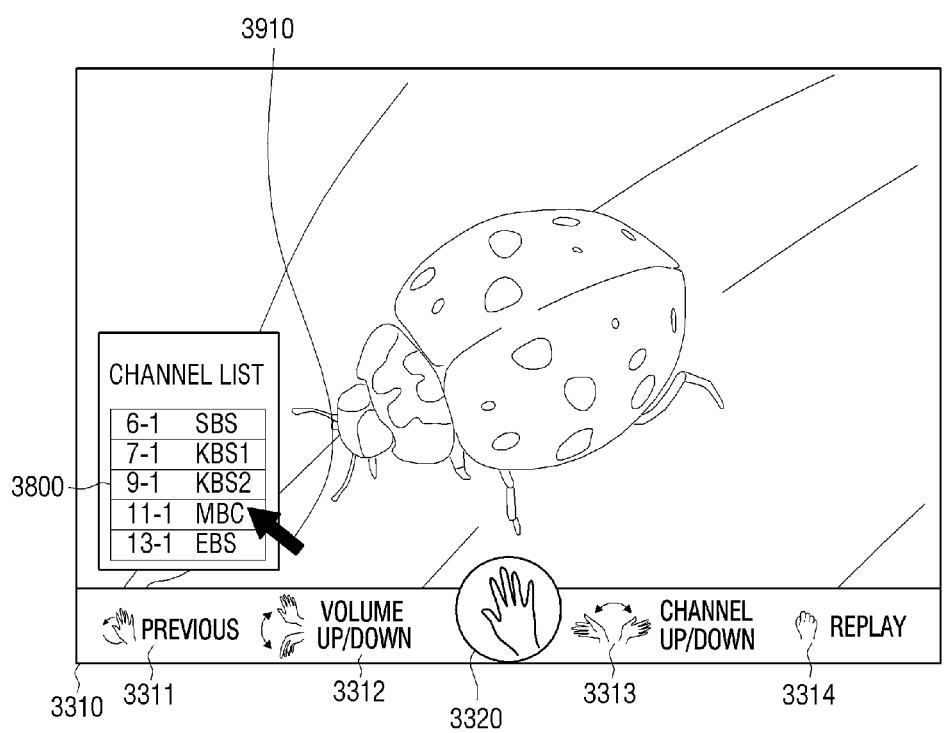

If the motion assistance information is displayed and a motion of moving the hand from a current location in a left-downward direction to move the cursor 3910 is recognized through the motion recognition module 130*l*, the electronic apparatus 100 moves the cursor 2010 to "11-1 MBC" in accordance with the motion as shown in FIG. 40.

Figure 41:
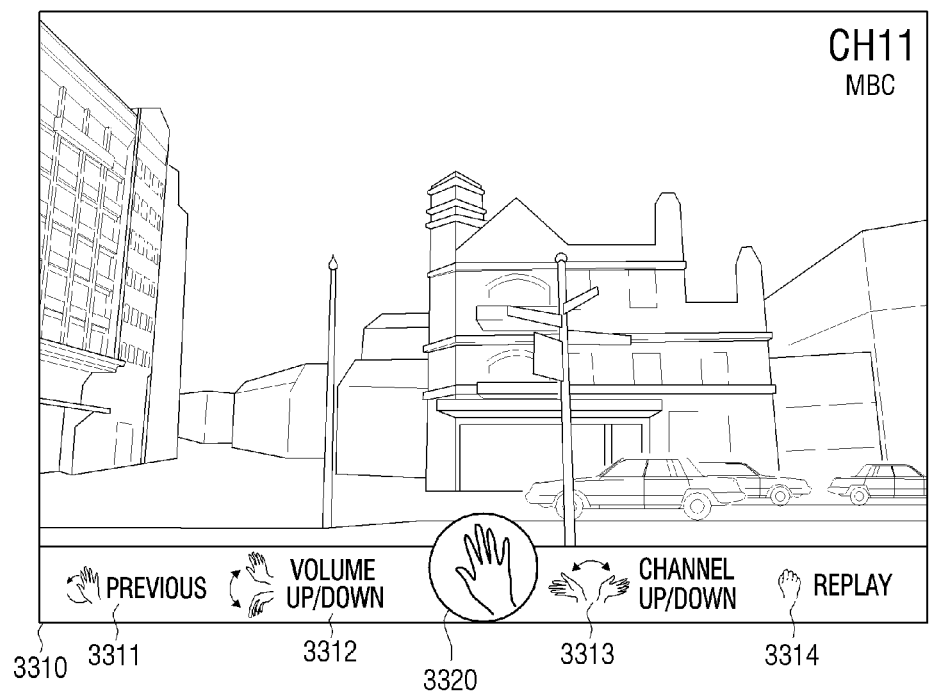

If a grab motion, which corresponds to a motion item 3314, is recognized through the motion recognition module 130*l*, the electronic apparatus 100 tunes to "11-1 MBC" and displays channel "11-1 MBC" as shown in FIG. 41.

Figure 42:
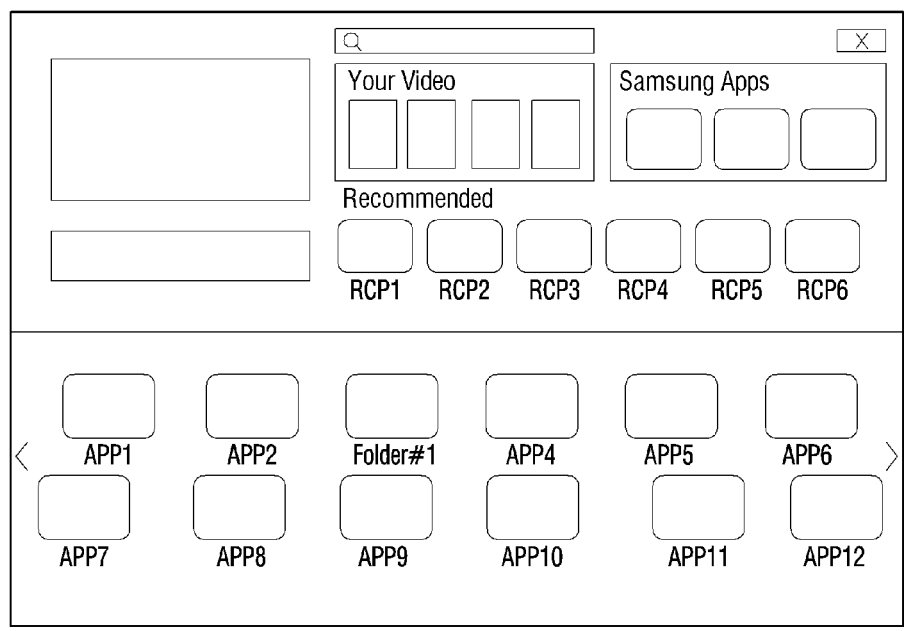
Figure 43:
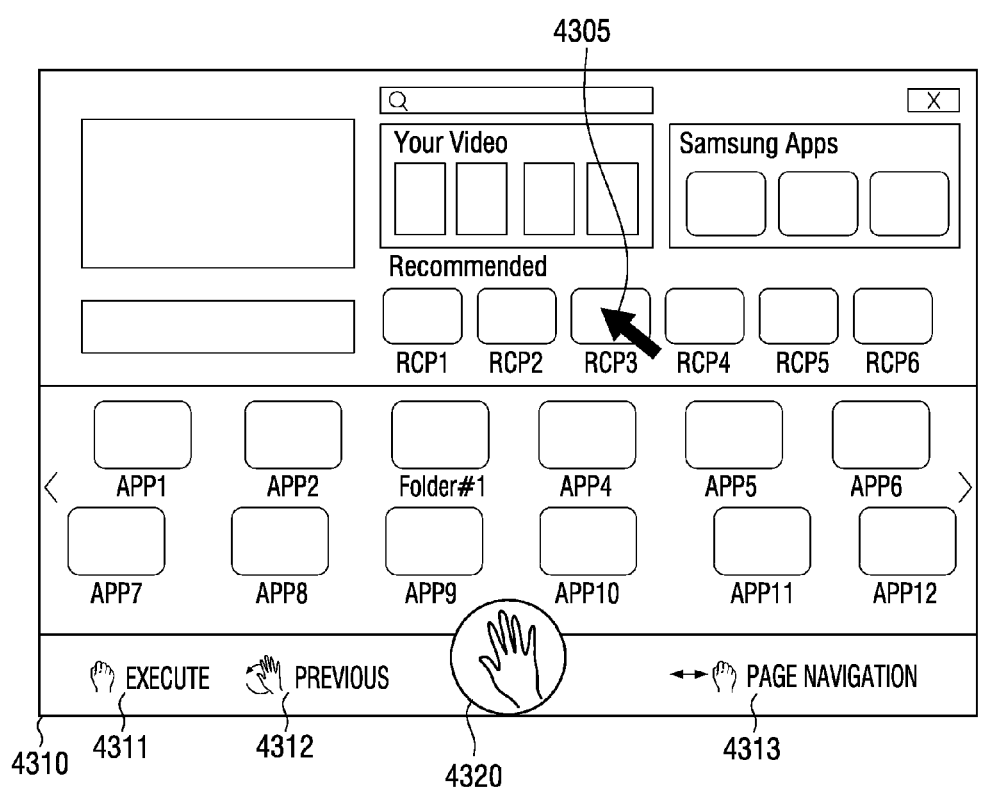

FIGS. 42 to 45 are views to explain application execution using a pointing motion of the user according to an exemplary embodiment. If a smart hub is displayed on the display screen as shown in FIG. 42, and a motion (for example, shaking the hand 3~4 times) to enter the motion task mode is recognized through the motion recognition module 130*l*, the electronic apparatus 100 generates and displays a cursor 4305 and displays the motion assistance information 4310 on the lower portion of the display screen as shown in FIG. 43.

Figure 44:
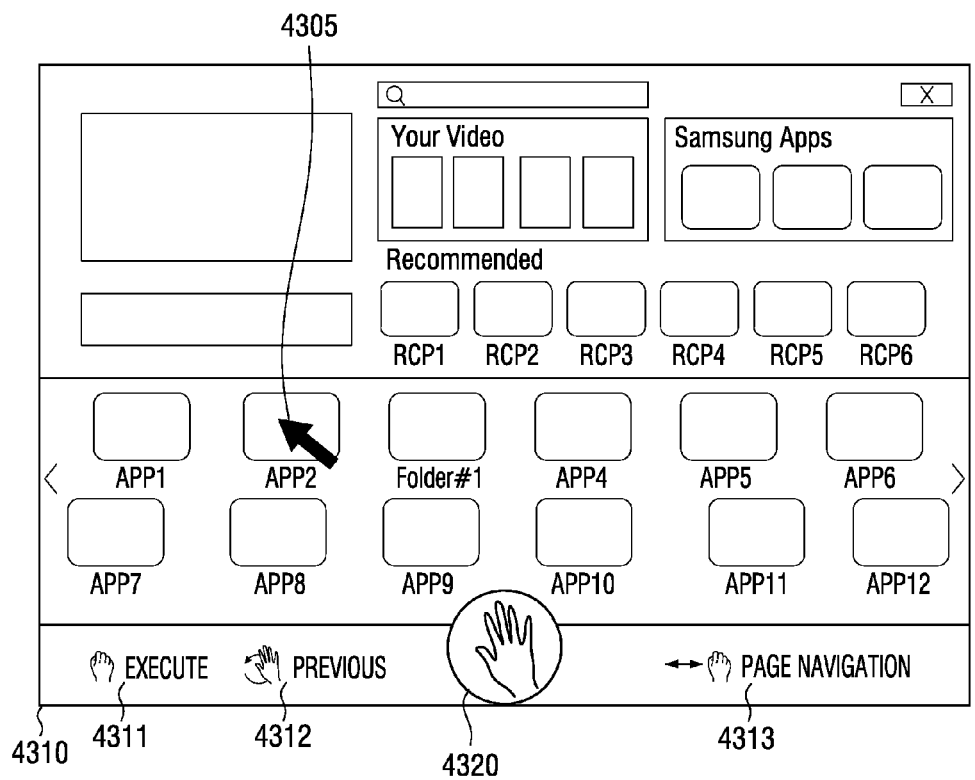

If a motion of moving the hand from a current location in a left-downward direction is recognized through the motion recognition module 130*l*, the electronic apparatus 100 moves the cursor 4305 to "APP 2" in accordance with the motion as shown in FIG. 44.

Figure 45:

If a grab motion, which corresponds to a motion item 4311, is recognized through the motion recognition module 130*l*, the electronic apparatus 100 executes "APP 2" as shown in FIG. 45. At this time, the electronic apparatus 100 may display a screen indicating execution of a selected application instead of the screen displaying the smart hub as shown in FIG. 45. However, this is merely an example and the electronic apparatus 100 may display the execution of the application on a screen on the smart hub smaller than the smart hub.

Figure 46:
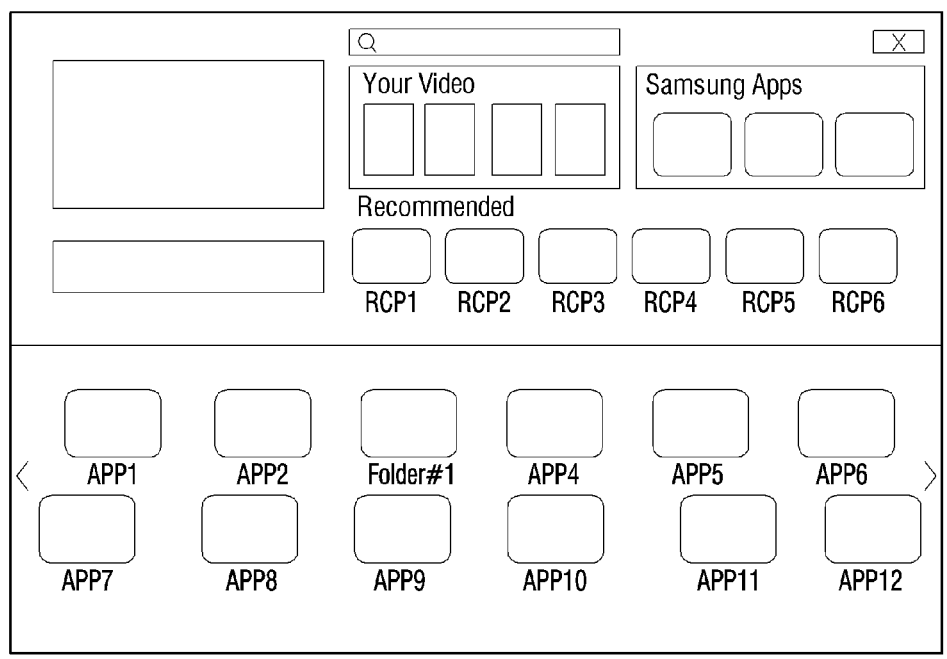
Figure 47:
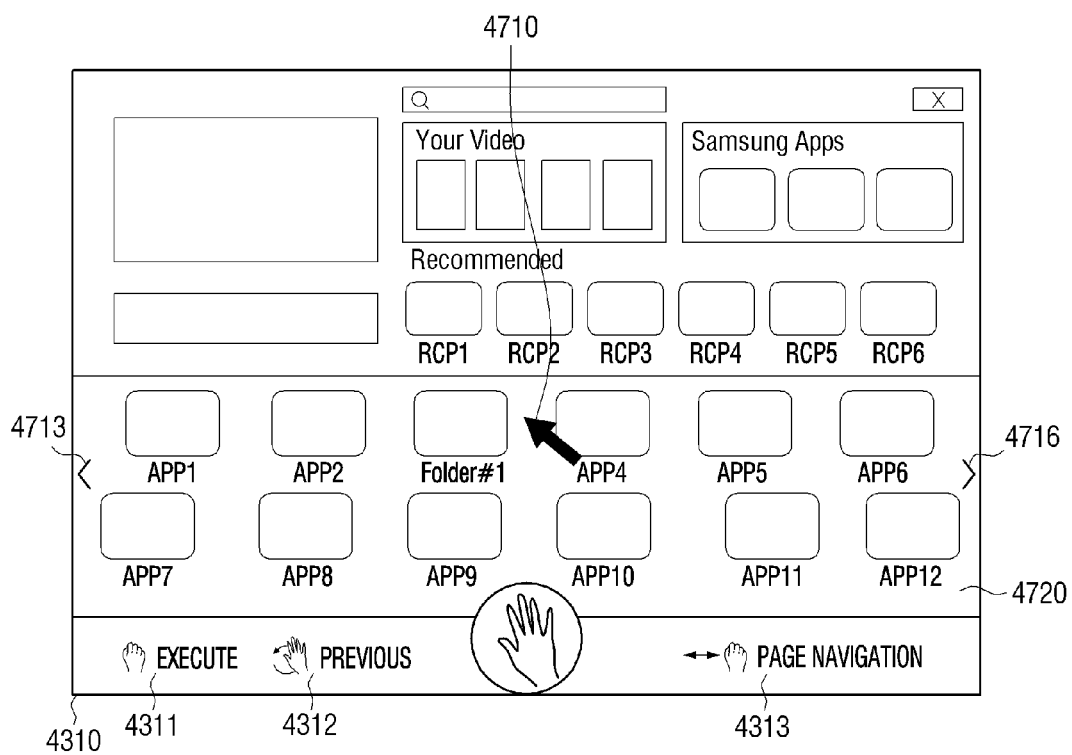
Figure 48:
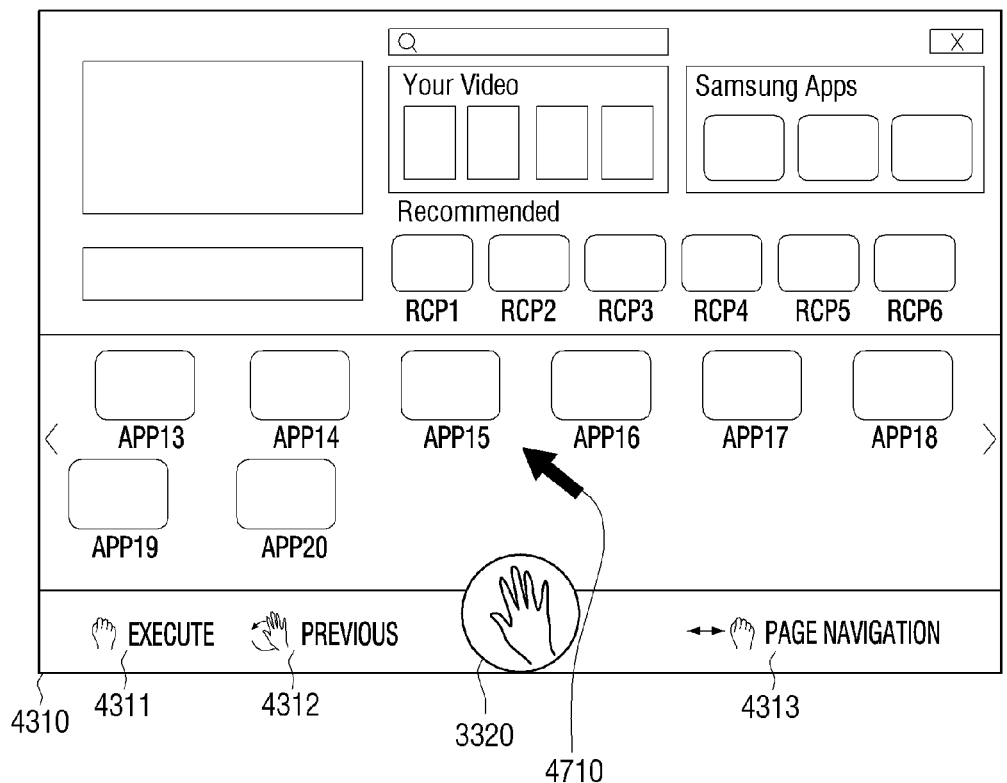

FIGS. 46 to 48 are views to explain navigation on an application display area of the smart hub using a user motion according to an exemplary embodiment. If the smart hub is displayed on the display screen as shown in FIG. 46 and a motion of shaking the hand 3~4 times to enter the motion task mode is recognized through the motion recognition module 130*l*, the electronic apparatus 100 generates a cursor 4710 and displays the motion assistance information on the lower portion of the display screen as shown in FIG. 47.

If the cursor 4710 is located on a navigable area (for example, an area where left and rightward moving direction key 4713 and 4716 are displayed) and a slap motion of moving the hand from a current location in a rightward direction is recognized through the motion recognition module 130*l*, the electronic apparatus 100 moves an application display area 4720 where the cursor 4710 is located in a leftward direction as shown in FIG. 48.

Figure 49:
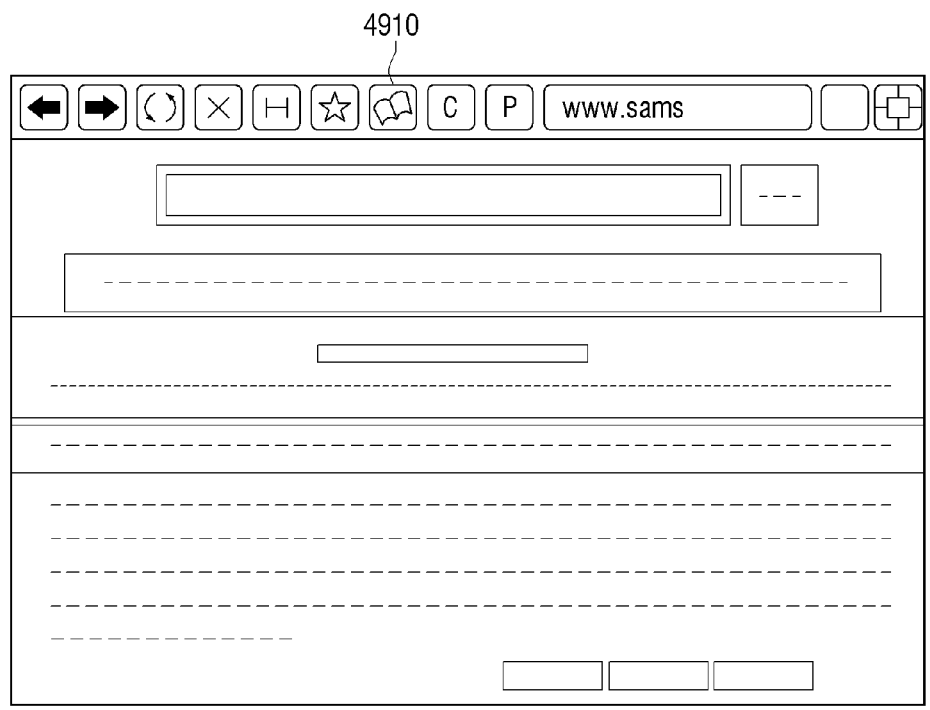
Figure 50:
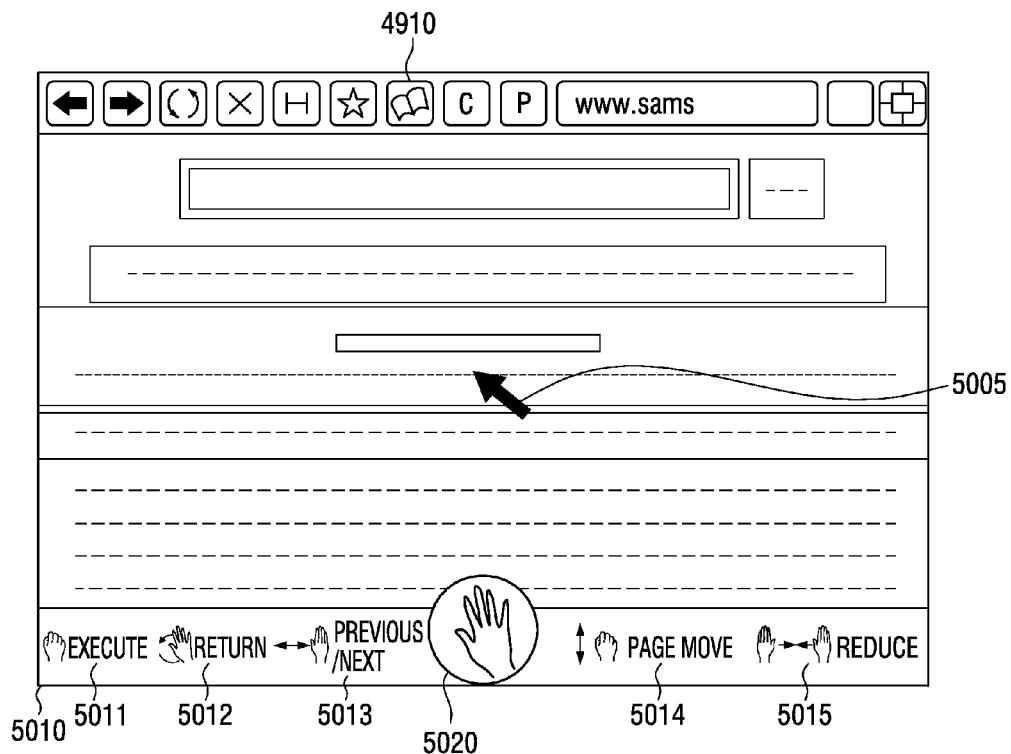

FIGS. 49 to 52 are views to explain execution of an icon having an indefinite name using motion recognition according to an exemplary embodiment. If a web page screen is displayed on the display screen as shown in FIG. 49, and a motion of shaking the hand 3~4 times to enter the motion task mode is recognized through the motion recognition module 130*l*, the electronic apparatus generates a cursor 5005 and displays the motion assistance information 5010 on the lower portion of the display screen as shown in FIG. 50.

Figure 51:
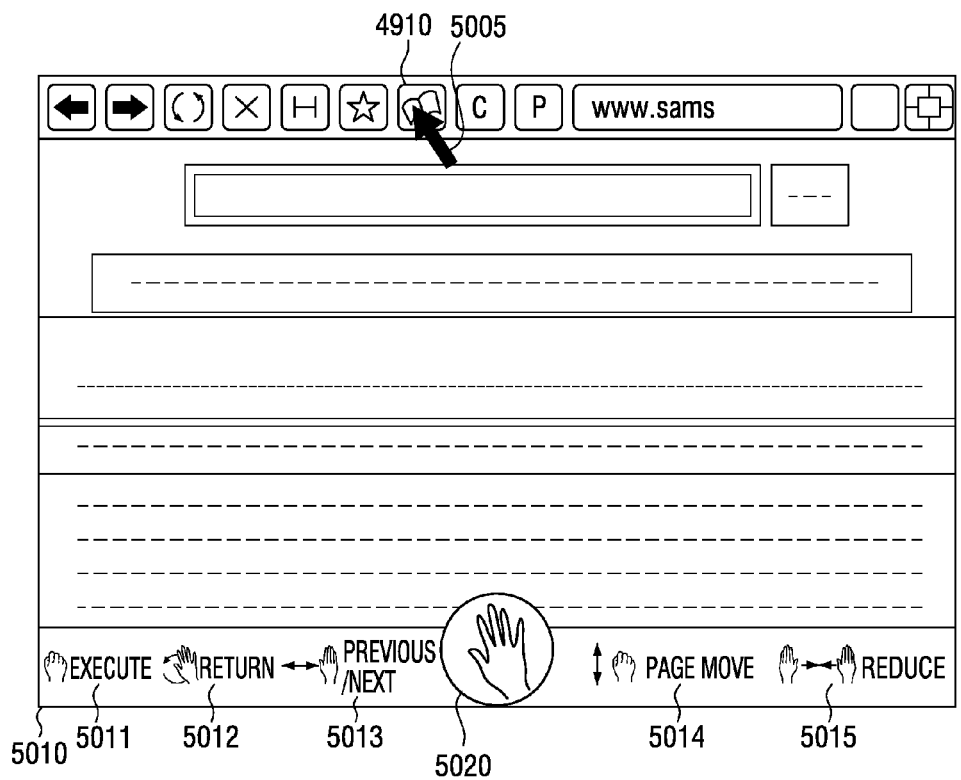

If a motion of moving the hand from a current location in a left-upward direction to move the cursor 5005 is recognized through the motion recognition module 130*l*, the electronic apparatus 100 moves the cursor 5005 to an icon "bookmark" in accordance with the motion as shown in FIG. 51.

Figure 52:
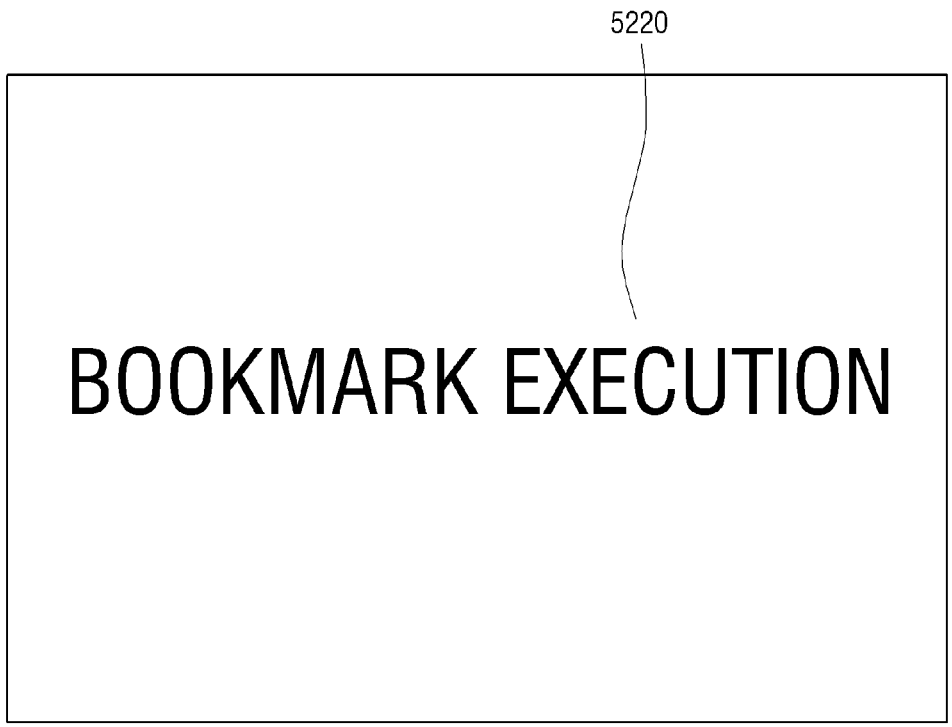

If a grab motion is recognized through the motion recognition module 130*l*, the electronic apparatus 100 displays execution of bookmark 5220 indicating bookmark of the web page currently displayed on the display screen as shown in FIG. 52.

Figure 53:
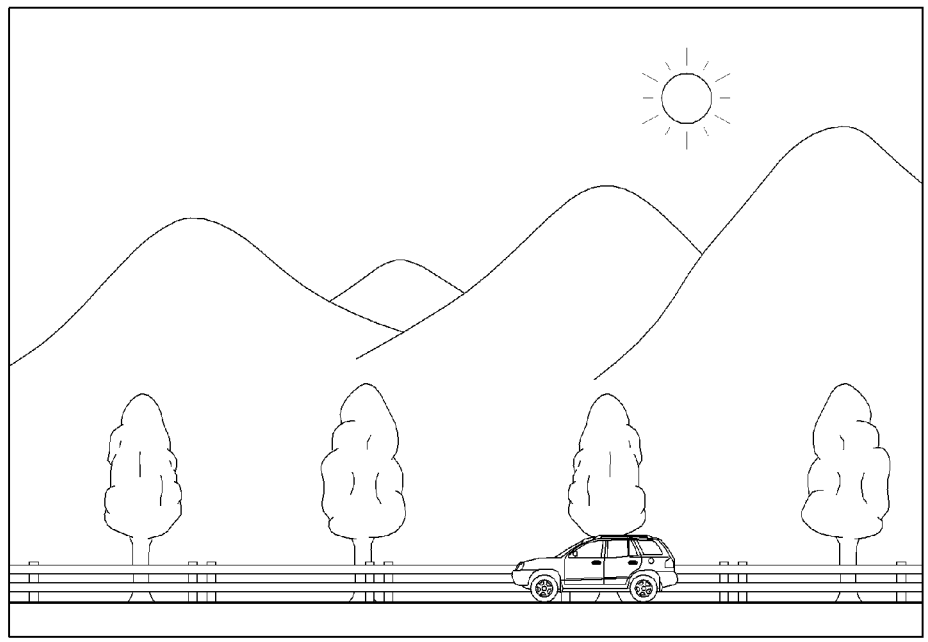
Figure 54:
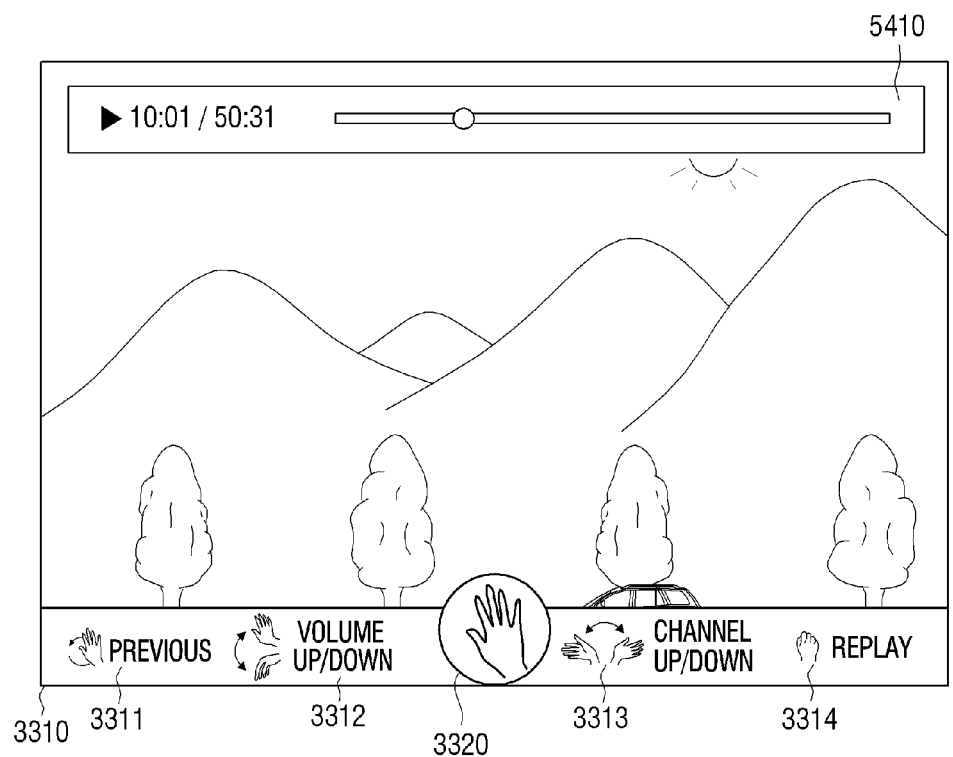
Figure 55:
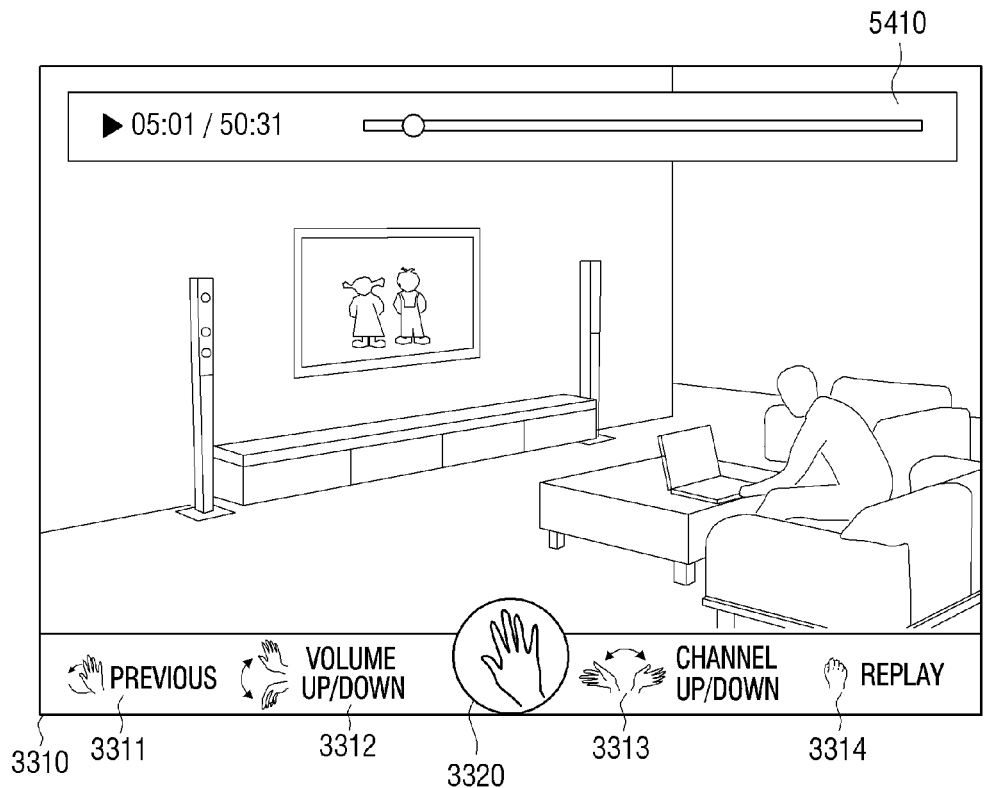

FIGS. 53 to 55 are views to explain a reproduction control task using motion recognition according to an exemplary embodiment. If a content image (for example, a moving image stored in the storage unit 130 or a moving image received from an external source) is displayed on the display screen as shown in FIG. 53, and a motion of shaking the hand 3~4 times to enter the motion task mode is recognized through the motion recognition module 130*l*, the electronic apparatus 100 generates a reproduction control bar 5410 and displays the motion assistance information on the lower portion of the display screen as shown in FIG. 54. At this time, the reproduction control bar 5410 is displayed on the display screen if a motion start command is recognized. The reproduction control bar 5410 may be displayed on the display screen if an extra user input (for example, a remote control button) is received.

If a slap motion in a leftward direction is recognized through the motion recognition module 130*l*, the electronic apparatus 100 skips backward from a current image by a predetermined time (for example, 10 minutes) and reproduces the image. The predetermined time may be changed through configuration.

Figure 56:
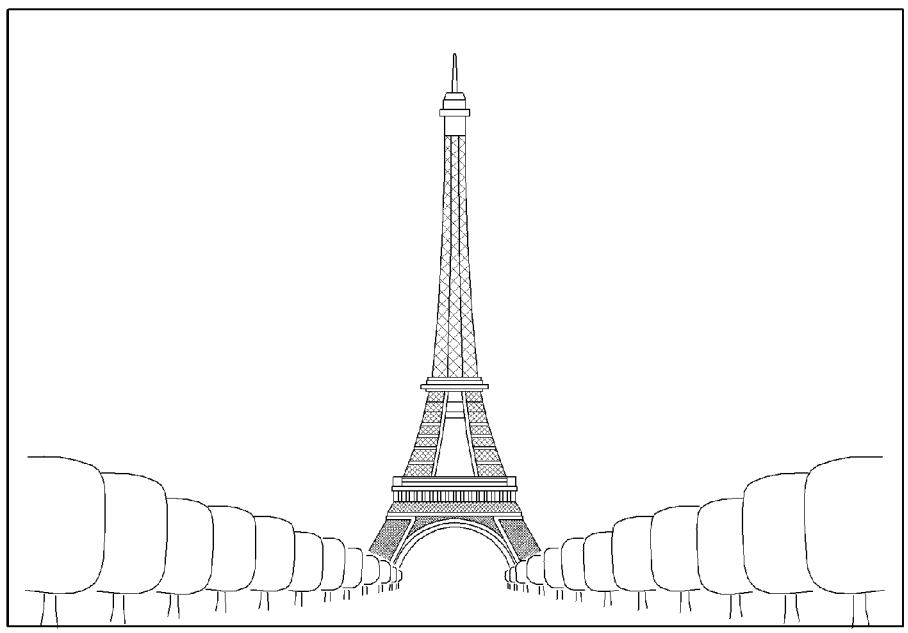
Figure 57:
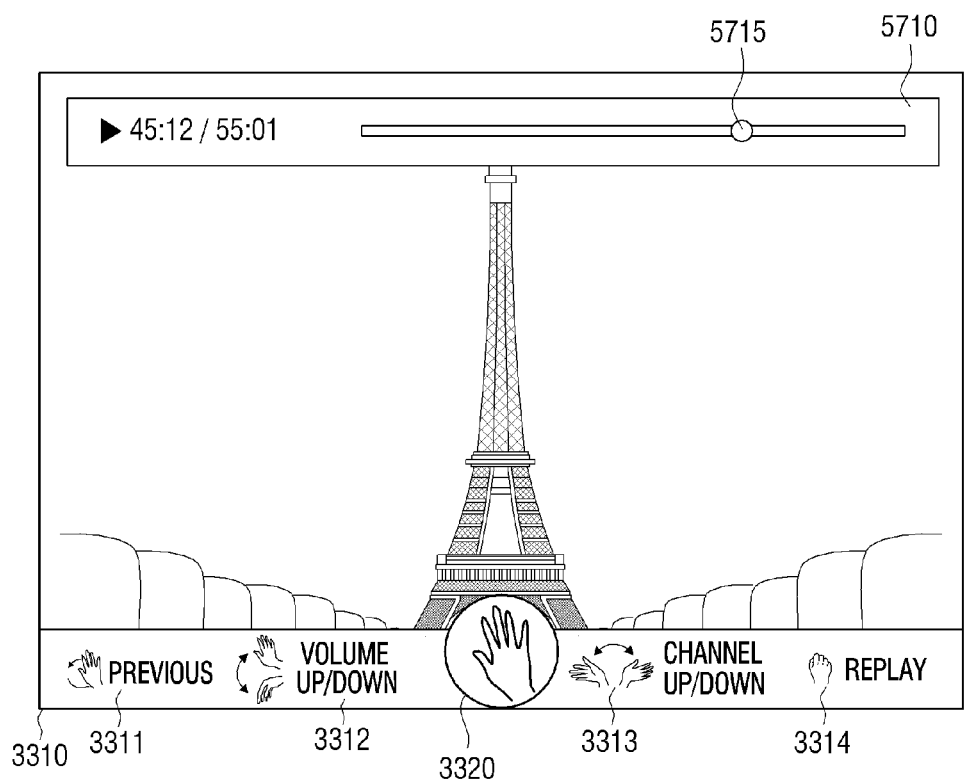
Figure 58:
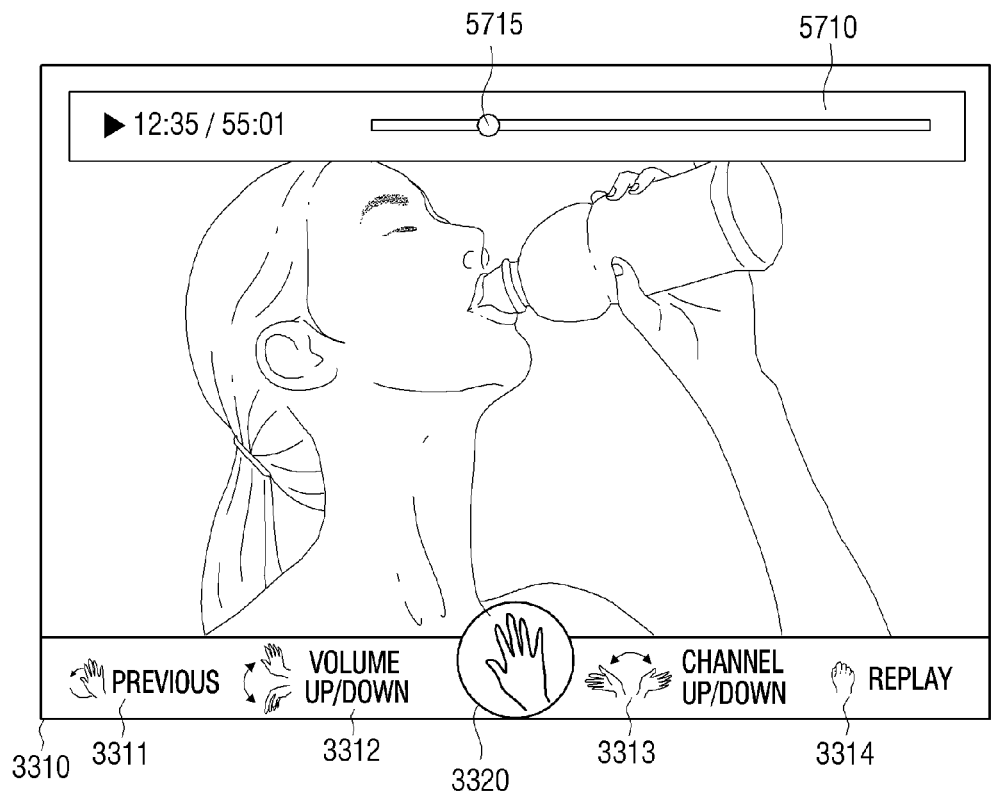

FIGS. 56 to 58 are views to explain a reproduction control task using another motion recognition according to an exemplary embodiment. If an image (for example, a moving image stored in the storage unit 130 or a moving image received from an external source) is displayed on the display screen as shown in FIG. 56, and a motion of shaking the hand 3~4 times to enter the motion task mode is recognized through the motion recognition module 130*l*, the electronic apparatus 100 generates a reproduction control bar 5710 and displays the motion assistance information on the lower portion of the display screen as shown in FIG. 57. At this time, the reproduction control bar 5710 is displayed on the display screen if a motion start command is recognized. The reproduction control bar 5710 may be displayed on the display screen if an extra user input (for example, a remote control button) is received.

If a grab motion is recognized through the motion recognition module 130*l*, the electronic apparatus 100 selects an icon 5715 indicating a current reproduction location, and, if a moving motion in a leftward direction is recognized through the motion recognition module 130*l* afterward, the electronic apparatus 100 goes back to a location as much as a predetermined time corresponding to the moving motion in the leftward direction. The icon 5715 also moves back as much as the moving motion in the leftward direction. If a motion of releasing the grab is recognized through the motion recognition module 130*l* (for example, a motion of spreading the hand), the electronic apparatus 100 reproduces the image from the location to which the icon 5715 moves back as shown in FIG. 58. However, this is merely an example. If a moving motion in a rightward direction is recognized after the grab, the electronic apparatus 100 goes forward as much as a predetermined time corresponding to the moving motion in the rightward direction. The icon 5715 also moves forward as much as the moving motion in the rightward direction.

As describe above, since the motion task that is controlled in accordance with the user motion recognized through the motion recognition module 130*l* is a task a setting value of which is changed in phases or a task that uses a cursor, the user can control the motion task more easily and more conveniently.

Figure 59:
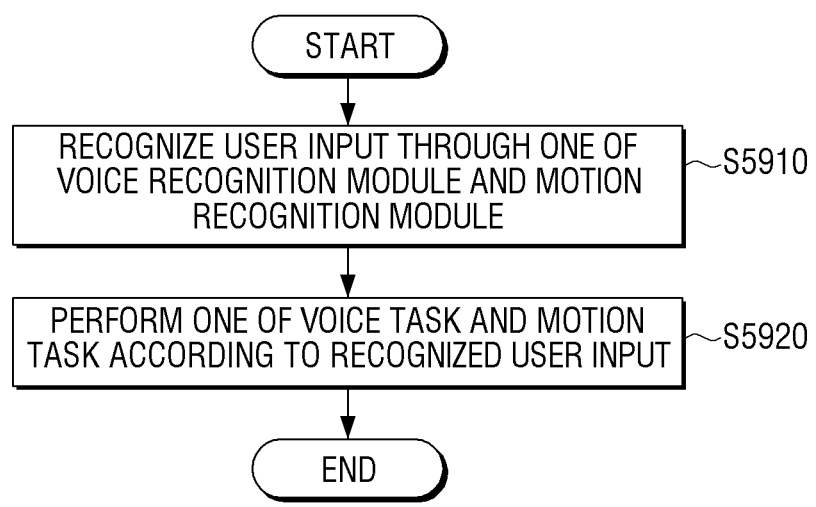
FIGS. 59 and 60 are flowcharts to explain a controlling method of an electronic apparatus which controls tasks by dividing the tasks into a motion task and a voice task according to various exemplary embodiments.
Figure 60:
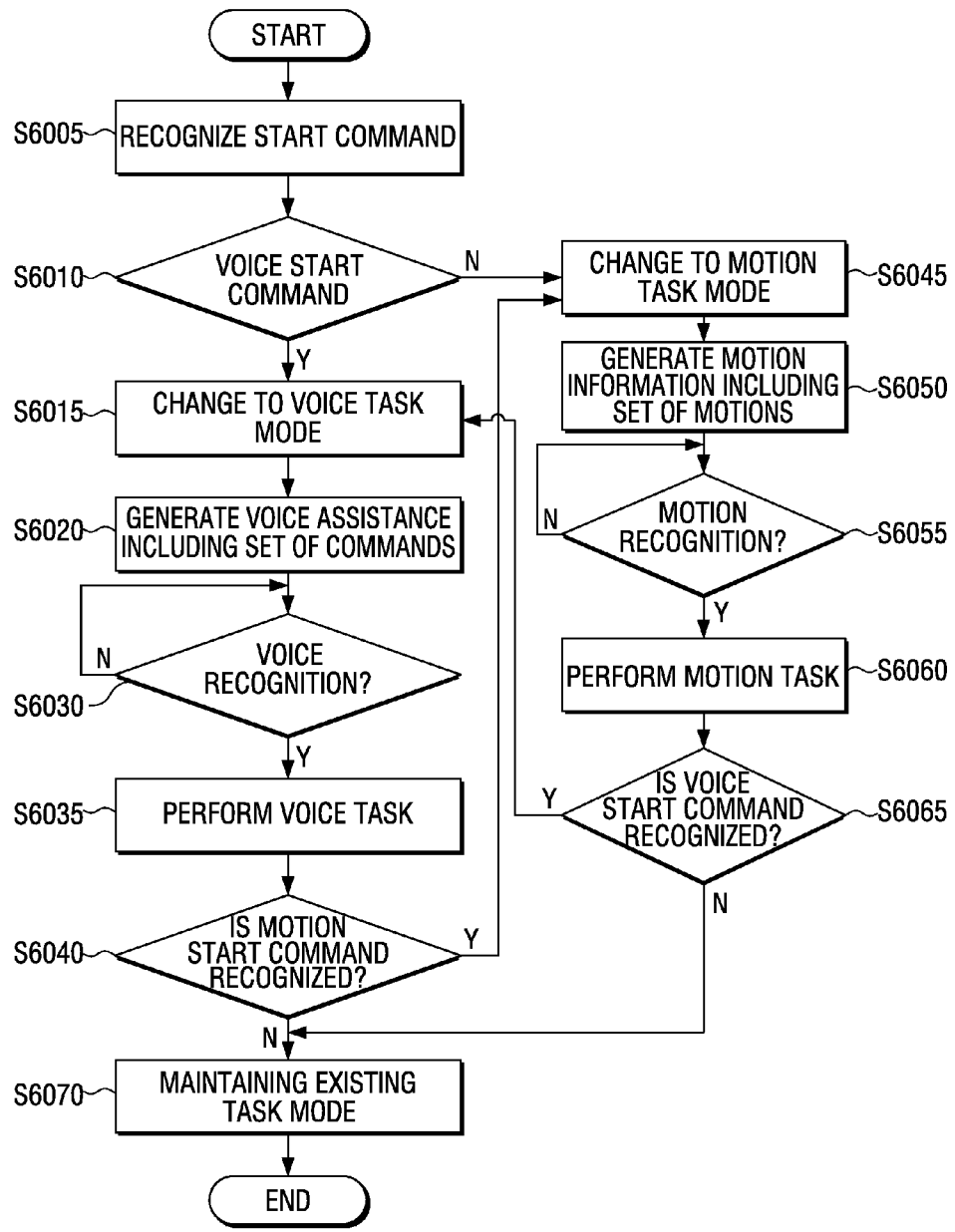

FIGS. 59 and 60 are flowcharts illustrating a method for controlling of an electronic apparatus, which controls an entire task by dividing it into a motion task and a voice task according to various exemplary embodiments.

FIG. 59 is a flowchart to explain a method for controlling of the electronic apparatus 100 according to an exemplary embodiment.

The electronic apparatus 100 recognizes a user voice or a user motion (S5910). The user voice is input through a microphone and is recognized by a voice recognition module, and the user motion is photographed by a camera and is recognized by a motion recognition module.

If a user input is recognized through one of the voice recognition module or the motion recognition module (S5910), the electronic apparatus 100 performs one of a voice task or a motion task in accordance with the user input (S5920). The voice task is a task that includes an identifier corresponding to a user voice from among the tasks for controlling the electronic apparatus 100, and the motion task is a task that is performed in phases in accordance with a user motion from among the tasks for controlling the electronic apparatus 100.

As described above, the user can control the electronic apparatus 100 more efficiently using the voice and the motion.

FIG. 60 is a flowchart to explain a method for controlling of the electronic apparatus according to an exemplary embodiment.

The electronic apparatus 100 recognizes a start command through one of the voice recognition module and the motion recognition module (S6005). The start command may be a voice start command that is recognized through the voice recognition module or a motion start command that is recognized through the motion recognition module.

If the recognized start command is a voice start command (S6010-Y), the electronic apparatus 100 changes a mode of the electronic apparatus 100 to a voice task mode (S6015). The voice task mode is a mode in which a task is performed in accordance with a user voice recognized through the voice recognition module.

Figure 61:
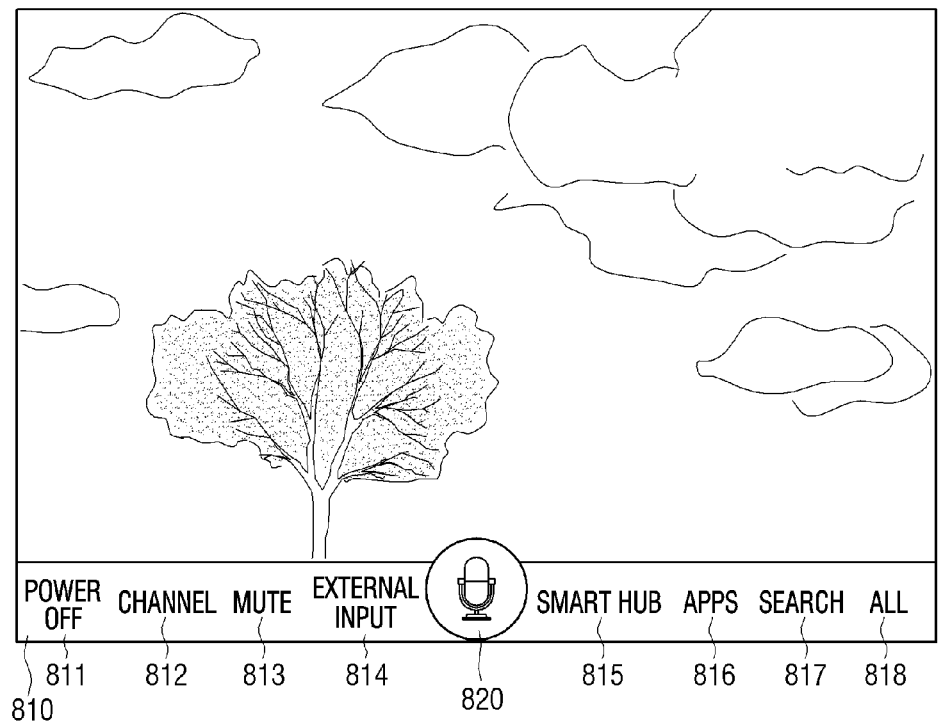
FIGS. 61 and 62 are views illustrating a voice UI regarding a voice task of an electronic apparatus according to an exemplary embodiment.

If the mode is changed to the voice task mode, the electronic apparatus 100 generates voice assistance information including voice items (S6020). For example, voice assistance information including voice items for performing voice tasks is displayed as shown in FIG. 61.

In the voice task mode, the electronic apparatus 100 determines whether a user voice is recognized or not (S6030). If it is determined that a user voice is recognized (S6030-Y), the electronic apparatus performs a voice task corresponding to the recognized user voice (S6035). For example, the voice task is performed as explained above with reference to FIGS. 6 to 32.

The voice task may include at least one of power control, channel shortcut, volume level setting, mute, external input change, text input, and replay/stop functions of the electronic apparatus.

Figure 62:
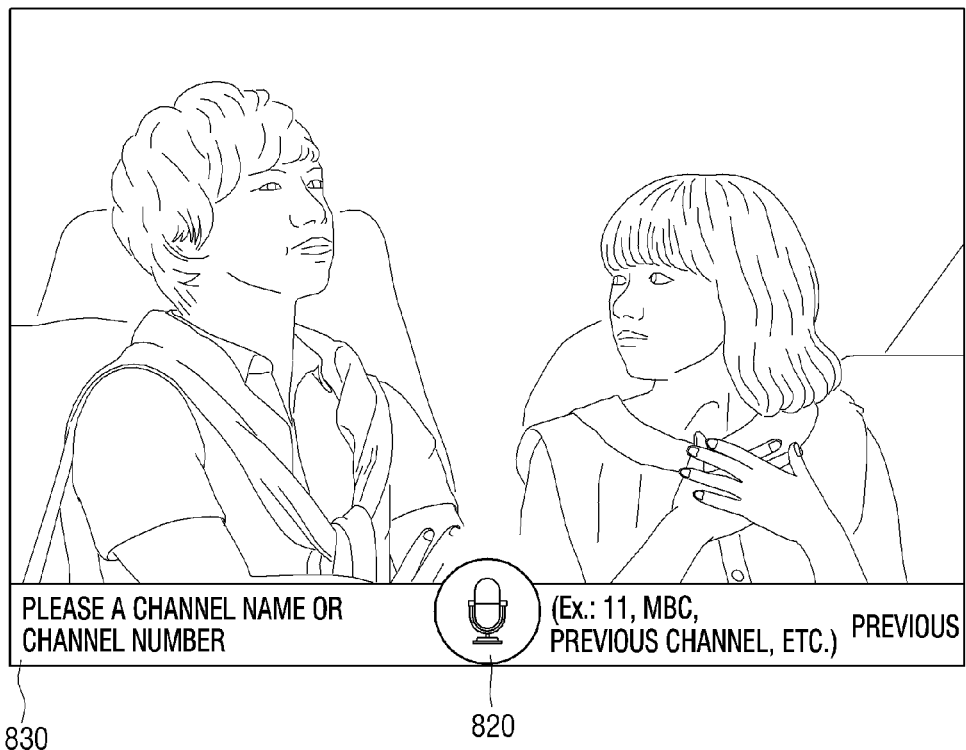

It is determined whether a motion start command is recognized or not in the voice task mode (S6040). If the motion start command is recognized (S6040-Y), the electronic apparatus 100 changes the mode of the electronic apparatus 100 to a motion task mode (S6045). For example, if the motion start command is recognized in the voice task mode, the electronic apparatus 100 changes the mode to the motion task mode and displays motion assistance information including motion items as shown in FIG. 62.

If the motion start command is not recognized (S6040-N), the electronic apparatus 100 maintains the current task mode, that is, the voice task mode (S6070). If the initially recognized start command is the motion start command rather than the voice start command (S6010-N), the electronic apparatus 100 changes the mode of the electronic apparatus 100 to the motion task mode (S6045). The motion task mode is a mode in which a task is performed only by a user motion recognized through the motion recognition module 130*l*.

If the mode of the electronic apparatus 100 is changed to the motion task mode, the electronic apparatus 100 generates motion assistance information including a motion item (S6050). For example, as shown in FIG. 62, the motion assistance information including a motion item for controlling a motion task is displayed.

The electronic apparatus 100 determines whether a user motion is recognized or not (S6055). If it is determined that a user motion is recognized (S6055-Y), the electronic apparatus 100 performs a motion task corresponding to the recognized user motion (S6060). For example, the motion task is performed as explained above with reference to FIGS. 33 to 58.

The motion task may include at least one of channel changing, volume level control, screen navigation, slide bar control, and cursor pointing.

It is determined whether a voice start command is recognized or not in the motion task mode (S6065), and if a voice start command is recognized (S6065-Y), the electronic apparatus 100 changes the mode to the voice task mode (S6010). For example, if a voice start command is recognized in the motion task mode, the electronic apparatus 100 changes the mode to the voice task mode and displays the voice assistance information including the voice items as shown in FIG. 60

If a voice start command is not recognized (S6040-N), the electronic apparatus 100 maintains the current task mode, that is, the motion task mode (S6070).

As described above, the electronic apparatus 100 can perform various tasks in accordance with the user motion or the user voice, and thus user convenience can be improved.

The control unit 140 may control to display the voice assistance information for performing the voice tasks in the voice task mode in which at least one of the voice tasks is performed in accordance with the recognized voice. For example, if a voice start command is recognized through the voice recognition module, the control unit 140 may control to display the voice assistance information for performing the voice tasks that are controllable in accordance with the user voice. At least one voice item corresponding to various voice tasks may be displayed as voice assistance information. The at least one voice item may be an utterable command. Accordingly, the user can easily identify a recognizable command in the voice task mode. Also, if a corresponding command is uttered, the user can easily recognize which voice task will be performed.

The control unit 140 may recognize a first voice corresponding to a first voice item from among at least one voice item displayed as voice assistance information in the voice task mode. The control unit 140 determines whether additional item information regarding the first voice item corresponding to the recognized first voice exists or not. If additional item information does not exist, the control unit 140 may perform a task corresponding to the first voice item. If the voice assistance information needs to be changed, the control unit 140 may control a display unit (not shown) to display changed voice assistance information. If additional item information exists, the control unit 140 may control to display the additional item information regarding the first voice item corresponding to the recognized first voice. The control unit 140 may recognize a second voice corresponding to the additional item information. The control unit 140 may perform a task corresponding to the first voice item and the second voice from among the voice tasks.

The control unit 140 may control to display motion assistance information for performing the motion tasks in the motion task mode in which at least one of the motion tasks is performed in accordance with the recognized motion. For example, if a motion start command is recognized through the motion recognition module, the control unit 140 controls to display the motion assistance information for performing the motion tasks that are controllable in accordance with the user motion. At least one motion item corresponding to various motion tasks may be displays as the motion assistance information. The at least one motion item may include a motion image indicating a recognizable motion in the motion task mode and a task corresponding to the recognizable motion. Accordingly, the user can easily identify a recognizable motion in the motion task mode and can easily recognize which motion task will be performed according to which motion the user performs. Therefore, the user can easily perform the motion task.

The control unit 140 may recognize a first motion corresponding to a first motion item from among at least one motion item displayed as the motion assistance information in the motion task mode. The control unit 140 may determine whether additional item information regarding the first motion corresponding to the recognized first motion exists or not. If additional item information does not exist, the control unit 140 may perform a task corresponding to the first motion item. Also, if the motion assistance information needs to be changed, the control unit 140 may control a display unit (not shown) to display changed motion assistance information. If additional item information exists, the control unit 140 may control to display the additional item information regarding the first motion item corresponding to the recognized first motion. The control unit 140 may recognize a second motion corresponding to the additional item information. The control unit 140 may perform tasks corresponding to the first motion item and the recognized second motion from among the motion tasks. The voice assistance information, the motion assistance information, the additional item information regarding the voice item, or the additional item information regarding the motion item may be displayed on the same area (the lower portion) of the display screen. The above-described information may be displayed on a pre-set area or a dynamically changeable area. For example, the voice assistance information or the motion assistance information may be displayed on an upper, lower, right, or left portion of the display screen, and may be dynamically changeable according to an image displayed on the screen.

The voice assistance information, the motion assistance information, the additional item information regarding the voice item, or the additional item information regarding the motion item may be displayed along with a displayed or reproduced image, an application, an OSD, or a recognition candidate, or may be displayed independently. The area where the above information is displayed may be overlapped with an area where the image, the application, the OSD or the recognition candidate is displayed. At least part of the voice assistance information or the motion assistance information may be displayed transparently or semi-transparently. The transparency may be adjusted according to user selection.

The voice assistance information and the motion assistance information described above may be provided to the user in various forms. Hereinafter, the voice assistance information, the additional item information regarding the voice item, and the motion assistance information will be explained in detail with reference to FIGS. 61 to 63.

FIG. 61 is a view illustrating voice assistance information displayed on the display unit 193 in the voice task mode according to an exemplary embodiment.

As shown in FIG. 61, the display unit 193 may display at least one voice item 811, 812, 813, 814, 815, 816, 817, and 818 in the voice task mode as the voice assistance information. Each of the voice items may be an utterable command. Also, the guide assistance information may include a mode image or a text indicating the voice task mode. The voice assistance information may include a guide area 810 including the at least one voice item or a mode display area 820 displaying a designated mode (for example, the voice task mode or the motion task mode) of the electronic apparatus 100. The mode display area 820 may include at least one of a mode image and a text indicating the designated mode of the voice task mode and the motion task mode. Also, the guide area 810 and the mode display area 820 may be distinctively displayed as shown in FIG. 61 or may be displayed without drawing a boundary between the two areas. The mode display area 820 may be omitted. The location of each of the guide area 810 and the mode display area 820 may be set at the manufacturing time of the electronic apparatus 100, or may arbitrarily set by the user, or the guide area 810 and the mode display area 820 may be dynamically located according to an image displayed along a UI. For example, if an OSD is displayed, the location of each of the guide area 810 and the mode display area 820 may be changed to a certain location out of an area where the OSD is displayed so that the display of the OSD is highlighted. The guide area 810 may be displayed on the lower portion of the display screen and the mode display area 820 may be displayed at a lower center of the display screen. Also, the location of the mode display area 820 may be changed to another location such as a lower right portion independently from the guide area 810 according to configuration.

In the voice task mode, the guide area 810 includes at least one voice items 811, 812, 813, 814, 815, 816, 817, and 818. For example, each of the at least one voice item may be a command to perform a voice task. At least one command included in the guide area 810 may include power off 811, channel 812, mute 813, external input 814, smart hub 815, apps 816, search 817 or all 818. The power off 811 is a command to turn off the electronic apparatus 100. The channel 812 is a command to perform channel shortcut. The mute 813 is a command to perform mute. The external input 814 is to command to change external input. The smart hub 815 is a command to perform a task of entering a smart function such as an Internet function, an application providing function, and a multimedia (for example, a moving image, music, and a photo) providing function of the electronic apparatus 100. The apps 816 is a command to perform a task of searching an application of the electronic apparatus 100. The search 817 is a command to perform a content, an application and web searching provided by the electronic apparatus 100. The all 818 is a command to display all commands. The guide area 818 may include 'more' as a command instead of the all 818. That is, the all 818 and 'more' may be voice items for displaying other items than the at least one voice items 811, 812, 813, 814, 815, 816, 817, and 818 from among the voice items corresponding to the voice tasks. Also, if the electronic apparatus 100 displays other items, the electronic apparatus 100 may be configured not to use a pre-set timer. The pre-set timer is a timer to stop the voice task mode if at least one of the displayed voice items 811, 812, 813, 814, 815, 816, 817, and 818 is not recognized for a pre-set time. If the voice task mode is stopped, the voice assistance information may disappear and the mode may be changed to a mode in which the electronic apparatus 100 is controlled by a general remote controller. Also, if the voice task mode is stopped, the performance of the voice task may be limited until the electronic apparatus 100 re-enters the voice task mode according to a voice start command. Also, if an OSD or a recognition candidate is displayed on the screen along with the voice assistance information, the motion assistance information, and additional item information, the pre-set timer to stop the designated mode may not be driven regardless of the designated mode. Also, the guide area 810 may include other commands than the above-described commands.

The at least one voice item 811, 812, 813, 814, 815, 816, 817, 818, which is displayed as the voice assistance information, may be differently configured according to a currently performed function. That is, the at least one command displayed on the guide area 810 may be differently configured according to a currently performed function. Specifically, at least one of the voice items corresponding to the voice tasks may be selectively configured according to at least one of an application, OSD, and a candidate displayed along with the voice assistance information. For example, if a smart function is currently performed in the electronic apparatus 100, voice assistance information including a command "return" to return to a broadcast receiving function may be displayed. A recognition candidate may include at least one of a name having at least one of a number or a text similar to a recognized voice, a command similar to a recognized voice, a task corresponding to a similar command, a motion similar to a recognized motion, and a task corresponding to a similar motion. For example, candidates similar to a recognized voice may display a list of channel identifiers similar to the recognized voice in a pop-up window. The OSD may include current setting information of the electronic apparatus 100 and a setting menu of the electronic apparatus 100 excluding the recognition candidate. For example, as the OSD, an identifier of a current channel (a channel number or a channel name) may be displayed or an external input list or a channel list may be displayed.

The control unit 140 may recognize a first voice corresponding to a first voice item from among the at least one voice item 811, 812, 813, 814, 815, 816, 817, 818 displayed as the voice assistance information. The control unit 140 may control to display additional item information regarding the first voice item corresponding to the recognized first voice. The additional item information regarding the first voice item may include an additional command regarding the first voice item, a guide message, or an utterance example. For example, if "channel" is recognized through the voice recognition module 130k as a voice corresponding to the voice item 812 displayed on the guide area 810 and a task corresponding to the voice item 812 is channel shortcut, the display unit 193 may display additional item information including a guide message, an utterance example, or an additional command (for example, 'previous') for utterance of at least one identifier of a channel name, a program name, and a channel number, as shown in FIG. 62. The "previous" herein may be a command to display an UI including the guide area 810 of FIG. 61 again. The additional item information may include a guide area 830 including an additional command, a guide message, or an utterance example, and the mode display area 820. For example, the guide message may be displayed on the left portion of the guide area 830 and the additional command or the utterance example may be displayed on the right portion of the guide area 830.

The control unit 140 may recognize a second voice corresponding to the additional item information. The control unit 140 may perform a task corresponding to the first voice item and the second voice from among the voice tasks. For example, if the first voice item is the voice item 812 and "MBC" is recognized as the second voice corresponding to the additional item information of FIG. 60, the control unit 140 may perform channel shortcut to change a current channel to a channel corresponding to the channel identifier including 'MBC'. That is, the additional item information regarding the first voice item may be information for guiding utterance of the second voice to ask whether to perform the task corresponding to the first voice item or to additionally obtain information necessary for performing the task.

Figure 63:
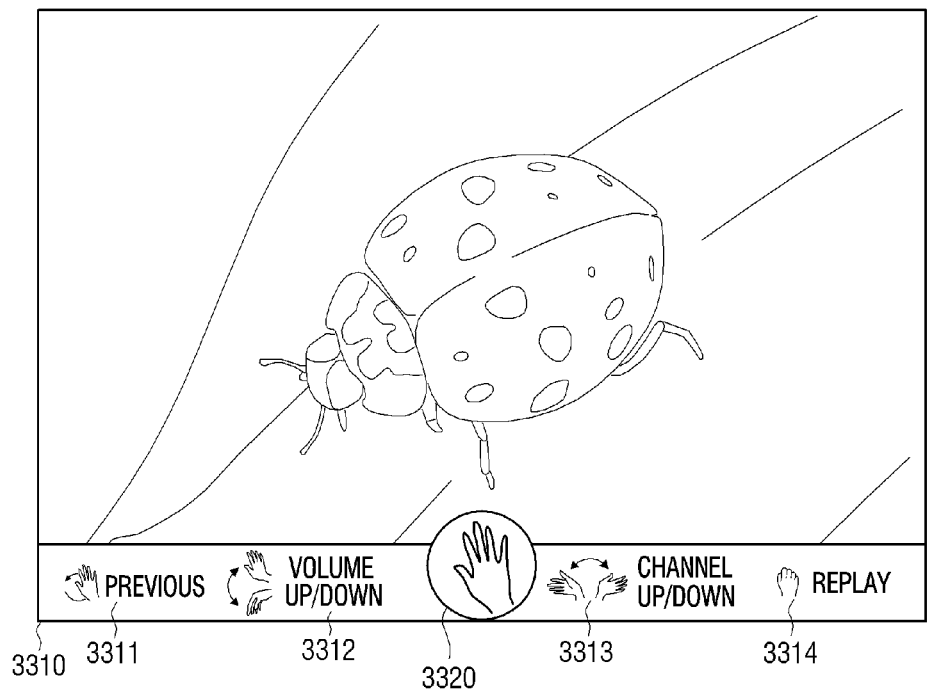
FIG. 63 is a view illustrating a motion UI regarding a motion task of an electronic apparatus according to an exemplary embodiment.

FIG. 63 is a view illustrating motion assistance information displayed on the display unit 193 of the electronic apparatus 100 in the motion task mode according to an exemplary embodiment.

As shown in FIG. 63, the display unit 193 may display at least one motion item 3311, 3312, 3313, and 3314 as the motion assistance information in the motion task mode. Each of the at least one motion item may include a motion image indicating a motion recognizable in the motion task mode or a text indicating a task corresponding to a recognizable motion (or a motion image). The motion assistance information may include a mode image or a text indicating the motion task mode. The motion assistance information may include a guide area 3310 including the at least one motion item and a mode display area 3320 displaying a mode of the electronic apparatus 100. The mode display area 3320 may include at least one of a mode image and a text indicating a designated mode of the voice task mode and the motion task mode. The guide area 3310 and the mode display area 3320 may be distinctively displayed as shown in FIG. 63 or may be displayed without drawing a boundary between the two areas. Also, the mode display area 3320 may be omitted. For example, the guide area 3310 may be displayed on the lower portion of the display screen and the mode display area 3320 may be displayed at a center of the lower portion of the display screen. The location of the mode display area 3320 may be changed according to configuration (for example, a right lower portion).

In the motion task mode, the guide area 3310 includes at least one motion item 3311, 3312, 3313, 3314. For example, each of the at least one motion item may include a motion image and a text indicating a task corresponding to the motion image. The at least one motion item included in the guide area 3310 may include a motion item 3311 indicating that a rotation motion in a counter clockwise direction corresponds to 'back' to go back to a previous setting, a motion item 3312 indicating that slap motions in upward/downward directions correspond to 'volume up/down' to control a volume level, a motion item 3313 indicating that slap motions in leftward/rightward directions correspond to 'channel up/down' to perform channel changing, and a motion item 3314 indicating that a grab motion corresponds to 'replay' to reproduce an image. The guide area 3310 may display other motion items than the above-described motion items. The motion image included in each of the above-described at least one motion item and the text corresponding to the motion image may be changed according to mapping settings between a recognizable motion and a task corresponding to the recognizable motion. For example, the guide area 3310 may include a motion item indicating that the slap motions in the upward/downward directions correspond to the channel up/down to perform the channel changing, and a motion item indicating that the slap motions in the leftward/rightward directions correspond to the volume up/down to control the volume level.

The at least one motion item 3311, 3312, 3313, 3314 displayed as the motion assistance information may be differently configured according to a currently performed function. That is, the at least one motion item 3311, 3312, 3314, 3314 displayed on the guide area 3310 may be differently configured according to a current function of the electronic apparatus 100. For example, at least one of the motion items corresponding to the motion tasks may be selectively configured according to at least one of an application, OSD, and a recognition candidate displayed along with the motion assistance information.

The control unit 140 may recognize a first motion corresponding to a first motion item from among the at least one motion item 3311, 3312, 3313, 3314 displayed as the motion assistance information. If additional item information exists, the control unit 140 may control to display additional item information regarding the first motion item corresponding to the recognized first motion. For example, if a grab motion corresponding to the motion item 3314 is recognized, additional item information including a guide message asking whether to reproduce a selected item or image file, or a motion item indicating that slap motions in leftward/rightward directions correspond to an answer Yes/No may be displayed.

The control unit 140 may recognize a second motion corresponding to the additional item information. The control unit 140 may perform a task corresponding to the first motion item and the recognized second motion from among the motion tasks. For example, if the first motion item is the motion item 3314 and a slap motion in a leftward direction is recognized as the second motion corresponding to the additional item information including a guide message asking whether to reproduce a designated image file and a motion item indicating that the slap motions in the leftward/rightward directions correspond to the answer Yes/No, the designated image file is reproduced. As described above, the additional item information regarding the first motion item may be information for guiding the second motion to ask whether to perform the task corresponding to the first motion item or to additionally obtain information necessary for performing the task.

If an error occurs in the motion recognition, motion assistance information indicating the error may be displayed. For example, the motion assistance information may include a guide message "Gesture has not been recognized. Please input again." or a palm image that is mapped with a text indicating re-input. Also, the motion assistance information may include a guide message "Recognition of both hands is now impossible." or a guide message "Available only in 'Web Browser', 'View Photo', and 'Google Map App'". The recognition of both hands may be performed to perform a task of enlarging a screen or reducing a screen, in response to a motion of moving both hands apart or pulling both hands closer to each other. Also, as part of the motion assistance information, an image or a text indicating an error may be displayed on the mode display area.

Hereinafter, a user interface (UI) for providing feedback in accordance with voice recognition or motion recognition of the electronic apparatus 100 will be explained with reference to FIGS. 64 to 66.

Figure 64:
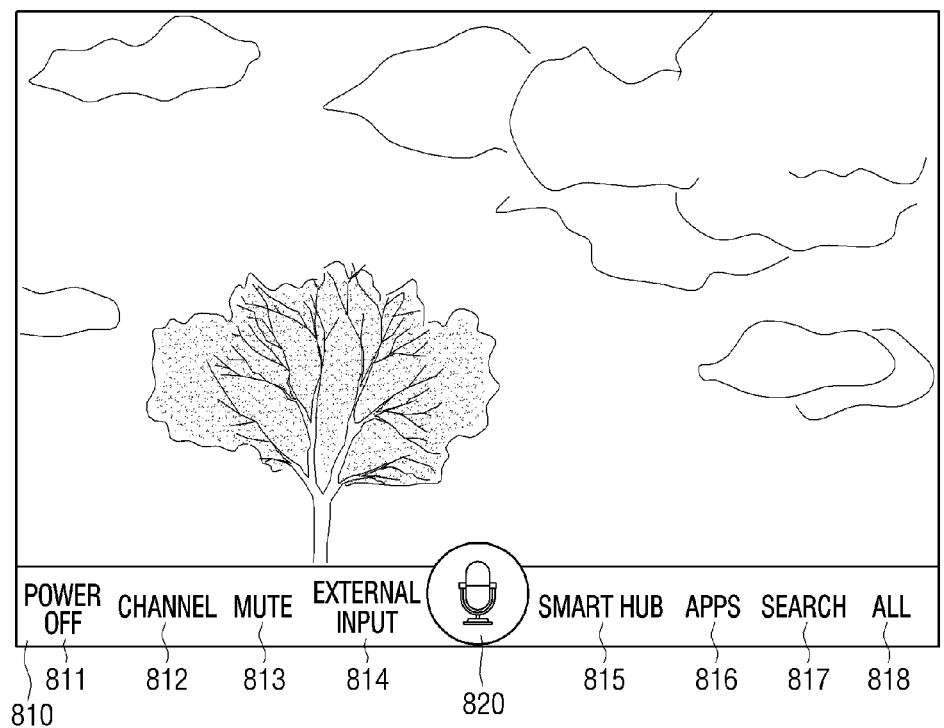
FIGS. 64 to 66 are views illustrating a visual feedback of voice recognition or motion recognition according to an exemplary embodiment.

As shown in FIG. 64, the voice assistance information including the guide area 810 and the mode display area 820 may be displayed in the voice task mode. The guide area 810 and the mode display area 820 may be displayed with a visual effect that makes the guide area 810 and the mode display area 820 look like they rise from the lower end of the screen. For example, the guide area 810 and the mode display area 820 may be displayed in the form of animation for a predetermined time (for example, for 3 seconds). For example, a part of the guide area 810 and the mode display area 820 rises from the lower end rapidly and then rises slowly. The rising animation ends when the guide area 810 and the mode display area 820 are completely displayed as shown in FIG. 64. When the electronic apparatus 100 enters the motion task mode, the motion assistance information may be displayed in the form of animation described above. If a displayed UI of a specific mode disappears or if a mode is changed to a specific mode, various visual or auditory effects other than the above-described visual effect may be output.

If the electronic apparatus 100 recognizes the first voice corresponding to the first voice item, the electronic apparatus 100 may provide at least one of visual feedback and auditory feedback corresponding to a level of recognition accuracy in accordance with recognition accuracy of the first voice. If the electronic apparatus 100 recognizes the first motion corresponding to the first motion item, the electronic apparatus 100 may provide at least one of visual feedback and auditory feedback corresponding to a level of recognition accuracy in accordance with recognition accuracy of the first motion. The recognition accuracy herein may indicate a level based on which it is determined whether the first voice (or the first motion) is a voice (or a motion) recognizable by the electronic apparatus 100, or may indicate a level based on which it is identified whether a recognized voice (or motion) corresponds to one of pre-set commands (or pre-set motions). The recognition accuracy may be an index changing according to how long it takes to identify a task corresponding to a recognized voice or motion.

For example, if "smart hub" is recognized as a voice corresponding to the voice item 815, the electronic apparatus 100 may determine recognition accuracy by stochastically calculating the ability to identify the voice as one of the at least one command 811, 812, 813, 814, 815, 816, 817, 818 included in the guide area 810. The electronic apparatus 100 may compare the recognition accuracy and a pre-set threshold value and may differently display a visual effect according to whether the recognition accuracy is higher or lower than the pre-set threshold value. For example, as shown in FIG. 65, a rotating animation in a clockwise direction may be displayed on a background portion of an image in a mode display area 6520 indicating the voice task mode, according to the accuracy of voice recognition. If the recognition accuracy is lower than the threshold value, a rotation speed of the image of the animation is slow, and, if the recognition accuracy is higher than the threshold value, the rotation speed of the image is fast. When the above-described visual feedback is provided according to the recognition accuracy, auditory feedback may also be provided.

Figure 66:
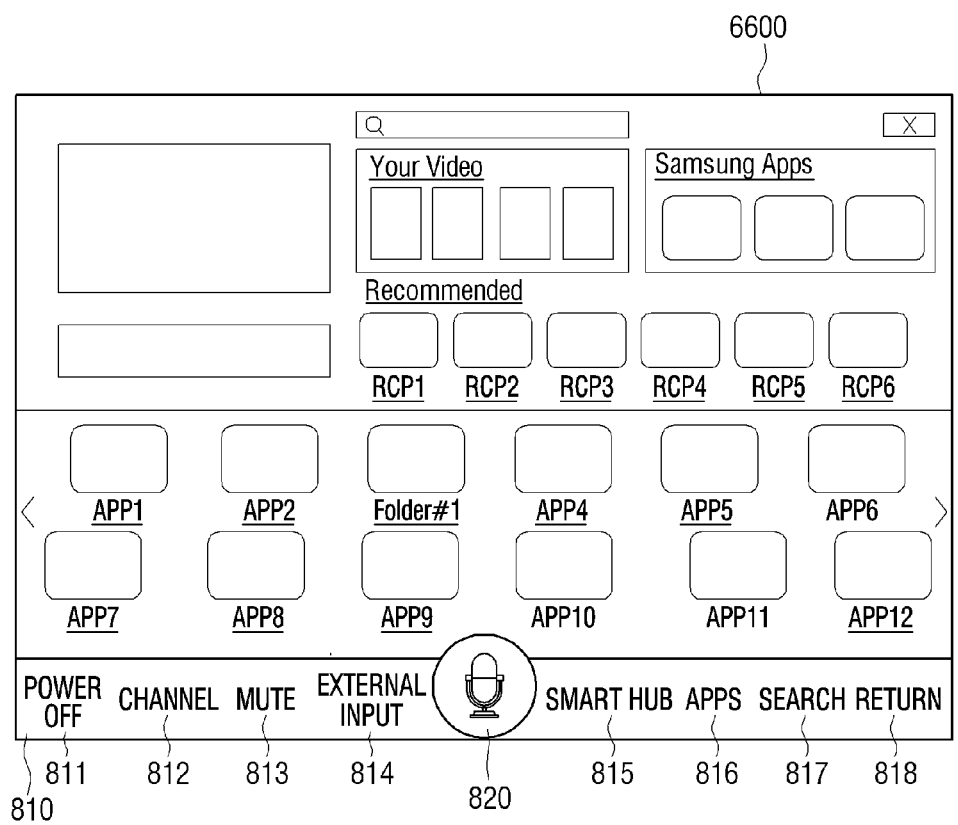

The animation, which is displayed on the mode display area 820 as the visual feedback, is displayed during a time period until a smart hub 6600 of FIG. 66 is driven and displayed after the voice corresponding to the voice item has been recognized, and may have nothing to do with the recognition accuracy.

If the electronic apparatus 100 recognizes the first voice corresponding to the first voice item, the electronic apparatus 100 may provide visual feedback or auditory feedback indicating at least one of the first voice item and the task corresponding to the first voice item. If the electronic apparatus 100 recognizes the first motion corresponding to the first motion item, the electronic apparatus 100 may provide visual feedback or auditory feedback indicating at least one of the first motion item and the task corresponding to the first motion item.

Figure 65:
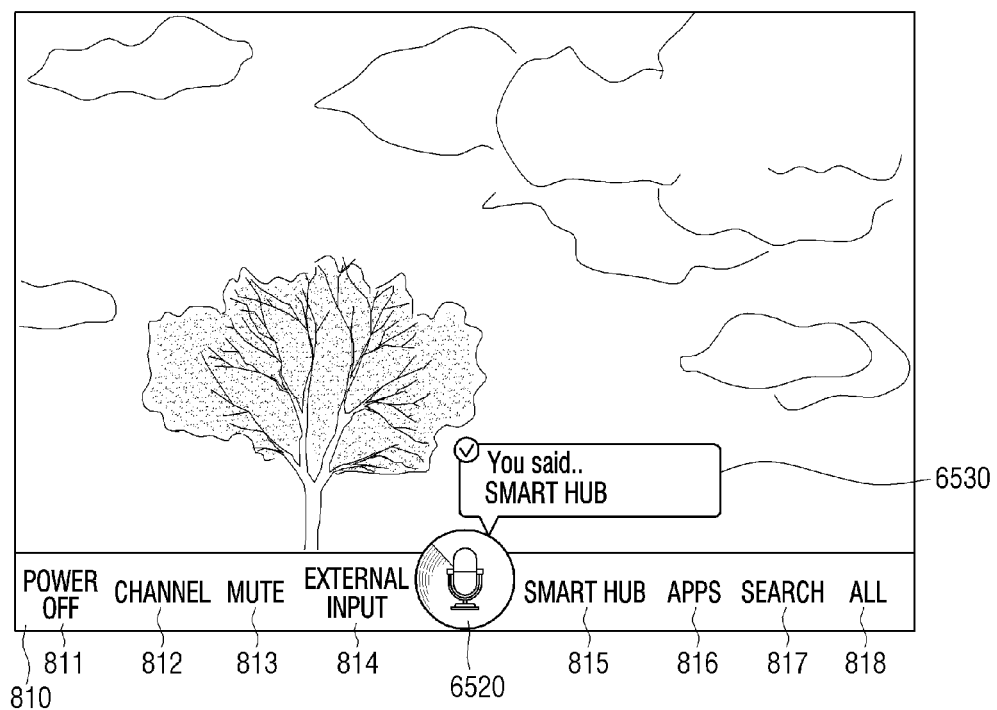

For example, if "smart hub" is recognized as a voice corresponding to the voice item 815, "smart hub" may be displayed on a feedback area 6530, indicating the voice item 815 or the task corresponding to the voice item 815 as shown in FIG. 65. The visual feedback may be displayed on a predetermined location of the screen without putting to a limit to the feedback area 6530. Also, auditory feedback "You said, smart hub." may be output along with the visual feedback displayed on the feedback area 6530.

If a slap motion in a rightward direction is recognized as a motion corresponding to the item 813, the electronic apparatus 100 may display visual feedback (for example, "You did, Channel UP") indicating a task corresponding to one of the motion items on the feedback area 6530, or may control to output auditory feedback using a text to speech (TTS) module (not shown) of the electronic apparatus 100.

Figure 67:
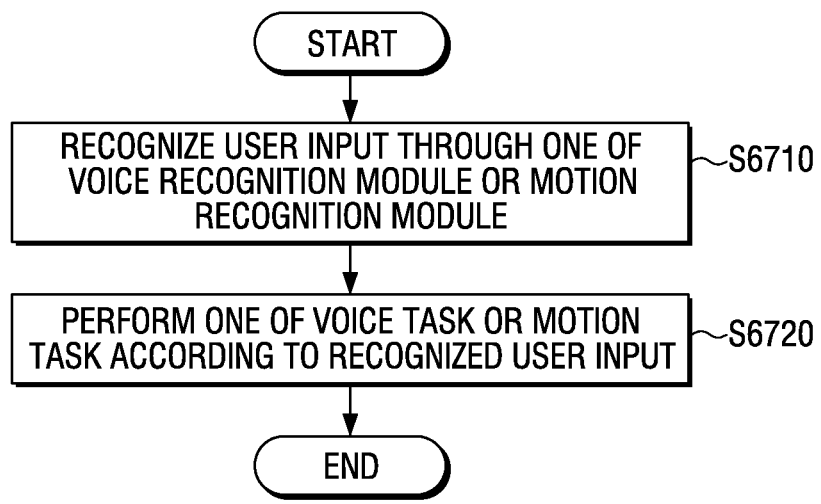
FIGS. 67 to 69 are flowcharts to explain a controlling method of an electronic apparatus which provides a voice UI and a motion UI according to various exemplary embodiments.
Figure 68:
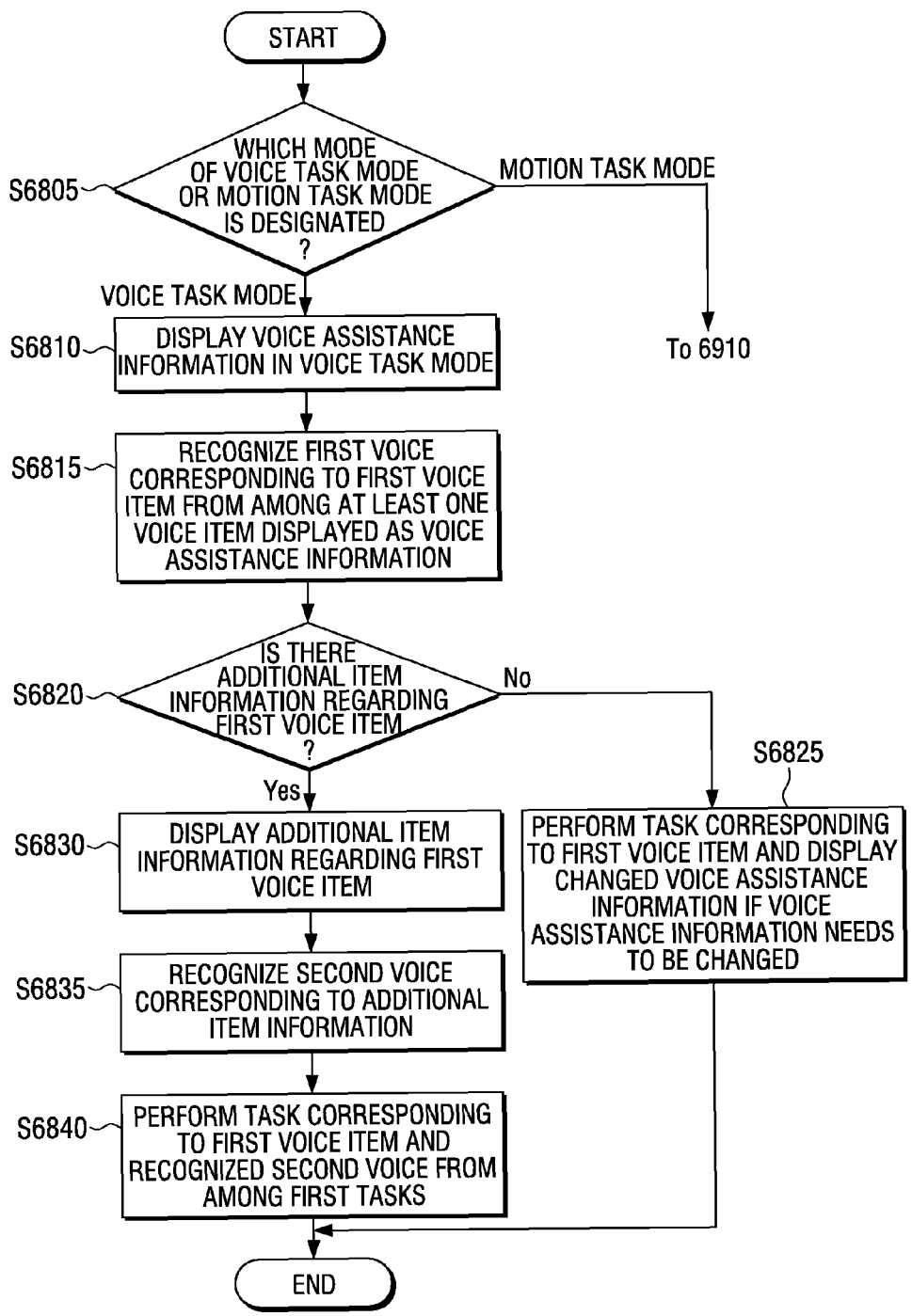
Figure 69:
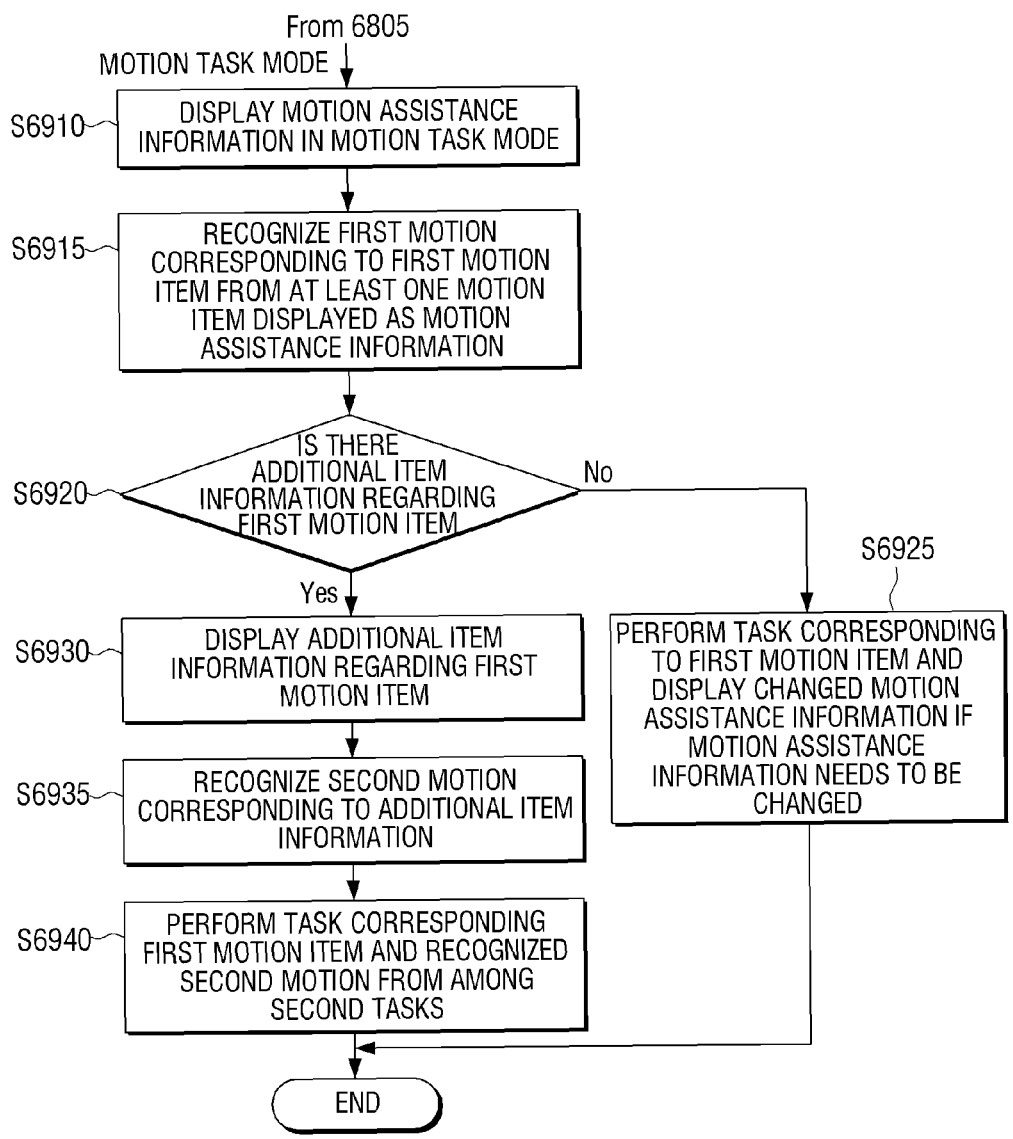

FIGS. 67 to 69 are flowcharts to explain a controlling method of an electronic apparatus which provides voice assistance information and motion assistance information according to various exemplary embodiment.

FIG. 67 is a flowchart to explain a controlling method of the electronic apparatus 100 according to an exemplary embodiment.

The electronic apparatus 100 may recognize a user input (a voice or a motion) using one of a voice recognition module or a motion recognition module (S6710). A user voice may input through a microphone and the input voice may be recognized by the voice recognition module, and a user motion may be photographed by a camera and the photographed motion may be recognized by the motion recognition module.

The electronic apparatus 100 may perform one of a voice task or a motion task in accordance with the received user input (S6720). That is, the electronic apparatus 100 may be operated in accordance with a designated mode of a voice task mode and a motion task mode. For example, if a voice start command or a motion start command is recognized, a mode corresponding to the recognized start command is designated.

The voice task mode is a mode in which at least one of first tasks (that is, voice tasks) is performed in accordance with a recognized voice, and the motion task mode is a mode in which at least one of second tasks (that is, motion tasks) is performed in accordance with a recognized motion. The voice tasks indicate tasks that are performed in accordance with a recognized voice, and the motion tasks indicate tasks that are performed in accordance with a recognized motion. The voice tasks and the motion tasks may be different from each other.

FIGS. 68 and 69 are flowcharts illustrating a controlling method of the electronic apparatus 100 according to an exemplary embodiment.

The electronic apparatus 100 may identify which of the voice task mode and the motion task mode is designated (S6805). Although only the voice task mode or the motion task mode is displayed in the present exemplary embodiment, identifiable modes may further include a mode in which the electronic apparatus 100 is controlled by a remote controller. If the motion task mode is designated, the electronic apparatus 100 enters operation S6910 of FIG. 69 and continues a controlling operation of the electronic apparatus 100 according to the present exemplary embodiment.

If the voice task mode is designated, the electronic apparatus 100 may display voice assistance information for performing the first tasks in the voice task mode in which at least one of the first tasks is performed in accordance with a recognized voice (S6810).

The electronic apparatus 100 may recognize a first voice corresponding to a first voice item from among at least one voice item displayed as the voice assistance information (S6815).

The electronic apparatus 100 may determine whether additional item information regarding the first voice item corresponding to the recognized first voice exists or not (S6820). If the additional item information regarding the first voice item does not exist, the electronic apparatus 100 may perform a task corresponding to the first voice item (S6825). Also, if the voice assistance information needs to be changed, the electronic apparatus 100 may display changed voice assistance information. For example, if mute is recognized as a voice corresponding to the voice item 813, the electronic apparatus 100 performs mute, and changes the voice item 813 to the voice item 2213 and displays changed voice assistance information as shown in FIG. 22.

If the additional item information regarding the first voice item exists, the electronic apparatus 100 may display the additional item information regarding the first voice item corresponding to the recognized first voice (S6830). For example, if "channel" is recognized as a voice corresponding to the voice item, additional item information including a guide message or an utterance example may be displayed.

The electronic apparatus 100 may recognize a second voice corresponding to the additional item information (S6835).

The electronic apparatus 100 may perform a task corresponding to the first voice item and the recognized second voice from among the first tasks (S6840). For example, if the first voice item is the voice item 812 and the second voice is "seven", the electronic apparatus 100 may perform channel shortcut to change a current channel to a channel having channel identifier 7.

If the motion task mode is designated, the electronic apparatus 100 may display motion assistance information for performing the second tasks in the motion task mode in which at least one of the second tasks is performed in accordance with a recognized motion (S6910 of FIG. 69).

The electronic apparatus 100 may recognize a first motion corresponding to a first motion item from at least one motion item displayed as the motion assistance information (S6915).

The electronic apparatus 100 may determine whether additional item information regarding the first motion item corresponding to the recognized first motion exists or not (S6920). If the additional item information regarding the first motion item does not exist, the electronic apparatus 100 may perform a task corresponding to the first motion item (S6925). For example, if a slap motion in a rightward direction is recognized as a motion corresponding to the motion item 3313 in FIG. 33, the electronic apparatus 100 changes a current channel (channel 6) to a next channel (channel 7), which is located after the current channel (channel 6) according to a pre-set order, in accordance with channel-up. Also, if the motion assistance information needs to be changed, the electronic apparatus may display changed motion assistance information.

If the additional item information regarding the first motion item exists, the electronic apparatus 100 may display the additional item information regarding the first motion item corresponding to the recognized first motion (S6930).

For example, if a grab motion corresponding to the motion item is recognized, the additional item information including a guide message asking whether to reproduce a selected item or image file or a motion item indicating that slap motions in leftward/rightward directions correspond to an answer Yes/No may be displayed.

The electronic apparatus 100 may recognize a second motion corresponding to the additional item information (S6935).

The electronic apparatus 100 may perform a task corresponding to the first motion item and the recognized second motion from among the second tasks (S6940). For example, if the first motion item is a motion item for reproducing an image and the second motion is a slap motion in a leftward direction, the electronic apparatus 100 may reproduce a designated image file.

The control unit 140 may distinctively display an executable icon of a content that is controllable through voice recognition and an executable icon of a content that is uncontrollable through voice recognition using the UI process module 130*j*.

The control unit 140 may determine whether a content is supported by voice recognition using a header (not shown) of the content stored in the electronic apparatus 100 or a separate configuration file (not shown) included in the content.

If it is determined that the content is controllable through voice recognition, the control unit 140 combines an additional icon stored in the storage unit and an original executable icon of the content using the UI process module 130*j*, and displays the combined icon. The user may know that the content is controllable through voice recognition based on the presence of the additional icon displayed on the display screen.

A plurality of additional icons may be stored in the storage unit 130. The user may change an additional icon to be combined with the original executable icon through configuration.

Also, the control unit 140 may distinctively display a name of a content that is controllable through voice recognition and a name of a content that is uncontrollable through voice recognition using the UI process module 130*j*, for example, by underlining and displaying the name in bold. The user may know that the content is controllable through voice recognition based on the name of the executable icon underlined and displayed in bold.

The control unit 140 may display an executable icon of a content that is controllable through voice recognition and a name of the executable icon distinctively from an executable icon of a content that is uncontrollable through voice recognition and a name of the executable icon using the UI process module 130*j*.

The control unit 140 or the content may distinctively display a menu that is controllable through voice recognition and a menu that is uncontrollable through voice recognition from among menus of a tool bar displayed on a UI of the executed content (for example, menus 'next', 'previous', or 'open').

Hereinafter, a method for displaying an executable icon of an application that is controllable through voice recognition and a name of the executable icon distinctively from an executable icon of an application that is uncontrollable through voice recognition and a name of the executable icon according to various exemplary embodiments will be explained with reference to FIGS. 70 to 79.

Figure 70:
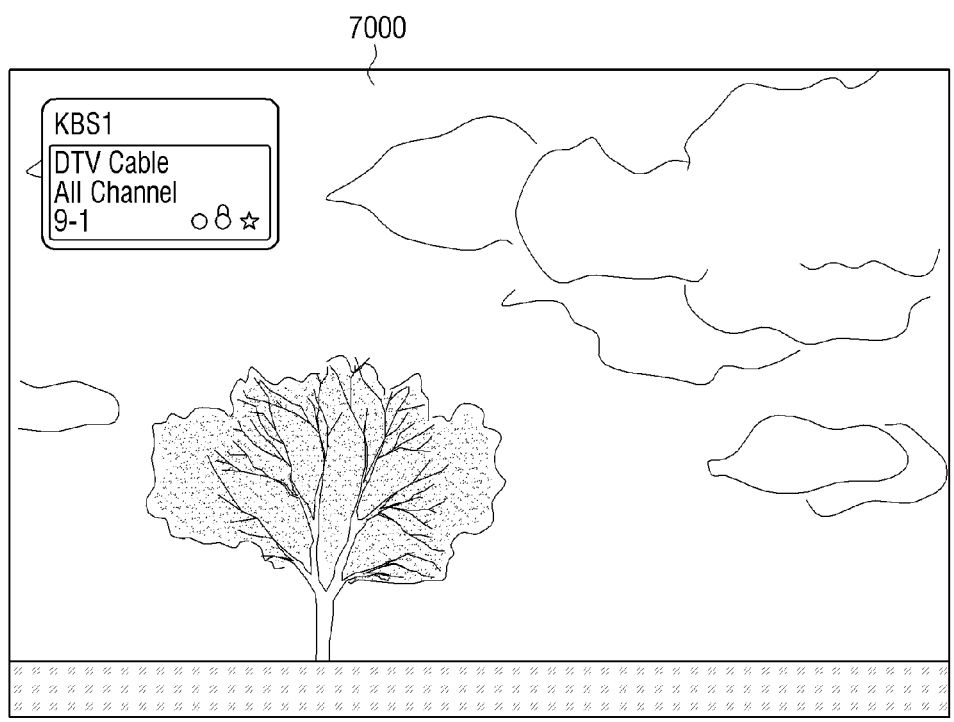
FIGS. 70 to 78 are views to explain a method for displaying a UI of an electronic apparatus to explain an exclusive icon for a voice application according to various exemplary embodiments.

Referring to FIG. 70, the control unit 140 of the electronic apparatus 100 outputs a video, an audio, and control data (for example, an electronic program guide (EPG)) corresponding to a broadcast signal received from the broadcast receiving unit 150 to the audio output unit 196 and a display screen 7000 of the display unit 193.

The control unit 140 recognizes a voice start command (trigger voice) uttered by the user using the voice input unit 110, the voice recognition module 130k, and the voice database 130m. The control unit 140 is changed to a voice task mode, in which the electronic apparatus 100 is controllable through voice recognition, by the recognized voice start command (for example, "Ginny"). The control unit 140 compares the voice start command recognized through the voice input unit 110 and the voice recognition module 130k and a voice start command pre-stored in the voice database 130m. If the voice is recognized as the voice start command as a result of the comparing, the electronic apparatus 100 is changed to the voice task mode under control of the control unit 140. The voice database 130m may store a first command corresponding to a voice that is recognizable through the voice input unit 110 and the voice recognition module 130k (for example, a command corresponding to "change to the voice task mode" or a command corresponding to "channel change". The control unit 140 may perform a voice task of the electronic apparatus 100 corresponding to the first command. The voice start command pre-stored in the voice database 130m may be changed (for example, may be added, changed, or deleted) through configuration. Recognition of the input voice start command could be easily understood by an ordinary skilled person in the related art.

Figure 71:
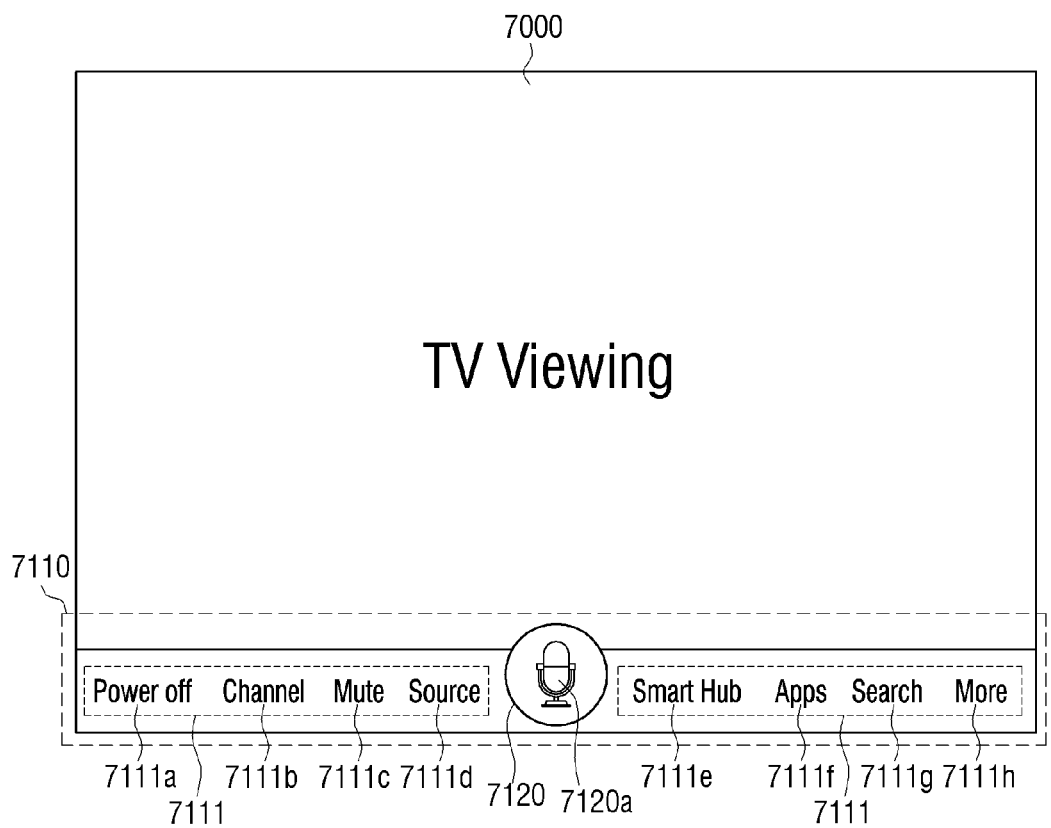
Figure 72:
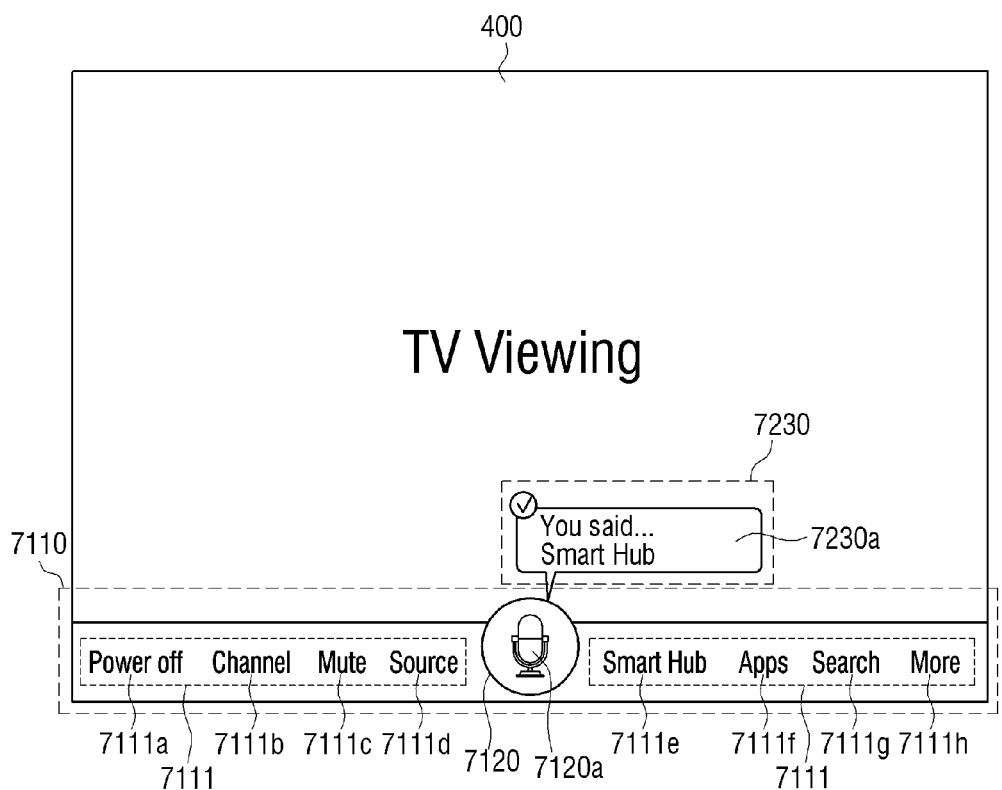

Referring to FIG. 71, the control unit 140 displays voice assistance information 7110 for performing the voice task mode on a display screen 400 on which an image is displayed. The control unit 140 may display the voice assistance information 7110 to overlap on the displayed image. The control unit 140 may display the voice assistance information 7110 on a lower portion of the display screen 400. The voice assistance information 7110 may include a command/guide display area 7111, a mode display area 7120 and 7120a, and a first feedback display area 7230 (see FIG. 72). Referring to FIG. 72, the first feedback display area 7230 may be displayed on one side portion of the mode display area 7120. The first feedback display area 7230 may include first visual feedback 7230a (see FIG. 72). The control unit 140 outputs the recognized first command to the speaker 161 of the electronic apparatus 100, thereby providing first auditory feedback (not shown) to the user. The electronic apparatus 100 may provide one of the visual feedback and the auditory feedback or provide both the visual feedback and the auditory feedback.

Figure 73:
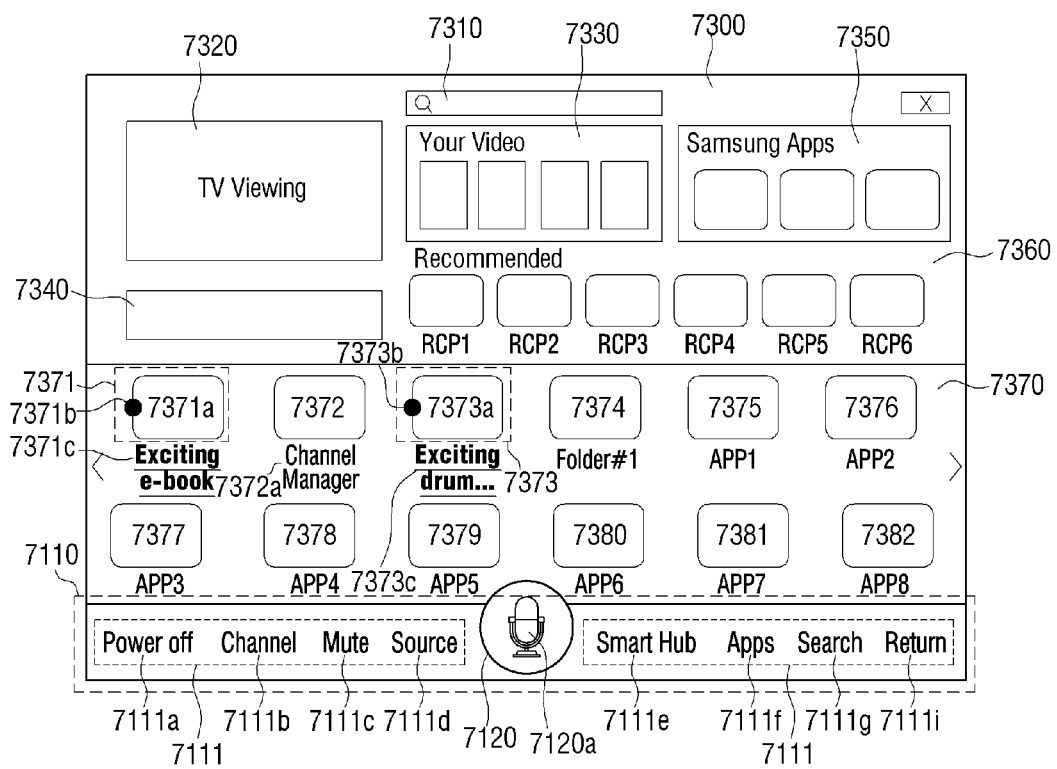

Referring to FIG. 73, if the first command is recognized, the control unit 140 displays a content list corresponding to the first command (hereinafter, referred to as a smart hub 7300). The smart hub 7300 is a UI serving as a hub of various functions supported by the electronic apparatus 100. The smart hub 7300 is a UI where executable icons corresponding to various functions supported by the electronic apparatus 100 (for example, functions of viewing a moving image, listening to music, accessing the Internet) are displayed. Also, the smart hub 7300 is a UI where executable icons of contents stored in the storage unit 130 of the electronic apparatus 100 (for example, a photo, music, a moving image), executable icons corresponding to contents received from external sources (for example, a photo, music, a moving image), and executable icons of executable applications (for example, a web browser) are displayed.

The smart hub 7300 may include a plurality of areas from among a search area 7310 that searches various contents, applications or Internet information using a voice (for example, a voice task mode) or a motion (for example, a motion task mode), a broadcast area 7320 that is located on one side portion of the search area 7310 and displays a down-sized broadcast image, a your video area 7330 that is located under the search area 7310 and displays an executable icon corresponding to a moving image stored in the storage unit 130, an information display area 7340 that is located under the search area 7310 and shows a notice or an advertisement from a manufacturer of the electronic apparatus 100, an Apps area 7350 that is located under the search area 7310 and displays executable icons of applications corresponding to various free or paid services provided by the manufacturer of the electronic apparatus 100, a recommended area 7360 that is located under the search area 7310 and displays a service recommended by the manufacturer of the electronic apparatus 100, and an application list area 7370 that is located under the search area 7310 and displays an executable icon corresponding to an application executable in the electronic apparatus 100. It should be understood by an ordinary skilled person in the related art that the plurality of areas 7310 to 7370 displayed on the smart hub 7300 may be added or deleted according to the performance or function of the electronic apparatus.

The smart hub 7300 may display the voice assistance information 7110 corresponding to the voice task mode. Also, the smart hub 7300 may display the motion assistance information 7720 corresponding to the motion task mode. The voice assistance information 7110 or the motion assistance information 7720 (see FIG. 77) may overlap on the smart hub 7300. Referring to FIG. 73, the smart hub 7300 displays the voice guide information 7110 corresponding to the voice task mode.

In the voice task mode, the smart hub 7300 displays an executable icon (for example, 7371) corresponding to a content that is controllable through voice recognition (for example, an application and a moving image) distinctively from an executable icon (for example, 7372) corresponding to a content that is uncontrollable through voice recognition. The executable icon 7371 corresponding to the content that is controllable through voice recognition may be a combination of an original executable icon 7371a corresponding to the content that is controllable through voice recognition and an additional icon 7371b (one of a still image, a moving image, and a text) located on one side portion of the original executable icon 7371a. The additional icon 7371b may be displayed to overlap with the original executable icon 7371a or separately from the original executable icon 7371a. The additional icon is added to one side of the executable icon corresponding to the content according to whether a voice is recognized or not. However, this is merely an example. It should be understood by an ordinary skilled person in the related art that the executable icon corresponding to the content may be distinctively displayed in various ways according to whether a voice is recognized or not, for example, by changing a location or size of the additional icon 7371b.

A name 7371c of the executable icon corresponding to the content that is controllable through voice recognition may be displayed distinctively from a name 7372a of the executable icon corresponding to the content that is uncontrollable through voice recognition (for example, underlined and bold). However, distinguishing the name of the executable icon corresponding to the content according to whether a voice is recognizable by underlining the name and inserting a bold font is merely an example. It should be understood by an ordinary skilled person in the related art that the name of the executable icon corresponding to the content may be displayed distinctively in various ways according to whether a voice is recognizable, for example, by changing a font or color.

If a name of an executable icon has letters longer than the number of letters defined in the smart hub 7300 (for example, 15 letters in English and 8 letters in Korean) (for example, a name 7373*c*), only a part of the name of the executable icon may be displayed. For example, the remaining part of the name of the executable icon which is not displayed may be displayed as an ellipsis.

The command displayed on the voice assistance information 7110 of the smart hub 7300 may be changed. If the smart hub 7300 is displayed in response to a first command voice, a command (return 7111*i*) to return to a previous image that was displayed before the smart hub 7300 is displayed is displayed. The command to return may be added to the voice assistance information 7110 (for example, 9 commands in total are displayed) or may be replaced with one of the displayed commands (for example, a command 'all') (for example, 8 commands in total are displayed).

The control unit 140 recognizes a second command voice uttered by the user using the voice input unit 110, the voice recognition module 130*k*, and the voice database 130*m* (for example, the name of the application 7371*c*, "Exciting e-book"). The control unit 140 compares the second command voice recognized through the voice input unit 110 and the voice recognition module 130*k* and a second command voice pre-stored in the voice database 130*m*. If the voice is recognized as a second command as a result of the comparing, the control unit 140 displays third visual feedback (for example, "you said "Exciting e-book"" (not shown)) corresponding to the recognized second command on the first feedback display area 7230. The third visual feedback (not shown) may be provided for a predetermined time (for example, 500 msec) The predetermined time may be changed through configuration.

The control unit 140 may output the recognized second command to the speaker 161 of the electronic apparatus, thereby providing third auditory feedback (not shown) to the user.

If the voice is not recognized as the second command as a result of the comparing, the control unit 140 may provide fourth visual feedback (for example, "please say it again" (not shown)) on the first feedback display area 7230. The control unit 140 may provide fourth auditory feedback (for example, "please say it again" (not shown)) to recognize the second command voice.

If a plurality of names of applications correspond to the recognized second command, the control unit 140 may display a candidates pop-up window 7314 displaying the plurality of names of applications on the smart hub 7300.

Figure 74:
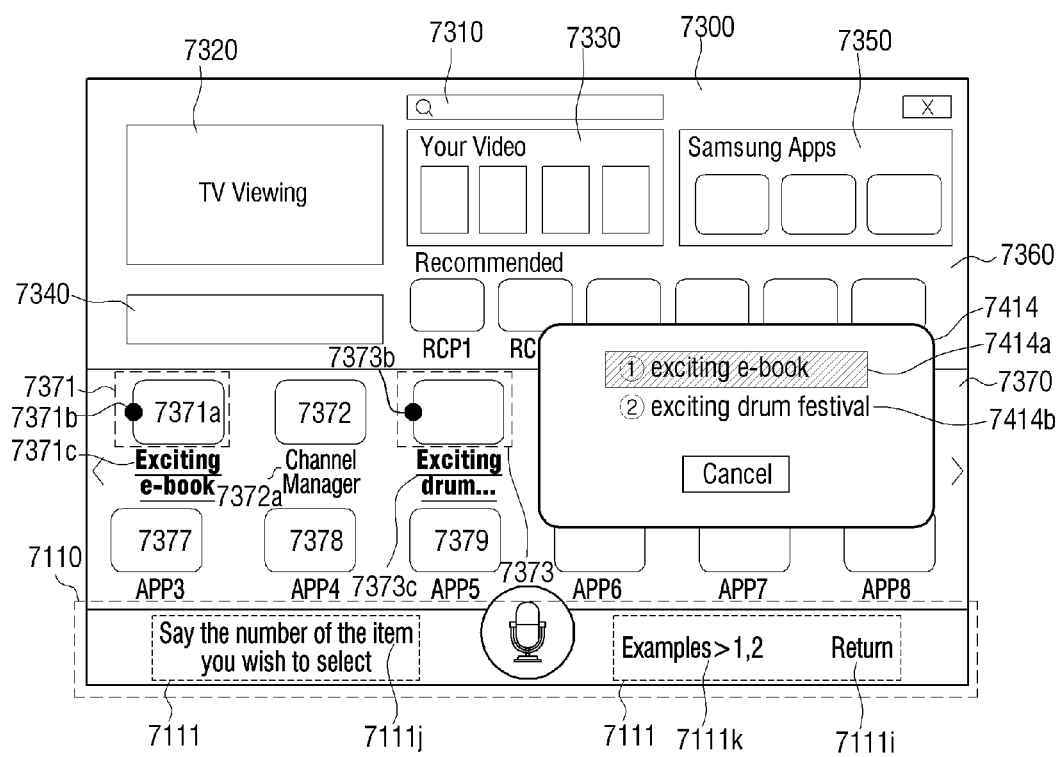

Referring to FIG. 74, if a second command (for example, including a part of the name of the application, "Exciting") is recognized through the voice input unit 110, the voice recognition module 130*k*, and the voice database 130*m*, the control unit 140 displays a list of a plurality of applications corresponding to the second command on the candidates pop-up window 7414. For example, the candidates pop-up window 7414 displays ① exciting e-book 7414*a* and ② exciting drum festival 7414*b*. If the candidates pop-up window 7414 is displayed on the smart hub 7300, the command on the command/guide display area 7111 displayed on the lower portion of the smart hub 7300 is changed. For example, the command/guide display area 7111 displays "Say the number of the item you wish to select" 7111*j* on the left portion of the mode display area 7112, and displays "Examples>1, 2 7111*k* and Return 7111*i*" on the right portion. If a voice corresponding to a number (for example, "one") is recognized through the voice input unit 110, the voice recognition module 130*k*, and the voice database 130*m*, the control unit 140 selects ① exciting e-book 7414*a* on the candidates pop-up 7414. The control unit 140 may display the name of the application selected on the candidates pop-up window 7414 distinctively from the name of the application not selected.

Also, if a voice corresponding to a full name of an application displayed on the candidates pop-up window 7414 is recognized, the control unit 140 may distinctively display the ① exciting e-book on the candidates pop-up window 7414.

Figure 75:
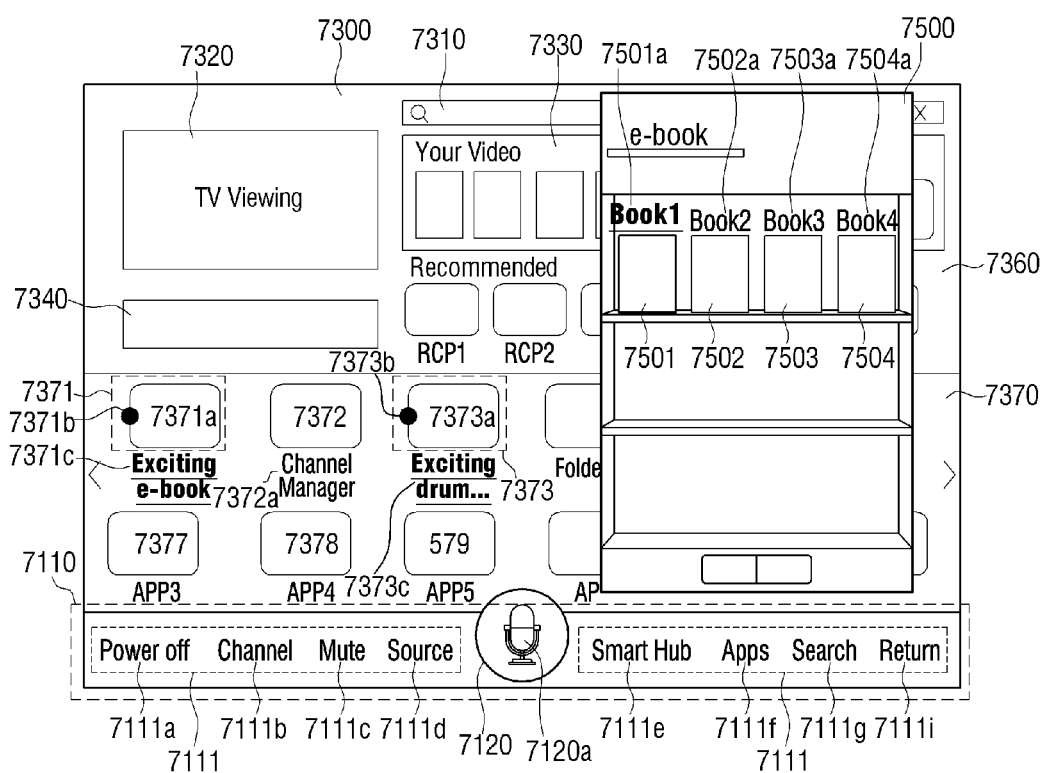

Referring to FIG. 75, the control unit 140 executes the application, Exciting e-book, corresponding to the second command (for example, "Exciting e-book") recognized through the voice input unit 110, the voice recognition module 130*k*, and the voice database 130*m*. The control unit 140 displays a UI 7500 of the Exciting e-book being executed. The control unit 140 displays the UI 7500 of the Exciting e-book to overlap on the smart hub 7300. The control unit 140 may display the UI 7500 of the Exciting e-book in a full screen size by replacing the smart hub 7300 with the UI 7500.

The UI 7500 of the Exciting e-book displays executable icons 7501 to 7504 corresponding to a plurality of e-books stored in the storage unit of the electronic apparatus 100 and names 7501*a* to 7504*a* of the executable icons. The control unit 140 may display the names 7501*a* to 7504*a* of the executable icons corresponding to the plurality of e-books distinctively from one another according to whether a voice is recognizable. For example, the control unit 140 displays the name 7501*a* of the executable icon corresponding to the e-book that is controllable through voice recognition distinctively from the name 7502*a* of the executable icon corresponding to the e-book that is uncontrollable through voice recognition. Also, the control unit 140 or the application (Exciting e-book) may distinctively display a menu that is controllable through voice recognition and a menu that is uncontrollable through voice recognition from among menus on a tool area (not shown) of the Exciting e-book (for example, a menu 'next', 'previous', or 'open' (not shown)). Distinguishing the name 7501*a* of the executable icon corresponding to the e-book that is controllable through voice recognition by underlining the name and inserting a bold font is merely an example. It should be understood by an ordinary skilled person in the related art that that the name of the executable icon corresponding to the e-book may be displayed distinctively in various ways according to whether a voice is recognizable, for example, by changing a font or color. The control unit 140 may download the e-book that is recognizable by a voice from an external server through the network interface unit 180.

If the name 7501*a* of the executable icon corresponding to the e-book that is controllable through voice recognition is recognized through the voice input unit 110, the voice recognition module 130*k*, and the voice database 130*m*, the control unit 140 executes and displays the e-book 7501. The user may control the e-book being displayed through voice recognition (for example, changing a page).

Figure 76:
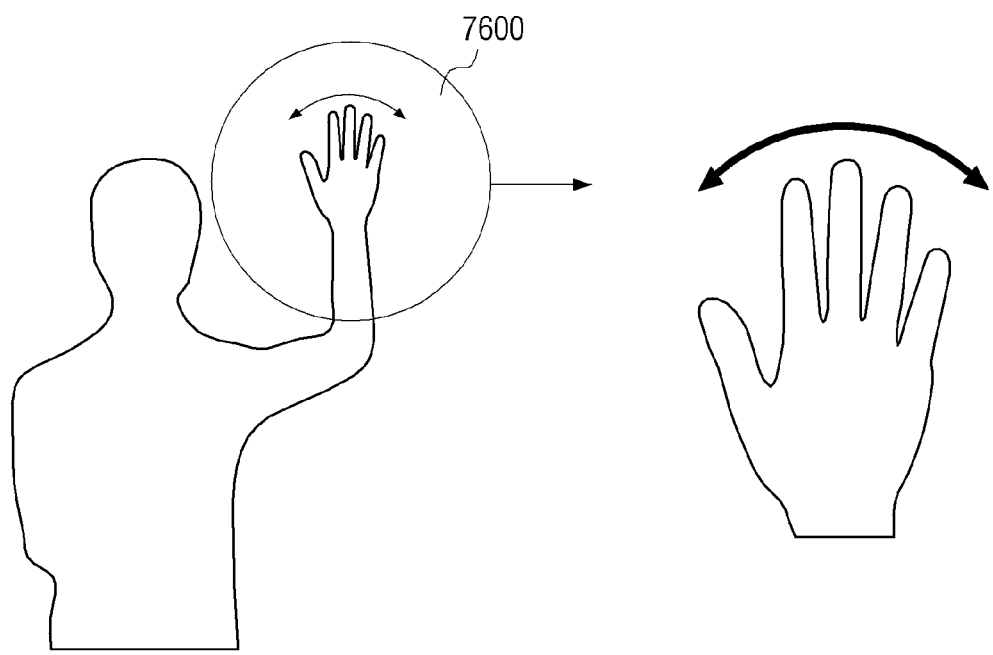

The control unit 140 recognizes a motion start command 700 using the motion input unit 120, the motion recognition module 130*l*, and the motion database 130*n*. Referring to FIG. 76, the motion start command 7600 is a motion of shaking user's spread fingers horizontally 3~4 times opposite to the motion input unit 120. The control unit 140 changes a mode of the electronic apparatus 100 to a motion task mode, in which the electronic apparatus 100 is controllable through motion recognition, according to the recognized motion start command. The control unit 140 compares the motion start command recognized through the motion input unit 120 and the motion recognition module 130*l* and a motion start command pre-stored in the motion database 130*n*. If the motion is recognized as the motion start command as a result of the comparing, the electronic apparatus 100 is changed from the voice task mode to the motion task mode by the control unit 140. The motion database 130*n* may store a second command corresponding to a motion that is recognizable through the motion input unit 120 and the motion recognition module 130*l* (for example, a command corresponding to "previous" or a command corresponding to "replay"). The control unit 140 may perform a motion task of the electronic apparatus 100 corresponding to the second command. The motion start command pre-stored in the motion database 130*n* may be changed through configuration (for example, may be added, changed, or deleted).

The smart hub displays motion assistance information and equally displays an executable icon of an application that is controllable through voice recognition and an executable icon of an application that is uncontrollable through voice recognition.

Figure 77:
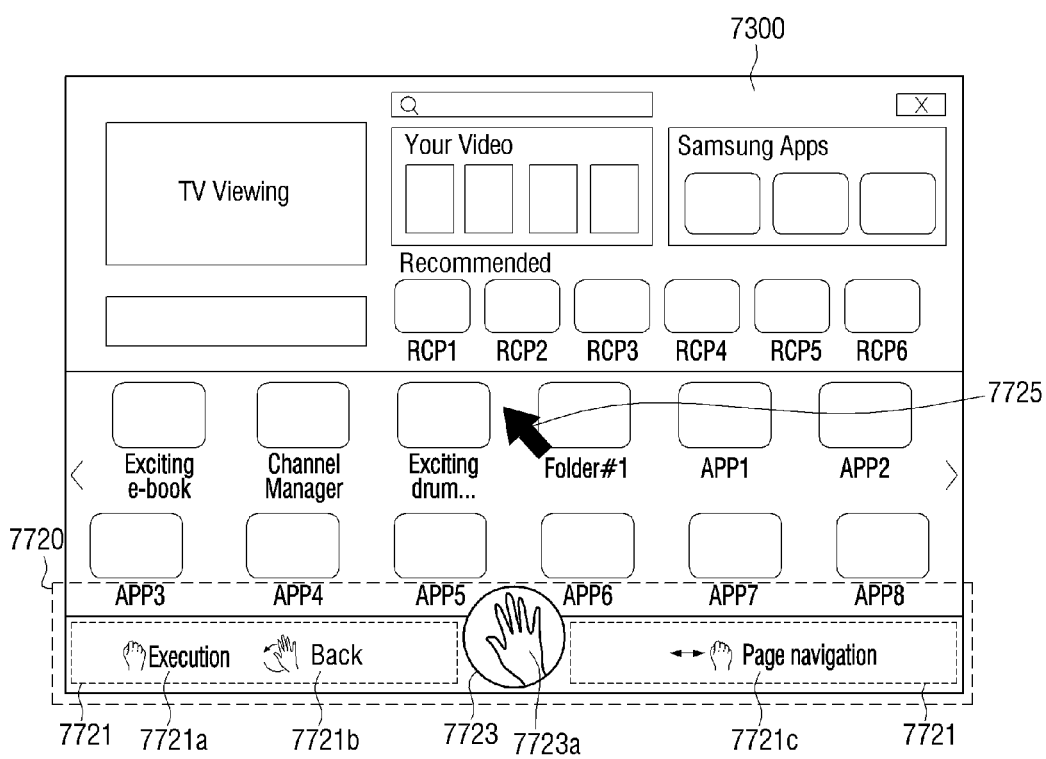

Referring to FIG. 77, the control unit 140 displays motion assistance information 7720 and a cursor 7725 corresponding to the motion task mode on the smart hub 7300. The control unit 140 may overlap the motion assistance information 7720 on the smart hub 7300. The control unit 140 may display the motion assistance information 7720 on a lower portion of the smart hub 7300. The motion assistance information 7720 may include a motion/guide display area 7721, a mode display area 7722, and a second feedback display area (not shown).

The control unit 140 displays the motion assistance information 7720 on the smart hub 7300 and equally displays the executable icon of the application that is controllable through voice recognition and the executable icon of the application that is uncontrollable through voice recognition.

Referring to FIG. 74, the control unit 140 recognizes a third command voice uttered by the user (for example, a full name of an application, "Exciting drum festival", or a part of the name) using the voice input unit 110, the voice recognition module 130*k*, and the voice database 130*m*. The control unit 140 compares the third command recognized through the voice input unit 110 and the voice recognition module 130*k* and a third command pre-stored in the voice database 130*m*. If the voice is recognized as the third command as a result of the comparing, the control unit 140 may display sixth visual feedback (for example, "you said "Exciting drum festival"" (not shown)) corresponding to the recognized third command on the first feedback display area 7413. The sixth visual feedback (not shown) may be provided for a predetermined time (for example, 500 msec).

If the third command is not recognized, the control unit 140 may display seventh visual feedback (for example, "please say it again" (not shown)) on the first feedback display area 7413. The control unit 140 may provide sixth auditory feedback (for example, "please say it again") to recognize the third command voice.

Referring to FIG. 74, if a plurality of names of applications correspond to the third command (for example, including a part of the name of the application to be selected, "Exciting"), the control unit 140 may display the candidates pop-up window 7414 displaying the plurality of names of applications on the smart hub 7400. If a voice corresponding to a number (for example, "two") is recognized through the voice input unit 110, the voice recognition module 130*k*, and the voice database 130*m*, the control unit 130 selects ② exciting drum festival 414*b* on the candidates pop-up window 7414.

Figure 78:
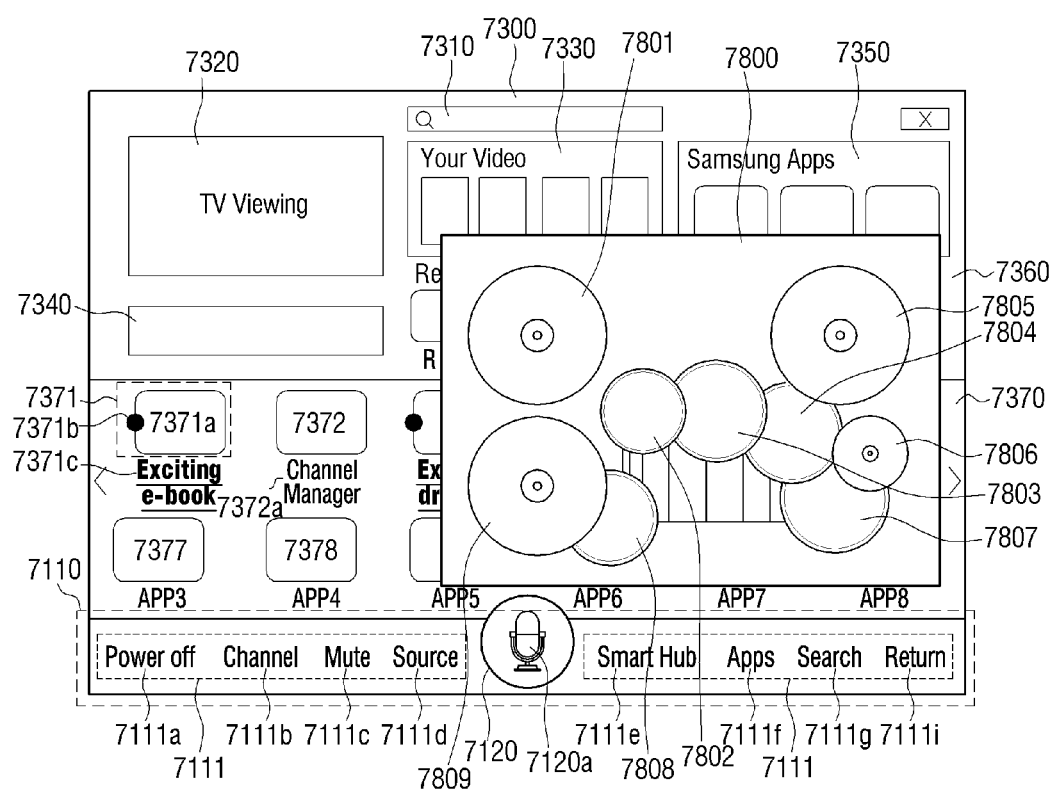

Referring to FIG. 78, the control unit 140 executes the application, Exciting drum festival, corresponding to the third command (for example, "Exciting drum festival") recognized through the voice input unit 110, the voice recognition module 130*k*, and the voice database 130*m*. The control unit 140 displays a UI 7800 of the Exciting drum festival being executed. The control unit 140 may display the UI 7800 of the Exciting drum festival to overlap on the smart hub 7300. The control unit 140 may display the UI 7800 of the Exciting drum festival in a full screen size by replacing the smart hub 7300 with the UI 7800.

Drums 7801 to 7809 displayed on the UI 7800 of the Exciting drum festival may be played through recognition of a user voice or a remote controller. The drums 7801 to 7809 on the Exciting drum festival may be played through motion recognition (for example, a grab motion) in the motion task mode.

Figure 79:
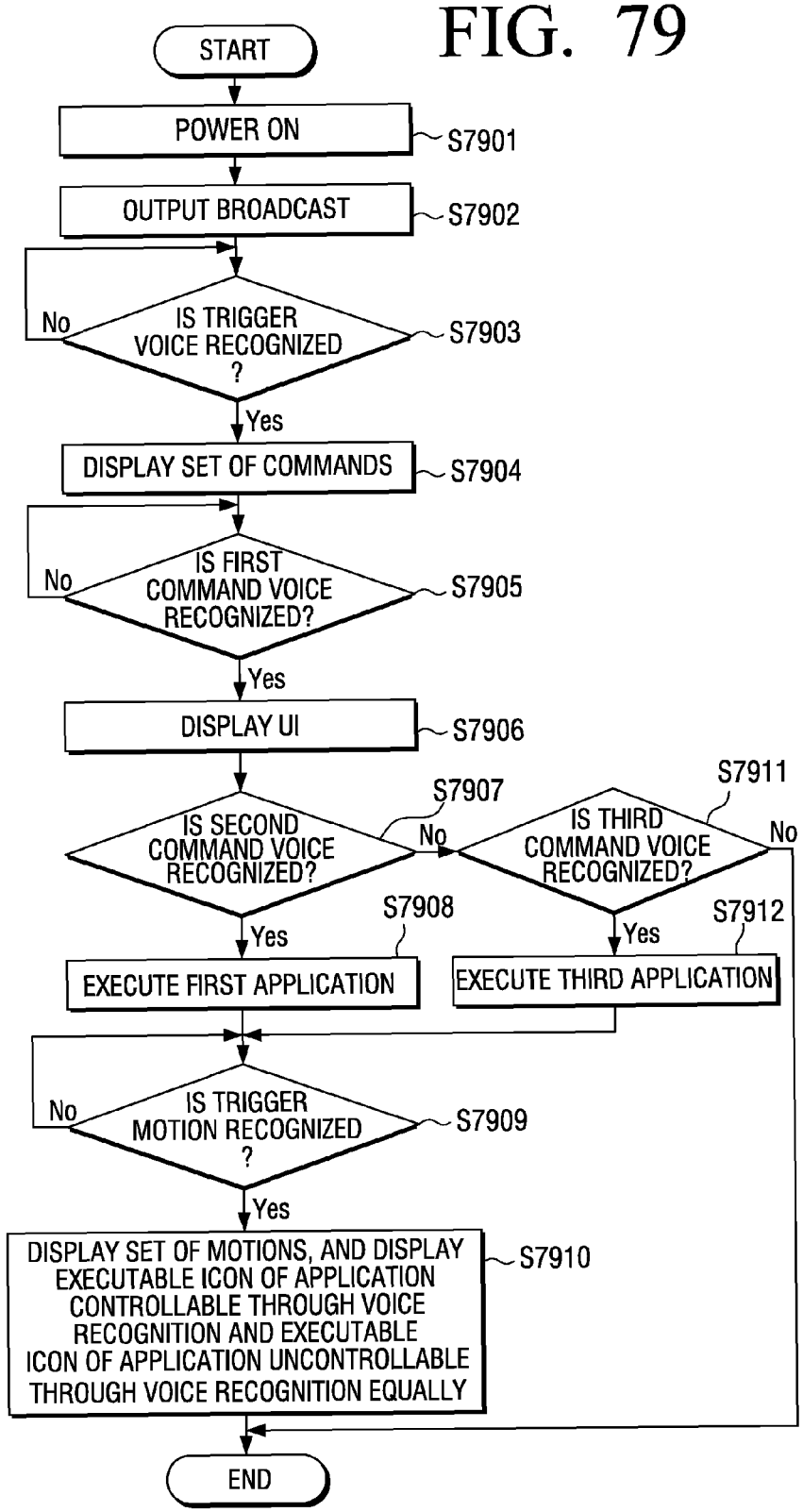
FIG. 79 is a flowchart to explain a method for displaying a UI of an electronic apparatus according to an exemplary embodiment.

FIG. 79 is a flowchart illustrating a method for displaying a UI of an electronic apparatus according to an exemplary embodiment.

The electronic apparatus 100 is turned on S7901. For example, if a power button (not shown) located on the electronic apparatus 100 is pressed, if a power key (not shown) of the electronic apparatus 100 located on a remote controller is selected (for example, a key is pressed), or if a user voice (for example, "power on") is recognized through the voice input unit 110, the voice recognition module 130*k*, and the voice database 130*m* of the electronic apparatus 100, the electronic apparatus 100 may be turned on.

A broadcast is output (S7902). For example, the electronic apparatus 100 outputs an image corresponding to a broadcast signal received from the broadcast receiving unit 150 as shown in FIG. 70.

A voice start command is recognized (S7903). That is, the electronic apparatus 100 recognizes a voice start command uttered by the user using the voice input unit 110, the voice recognition module 130*k*, and the voice database 130*m*. The electronic apparatus 100 changes a mode of the electronic apparatus 100 to a voice task mode, in which the electronic apparatus 100 is controllable through voice recognition, in accordance with the recognized voice start command.

A set of commands is displayed (S7904). For example, the electronic apparatus 100 displays a set of commands 7110 corresponding to the voice task mode on the display screen 7000 where an image is displayed, as shown in FIG. 71.

A first command voice is recognized (S7905). Specifically, the electronic apparatus 100 recognizes a first command voice (for example, "smart hub") uttered by the user using the voice input unit 110, the voice recognition module 130*k*, and the voice database 130*m*. If the voice is recognized as a first command, the electronic apparatus 100 displays the first visual feedback corresponding to the recognized first command on the first feedback display area 7230 as shown in FIG. 72.

A UI is displayed (S7906). For example, if the first command is recognized, the electronic apparatus 100 displays the smart hub 7300 corresponding to the first command as shown in FIG. 73.

A second command voice is recognized (S7907). Specifically, the electronic apparatus 100 recognizes a second command voice (for example, a name of an application, "Exciting e-book" 7371*c*) uttered by the user using the voice input unit 110, the voice recognition module 130*k*, and the voice database 130*m*. If a plurality of names of applications correspond to the recognized second command, the electronic apparatus

100 may display the candidates pop-up window 7414 displaying the plurality of names of applications, as shown in FIG. 74.

A first application is executed (S7908). For example, the electronic apparatus 100 executes the application, Exciting e-book, corresponding to the second command as shown in FIG. 75.

A motion start command (trigger motion) is recognized (S7909). Specifically, the electronic apparatus 100 recognizes a motion start command 7600 of the user using the motion input unit 120, the motion recognition module 130*l*, and the motion database 130*n*. For example, the motion start command 7600 is a motion of shaking user's spread fingers horizontally 3~4 times opposite to the motion input unit 120 as shown in FIG. 76.

Motion items are displayed on a smart hub and an executable icon of an application that is controllable through voice recognition and an executable icon of an application that is uncontrollable through voice recognition are equally displayed. For example, the electronic apparatus 100 displays the motion assistance information 7720 and the cursor 7725 corresponding to the motion task mode on the smart hub 7300 as shown in FIG. 77.

If the second command is not recognized in operation S7907, operation S7911 is performed.

A third command is recognized (S7911). The control unit 140 recognizes a third command voice uttered by the user using the voice input unit 110, the voice recognition module 130*k*, and the voice database 130*m*. If a plurality of names of applications correspond to the third command, the control unit 140 may display the candidates pop-up window 7414 displaying the plurality of names of applications on the smart hub 500 as shown in FIG. 74.

A third application is executed (S7912). For example, the electronic apparatus 100 executes the application, Exciting drum festival, corresponding to the third command recognized through the voice input unit 110, the voice recognition module 130*k*, and the voice database 130*m*, as shown in FIG. 78.

If the third command is not recognized in operation S7911, the operation ends.

The control unit 140 may provide one of a plurality of broadcast signals received through the broadcast receiving unit 150 and one of stored contents to the image output unit 190 or the display unit 193. The display unit 193 may display the received one broadcast signal or stored content. The stored content includes all of the contents that are stored in the electronic apparatus 100 permanently, momentarily or temporarily. For example, the content may be stored in the storage unit 130 of the electronic apparatus 100 permanently until a user request for deletion is received. Also, if a part of the storage unit 130 of the electronic apparatus 100 serves as a buffer, the content may be stored in the storage unit 130 momentarily or temporarily. Specifically, if a content input from the external terminal input unit 160 or the network interface unit 180 is provided to the image output unit 190 or the display unit 193 on a real time basis, the control unit 140 may store the content in a part of the storage unit 130 momentarily or temporarily so that an input speed of the content is substantially equal to an output speed of the content.

The control unit 140 may recognize a user motion using the motion recognition module 130*l* and may change a state of the provided broadcast signal or content in response to the recognized user motion. If the control unit 140 provides a broadcast signal, the control unit 140 may control a volume level of the broadcast signal or may provide another broadcast signal from among the plurality of broadcast signals in response to the recognized user motion. If the control unit 140 provides a content, the control unit 140 may change at least part of the screen on which the content is displayed in response to the recognized user motion.

For example, if a content (for example, an image including a plurality of pages or a document including a plurality of pages) includes a plurality of pages and one of the plurality of pages is displayed on the screen, the control unit 140 may change the screen on which one of the plurality of pages is displayed to a screen on which another page is displayed. In particular, the control unit 140 may change the screen on which one of the plurality of pages is displayed to a screen on which one of pages located on an upper, lower, left or right portion of one page of the plurality of pages is displayed in response to the recognized user motion.

As another example, if a content (for example, a web page) includes one page, the control unit 140 may change a screen on which a part of the page is displayed to a screen on which another part of the page is displayed.

Also, the control unit 140 may change a screen on which a provided content (for example, an image or a moving image) is displayed to a screen on which a content different from the content is displayed.

The control unit 140 may recognize a user voice using the voice recognition module 130*k*, and may provide one of the plurality of broadcast signals in accordance with the recognized user voice. For example, if a channel identifier is recognized through the voice recognition module 130*k*, the control unit 140 may provide a broadcast signal having the recognized channel identifier from among the plurality of broadcast signals using the channel control module 130*b*.

In another exemplary embodiment, the control unit 140 may select one broadcast signal from among the plurality of broadcast signals in response to a user motion recognized using the motion recognition module 130*l*. The control unit 140 may provide the selected broadcast signal to the image output unit 190 or the display unit 193. The display unit 193 may display the provided broadcast signal. Next, the control unit 140 may stop providing the broadcast signal to the image output unit 190 or the display unit 193. For example, the control unit 140 may stop providing the broadcast signal in response to a user input received through the motion recognition module 130*l*, the voice recognition module 130*k*, or the remote controller. The control unit 140 may provide a content stored in the electronic apparatus 100.

When the control unit 140 provides the stored content to the display unit 193, the control unit 140 may re-recognize a user motion which has the same form as that of the user motion when one of the plurality of broadcast signals is selected. The user motion of the same form includes a user motion having a substantially same form. For example, if forms of objects of a plurality of user motions are the same, the forms of the objects move in the same direction, and moving speeds of the forms of the objects are higher than a predetermined speed, the control unit 140 may recognize the plurality of user motions as a user motion of the same form. For example, if a user motion to select one broadcast signal and a re-recognized user motion are all slap motions and the slap motions are moved in the same direction, the control unit 140 may recognize the user motion to select one broadcast signal and the re-recognized user motion as a user motion of the same form. Also, if a user motion to select one broadcast signal is an slap motion in an upward direction and a user motion to change at least part of a screen where a provided content is displayed is also a slap motion in an upward direction, the control unit 140 may recognizes those two motions as a user motion of the same form.

Next, the control unit 140 may change at least part of the screen where the provided content is displayed in response to the re-recognized user motion.

In another exemplary embodiment, the control unit 130 may provide first image data to the image output unit 190 or the display unit 193. The control unit 130 may provide audio data for the first image data to the audio output unit 196. The first image data may be image data of a broadcast signal and the audio data for the first image data may be audio data of the broadcast signal, for example. The control unit 140 may control a volume level of the audio data in response to the recognized user motion. For example, the control unit 140 may control a volume level of the audio data for the first image data. Next, the control unit 140 may stop providing the first image data and the audio data for the first image data and may provide second image data. The second image data may be image data of a content stored in the electronic apparatus 100, for example. Next, the control unit 140 may re-recognize a user motion of the substantially same form as that of the user motion recognized to control the volume level of the audio data. The control unit 140 may change at least part of a screen where the second image data is displayed in response to the re-recognized user motion.

In another exemplary embodiment, the control unit 140 may provide one of first image data from among image data provided from a plurality of sources, respectively, and second image data from among a plurality of image data provided from a single source to the image output unit 190 or the display unit 193. The display unit 193 displays the first image data or the second image data. For example, the first image data from among the image data provided from the plurality of sources, respectively, may be image data of a broadcast signal that is received through a channel selected by a tuner included in the broadcast receiving unit 210 from among image data of a plurality of broadcast signals received through a plurality of channels. For example, the second image data from among the plurality of image data provided from a single source may be image data of one content from among a plurality of contents provided from the storage unit 130 of the electronic apparatus 100, an external apparatus connected to the external terminal input unit 200, or a server connected to the network interface unit 180. Next, the control unit 140 may recognize a user motion through the motion recognition module 130*l*. If the control unit 140 provides the first image data, the control unit 140 may provide image data provided from a source different from the source of the first image data in response to the recognized user motion. If the control unit 140 provides the second image data, the control unit 140 may provide image data that is different from the second image from among the plurality of image data provided from the single source.

In another exemplary embodiment, the control unit 140 may provide one of first image data that is promptly reproduced when power is supplied to the electronic apparatus 100 and second image data that is reproduced after the electronic apparatus 100 enters a mode after power is supplied to the electronic apparatus 100 to the image output unit 190 or the display unit 193. The display unit 193 may display the first image or the second image data. The first image data that is promptly reproduced when the power is supplied to the electronic apparatus 100 may be a broadcast signal that is promptly reproduced when a TV is turned on, if the electronic apparatus 100 is a TV, for example. The second image data that is reproduced after the electronic apparatus 100 enters a mode after power is supplied to the electronic apparatus 100 may be a content that is reproduced after a TV enters a mode in accordance with a user input through the voice input unit 110, the motion input unit 120 or the remote controller after the TV is turned on, if the electronic apparatus is a TV, for example. Next, if the first image data is provided, the control unit 140 may provide different image data that is promptly reproduced when power is supplied (for example, image data of a broadcast signal of a different channel) in response to a user motion recognized through the motion recognition module 130*l*. If the second image data is provided, the control unit 140 may provide different image data that is reproduced after the electronic apparatus 100 enters a mode (for example, image data of a content stored in the storage unit 130, or image data of a content received from the external terminal input unit 160 or the network interface unit 180) in response to the user motion recognized through the motion recognition module 130*l*.

In another exemplary embodiment, the control unit 140 may provide one of a plurality of moving images or one of a plurality of images to the image output unit 190 or the display unit 193. The display unit 193 may display the moving image or the image. For example, one of the plurality of moving images may indicate an image that changes with time as one of a plurality of broadcast signals. Also, one of the plurality of images may be one of a plurality of stored images. Next, if the moving image is provided, the control unit 140 may provide a moving image that is different from the provided moving image from among the plurality of moving images (for example, a broadcast signal of a different channel) in response to a user motion recognized through the motion recognition module 130*l*. If the image is provided, the control unit 140 may provide an image that is different from the provided image from among the plurality of images in response to the user motion recognized through the motion recognition module 1031.

Hereinafter, a screen that is changed in response to a user motion will be explained with reference to FIGS. 80 to 91.

Figure 80:
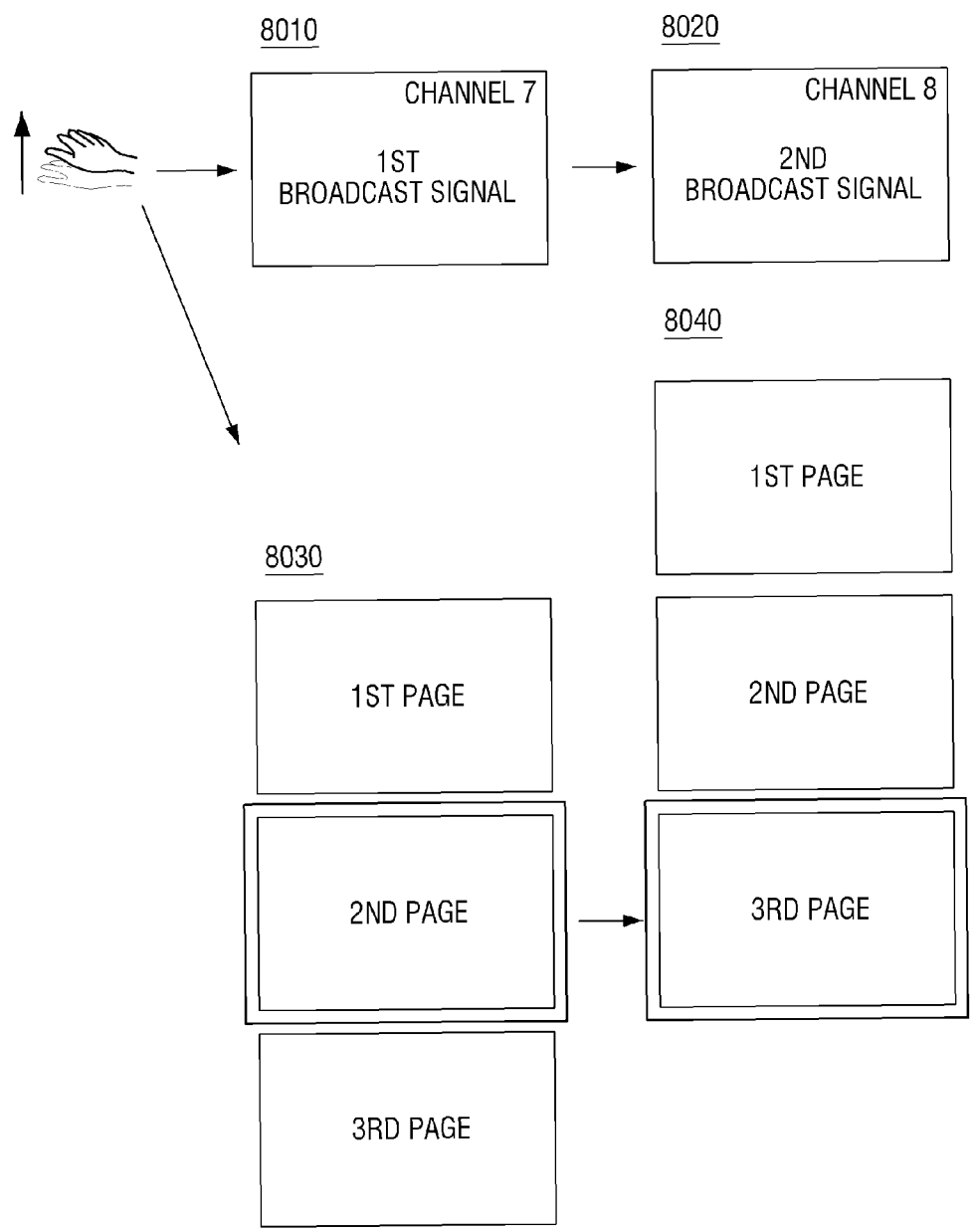
FIGS. 80 to 91 are views illustrating a screen which changes in accordance with a user motion in upward, downward, leftward, and rightward directions according to various exemplary embodiments.
Figure 81:
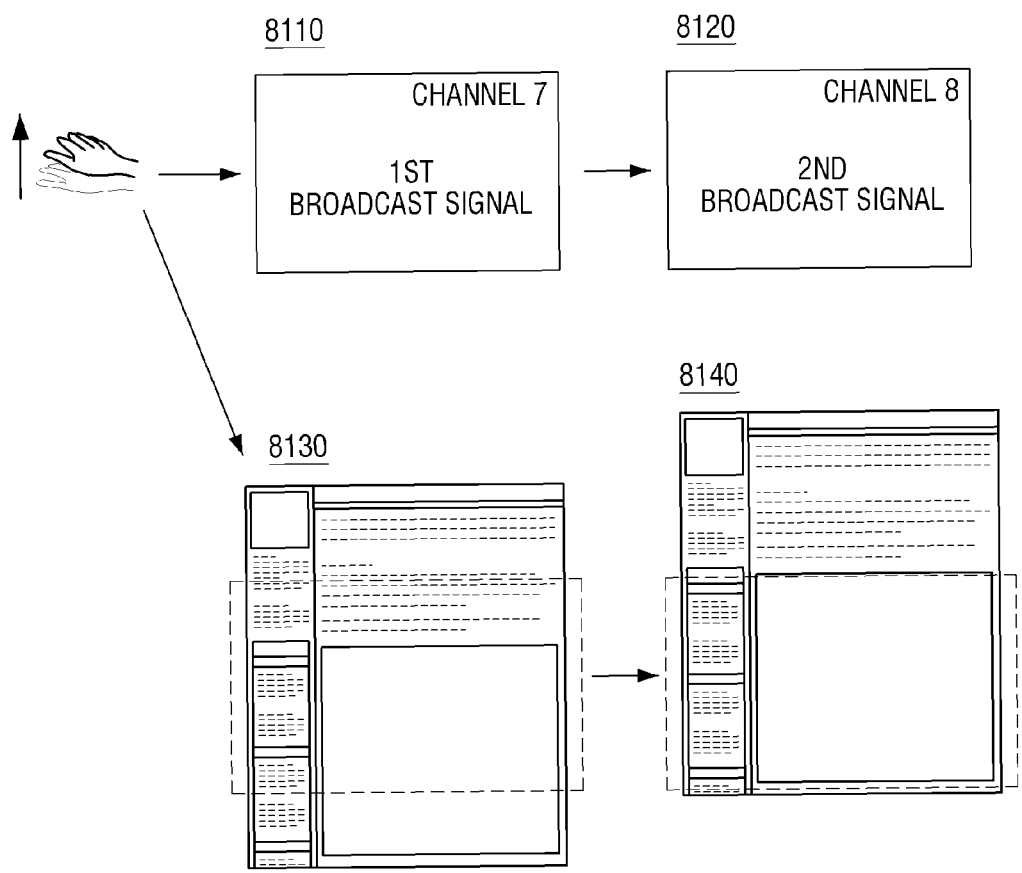

FIGS. 80 and 81 are views illustrating a screen that is changed in response to a user motion in an upward direction according to various exemplary embodiments.

In FIG. 80, the control unit 140 may recognize a slap motion in an upward direction as a user motion. Referring to 8010 and 8020 of FIG. 80, if the control unit 140 provides a broadcast signal, the control unit 140 may stop providing the broadcast signal on a screen and may provide a broadcast signal a channel number of which is increased from a channel number of the stopped broadcast signal in response to the slap motion in the upward direction. For example, a broadcast signal having channel number '7' is changed to a broadcast signal having channel number '8'. Referring to 8030 and 8040 of FIG. 80, if the control unit 140 provides a content including a plurality of pages, the control unit 140 may change a screen where one of the plurality pages is displayed to a screen where a page located under the one page of the plurality of pages is displayed in response to the slap motion in the upward direction. For example, the screen where the second page is displayed as in 8030 may be changed to the screen where the third page is displayed as in 8040.

In FIG. 81, the control unit 140 may recognize a slap motion in an upward direction as a user motion. Referring to 8110 and 8120 of FIG. 81, if the control unit 140 provides a broadcast signal, the control unit 140 stops providing the broadcast signal on a screen and may provide a broadcast signal a channel number of which is increased from a channel number of the stopped broadcast signal in response to the slap motion in the upward direction. Referring to 8130 and 8140 of FIG. 81, if the control unit 140 provides a content including one page, the control unit 140 may change a part of the one page on the screen to another part located under the part of the one page in response to the slap motion in the upward direction.

Figure 82:
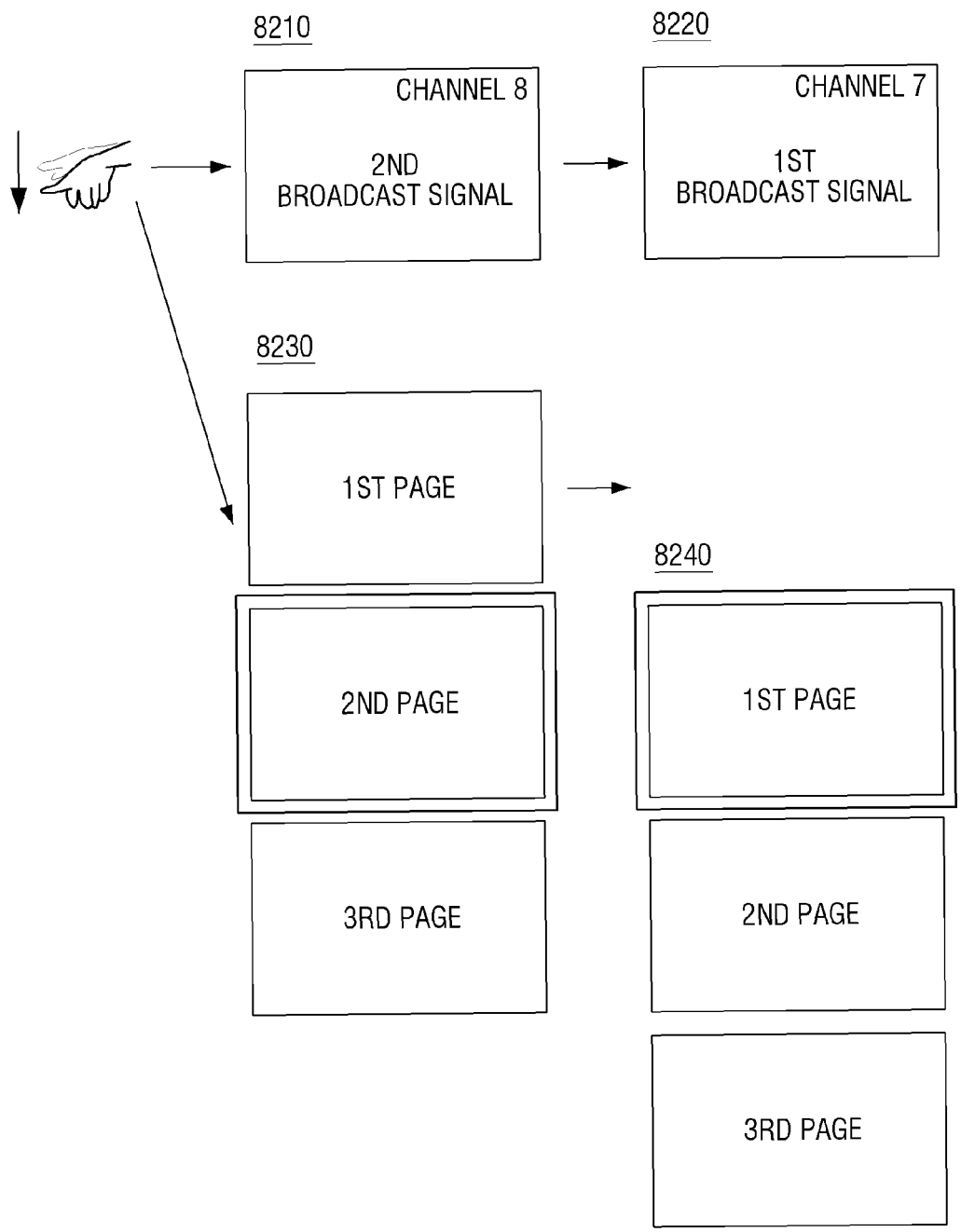
Figure 83:
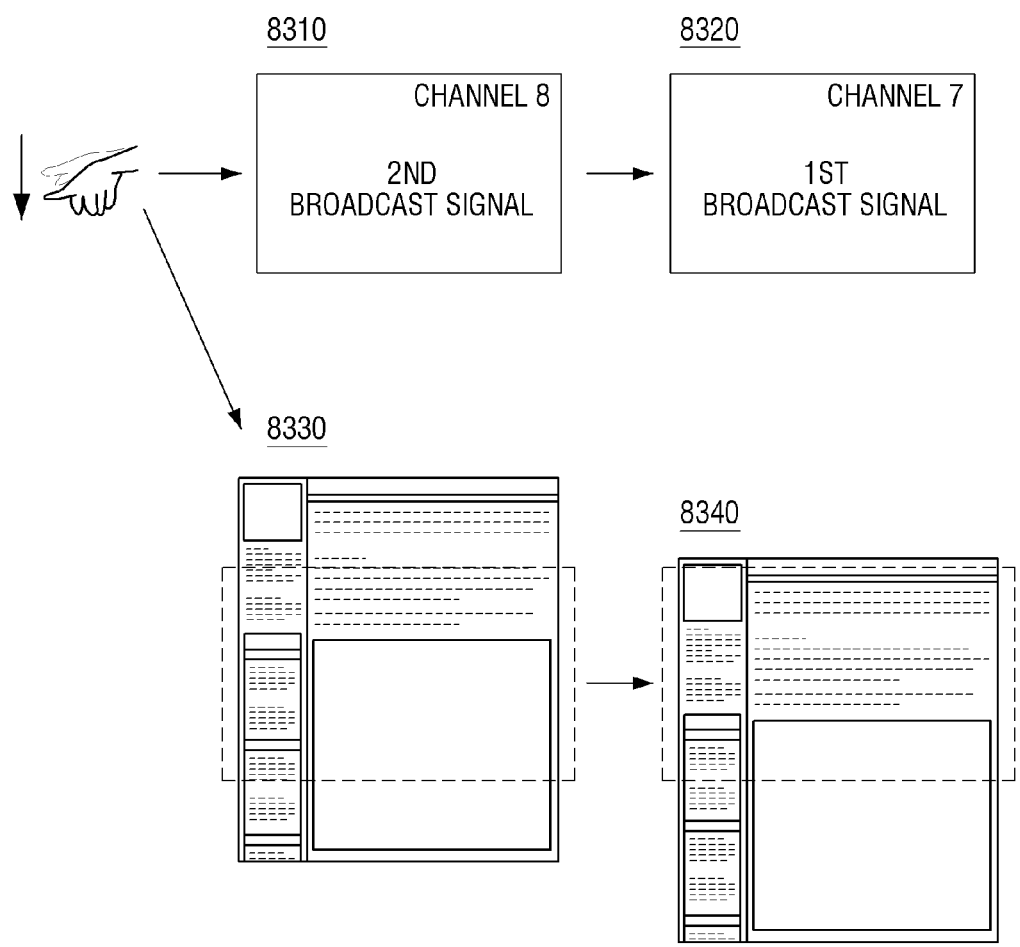

FIGS. 82 and 83 are views illustrating a screen that is changed in response to a user motion in a downward direction according to various exemplary embodiments.

In FIG. 82, the control unit 140 may recognize a slap motion in a downward direction as a user motion. Referring to 8210 to 8220 of FIG. 82, if the control unit 140 provides a broadcast signal, the control unit 140 stops providing the broadcast signal on a screen and may provide a broadcast signal a channel number of which is decreased from a channel number of the stopped broadcast signal in response to the slap motion in the downward direction. For example, a broadcast signal having channel number '8' is changed to a broadcast signal having channel number '7'. Referring to 8230 and 8240 of FIG. 82, if the control unit 140 provides a content including a plurality of pages, the control unit 140 may change a screen where one of the plurality of pages is displayed to a screen where a page located above the one page of the plurality of pages is displayed in response to the slap motion in the downward direction. For example, the screen where the second page is displayed as in 8230 may be changed to the screen where the first page is displayed as in 8240.

In FIG. 83, the control unit 140 may recognize a slap motion in a downward direction as a user motion. Referring to 8310 and 8320 of FIG. 83, if the control unit 140 may provide a broadcast signal, the control unit 140 stops providing the broadcast signal on a screen and may provide a broadcast signal a channel number of which is decreased from a channel number of the stopped broadcast signal in response to the slap motion in the downward direction. Referring to 8330 and 8340, if the control unit 140 provides a content including one page, the control unit 140 may change a part of the one page on the screen to another part located above the part of the one page in response to the slap motion in the downward direction.

FIGS. 84 to 87 are views illustrating a screen that is changed in response to a user motion in a leftward direction according to various exemplary embodiments.

Figure 84:
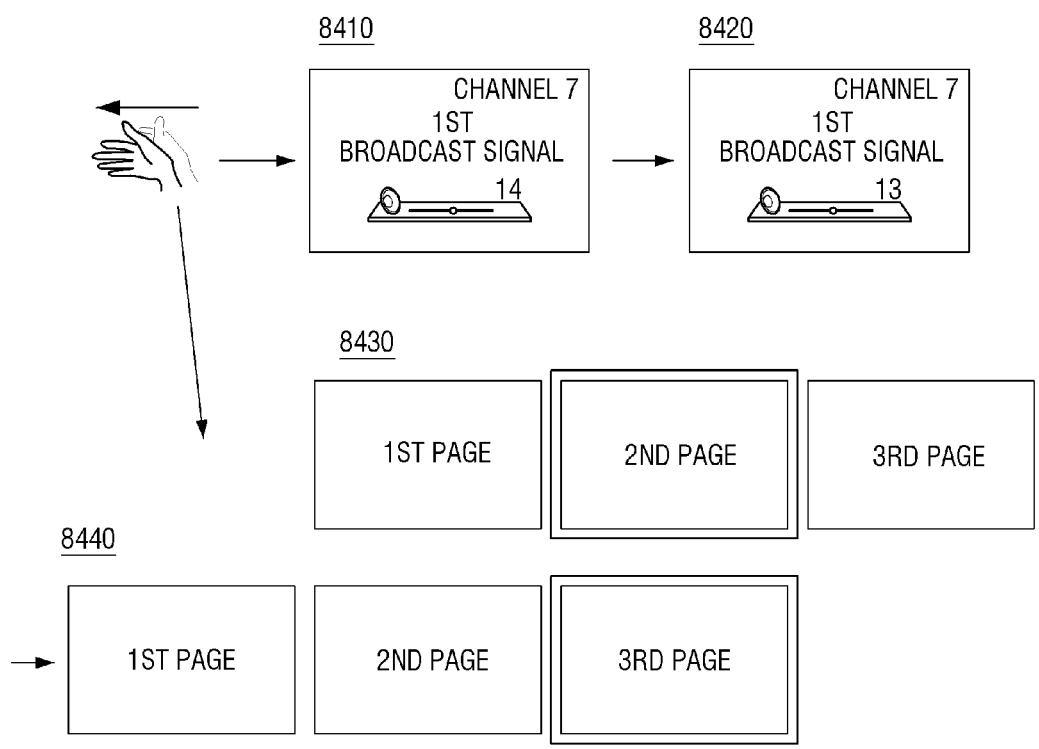

In FIG. 84, the control unit 140 may recognize a slap motion in a leftward direction as a user motion. Referring to 8410 and 8420, if the control unit 140 provides a broadcast signal, the control unit 140 may reduce a volume level of the broadcast signal being provided in response to the slap motion in the leftward direction. For example, the volume level of the broadcast signal may be reduced from '14' to '13'. Referring to 8430 and 8440, if the control unit 120 provides a content including a plurality of pages, the control unit 140 may change a screen where one of the plurality of pages is displayed to a screen where a page located on the right portion of the one page of the plurality of pages is displayed in response to the slap motion in the leftward direction. For example, the screen where the second page is displayed as in 8430 may be changed to the screen where the third page is displayed as in 8440.

Figure 85:
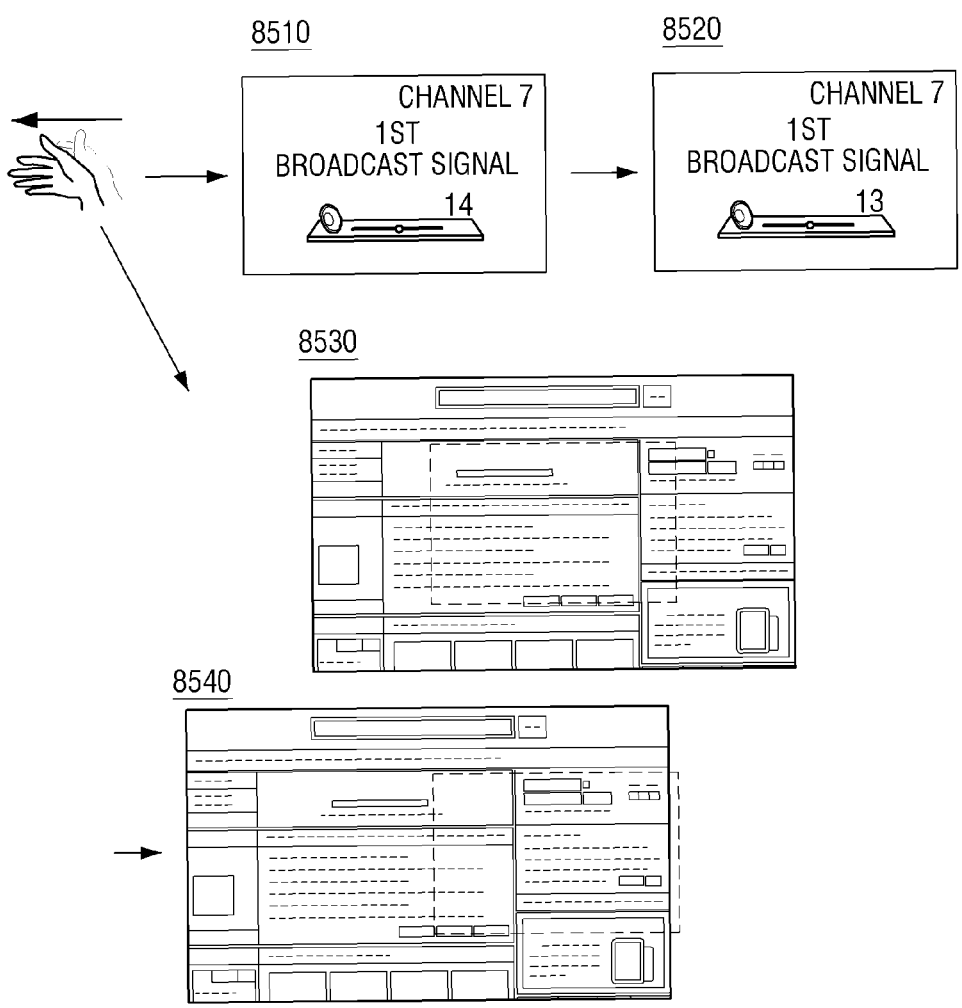

In FIG. 85, the control unit 140 may recognize a slap motion in a leftward direction as a user motion. Referring to 8510 to 8520 of FIG. 85, if the control unit 140 provides a broadcast signal, the control unit 140 may reduce a volume level of the broadcast signal being provided in response to the slap motion in the leftward direction. Referring to 8530 and 8540 of FIG. 85, if the control unit 140 provides a content including one page, the control unit 140 may change a screen where a part of the one page is displayed to a screen where another part located on the right portion of the part is displayed in response to the slap motion in the leftward direction.

Figure 86:
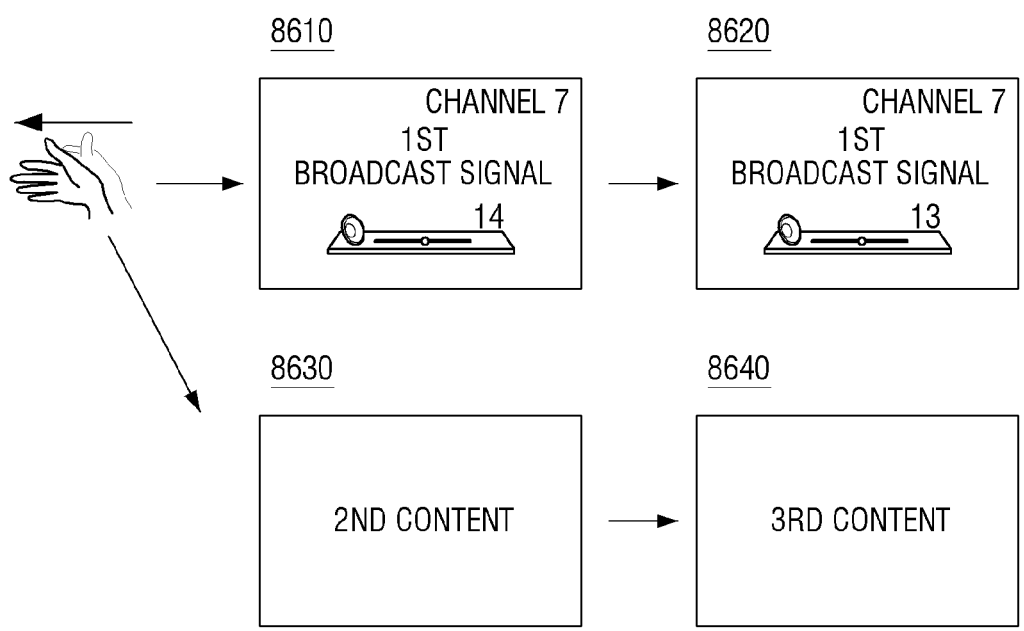

In FIG. 86, the control unit 140 may recognize a slap motion in a leftward direction as a user motion. Referring to 8610 and 8620 of FIG. 86, if the control unit provides a broadcast signal, the control unit 140 may reduce a volume level of the broadcast signal being provided in response to the slap motion in the leftward direction. Referring to 8630 and 8640 of FIG. 86, the control unit 140 may change a screen where a second content is displayed to a screen where a third content, which is located after the second content, is displayed in response to the slap motion in the leftward direction.

Figure 87:
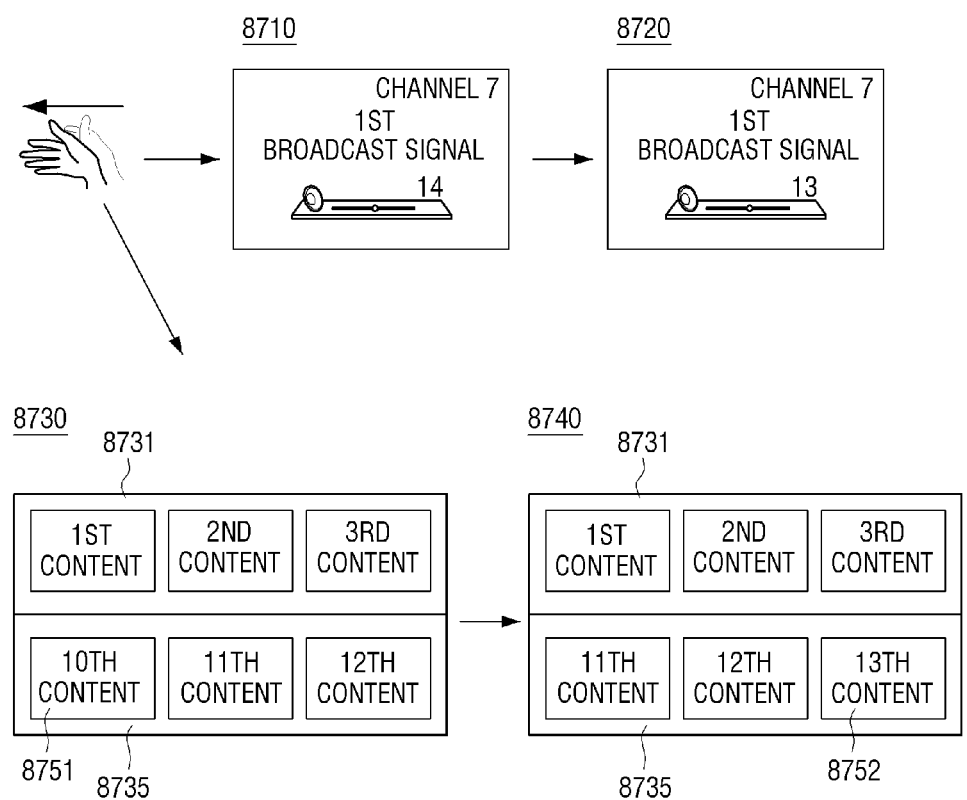

In FIG. 87, the control unit 140 may recognize a slap motion in a leftward direction as a user motion. Referring to 8710 and 8720 of FIG. 87, if the control unit 140 provides a broadcast signal, the control unit 140 may reduce a volume level of the broadcast signal being provided in response to the slap motion in the leftward direction. Referring to 8730 and 8740 of FIG. 87, if the control unit 140 provides a least one content on a first area 8731 and a second area 8735 on a screen, respectively, the control unit 140 may remove a content 8751 from the second area 8735 and instead may display a different content 8752 on the second area 8735 in response to the slap motion in the leftward direction.

Figure 88:
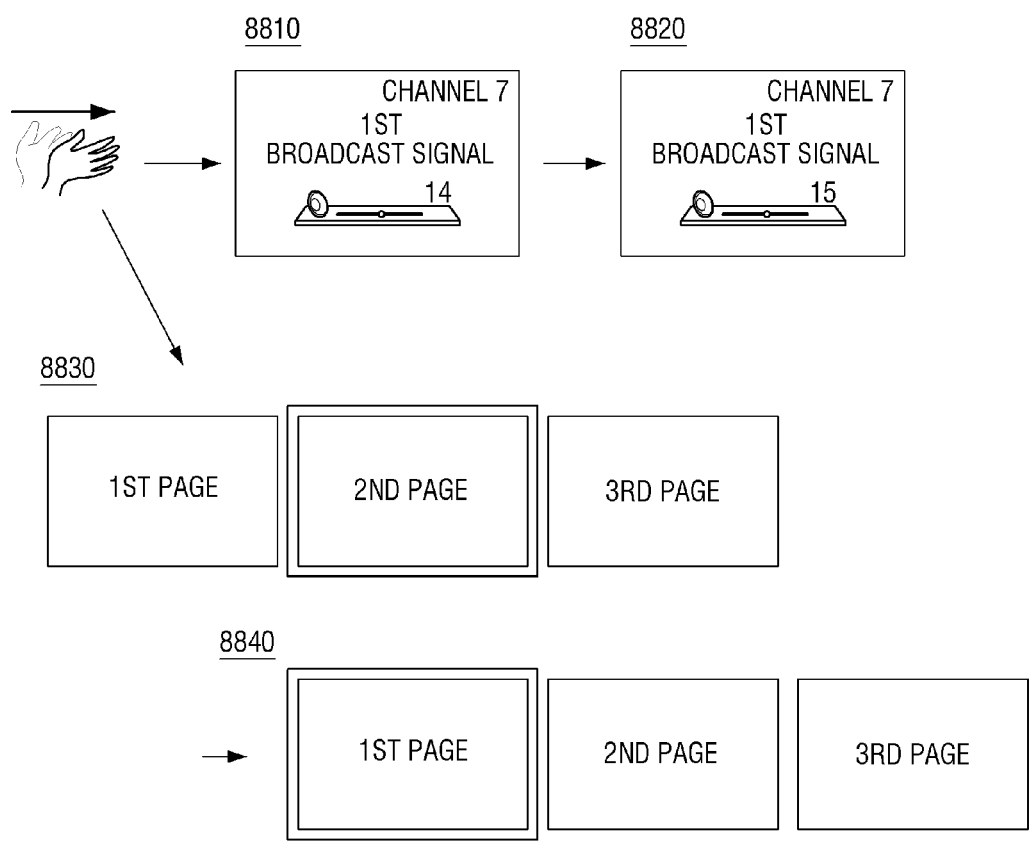

In FIG. 88, the control unit 140 may recognize a slap motion in a rightward direction as a user motion. Referring to 8810 and 8820 of FIG. 88, if the control unit 140 provides a broadcast signal, the control unit 140 may increase a volume level of the broadcast signal being provided in response to the slap motion in the rightward direction. For example, the volume level of the broadcast signal may be increased from '14' to '15'. Referring to 8830 to 8840 of FIG. 88, if the control unit 140 provides a content including a plurality of pages, the control unit 140 may change a screen where one of the plurality of pages is displayed to a screen where a page located on the left portion of the one page of the plurality of pages is displayed in response to the slap motion in the rightward direction. For example, the screen where the second page is displayed as in 8830 may be changed to the screen where the first page is displayed as in 8840.

Figure 89:
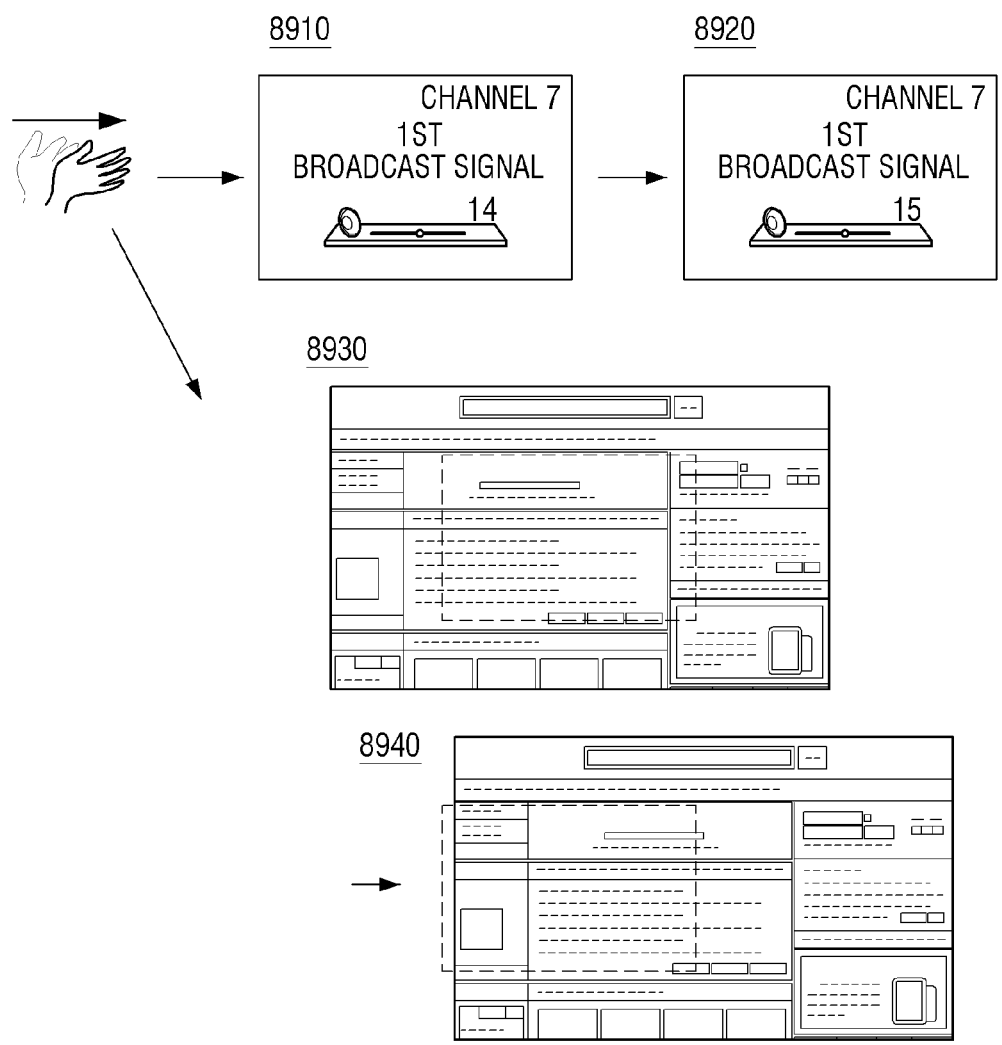

In FIG. 89, the control unit 140 may recognize a slap motion in a rightward direction as a user motion. Referring to 8910 and 8920 of FIG. 89, if the control unit 140 provides a broadcast signal, the control unit 140 may increase a volume level of the broadcast signal being provided in response to the slap motion in the rightward direction. Referring to 8930 and 8940 of FIG. 89, if the control unit 140 provides a content including one page, the control unit 140 may change a screen where a part of the one page is displayed to a screen where another part located on the left portion of the part is displayed in response to the slap motion in the rightward direction.

Figure 90:
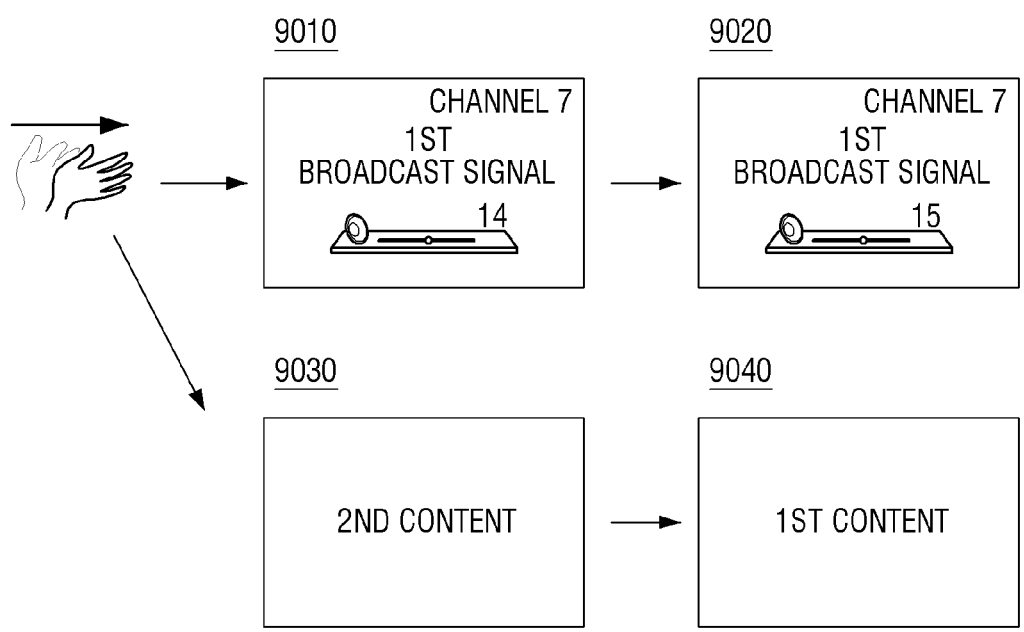

In FIG. 90, the control unit 140 may recognize a slap motion in a rightward direction as a user motion. Referring to 9010 to 9020 of FIG. 90, if the control unit 140 provides a broadcast signal, the control unit 140 may increase a volume level of the broadcast signal being provided in response to the slap motion in the rightward direction. Referring to 9030 and 9040 of FIG. 90, if the control unit 140 provides a second content, the control unit 140 may change a screen where the second content is displayed to a screen where a first content, which is located before the second content, is displayed in response to the slap motion in the rightward direction.

Figure 91:
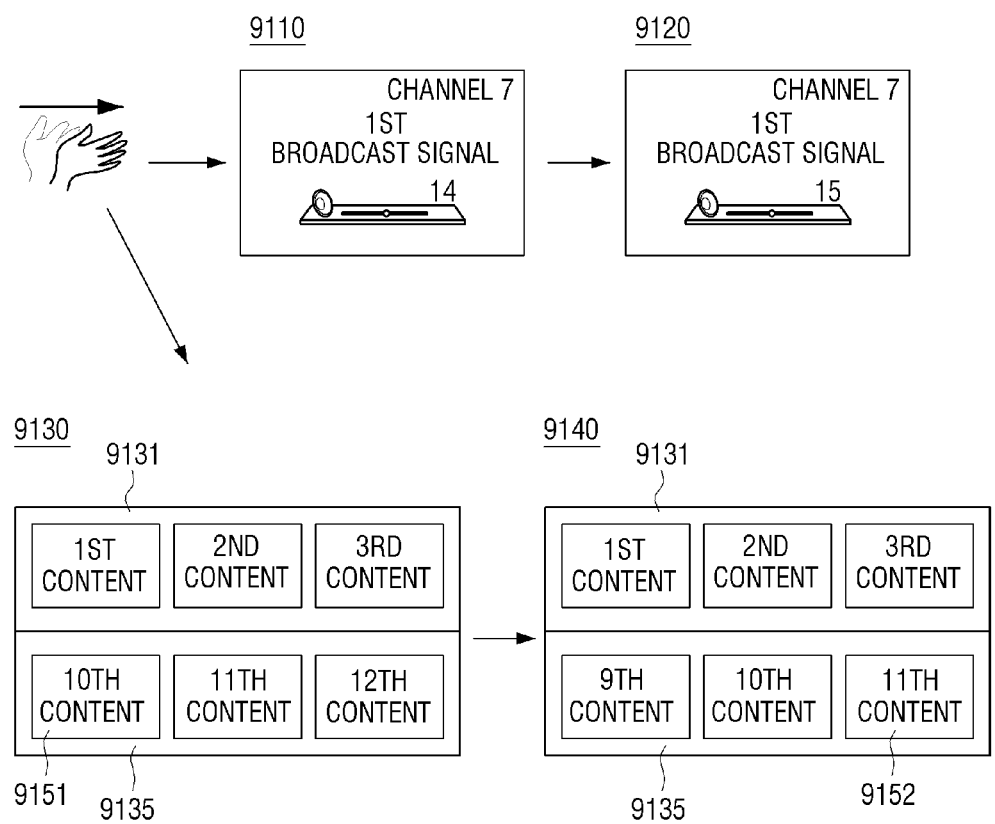

In FIG. 91, the control unit 140 may recognize a slap motion in a rightward direction as a user motion. Referring to 9110 and 9120 of FIG. 91, if the control unit 140 provides a broadcast signal, the control unit 140 may increase a volume level of the broadcast signal being provided in response to the slap motion in the rightward direction. Referring to 9130 and 9140 of FIG. 91, if the control unit 140 provides at least one content on a first area 9131 and a second area 9135 on a screen, respectively, the control unit 140 may remove a content 9151 from the second area 9135 and instead may display a different content 9152 on the second area 9135 in response to the slap motion in the rightward direction.

Figure 92:
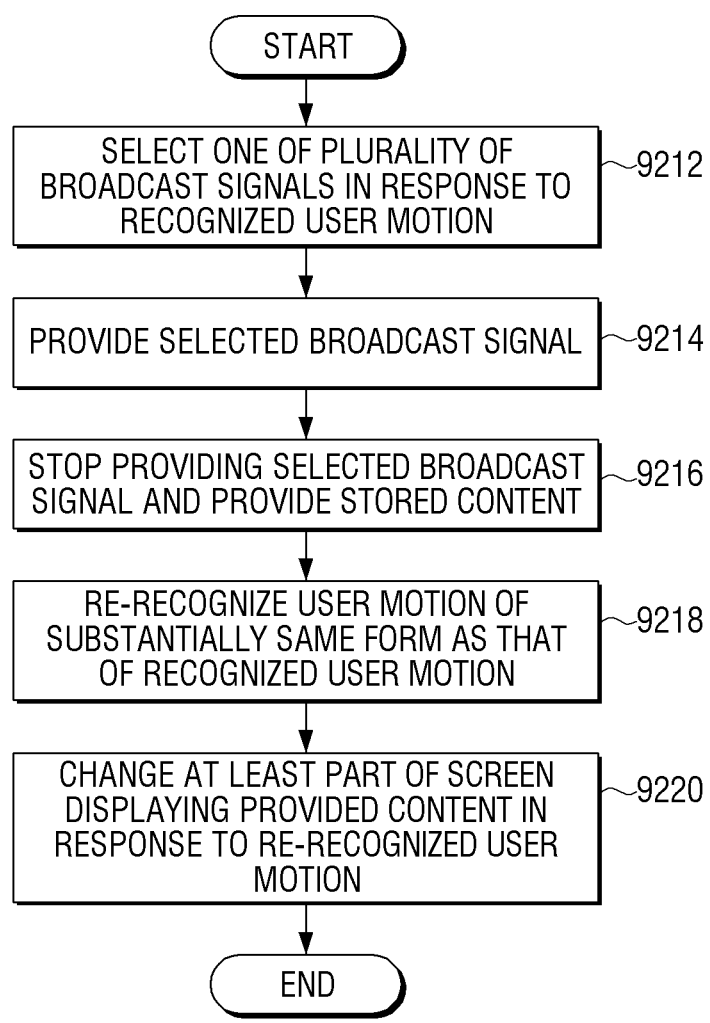
FIGS. 92 and 93 are flowcharts to explain a controlling method of an electronic apparatus in which a screen changes in accordance with a user motion according to various exemplary embodiments.
Figure 93:
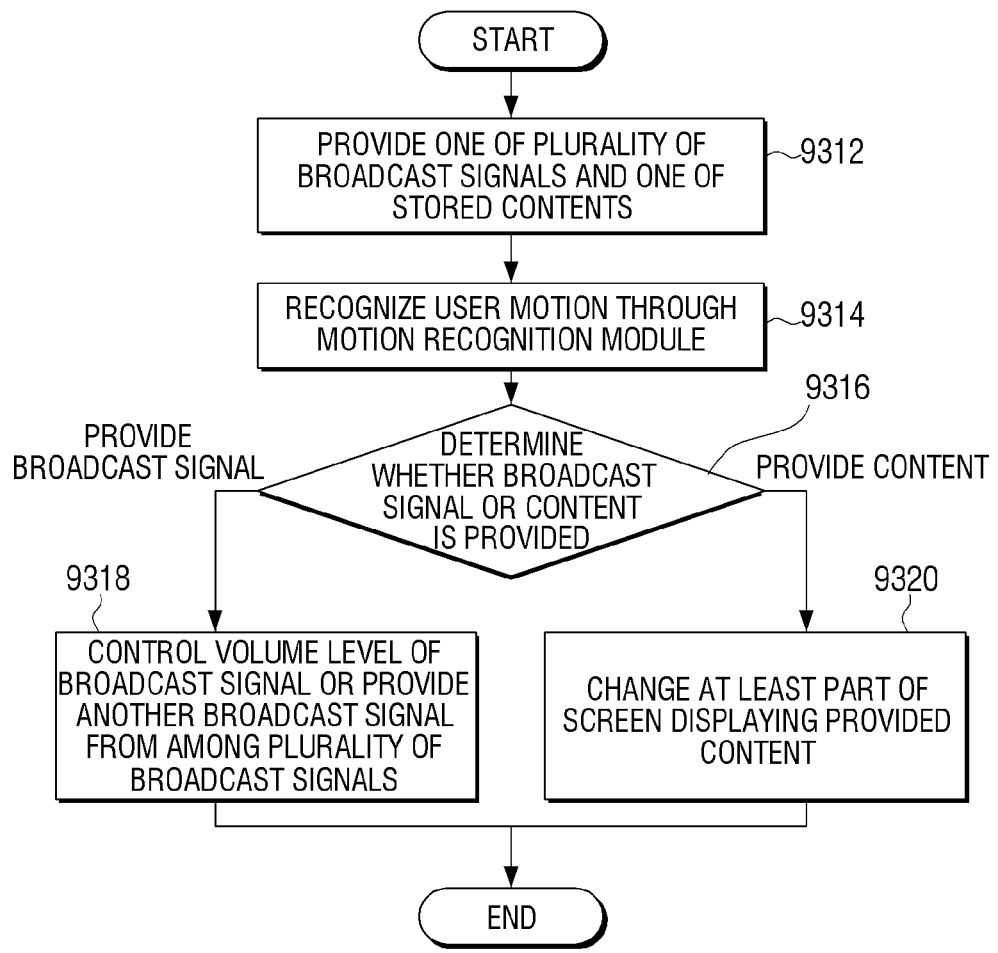

FIGS. 92 and 93 are flowcharts illustrating a controlling method of an electronic apparatus that changes a screen in response to a user motion according to various exemplary embodiments.

Referring to FIG. 92, the electronic apparatus 100 selects one broadcast signal from among a plurality of broadcast signals in response to a recognized user motion (S9212). The recognized user motion may be input through the motion input unit 120 and may be recognized by the motion recognition module 130*l*. The electronic apparatus 100 provides the selected broadcast signal (S9214). The broadcast signal may be provided to the image output unit 190 or the display unit 193. Then, in the event that the electronic apparatus 100 stops providing the selected broadcast signal and provides a stored content (S9216), the electronic apparatus 100 may re-recognize a user motion having the substantially same form as that of the recognized user motion (S9218). The stored content may be a content that is stored in the storage unit 130 or is received from the external terminal input unit 160 or the network interface 180. The re-recognized user motion may be input through the motion input unit 120 and may be recognized by the motion recognition module 130*l*. In response to the re-recognized user motion, the electronic apparatus 100 may change at least part of a screen where the provided content is displayed (S9220).

Referring to FIG. 93, the electronic apparatus 100 provides one of one broadcast signal from among a plurality of broadcast signals and a stored content (S9312). The electronic apparatus 100 recognizes a user motion through the motion recognition module 130*l* (S9314). The electronic apparatus 100 may determine whether the provided signal is a broadcast signal or a content in response to the user motion (S9316). If the broadcast signal is provided, the electronic apparatus 100 may control a volume level of the broadcast signal or provide another broadcast signal from among the plurality of broadcast signals (S9318). If the content is provided, the electronic apparatus 100 changes at least part of a screen where the provided content is displayed (S9320).

As described above, the user can control the electronic apparatus 100 more efficiently and intuitively using the user motion.

The control unit 140 controls the electronic apparatus 100 in accordance with a remote control signal received from the remote control signal receiving unit 170, a user voice input through the voice input unit 110, and a user motion input through the motion input unit 120. The remote controller recited herein may be a general remote controller, but this should not be considered as limiting. The remote controller may be a remote controller that includes a touch pad.

Specifically, if a voice start command input through the voice input unit 110 is recognized in a remote control mode, in which the electronic apparatus 100 is controlled in accordance with a remote control signal received at the remote control signal receiving unit 170, the control unit 140 changes a mode to a voice task mode to perform a voice task that is controlled by a user voice input through the voice input unit 110.

If the mode is changed to the voice task mode, the control unit 140 may control the display unit 193 to display an icon indicating that the mode of the electronic apparatus 100 is the voice task mode, and voice assistance information including a voice item guiding a voice task.

If a first button is selected from among buttons on the remote controller to change to the remote control mode in the voice task mode, the remote control signal receiving unit 170 receives a first remote control signal corresponding to the first button. The control unit 140 changes the mode of the electronic apparatus 100 to the remote control mode, in which the electronic apparatus 100 is controlled by the remote controller, in response to the first remote control signal. The first button may be a remote control mode change button to change the mode to the remote control mode. However, this is merely an example and the first button may be a certain button from among the buttons on the remote controller. If the first button is a certain button, the control unit 140 changes the mode to the remote control mode when receiving the first remote control signal corresponding to the first button, and then performs a task corresponding to the first button. For example, if the first button is a mute button, the control unit 140 changes the mode from the voice task mode to the remote control mode and then performs mute.

If a motion start command is input through the motion input unit 120 in the voice task mode, the control unit 140 recognizes the motion start command using the motion recognition module 130*l*. If the motion start command is recognized, the control unit 140 changes the mode of the electronic apparatus 100 to a motion task mode in which the electronic apparatus 100 is controlled by a user motion input through the motion input unit 120.

If the motion start command input through the motion input unit 120 is recognized in the remote control mode, in which the electronic apparatus 100 is controlled in accordance with a remote control signal received at the remote control signal receiving unit 170, the control unit 140 changes the mode to the motion task mode to perform a motion task that is controlled by a user motion input through the motion input unit 120.

If the mode is changed to the motion task mode, the control unit 140 may control the display unit 193 to display an icon indicating that the mode of the electronic apparatus 100 is the motion task mode, and motion assistance information including a motion item guiding a motion task.

If a first button is selected from among buttons on the remote controller to change to the remote control mode in the motion task mode, the remote control signal receiving unit 170 receives a first remote control signal corresponding to the first button. The control unit 140 changes the mode of the electronic apparatus 100 to the remote control mode in which the electronic apparatus 100 is controlled by the remote controller in response to the first remote control signal. The first button may be a remote control mode change button to change to the remote control mode. However, this is merely an example and the first button may be a certain button from among the buttons on the remote controller. If the first button is a certain button, the control unit 140 changes the mode to the remote control mode when receiving the first remote control signal corresponding to the first button, and then performs a task corresponding to the first button. For example, if the first button is a mute button, the control unit 140 changes the mode of the electronic apparatus 100 from the voice task mode to the remote control mode, and then performs mute.

If a voice start command is input through the voice input unit 110 in the motion task mode, the control unit 140 recognizes the voice start command using the voice recognition module 130k. If the voice start command is recognized, the control unit 140 may change the mode of the electronic apparatus 100 to the voice task mode in which the electronic apparatus 100 is controlled in accordance with a user voice input through the voice input unit 110.

Hereinafter, a method for changing to a remote control mode, a motion task mode, and a voice task mode according to an exemplary embodiment will be explained with reference to FIGS. 94 to 97.

Figure 94:
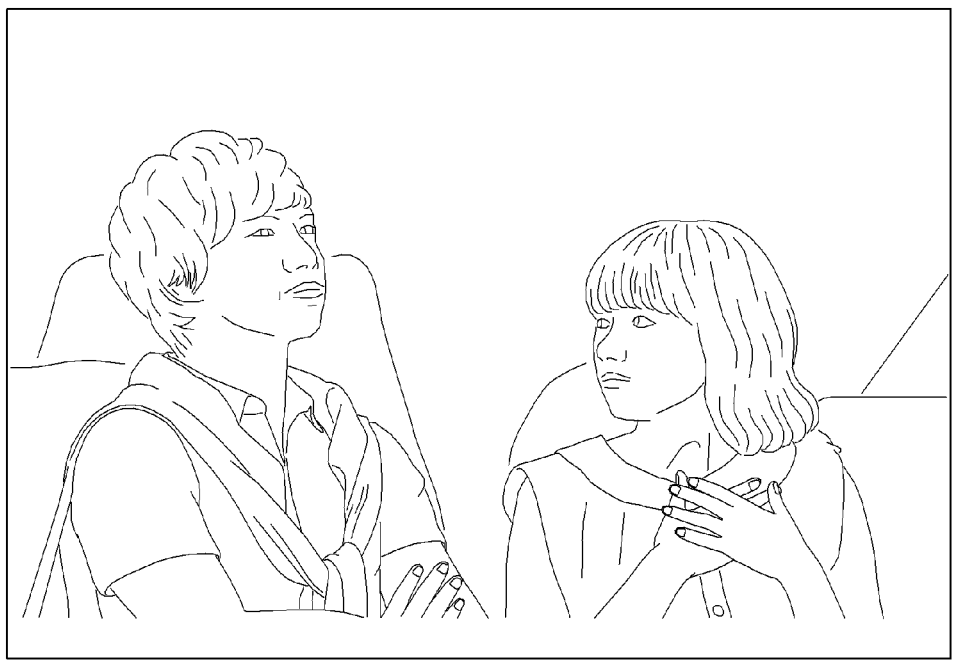
FIGS. 94 to 97 are views and a flowchart to explain a method for performing a remote control mode, a motion task mode, and a voice task mode according to various exemplary embodiments.

Specifically, after the electronic apparatus 100 is turned on, the control unit 140 is generally operated in a remote control mode in which the electronic apparatus 100 is controlled by a remote control signal. In the remote control mode, a separate UI is not displayed as shown in FIG. 94. However, this is merely an example and the control unit 140 may display a UI indicating the remote control mode in the remote control mode.

Figure 95:
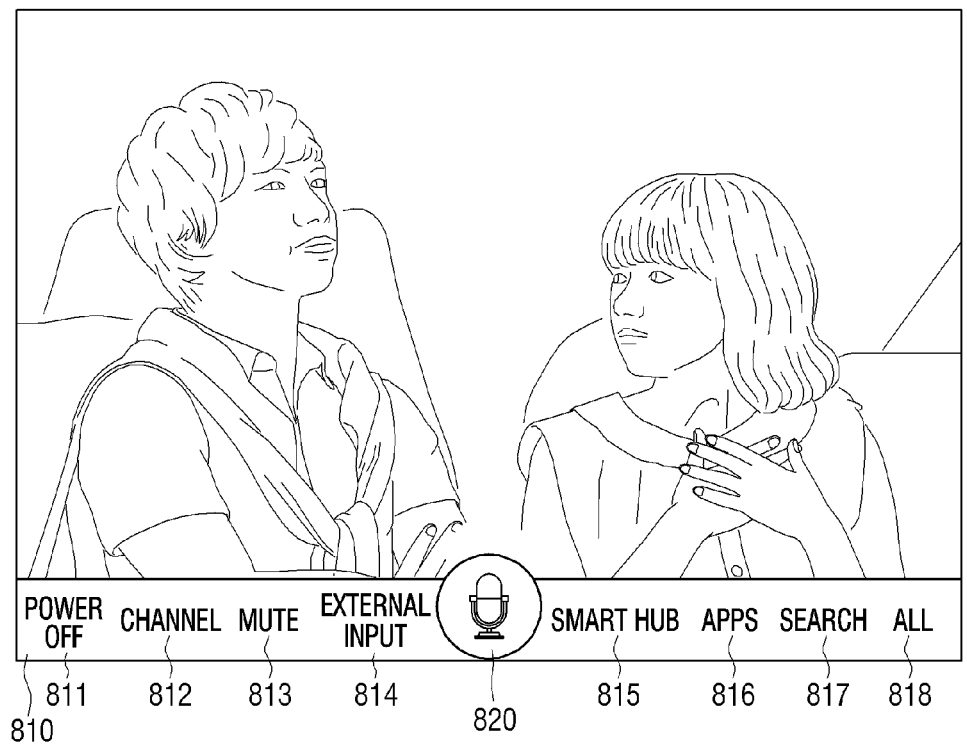

If a voice start command is input through the voice input unit 110 in the remote control mode, the control unit 140 recognizes the voice start command and changes the mode of the electronic apparatus 100 to a voice task mode, in which the electronic apparatus 100 is controlled in accordance with a user voice input through the voice input unit 110. When changing to the voice task mode, the control unit 140 may display voice assistance information as shown in FIG. 95.

If a first button on a remote controller is selected in the voice task mode, the control unit 110 receives a first remote control signal corresponding to the first button through the remote control signal receiving unit 170, and changes the mode of the electronic apparatus 100 to the remote control mode again as shown in FIG. 94. The first button on the remote controller may be a remote control mode change button. However, this is merely an example and the first button may be a certain button on the remote controller.

Figure 96:
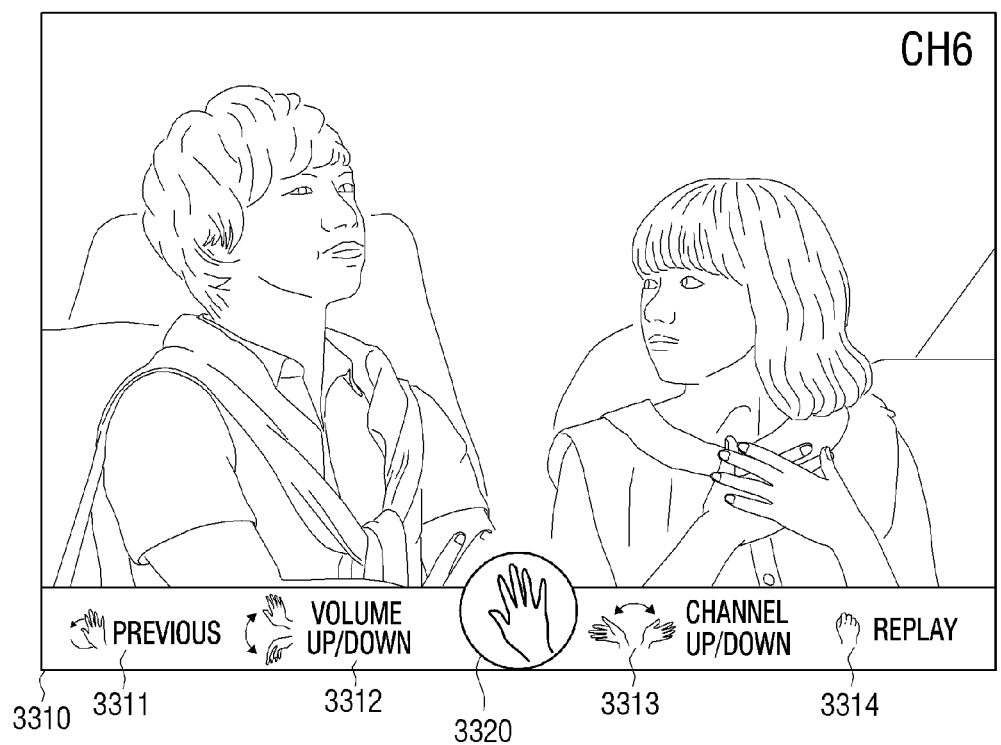

If a motion start command is input through the motion input unit 120 in the voice task mode, the control unit 140 recognizes the motion start command and changes the mode of the electronic apparatus 100 to a motion task mode, in which the electronic apparatus 100 is controlled in accordance with a user motion input through the motion input unit 120. When changing to the motion task mode, the control unit 140 may display motion assistance information 3310 as shown in FIG. 96.

If a motion start command is input through the motion input unit 120 in the remote control mode, the control unit 140 recognizes the motion start command and changes the mode of the electronic apparatus 100 to the motion task mode in which the electronic apparatus 100 is controlled in accordance with a user motion input through the motion input unit 120. When changing to the motion task mode, the control unit 140 may display the motion assistance information 3310 as shown in FIG. 96.

If a first button on the remote controller is selected in the motion task mode, the control unit 140 receives a first remote control signal corresponding to the first button through the remote control signal receiving unit 170 and changes the mode of the electronic apparatus 100 to the remote control mode again as shown in FIG. 94. The first button on the remote controller may be a remote control mode change button. However, this is merely an example and the first button may be a certain button on the remote controller.

If a voice start command is input through the voice input unit 110 in the motion task mode, the control unit 140 recognizes the voice start command and changes the mode of the electronic apparatus 100 to the voice task mode in which the electronic apparatus is controlled in accordance with a user voice input through the voice input unit 110. When changing to the voice task mode, the control unit 140 may display voice assistance information as shown in FIG. 95.

As described above, the electronic apparatus 100 may be changed to the remote control mode, the voice task mode, and the motion task mode using the remote control signal, the voice start command, and the motion start command, respectively.

Figure 97:
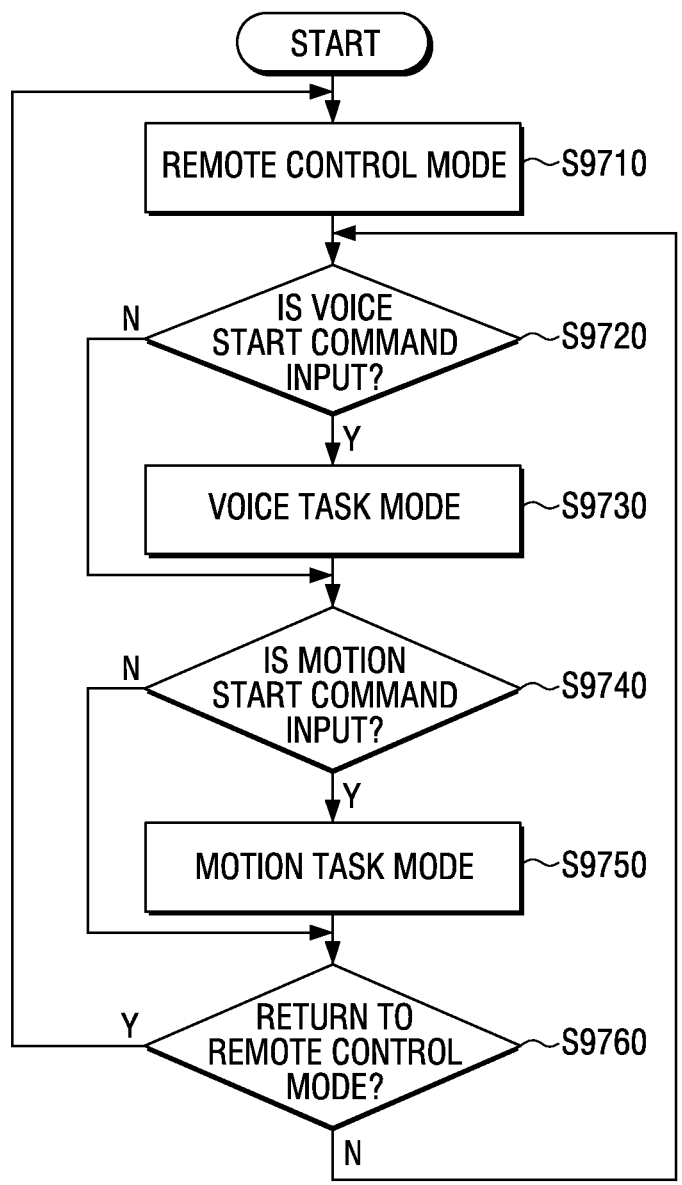

FIG. 97 is a flowchart to explain a method for changing to a remote control mode, a motion task mode, and a voice task mode according to an exemplary embodiment.

The electronic apparatus 100 is turned on and then enters a remote control mode in which the electronic apparatus 100 is controlled by a remote controller (S9710).

The electronic apparatus 100 remains in the remote control mode (S9710) unless a voice start command or a motion start command is input.

The electronic apparatus 100 determines whether or not a voice start command is input (S9720). If a voice start command is input (S9720-Y), the electronic apparatus 100 changes the mode of the electronic apparatus 100 to a voice task mode, in which the electronic apparatus 100 is controlled in accordance with a user voice input through the voice input unit 110 (S9730). When entering the voice task mode, the electronic apparatus 100 may display voice assistance information as shown in FIG. 95.

The electronic apparatus 100 determines whether or not a motion start command is input (S9740). If a motion start command is input in the voice task mode (S9740-Y), the electronic apparatus 100 changes the mode of the electronic apparatus 100 to a motion task mode, in which the electronic apparatus 100 is controlled in accordance with a user motion input through the motion input unit 120 (S9750).

If the electronic apparatus 100 is in either the voice task mode or the motion task mode, the control unit 140 determines whether or not to return to the remote control mode (S9760). As described above, the control unit 140 may return to the remote control mode if a start command to return to the remote control mode or a mode canceling command is recognized. Also, if the electronic apparatus 100 is in a voice task mode, the control unit 140 may automatically return to the remote control mode if no voice is recognized for a predetermined time (for example, 5 minutes). Similarly, if the electronic apparatus 100 is in a motion task mode, the control unit 140 may automatically return to the remote control mode if no motion is recognized for a predetermined time (for example, 5 minutes).

As shown in FIG. 97, the electronic apparatus 100 operates in the remote control mode (S9710), the voice task mode (S9730) and the motion task mode (S9750). In all three modes, the control unit 140 determines whether to switch to the voice task mode (S9720-Y), whether to switch to the motion task mode (S9740-Y), whether to switch to the remote control mode (S9760-Y) or whether to remain in the current mode (S9720-N, S9740-N, S9760-N). Although the method in FIG. 97 has been described, this is merely an example and the technical idea of the present disclosure may be applied to any method for changing from/to the remote control mode, the voice task mode, and the motion task mode.

As described above, the mode of the electronic apparatus 100 is changed to the remote control mode, the voice task mode, and the motion task mode so that the user can control the electronic apparatus 100 according to a mode desired by the user.

The control unit 140 may control the electronic apparatus 100 through voice recognition using an external mobile device.

Specifically, if a user voice is input through a microphone included in an external mobile device, the control unit 140 receives input of the user voice through the voice input unit 110, recognizes the input user voice, and performs a voice task of the electronic apparatus 100 in accordance with the recognized user voice. The mobile device may be, but not limited to, a remote controller, a mobile phone, a personal digital assistant (PDA), and a notebook computer. The voice input unit 110 may be a communication unit for receiving a user voice signal from the external mobile device.

An application for voice recognition is executed in the external mobile device and a user voice is input. If the mobile device recognizes the user voice, generates a control signal corresponding to the user voice, and then transmits the control signal to the electronic apparatus 100, the control unit 140 may perform a voice task of the electronic apparatus 100 in accordance with the control signal input from the mobile device.

If an application for voice recognition is executed in the mobile device and a user voice input to the microphone included in the mobile device is input, the control unit 140 recognizes the input user voice and performs a voice task of the electronic apparatus 100 in accordance with the user voice.

If a first button included in the mobile device is selected after the application for voice recognition has been executed in the mobile device, the control unit 140 receives a first signal corresponding to the first button through a communication unit (not shown) and changes a mode of the electronic apparatus 100 to a voice task mode in response to the first signal. The voice task mode that is changed by selecting the first button included in the mobile device is a mode in which a voice task is performed in accordance with a user voice input from the microphone included in the mobile device. The voice task mode which is changed by selecting the first button included in the mobile device may be released if one of the first button and a second button on the mobile device is selected. The first button and the second button may be a physical button included in the mobile device. However, this is merely an example and the first button and the second button may be a UI that is displayed on the mobile device after the application for voice recognition has been executed.

The control unit 140 may receive input of a user voice from the mobile device, while the second button on the mobile device is selected in the voice task mode. The control unit 140 may display a UI indicating that a user voice can be input on the mobile device, while the second button on the mobile device is selected. Accordingly, the user may know that it is possible to input a voice through the UI displayed on the mobile device.

If a user voice is input to the mobile device, the control unit 140 does not receive a user voice through a microphone included in the electronic apparatus 100.

The microphone included in the mobile device may be used when the mobile device makes a telephone call. That is, if the mobile device performs a general telephone call function, the microphone receives input of a voice for a telephone call from the user. If the mobile device executes an application for voice recognition, the mobile device may receive input of a voice to control the electronic apparatus 100 from the user.

Figure 98:
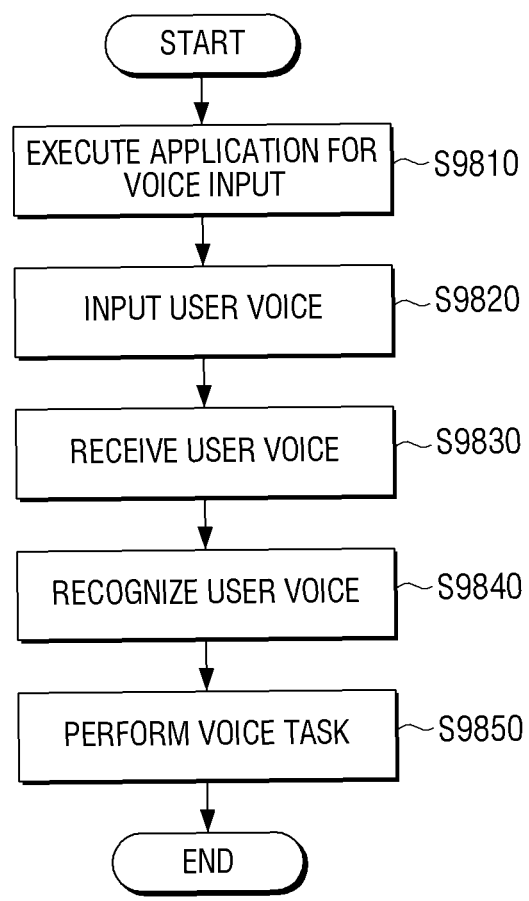
FIG. 98 is a flowchart to explain voice recognition using a mobile device according to an exemplary embodiment.

FIG. 98 is a flowchart to explain a method for recognizing a user voice using an external mobile device according to an exemplary embodiment.

The mobile device executes an application for voice input (S9810). The mobile device may be a mobile phone.

After the application for the voice input has been executed in the mobile device, the mobile device receives input of a user voice through a microphone included in the mobile device (S9820). The microphone included in the mobile device may be a microphone for making a telephone call.

The electronic apparatus 100 receives the user voice input to the external mobile device from the mobile device (9830).

If the user voice is received from the mobile device, the electronic apparatus 100 recognizes the user voice using the voice recognition module 130k (S9840).

The electronic apparatus 100 performs a voice task in accordance with the recognized user voice using the voice database (S9850).

In the above exemplary embodiment, the mobile device receives the input of the user voice and transmits the user voice to the electronic apparatus 100. However, this is merely an example and the mobile device may directly recognize the user voice, may generate a control signal corresponding to the user voice, and then may transmit the control signal to the electronic apparatus 100.

As described above, the voice task of the electronic apparatus 100 is performed using the mobile device such as a mobile phone so that the user can control the electronic apparatus more easily using voice recognition.

According to an exemplary embodiment, the motion task mode may be one of a motion mode and a pointing mode according to whether a pointer is needed to perform a task. Specifically, the motion mode is a mode in which a task to change settings of the electronic apparatus 100 is controlled in accordance with a pre-set motion (for example, a slap motion in an upward, downward, leftward or rightward direction, a grab motion, or a rotation motion in a counter clockwise direction). For example, if a motion start command is input while the electronic apparatus 100 performs a broadcast receiving function, the control unit 140 may change a mode of the electronic apparatus 100 to the motion mode. Accordingly, the electronic apparatus 100 may perform a task such as volume control or channel change in response to a user motion matched with a pre-set motion.

The pointing mode is a mode in which a pointer is used to perform a task. For example, if a motion start command is input when the electronic apparatus 100 displays one of lists including a plurality of selectable items (for example, a content list, a channel list, an electronic program guide or EPG, and a web page), the control unit 140 may change a mode of the electronic apparatus 100 to the pointing mode. In the pointing mode, the control unit 140 displays a pointer at a center of a display screen. The pointer may be displayed at an upper position of the center of the display screen due to the presence of motion assistance information.

Hereinafter, the pointing mode will be explained in more detail.

If a motion start command is input through the motion input unit 120 while the electronic apparatus 100 displays one of a content list including a plurality of executable icons for executing applications (for example, a smart hub) and a web page, the control unit 140 changes a mode of the electronic apparatus 100 to a pointing mode and displays a pointer at a center of the display screen.

In the pointing mode, the electronic apparatus 100 may display motion assistance information for performing a motion task on a lower portion of the display screen. The displayed motion assistance information may be different from motion assistance information of the motion mode.

If a motion start command is input through the motion input unit 120 while the electronic apparatus 100 displays a content list, the control unit 140 changes a mode of the electronic apparatus 100 to a pointing mode. In the pointing mode, if the pointer is located at a first executable icon of the content list according to a user motion input to the motion input unit 120, the control unit 140 displays the first executable icon distinctively from other executable icons. If a command to end a screen of the content list is input in the pointing mode, the control unit 140 may remove not only the content list but also the pointer from the display screen.

If a motion start command is input through the motion input unit 120 while the electronic apparatus 100 displays a web page, the control unit 140 changes a mode of the electronic apparatus 100 to a pointing mode. The web page may include a plurality of hyperlinks. In the pointing mode, if the pointer is located at a first hyperlink of the web page according to a user motion input through the motion input unit 120, the control unit 140 displays the first hyperlink distinctively from other hyperlinks. If the pointer is located at the first hyperlink and a first user motion (for example, a grab motion) is input through the motion input unit 120, the control unit 140 executes the first hyperlink.

Hereinafter, the pointing mode will be explained in more detail with reference to FIGS. 99 to 103.

Figure 99:
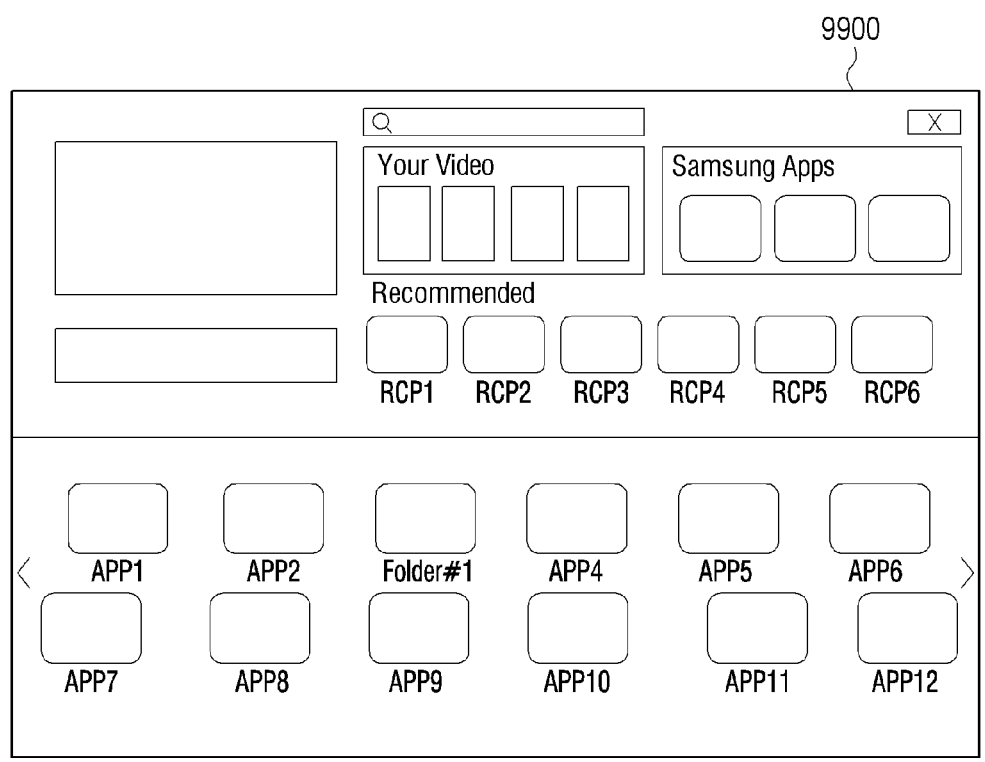
FIGS. 99 to 104 are views and a flowchart to explain a pointing mode according to an exemplary embodiment.
Figure 100:
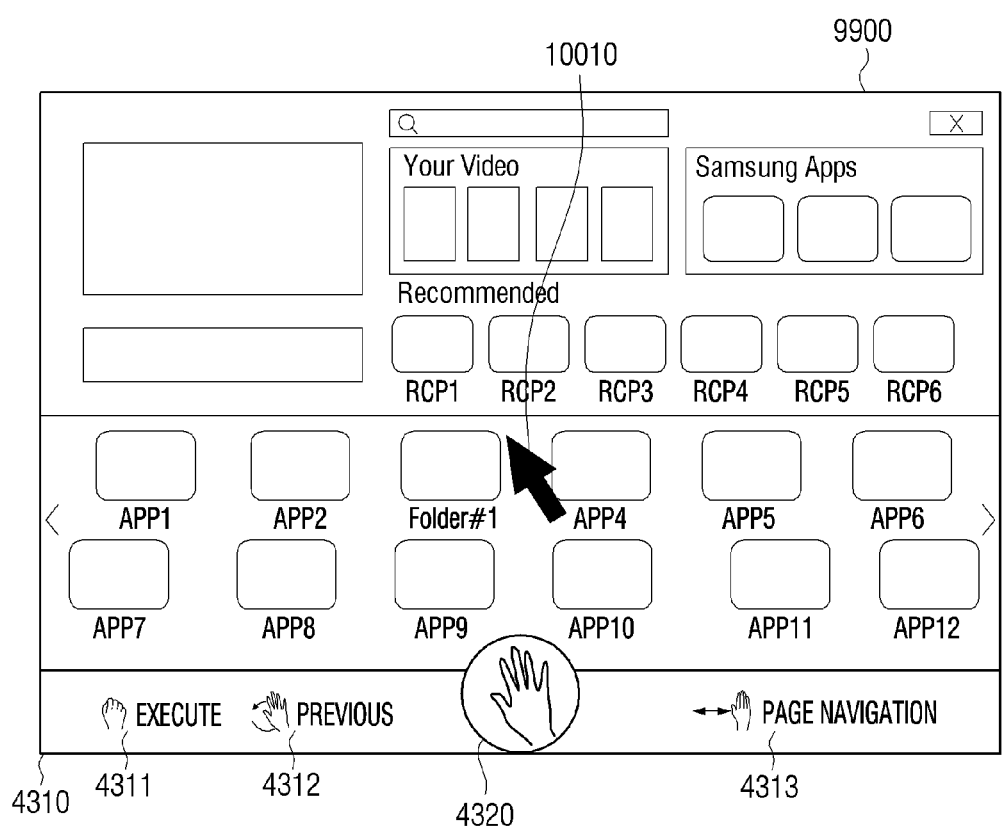

If a content list including executable icons for executing applications is displayed as shown in FIG. 99 and a motion start command is input through the motion input unit 120, the control unit 140 may display motion assistance information and a pointer 10010 as shown in FIG. 100. The pointer 10010 may be displayed at a center of a display screen.

Figure 101:
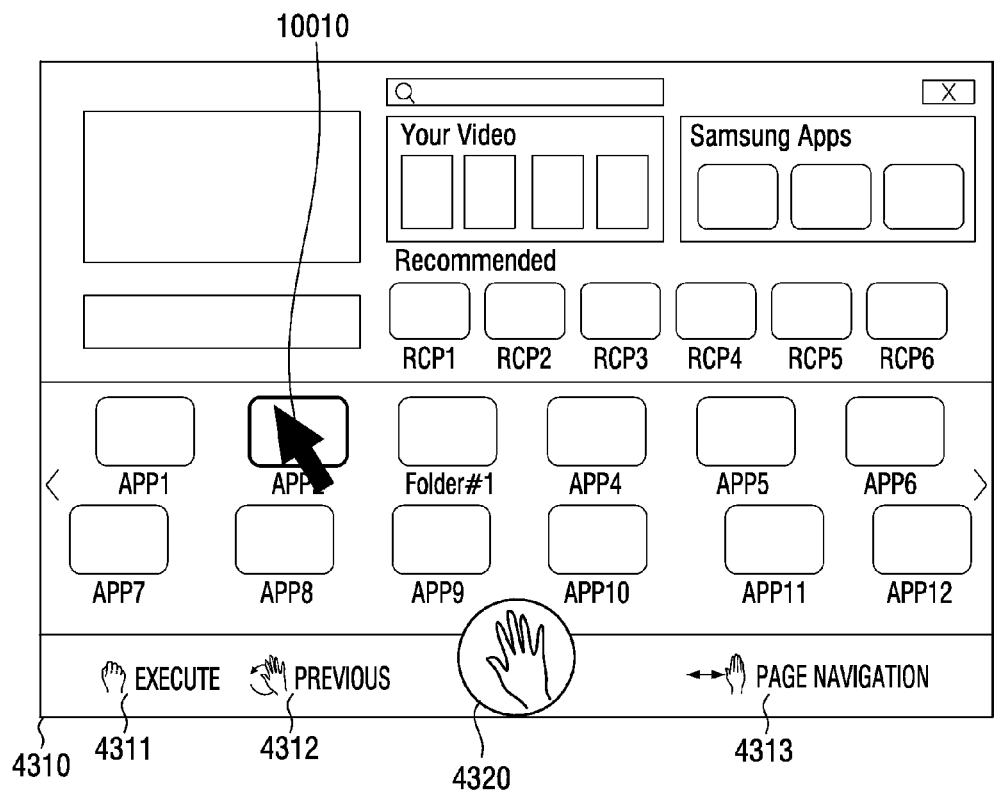

If a moving motion in a left-downward direction is input through the motion input unit 120 to place the pointer 10010 at executable icon "APP2", the control unit 140 places the pointer 10010 at executable icon "APP2". If the pointer 10010 is located at executable icon "APP2", the control unit 140 highlights executable icon "APP2" and a name of the executable icon thicker than other icons as shown in FIG. 101.

Figure 102:

If the pointer 10010 is located at executable icon "APP2" and a first user motion (for example, a grab motion) is input through the motion input unit 120, the control unit 120 executes executable icon "APP2" as shown in FIG. 102.

Figure 103:
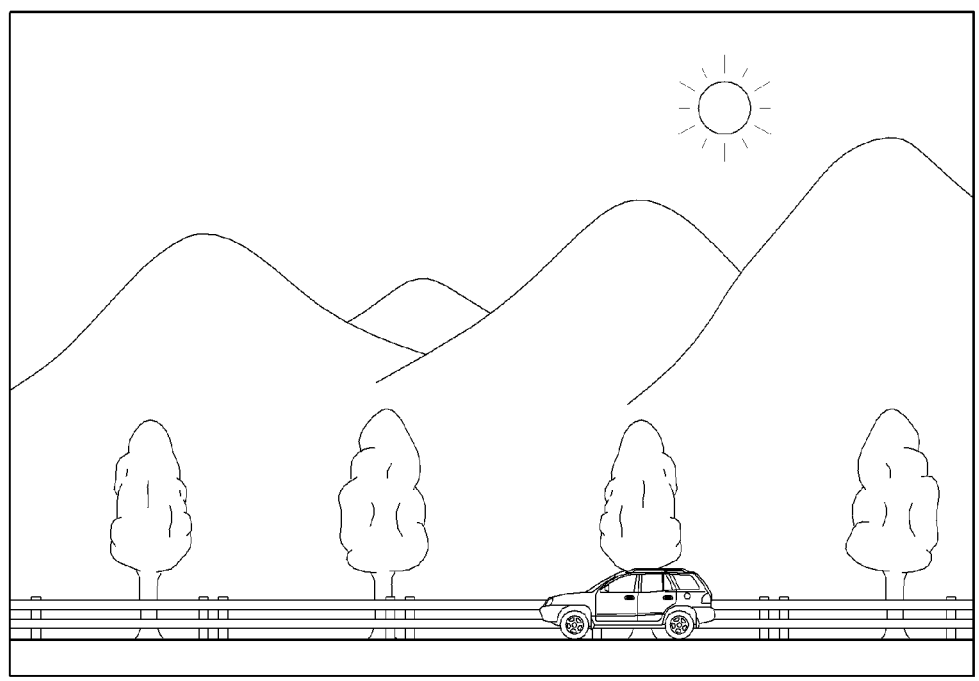

If the content list is displayed and a content list release command (for example, a rotation motion in a counter clockwise direction or a button of a remote controller) is input from the user as shown in FIG. 100, the control unit 140 removes the content list and the pointer from the display screen and displays a broadcast receiving screen as shown in FIG. 103.

Although the content list is displayed in the above exemplary embodiment, the technical idea of the present disclosure may be applied if a web page including a plurality of hyperlinks is displayed.

Figure 104:
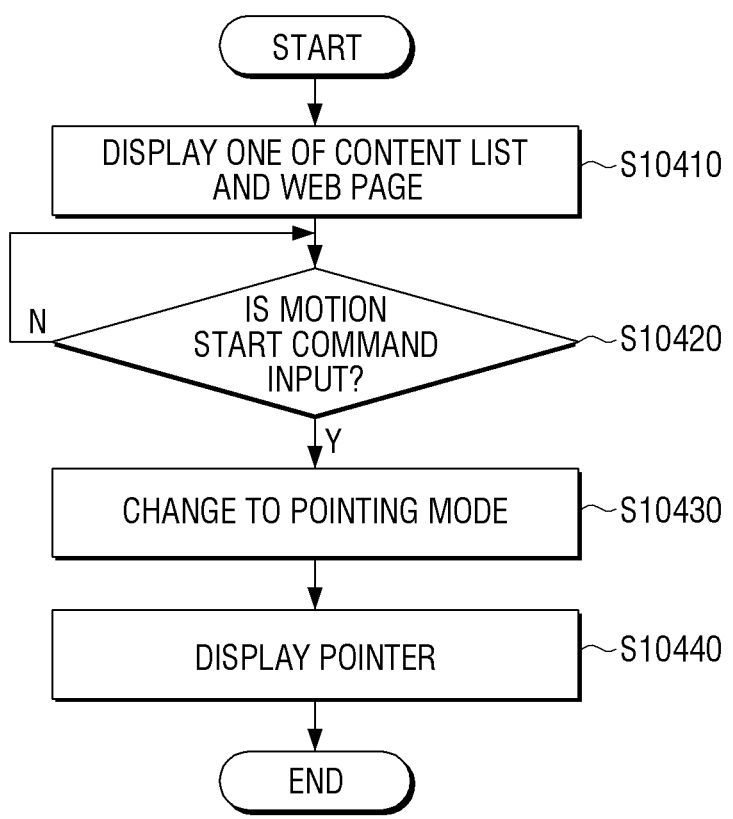

FIG. 104 is a flowchart to explain a method for providing a pointing mode according to an exemplary embodiment.

The electronic apparatus 100 displays one of a content list and a web page (S10410). The content list may include a plurality of executable icons for executing applications and the web page may include a plurality of hyperlinks.

The electronic apparatus 100 determines whether a motion start command is input or not (S10420).

If a motion start command is input (S10420-Y), the electronic apparatus 100 changes a mode of the electronic apparatus 100 to a pointing mode (S10430). The pointing mode is a mode to perform a task requiring a pointer (for example, executing an application and surfing a web page).

If the mode is changed to the pointing mode, the electronic apparatus 100 displays a pointer on a display screen (S10440). The pointer may be displayed at a center of the display screen.

As described above, the electronic apparatus 100 is changed to the pointing mode to perform a task requiring a pointer so that the user can control the electronic apparatus 100 more easily.

If a first motion is input through the motion input unit 120 in the pointing mode, the control unit 140 moves a pointer in a direction corresponding to the first motion, and, if a second motion is input through the motion input unit 120, the control unit 140 performs a motion task corresponding the second motion.

If the second motion is input when the pointer is located at a first executable icon of the content list or at a first hyperlink of the web page, the control unit 140 may un-highlight the first executable icon and the first hyperlink at which the pointer is located.

The second motion may be a motion that is pre-set to perform a motion mode of the electronic apparatus 100 and may be one of a slap motion in an upward, downward, leftward or rightward direction, a grab motion, and a rotation motion in a counter clockwise direction.

For example, if the second motion is a slap motion in an upward, downward, leftward or rightward direction, the control unit 140 may move the display screen in accordance with the slap motion in the upward, downward, leftward, or rightward direction. After moving the screen, the control unit 140 may display the pointer at a prior location again.

Also, if the second motion is a grab motion, the control unit 140 may execute the first executable icon at which the pointer is located. After executing the first executable icon, the control unit 140 may display the pointer at the prior location again.

Also, if the second motion is a rotation motion in a counter clockwise direction, the control unit 140 may display a broadcast program of a currently tuned channel on the display screen. That is, the control unit 140 may remove the content list or the web page from the display screen and provide a broadcast receiving function. At this time, since the broadcast receiving function does not require a pointer, the pointer is not displayed.

Although the pointer is not displayed in the above example, this is merely an example. The pointer may be maintained at the location where the pointer has been displayed.

Hereinafter, a case in which a pre-set motion is input in a pointing mode will be explained in detail with reference to FIGS. 105 to 107.

Figure 105:
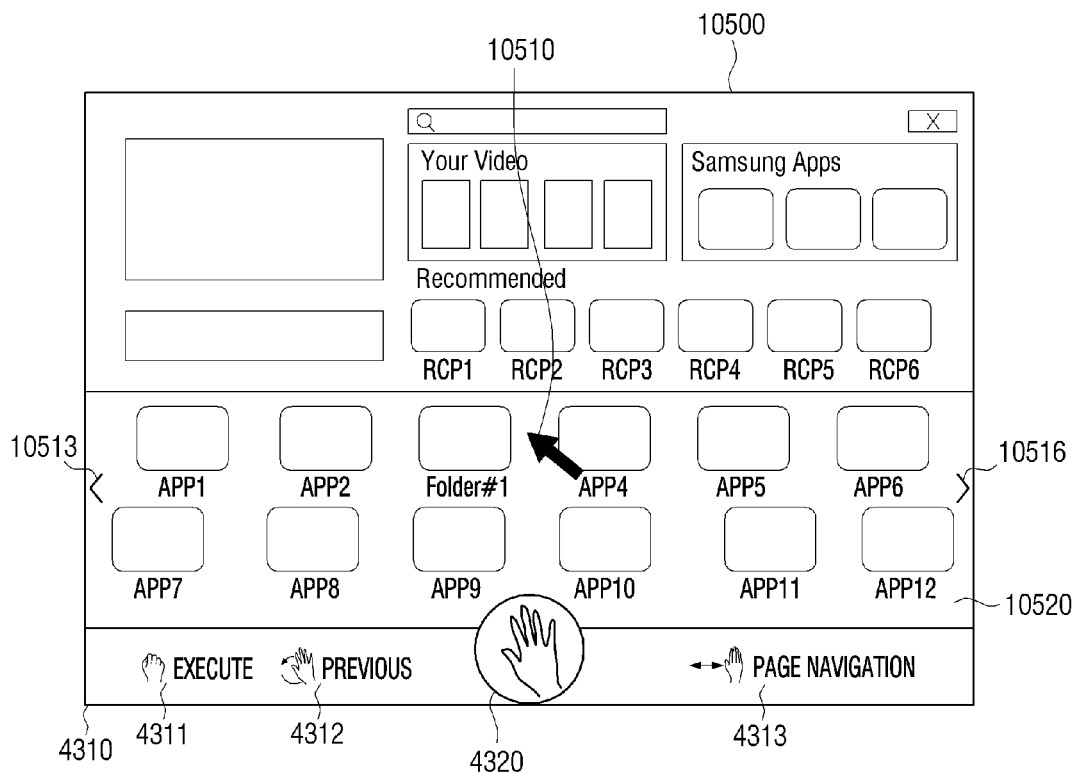
FIGS. 105 to 108 are views and a flowchart to explain a displaying method if a motion is input in a pointing mode according to an exemplary embodiment.

If a mode of the electronic apparatus 100 is changed to a pointing mode as shown in FIG. 100, the control unit 140 displays a pointer 10510 at a center of the display screen as shown in FIG. 105.

Figure 106:
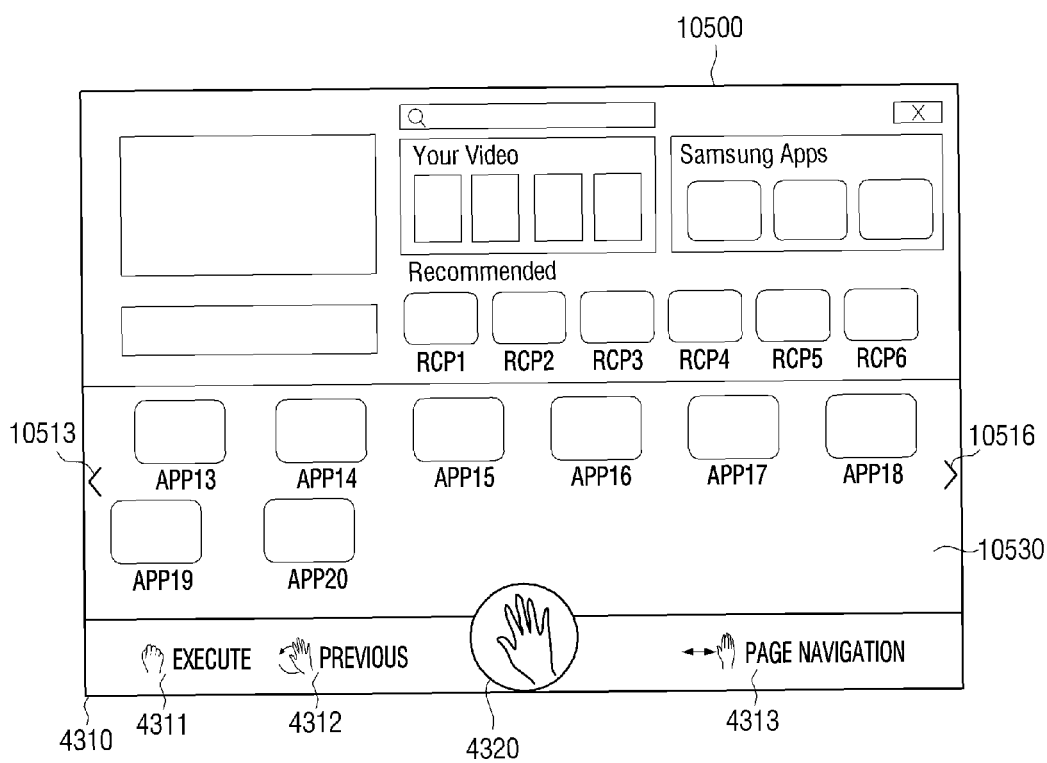

If a slap motion in a rightward direction is input through the motion input unit 120 in the state where the pointer is displayed on the display screen, the control unit 140 removes the pointer 10510 from the display screen and changes a screen of an application display area 1520 to a screen of another application display area 10530 as shown in FIG. 106.

Figure 107:
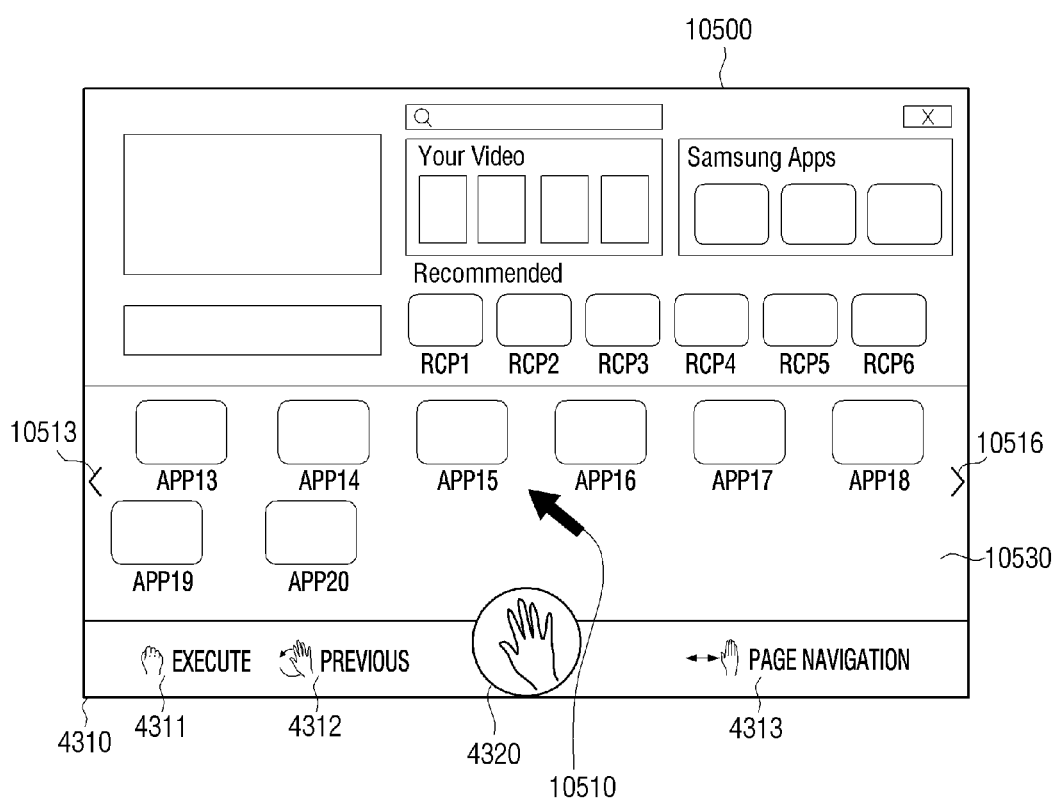

After moving the application display area 10520, the control unit 140 displays the pointer 10510 again as shown in FIG. 107.

Figure 108:
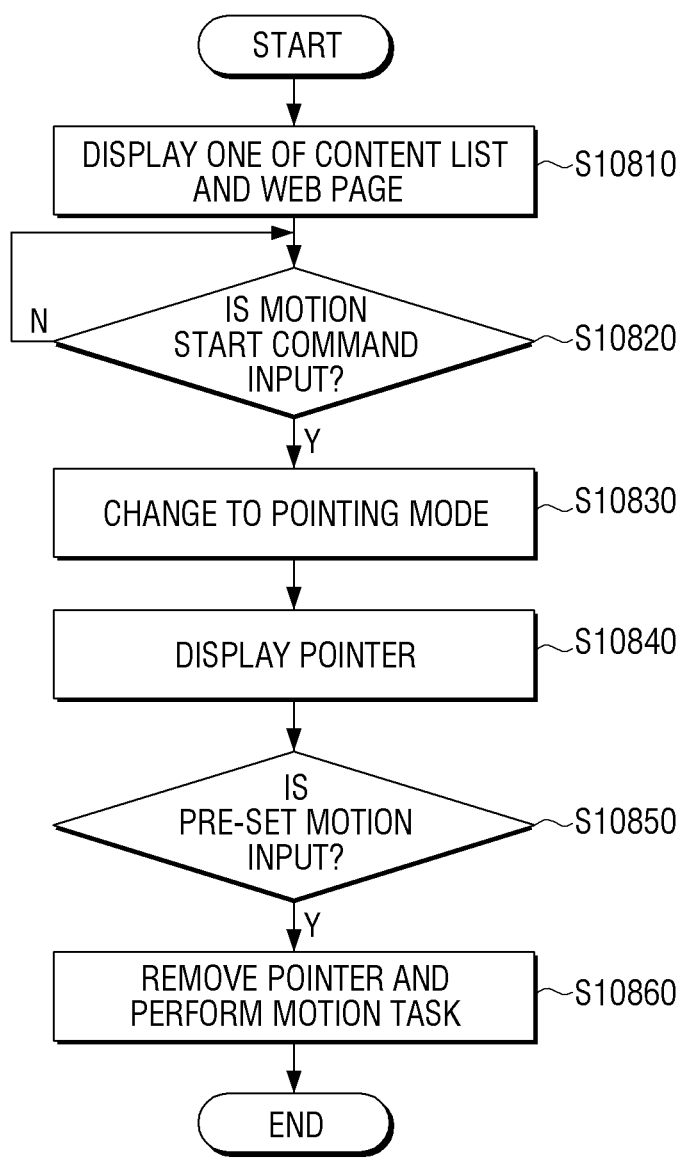

FIG. 108 is a flowchart to explain a controlling method of the electronic apparatus 100 if a pre-set motion is input in a pointing mode according to an exemplary embodiment.

The electronic apparatus 100 displays one of a content list and a web page (S10810). The content list may include a plurality of executable icons for executing applications and the web page may include a plurality of hyperlinks.

The electronic apparatus 100 determines whether a motion start command is input or not (S10820).

If a motion start command is input (S10820-Y), the electronic apparatus 100 changes a mode of the electronic apparatus 100 to a pointing mode (S10830). The pointing mode is a mode to perform a task requiring a pointer (for example, executing an application and surfing a web page).

If the mode is changed to the pointing mode, the electronic apparatus 100 displays a pointer on the display screen (S10840). The pointer may be located at a center of the display screen.

If a pre-set motion is input through the motion input unit 120 in the state where the pointer is displayed (S10850-Y), the electronic apparatus 100 removes the pointer and performs a motion task corresponding to the pre-set motion (S10860). The pre-set motion is a motion that is pre-set in a motion mode and may be a slap motion in an upward, downward, leftward, or rightward direction, a grab motion, or a rotation mode in a counter clockwise direction.

The electronic apparatus 100 is controlled as described above so that the user can perform the task in accordance with the pre-set motion even in the pointing mode.

The control unit 140 may display a selected item distinctively from other items in accordance with a mode of the electronic apparatus 100.

Specifically, the control unit 140 controls the display unit 193 to display a plurality of selectable items. The selectable item may be an executable icon of a content list or a hyperlink of a web page.

If one of a user voice and a user motion is input through one of the voice input unit 110 and the motion input unit 120, the control unit 140 selects a first item from among the plurality of items in accordance with the user input. The control unit 140 may display the selected first item distinctively from other items. For example, the control unit 140 may highlight the selected first item thicker than other items.

Figure 109:
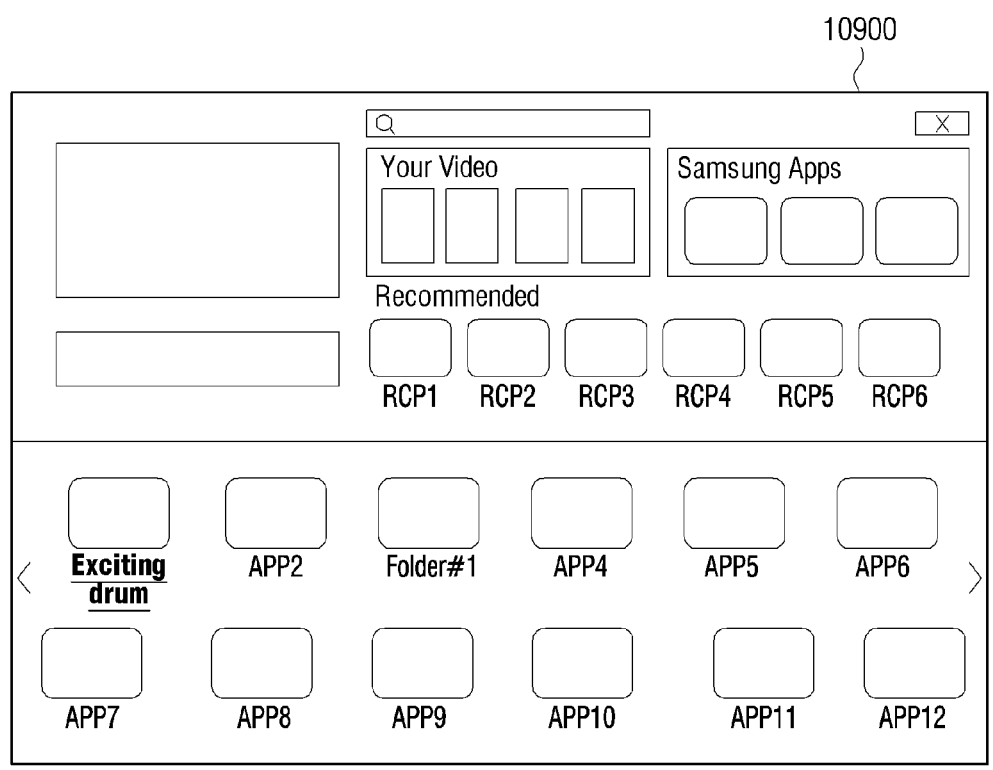
FIGS. 109 to 111 are views and a flowchart to explain a method for displaying an item in a voice task mode according to an exemplary embodiment.

If a name of the first item has a number of characters which exceeds a pre-set number and a mode of the electronic apparatus 100 is a motion task mode when the first item is displayed distinctively from other items, the control unit 140 may display the entire name of the first item. For example, the entire name of a selected executable icon, "Exciting Drum", is displayed as shown in FIG. 109. The control unit 140 may display the entire name of the first item in a scrolling method. In the above example, the entire name of the item is displayed in the motion task mode. However, this is merely an example and the entire name of the item may be displayed even in a remote control mode.

Figure 110:
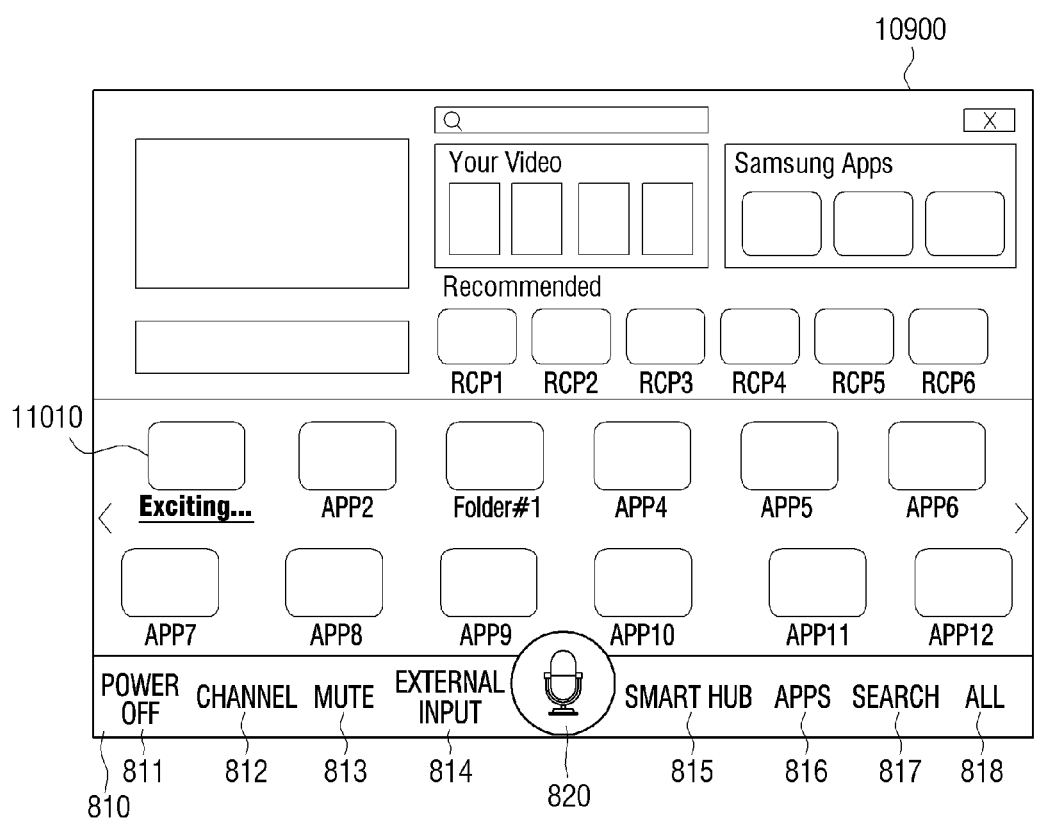

On the other hand, if a name of the first item has a number of characters which exceeds a pre-set number and a mode of the electronic apparatus 100 is a voice task mode, the control unit 140 may display only a part of the name of the first item. The part of the name of the first item is fixed. For example, only a part of the name of the selected executable icon, "Exciting Drum" is displayed as shown in FIG. 110.

If only a part of the name of the first item is displayed in the voice task mode and a user voice input through the voice input unit 110 is consistent with the displayed part of the name, the control unit 140 executes the first item.

If there is no space in a part of the name of the displayed first item and a user voice corresponding a plurality of spellings of the name of the displayed first item is input through the voice input unit 110, the control unit 140 executes the first item. For example, if the name of the displayed first item is "man" and voices "m", "a", and "n" are input in sequence, the control unit 140 executes the first item.

If a mode of the electronic apparatus 100 is a voice task mode and a plurality of items having names which are consistent with a user voice input through the voice input unit 110 are included among the names of the displayed items, the control unit 140 may display a list of a candidate group including the plurality of items. If the list of the candidate group is displayed, the control unit 140 may display the entire names of the items so that the user can clearly distinguish the items.

Figure 111:
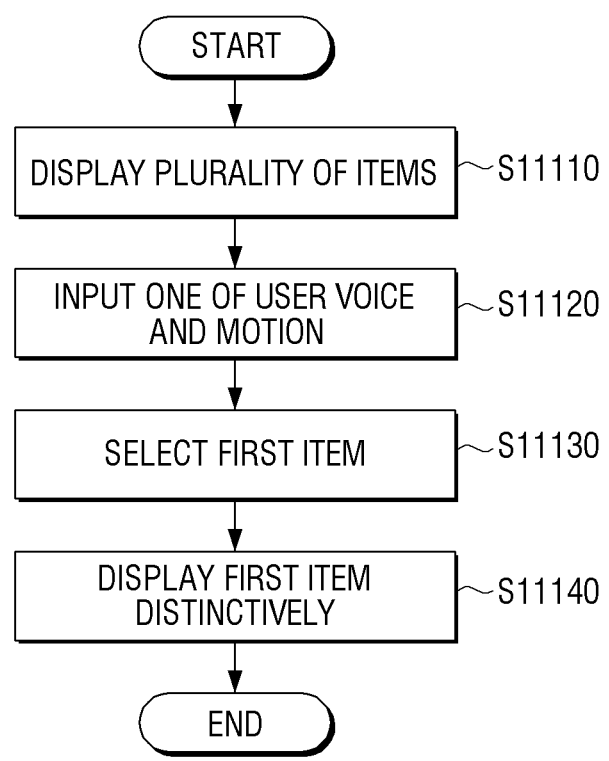

FIG. 111 is a flowchart to explain a controlling method of the electronic apparatus 100 which displays items differently in accordance with a mode according to an exemplary embodiment.

The electronic apparatus 100 displays a plurality of selectable items (S11110). The plurality of items may be executable icons included in a content list for executing applications or hyperlinks included in a web page.

The electronic apparatus 100 receives input of one of a user voice and a user motion through one of the motion input unit 110 and the motion input unit 120 (S11120).

The electronic apparatus 100 selects a first item in accordance with a user input (S11130). For example, in a voice task mode, the electronic apparatus 100 may select the first item in accordance with a user voice input through the voice input unit 110, and, in a motion task mode, the electronic apparatus 100 may select the first item in accordance with a user motion input through the motion input unit 120. In a remote control mode, the electronic apparatus 100 may select the first item in accordance with a remote control signal input through the remote control signal receiving unit 170.

If the first item is selected, the electronic apparatus 100 displays the selected first item distinctively from other items (S11140). For example, the electronic apparatus 100 may highlight the selected first item thicker than other items.

If a name of the first item has a number of characters which exceeds a pre-set number and a mode of the electronic apparatus 100 is the motion task mode (or the remote control mode) when the first item is displayed distinctively from other items, the electronic apparatus 100 may display the entire name of the first item. For example, as shown in FIG. 109, the entire name of a selected executable icon, "Exciting Drum", is displayed. Also, the electronic apparatus 100 may display the entire name of the first item in a scrolling method.

On the other hand, if a name of the first item has a number of characters which exceeds a pre-set number and the mode of the electronic apparatus 100 is the voice task mode, the electronic apparatus 100 may display only a part of the name of the first item. The part of the name of the first item is fixed. For example, only a part ("Exciting") of the name of the executable icon, "Exciting Drum", is displayed as shown in FIG. 110.

As described above, only the part of the name of the item is displayed in the voice task mode, so that the user can execute the first item by uttering only the part of the name.

The control unit 140 displays voice assistance information including a plurality of voice items in the voice task mode. The voice assistance information includes an icon indicating that the mode of the electronic apparatus 100 is the voice task mode, and the icon indicating the voice task mode may be located at a center of the voice assistance information.

If the voice assistance information is displayed and a user voice corresponding to one of the plurality of voice items is input through the voice input unit 110, the control unit 140 displays a guide message to perform a voice task on a first area of the voice assistance information, and displays the voice item on a second area of the voice assistance information. The first area may be a left area of the icon and the second area may be a right area of the icon. An output property of the guide message may be different from an output property of the voice item. The output property may include at least one of size, chroma, brightness, and color of characters.

If the user voice is a command to change a channel, the control unit 140 may display a guide message to guide change of a channel on the first area, and may display a voice item corresponding to an example of an utterable command to change a channel and a voice item corresponding to cancelation of change of a channel on the second area.

If the user voice is a command to turn off power, the control unit 140 may display a guide message to confirm turn-off of power on the first area, and may display a voice item corresponding to a command regarding whether to turn off power on the second area.

Hereinafter, displaying of voice assistance information will be explained with reference to FIGS. 112 to 114.

If a voice start command is input through the voice input unit 110, the control unit 140 changes a mode of the electronic apparatus 100 to a voice task mode in which the electronic apparatus 100 is controlled in accordance with a user voice input through the voice input unit 110. The control unit 140 displays voice assistance information as shown in FIG. 112.

The voice assistance information may display an icon 820 indicating that the current mode of the electronic apparatus 100 is the voice task mode. The voice assistance information may display a power off voice item 811, a channel voice item 812, a mute voice item 813, and an external input voice item 814 on a left area of the icon 820, and may display a smart hub voice item 815, an apps voice item 816, a search voice item 817, and all voice item 818 on a right area of the icon 820.

Figure 113:
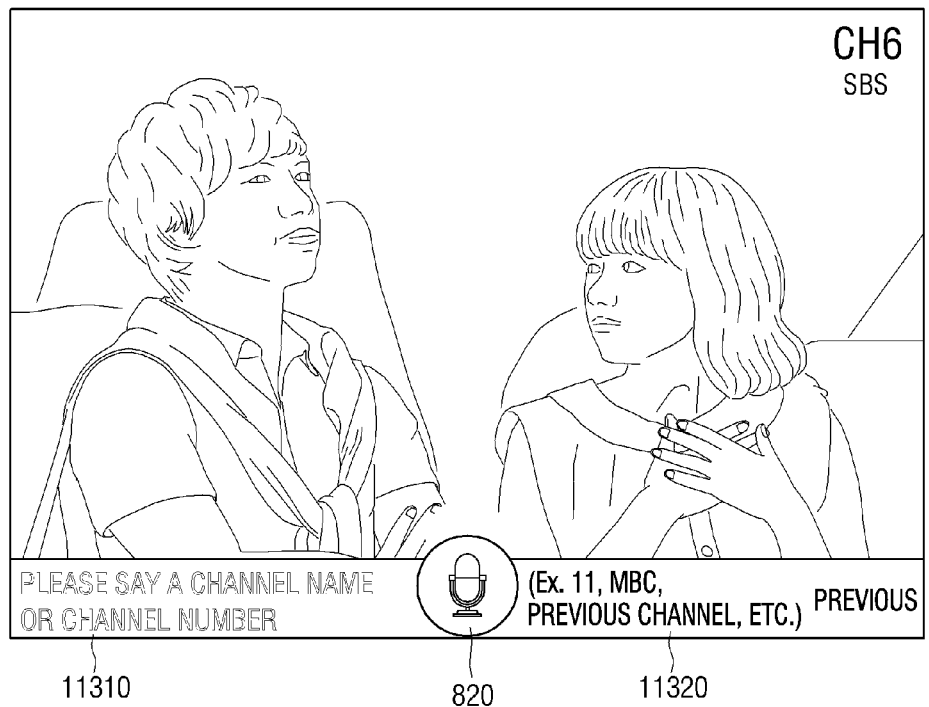

If the voice assistance information is displayed and a command, "channel", corresponding to the channel voice item 812 is input through the voice input unit 110, the control unit 140 changes the voice assistance information as shown in FIG. 113. The control unit 140 displays a guide message having first chroma on the left area of the icon 820 in the voice assistance information to perform a voice task. For example, as shown in FIG. 113, "Please say a channel name or a channel number 810 may be displayed on the left area.

The control unit 140 displays a voice item having second chroma on the right area of the icon 820 in the voice assistance information. The voice item may be a voice item corresponding to an example of a utterable command to change a channel and a voice item corresponding to cancelation of change of a channel (for example, a previous voice item). For example, as shown in FIG. 113, "(example: 11, MBC, previous channel, and etc.) Previous" 11320 may be displayed on the right area of the icon 820.

The control unit 140 may control such that the chroma of the right area of the icon 820 is thicker than the chroma of the left area of the icon 820.

Figure 112:
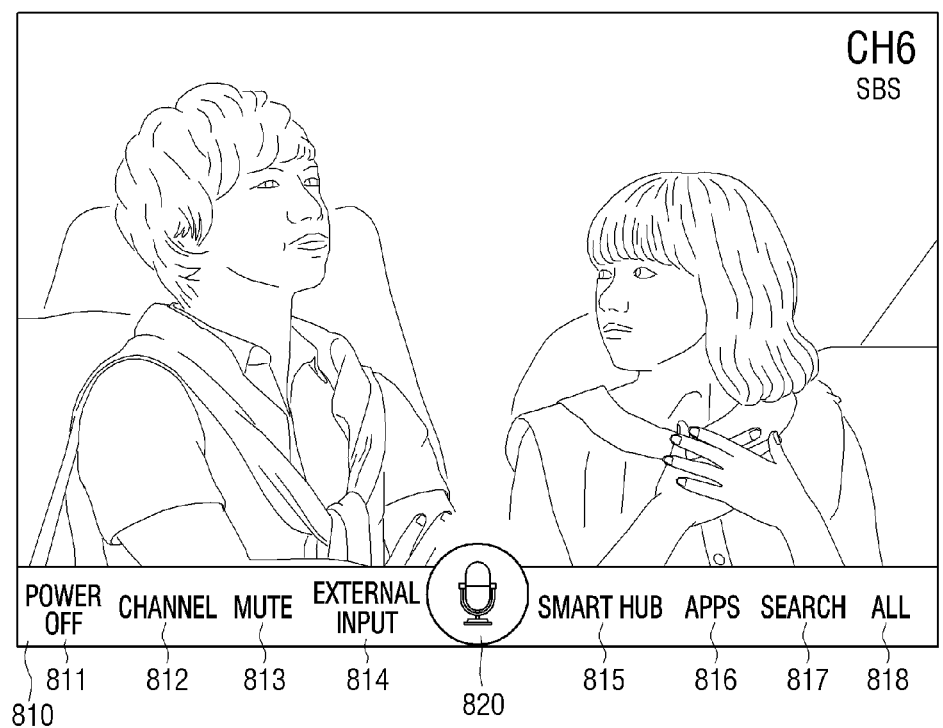
FIGS. 112 to 115 are views and a flowchart to explain a UI having a different chroma from each other according to an exemplary embodiment.
Figure 114:
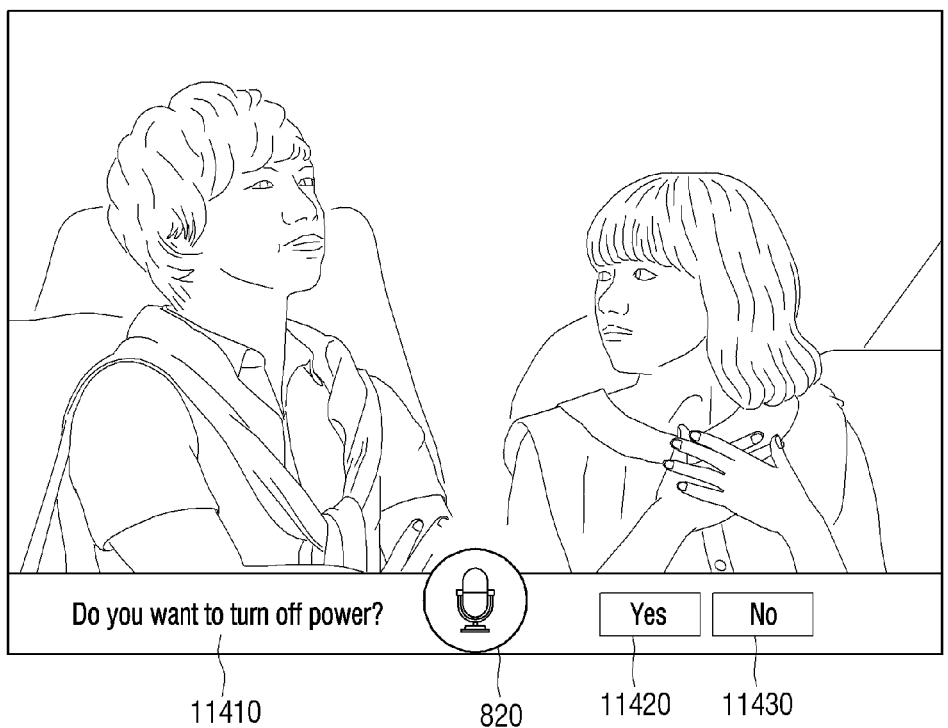

If the voice assistance information is displayed as shown in FIG. 112 and a command, "power off", corresponding to the power off voice item 811 is input through the voice input unit 110, the control unit 140 changes the voice assistance information as shown in FIG. 114. The control unit 140 displays a guide message having first chroma on the left area of the icon 820 in the voice assistance information to perform a voice task. For example, as shown in FIG. 114, "Do you want to turn off power? 11410 may be displayed on the left area of the icon 820.

The control unit 140 displays a voice item having second chroma on the right area of the icon 820 in the voice assistance information. The voice item may be a voice item corresponding to a command regarding whether to turn off power. For example, as shown in FIG. 114, "Yes or No" 11420 and 11430 may be displayed on the right area of the icon 820.

The control unit 140 may control such that the chroma of the right area of the icon 820 is thicker than the chroma of the left area of the icon 820.

Figure 115:
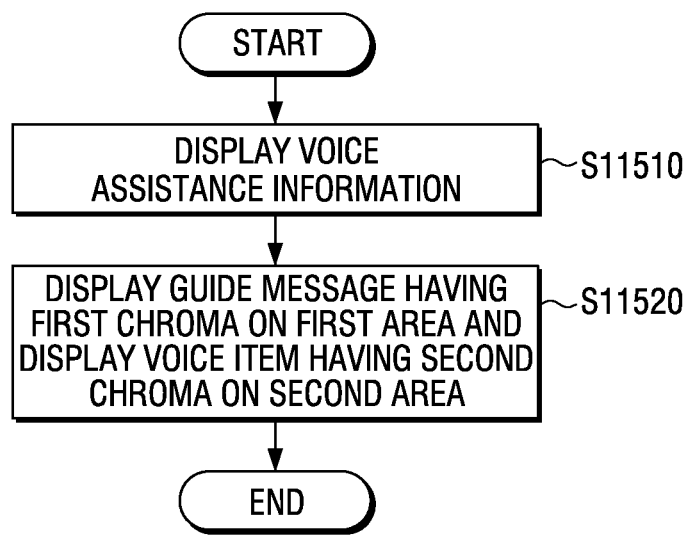

FIG. 115 is a flowchart to explain a controlling method of the electronic apparatus 100, which displays voice assistance information according to an exemplary embodiment.

The electronic apparatus 100 displays voice assistance information (S11510). The voice assistance information may include an icon indicating that a current mode of the electronic apparatus 100 is a voice task mode, and a plurality of voice items guiding the voice task mode.

If a user voice corresponding to one of the plurality of voice items is input through the voice input unit 110, the electronic apparatus 100 displays a guide message having first chroma on a first area, and displays a voice item having second chroma on a second area (S11520). The first area may be a right area of the icon in the voice assistance information and the second area may be a left area of the icon in the voice assistance information. The second chroma may be thicker than the first chroma.

As described above, the utterable voice item is displayed with chroma different from that of the guide message so that the user can know which command the user should utter more clearly.

The control unit 140 displays voice assistance information including a plurality of voice items guiding a voice task. If a user voice input through the voice input unit 110 includes a pre-set word that does not belong to a command corresponding to the plurality of voice items, the control unit 140 may perform a voice task corresponding to the pre-set word.

The pre-set word may be a word that corresponds to an executable key included in a remote controller which is interlocked with (i.e. communicates with) the electronic apparatus 100. For example, the pre-set word may include at least one of a command to generate a channel list, a command to generate a menu, a command to execute a social network, a command to guide a program schedule, a command to change to a 3D image, and a command to guide broadcast.

The pre-set word may be a word that corresponds to a command to provide a task related to a function performed by the electronic apparatus 100. For example, if the electronic apparatus 100 currently performs a function of reproducing a moving image, the pre-set word may include at least one of a command to reproduce the moving image, a command to pause the moving image, a command to stop the moving image, a command to reproduce a previous file, a command to reproduce a next file, a command to skip forward, and a command to skip backward.

That is, a command corresponding to an essential function of the electronic apparatus 100 is pre-stored in the voice database 130*m*, so that the user can use the essential function of the electronic apparatus 100 through voice recognition even if the function is not displayed in the voice assistance information.

Figure 116:
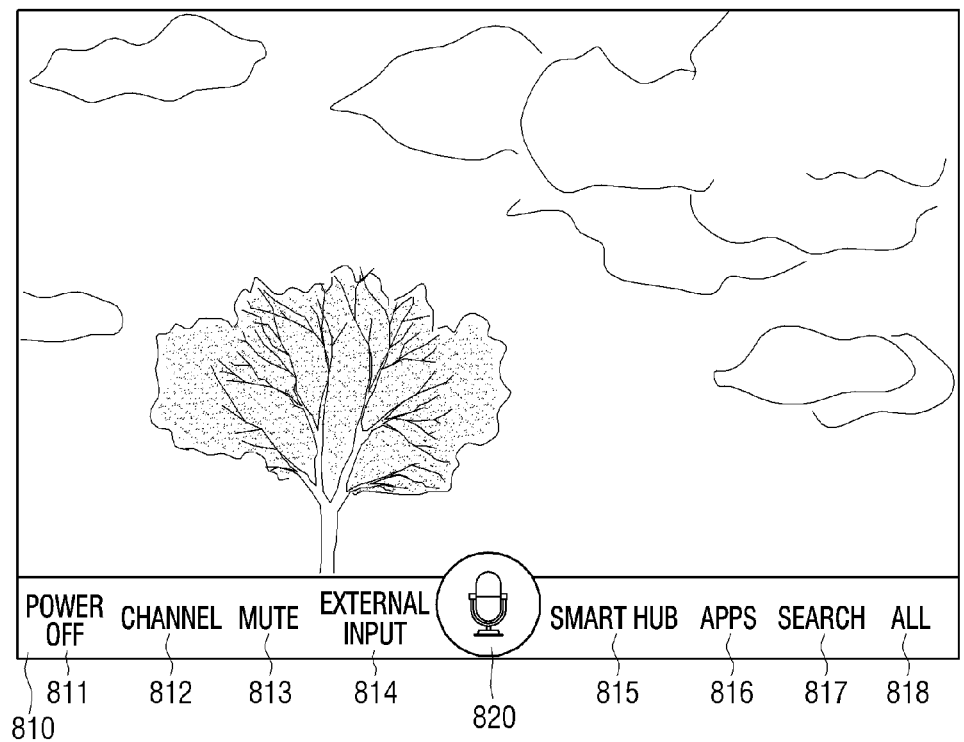
FIGS. 116 to 118 are views and a flowchart to explain performing of a task corresponding to a command other than a display voice item according to an exemplary embodiment.

Hereinafter, a case in which a command that does not belong to a voice item displayed on voice assistance information is uttered will be explained with reference to FIGS. 116 and 117.

If a voice start command (for example, "Ginny") is input through the voice input unit 110, the control unit 140 changes a mode of the electronic apparatus 100 to a voice task mode, in which the electronic apparatus 100 is controlled in accordance with a user voice input through the voice input unit 110. If the mode is changed to the voice task mode, the control unit 140 displays voice assistance information on the lower portion of the display screen as shown in FIG. 116.

At this time, an icon 820 indicating that the current mode of the electronic apparatus 100 is the voice task mode is displayed on the voice assistance information. The voice assistance information displays a power off voice item 811, a channel voice item 812, a mute voice item 813, and an external input voice item 814 on a left area of the icon 820, and displays a smart hub voice item 815, an apps voice item 816, a search voice item 817, and an all voice item 818 on a right area of the icon 820.

Figure 117:
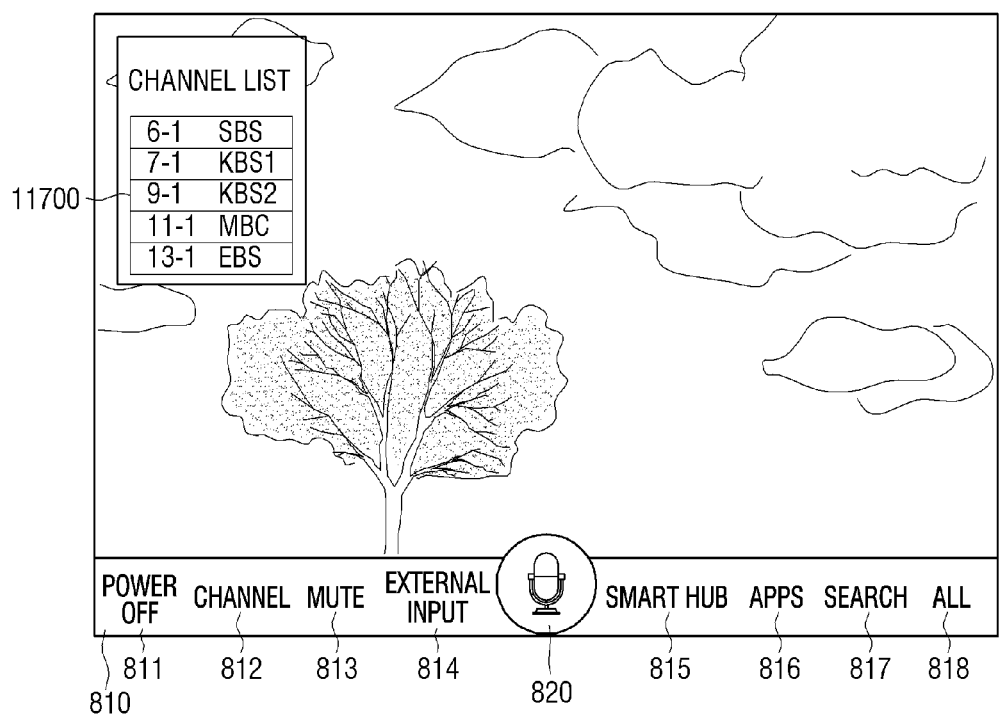

If the voice assistance information is displayed and a command, "channel list", which does not belong to the voice assistance information, is input through the voice input unit 110, the control unit 140 may displays a channel list 11700 on one side portion of the display screen as shown in FIG. 117.

The channel list 11700 includes a broadcast channel that falls within a pre-set number range with reference to a currently tuned broadcast channel. For example, if the currently tuned broadcast channel is "9-1 KBS2", the control unit 140 displays "6-1 SBS", 7-1 KBS 1", "9-1 KBS 2", "11-1 MBC", and "13-1 EBS" in the channel list 1170 as shown in FIG. 117.

The user may change the channel by selecting one of the channels in the channel list 11700. Accordingly, even if the voice assistance information does not display a voice item corresponding to the channel list, the user can perform a task of displaying the channel list through voice recognition.

Figure 118:
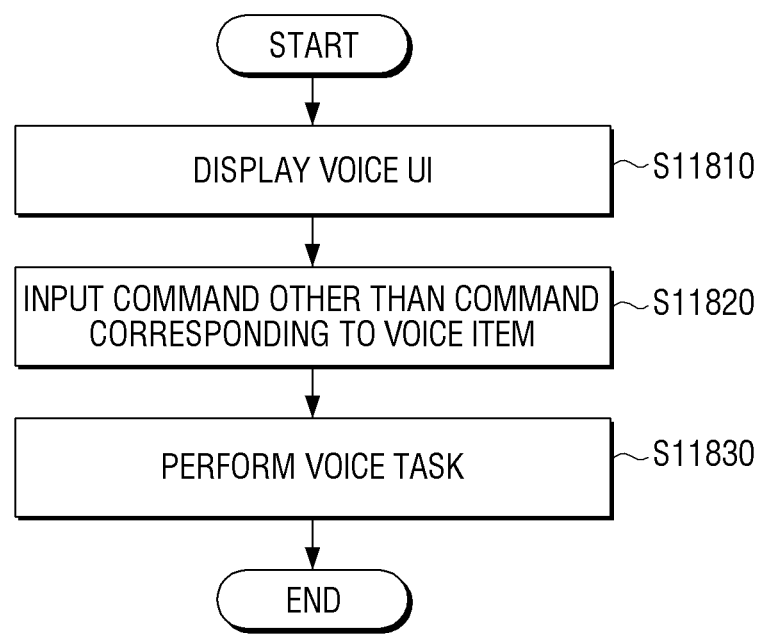

FIG. 118 is a flowchart to explain a controlling method of the electronic apparatus 100 if a command that does not belong to a voice item displayed on voice assistance information is uttered according to an exemplary embodiment.

The electronic apparatus 100 displays voice assistance information (S11810). The voice assistance information may include an icon indicating that a current mode of the electronic apparatus 100 is a voice task mode and a plurality of voice items guiding the voice task mode.

The electronic apparatus 100 receives input of a command other than commands corresponding to the voice items (S11820). If the command other than the commands corresponding to the voice items may be a word that corresponds to an executable key included in a remote controller which communicates with the electronic apparatus 100. For example, the word may include one of a command to generate a channel list, a command to generate a menu, a command to execute a social network, a command to guide a program schedule, a command to change to a 3D image, and a command to guide broadcast.

The command other than the commands corresponding to the voice items may be a word that corresponds to a command to provide a task related to a function currently performed by the electronic apparatus 100. For example, if the electronic apparatus 100 currently performs a function of reproducing a moving image, the word may include at least one of a command to reproduce the moving image, a command to pause the moving image, a command to stop the moving image, a command to reproduce a previous file, a command to reproduce a next file, a command to skip forward, and a command to skip backward.

The electronic apparatus 100 performs a voice task in accordance with the input command (S11830). For example, if a command to generate a channel list is input, the electronic apparatus 100 generates and displays a channel list.

As described above, the user can perform a task corresponding to a command that is not displayed in the voice assistance information.

The control unit 140 may perform not only a motion task mode using one hand but also a motion task mode using both hands.

Specifically, if a motion start command using both hands is input through the motion input unit 120, the control unit 140 may change a mode of the electronic apparatus 100 to a motion task mode using both hands to perform a motion task using both hands.

Figure 119:
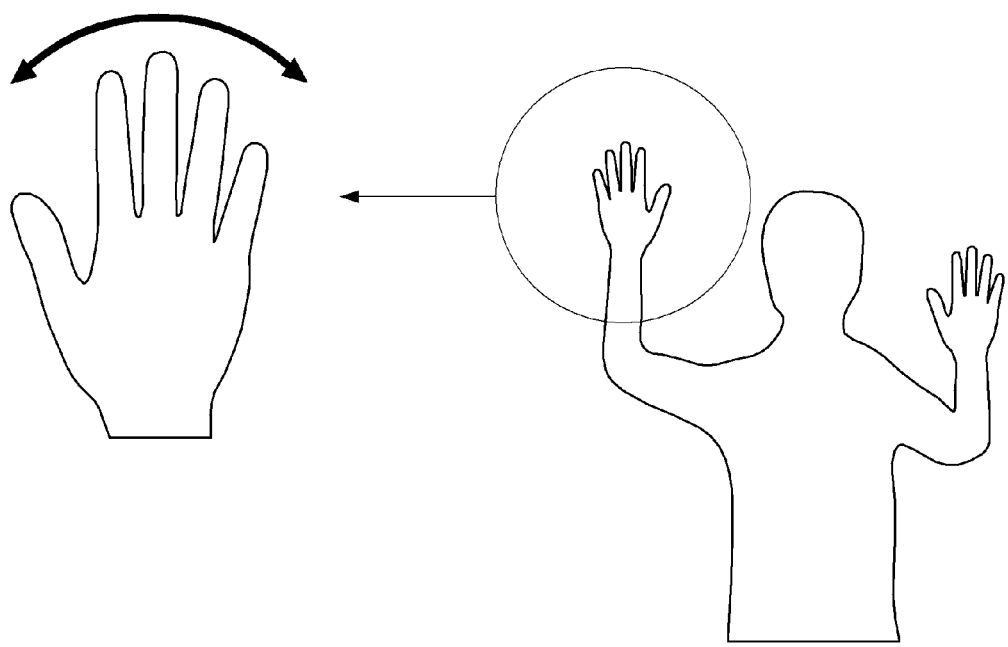
FIGS. 119 to 121 are views and a flowchart to explain a motion start command to change a current mode to a motion task mode using both hands according to an exemplary embodiment.

In a motion task mode using one hand, if a motion start command using the other hand is input, the control unit 140 may recognize the motion start command using both hands. Specifically, if a motion start command (a motion of shaking one hand 3~4 times) is input through the motion input unit 120 as shown in FIG. 119, the control unit 140 changes a mode of the electronic apparatus 100 to a motion task mode, in which the electronic apparatus 100 is controlled in accordance with a user motion input through the motion input unit 120. If a motion start command using the other hand is input through the motion input unit 120 in the motion task mode, the control unit 140 may change the mode of the electronic apparatus 100 to a motion task mode using both hands to perform a motion task using both hands.

Figure 120:
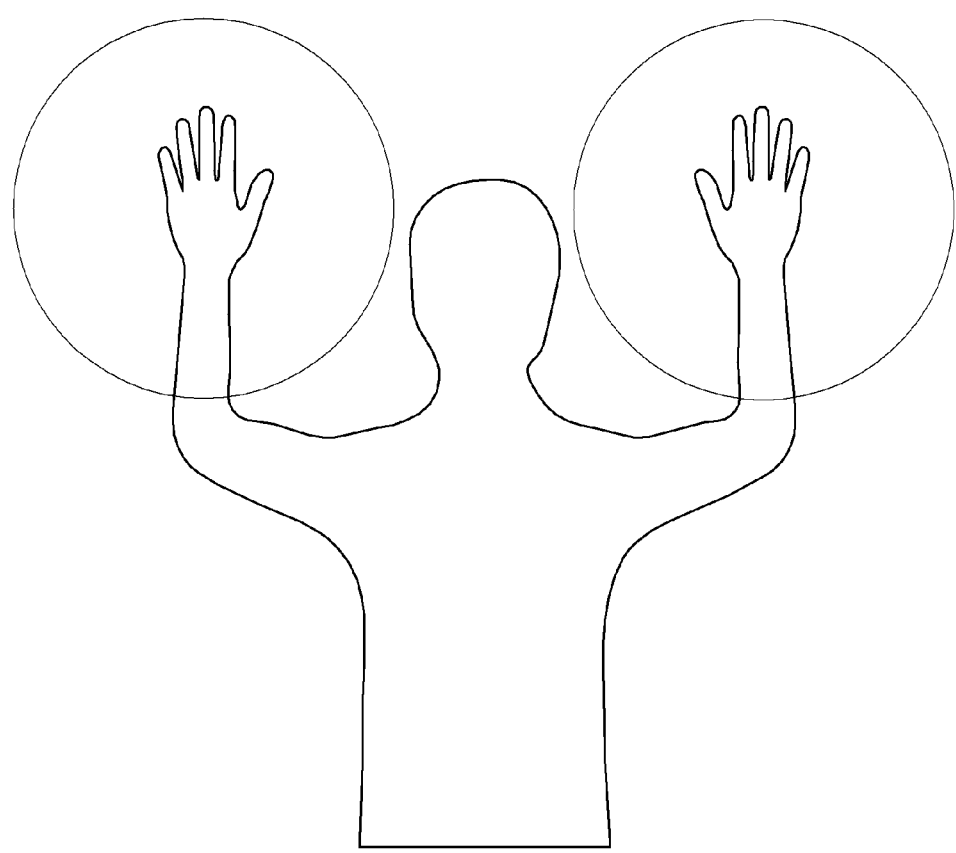

In another exemplary embodiment, the motion start command using both hands may be recognized if a shake motion of shaking both hands simultaneously multiple times (for example, 3~4 times) is input. Specifically, if the shake motion of shaking both hands simultaneously multiple times is input through the motion input unit 120 as shown in FIG. 120, the control unit 140 may change a mode of the electronic apparatus 100 to a motion task mode using both hands to perform a motion task using both hands.

The motion task using both hands may be a task of enlarging or reducing a display screen.

In particular, if an application where it is impossible to perform the motion task using both hands is executed, the control unit 140 may output a message that it is impossible to perform the motion task using both hands. For example, if the application where it is impossible to perform the motion task using both hands is executed, the control unit 140 may display an icon indicating that it is impossible to perform the motion task using both hands.

Figure 121:
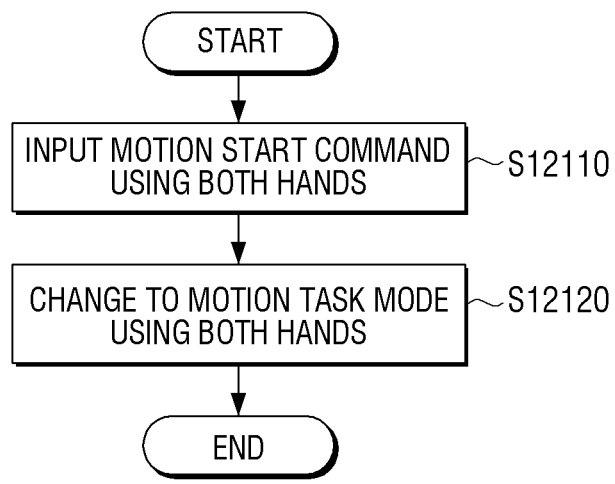

FIG. 121 is a flowchart to explain a motion task mode using both hands according to an exemplary embodiment.

The electronic apparatus 100 receives input of a motion start command using both hands (S12110). For example, in a motion task mode using one hand, if a motion start command using the other hand is input, the motion start command using both hands is recognized as being input.

In another exemplary embodiment, the motion start command using both hands may be recognized if a shake motion of shaking both hands simultaneously multiple times (for example, 3~4 times) is input.

If the motion start command using both hands is input, the electronic apparatus 100 changes a mode of the electronic apparatus 100 to a motion task mode using both hands to perform a task of the electronic apparatus using both hands. (S12120). The motion task mode using both hands may be task of enlarging or reducing a display screen.

As described above, the user can perform a motion task using not only one hand but also both hands.

If a motion start command is input through the motion input unit 120, the control unit 140 changes a mode of the electronic apparatus 100 to a motion task mode, in which a motion task is performed in accordance with a motion of a user who inputs the motion start command. In the motion task mode, the motion task is performed only in accordance with the motion of the user who inputs the motion start command until the user who inputs the motion start command releases the motion task mode. The motion task mode is maintained even if a motion start command is input from other users than the user who inputs the motion start command.

Specifically, if a motion start command is input through the motion input unit 120, the control unit 140 traces a hand of a user who inputs the motion start command using the motion recognition module 130*l*. The control unit 140 may trace the user hand using at least one of shape, color, and motion of the user hand.

Even if a motion start command of a hand of another user is input through the motion input unit 120, the control unit 140 does not perform a motion task by the hand of another user, and traces the hand of the user who initially inputs the motion start command and performs a motion task.

Even if a motion start command is input by another user, the control unit 140 may perform the motion task in accordance with the motion of the user who initially inputs the motion start command until a command to release the motion task mode is input from the user who inputs the motion start command.

Even if the hand of the user who inputs the motion start command is overlapped with hands of other users in the motion task mode, the motion task may be performed in accordance with the motion of the user who inputs the motion start command.

Alternatively, if a motion start command using one hand is input and another motion start command using one hand of a user other than the user who inputs the motion start command is input, the control unit 140 may change the mode of the electronic apparatus 100 to a motion task mode using both hands to perform a motion task using both hands. The motion task mode using both hands may be performed by one hand of the user who initially inputs the motion start command and one hand of another user.

If a plurality of motion start commands are input from a plurality of users through the motion input unit 120, the control unit 140 determines a motion start command that is initially input from among the plurality of motion start commands. If the initially input motion start command is determined, the control unit 140 changes a mode of the electronic apparatus 100 to a motion task mode in which a motion task is performed in accordance with a motion of the user who initially inputs the motion start command.

The motion task may be performed only in accordance with the motion of the user who initially inputs the motion start command until the user who initially inputs the motion start command releases the motion task mode. The motion task mode may be maintained even if a motion start command is input from other users than the user who initially inputs the motion start command.

Figure 122:
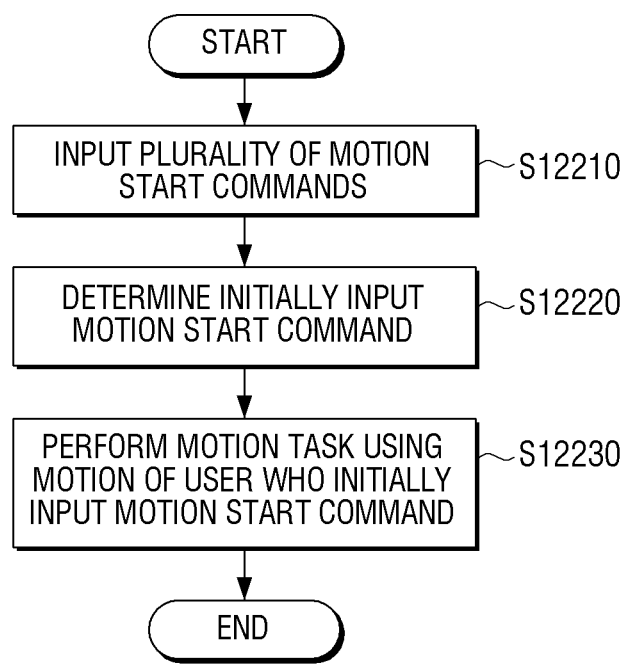
FIG. 122 is a flowchart to explain a method for performing a motion task mode if a motion start command is input from a plurality of users according to an exemplary embodiment.

FIG. 122 is a flowchart to explain a controlling method of the electronic apparatus 100 if a plurality of motion start commands are input from a plurality of users according to an exemplary embodiment.

The electronic apparatus 100 receives input of a plurality of motion start commands from a plurality of users through the motion input unit 120 (S12210). The motion start command may be a shake motion of shaking a user's hand multiple times (for example, 3~4 times).

The electronic apparatus 100 determines a motion start command that is initially input from among the plurality of motion start commands (S12220). Specifically, the electronic apparatus 100 may determine the initially input motion start command using a shape, color, and a motion of the user hand which is used for inputting the motion start command.

The electronic apparatus 100 performs a motion task using the motion of the user who initially inputs the motion start command (S12230). Specifically, if the electronic apparatus 100 determines the initially input motion start command, the electronic apparatus 100 changes a mode of the electronic apparatus 100 to a motion task mode in which a motion task is performed in accordance with a motion of the user who initially inputs the motion start command. The electronic apparatus 100 performs a motion task using a motion of the user who initially inputs the motion start command in the motion task mode.

The motion task may be performed only in accordance with the motion of the user who initially inputs the motion start command until the user who initially inputs the motion start command releases the motion task mode. The motion task mode may be maintained even if a motion start command is input from other users than the user who initially inputs the motion start command.

As described above, the motion task is performed in accordance with the initially input motion start command so that a malfunction by motions of other users can be prevented.

The control unit 140 may perform a voice task in phases. Specifically, if a first voice of a user is input through the voice input unit 110, the control unit 140 may display a first menu guiding at least one voice task on one area of an image in response to the first voice. If a second voice of the user is input through the voice input unit 110, the control unit 140 may perform a voice task corresponding to the second voice of the user from among at least one voice task.

For example, if a command to change a channel is input through the voice input unit 110, the control unit 140 may display a first menu including information for guiding change of a channel. If a user voice corresponding to a channel identifier (for example, one of a channel number, a channel name, and a program name) is input through the voice input unit 110, the control unit 140 may change a current channel to a channel corresponding to the user voice.

If a user voice corresponding to a program name is input through the voice input unit 110, the control unit 140 searches for the program name input through the voice input unit 110 from a pre-stored program guide (EPG), and changes a current channel to a channel to broadcast the input program name or schedules a watching time.

Figure 123:
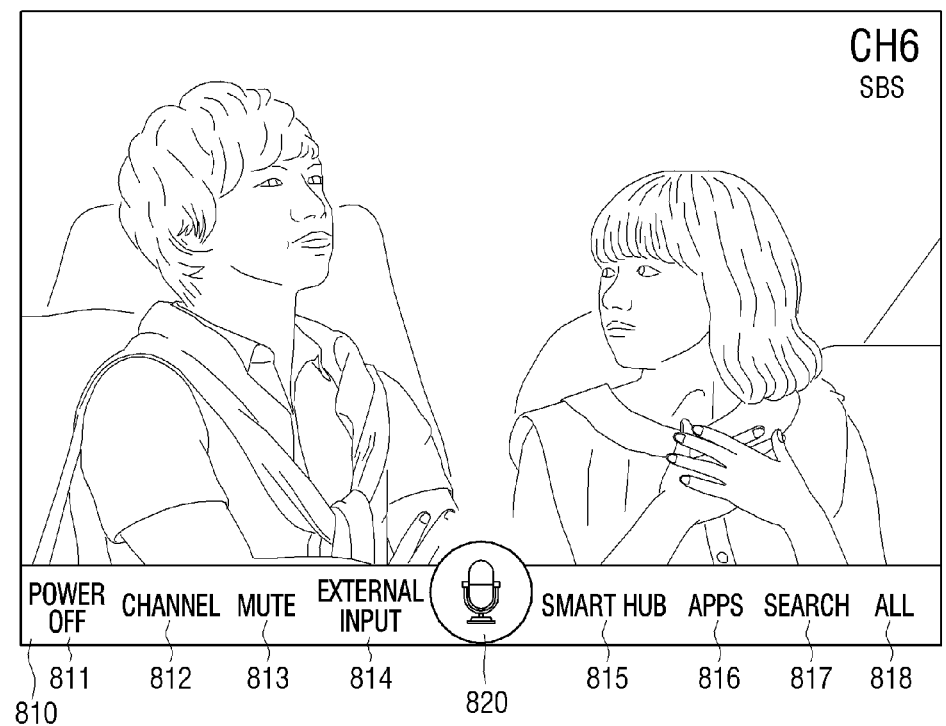
FIGS. 123 to 126 are views and a flowchart to explain a method for performing a task by in phases using voice recognition according to an exemplary embodiment.
Figure 124:
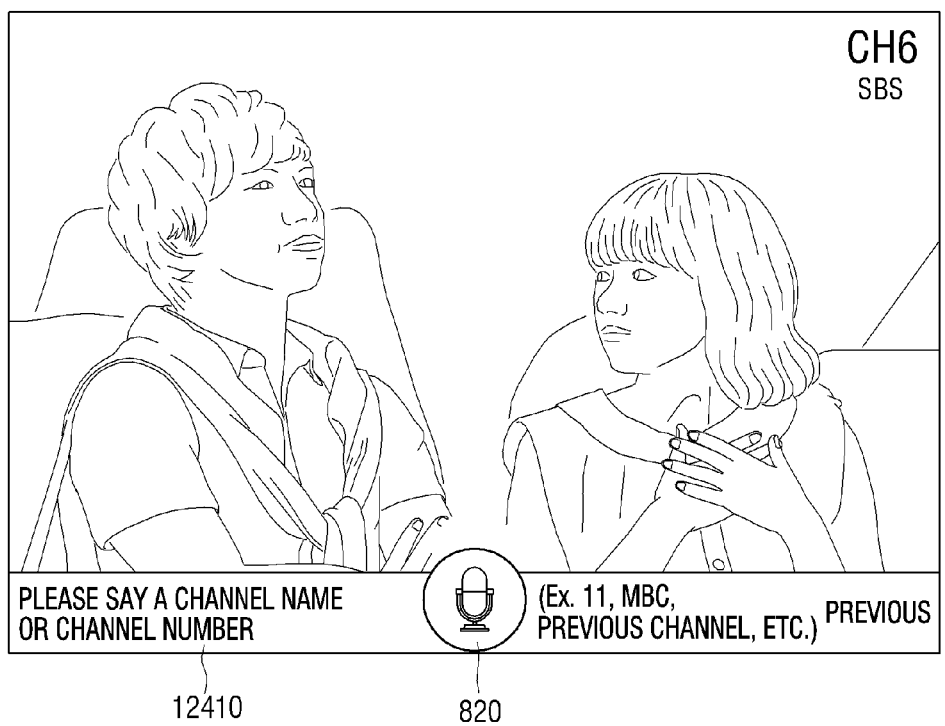
Figure 125:
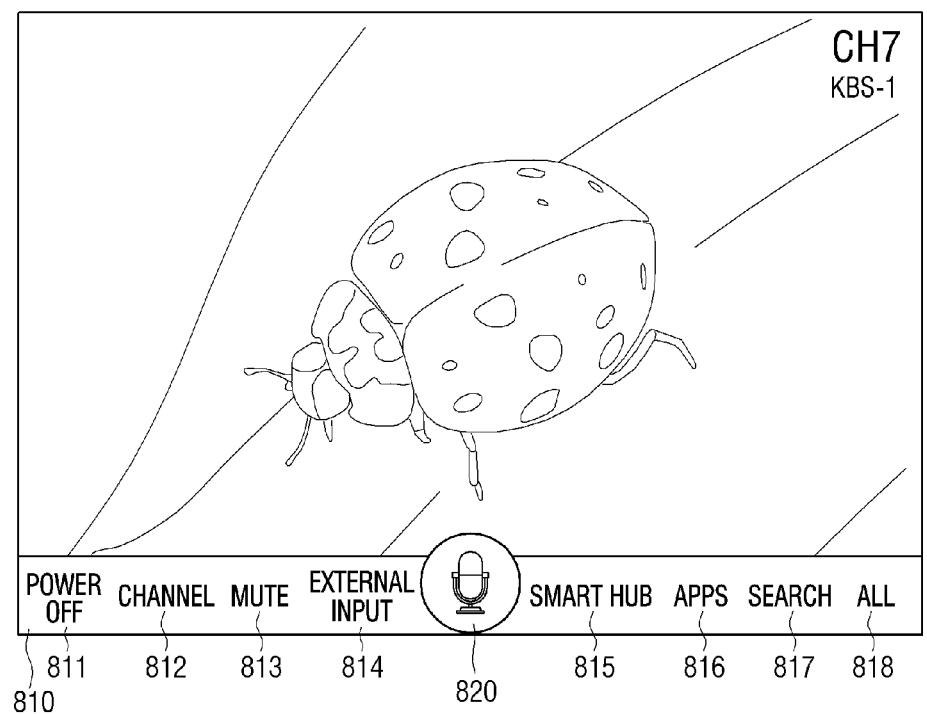

Hereinafter, a case in which voice recognition is performed in phases will be explained with reference to FIGS. 123 to 125.

If a voice start command is input through the voice input unit 110, the control unit 140 changes a mode of the electronic apparatus 100 to a voice task mode in which the electronic apparatus 100 is controlled in accordance with a user voice input through the voice input unit 110. The control unit 140 displays voice assistance information including a plurality of voice items as shown in FIG. 123.

If the voice assistance information is displayed and a user voice (for example, "channel") corresponding to a channel voice item 812 is input through the voice input unit 110, the control unit 140 changes the voice assistance information and displays a first menu guiding performance of a voice task. For example, the control unit 140 may display "Please say a channel name or a channel number" 12410 to guide change of a channel as shown in FIG. 124.

If a user voice corresponding to one of a channel number, a channel name, and a broadcast program name is input through the voice input unit 110, the control unit 140 changes a current channel to a channel corresponding to the user voice. For example, if "7" is input through the voice input unit 110, the control unit 140 displays channel 7 by tuning to channel 7 as shown in FIG. 125.

As described above, the voice task is performed in phases so that a malfunction can be prevented. Specifically, if the user wishes to change a channel, the user changes the channel after selecting the channel voice item once and thus can avoid changing to an undesirable channel.

Figure 126:
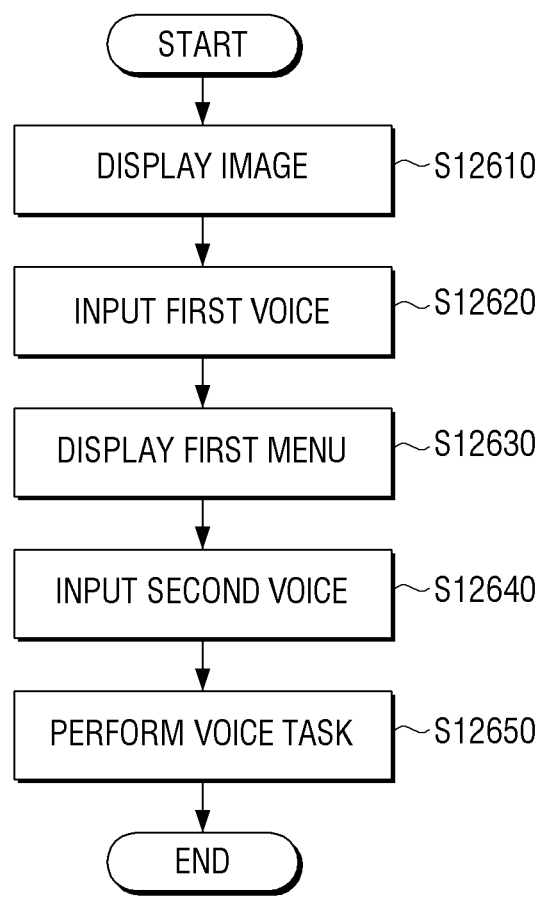

FIG. 126 is a flowchart to explain a controlling method of the electronic apparatus 100 which performs a voice task in phases according to an exemplary embodiment.

The electronic apparatus 100 displays an image (S12610). The image may include voice assistance information.

The electronic apparatus 100 receives input of a first voice through the voice input unit 110 (S12620). The first voice may be a user voice that corresponds to one of a plurality of voice items included in the displayed voice assistance information.

The electronic apparatus 100 displays a first menu guiding performance of a voice task in response to the input first voice (S12630).

The electronic apparatus 100 receives input of a second voice through the voice input unit 110 (S12640). The second voice is a command to perform a specific voice task.

The electronic apparatus 100 performs a voice task corresponding to the second voice in response to the input second voice (S12650). For example, if the second voice is a channel name, the electronic apparatus 100 changes a broadcast channel to a channel corresponding to the second voice.

As described above, the voice task is performed in phases so that a malfunction can be prevented.

In a voice task mode in which a voice task is performed in accordance with a user voice input through the voice input unit 110, the control unit 140 displays at least one executable icon and a name of the executable icon.

The voice input unit 110 receives input of a user voice. If a first executable icon displaying only a part of a name of the executable icon exists among the at least one executable icon, and the input user voice is consistent with the displayed part of the name of the first executable icon, the control unit 140 executes the first executable icon.

If the input user voice is consistent with a plurality of spellings constituting the displayed part of the name of the first executable icon, the control unit 140 executes the first executable icon.

If a second executable icon whose name includes a special character exists among the executable icons and the input user voice is consistent with an utterable name excluding the special character included in the name of the second executable icon, the control unit 140 executes the second executable icon.

The special character may be a symbol that is not utterable by the user. For example, the special character may be, but not limited to, a question mark (?), a comma (,), and a period (.).

For example, if an application having a name of an executable icon, "face recognition, voice recognition", exists, the control unit 140 executes the application when a user voice, "face recognition, voice recognition", is input through the voice input unit 110.

In the above example, the control unit 140 performs the executable icon. However, this is merely an example and the technical idea of the present disclosure may be applied if the control unit 140 performs a hyperlink.

Figure 127:
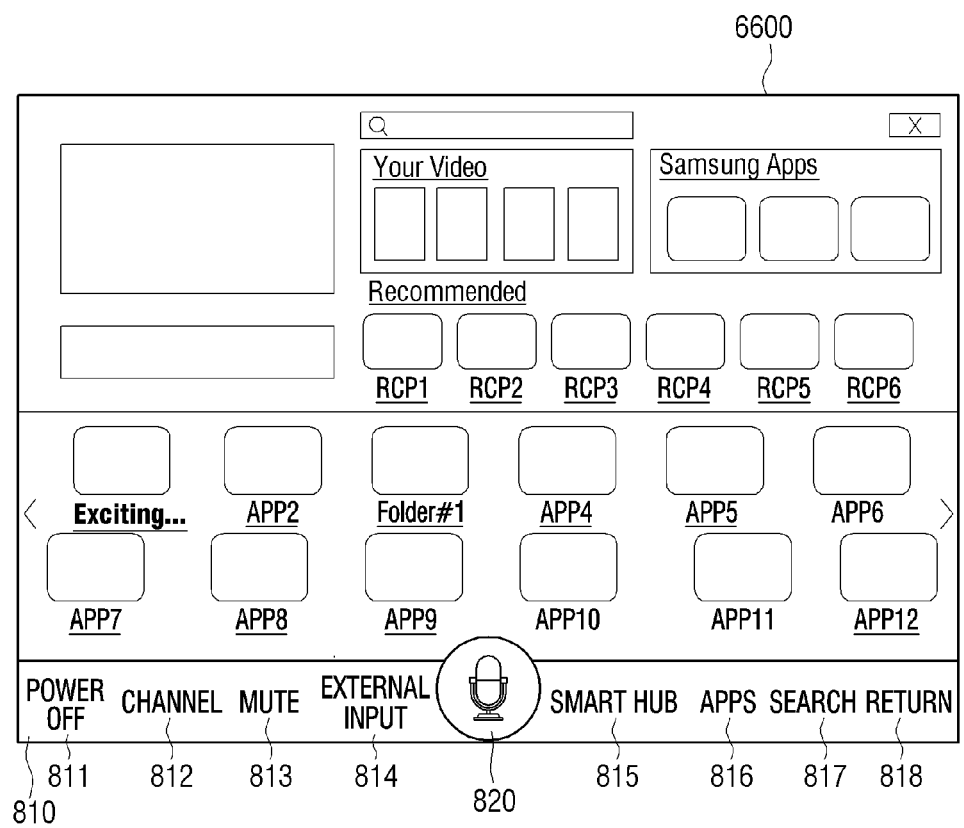

Hereinafter, a method for executing an executable icon displaying a part of a name of the executable icon according to an exemplary embodiment will be explained with reference to FIGS. 127 and 128.

The control unit 140 displays a content list (for example, a smart hub) including a plurality of executable icons for executing an application according to a specific command of a user. If an executable icon whose name has a number of characters exceeding a predetermined number is included among the plurality of executable icons included in the content list, the control unit 140 may display only a part of the entire name of the executable icon. For example, if an executable icon whose name has more than 10 characters is included among the plurality of executable icons included in the content list, the control unit 140 does not display the entire name of the executable icon, "Exciting Drum", and displays only "Exciting" as shown in FIG. 127.

If the content list is displayed and a voice start command is input through the voice input unit 110, the electronic apparatus 100 changes a mode of the electronic apparatus 100 to a voice task mode in which the electronic apparatus is controlled in accordance with a user voice input through the voice input unit 110. If the mode is changed to the voice task mode, the electronic apparatus 100 displays voice assistance information as shown in FIG. 127.

If the voice assistance information is displayed and "Exciting", which is consistent with the displayed part of the name, is uttered through the voice input unit 110, the control unit 140 executes "Exciting Drum" as shown in FIG. 128.

Also, if the voice assistance information is displayed and a plurality of spellings, "E", "X", "C", "I", "T", "I", "N", and "G", which constitute the displayed part of the name, are input through the voice input unit 110, the control unit 140 executes "Exciting Drum" as shown in FIG. 128.

Figure 129:
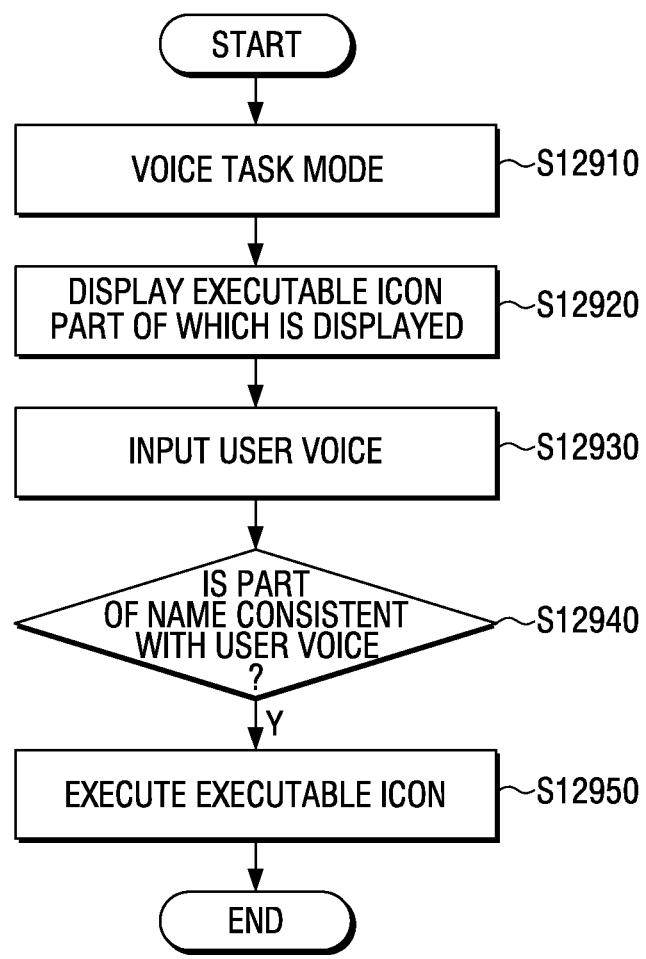

FIG. 129 is a flowchart to explain a method for executing an executable icon displaying only a part of a name of the executable icon according to an exemplary embodiment.

The electronic apparatus 100 changes a mode of the electronic apparatus 100 to a voice task mode in response to a voice start command input through the voice input unit 110 (S12910). The electronic apparatus 100 displays a content list including a plurality of executable icons for executing an application.

In particular, the electronic apparatus 100 displays an executable icon displaying a part of a name of the executable icon on the content list (S12920). This is because the name of the executable icon has a number of characters exceeding a predetermined number and thus the entire name of the executable icon cannot be displayed.

The electronic apparatus 100 receives input of a user voice through the voice input unit 110 (S12930).

The electronic apparatus 100 determines whether the user voice input through the voice input unit 110 is consistent with the displayed part of the name (S12940).

If there is an executable icon a part of a name of which is consistent with the user voice input through the voice input unit 110 (S12940-Y), the electronic apparatus 100 executes the executable icon (S12950).

In the above exemplary embodiment, the electronic apparatus 100 executes the executable icon. However, this is merely an example and the technical idea of the present disclosure may be applied if the electronic apparatus 100 executes a hyperlink.

As described above, an application or a hyperlink can be executed by uttering only a part of a name of a corresponding executable icon.

If one of a first user motion and a second user motion is input through the motion input unit 120 in a motion task mode, the control unit 140 may display an application execution screen by enlarging or reducing the application execution screen in response to the recognized one of the first user motion and the second user motion if the application execution screen is enlargeable or reducible.

Specifically, if a motion start command is input through the motion input unit 120 when an application is executed, the control unit 140 changes a mode of the electronic apparatus 100 to a motion task mode. If one of the first user motion and the second user motion is input through the motion input unit 120, the control unit 140 recognizes the input one of the first user motion and the second user motion and enlarges or reduces the application execution screen in response to the recognized motion.

The first user motion may be a motion of moving both hands apart, and if the first user motion is recognized, the control unit 140 may display the application execution screen by enlarging it.

The second user motion may be a motion of pulling both hands closer to each other, and if the second user motion is recognized, the control unit 140 may display the application execution screen by reducing it.

If a third user motion is input through the motion input unit 120 in the motion task mode, the control unit 140 may recognize the third user motion and display the application execution screen by moving it in response to the third user motion. The third user motion may be a motion of moving one hand while maintaining a grab motion. The application execution screen is movable within the display screen of the electronic apparatus 100.

Hereinafter, a special gesture which is input to a web page will be explained with reference to FIGS. 130 to 133.

Figure 130:
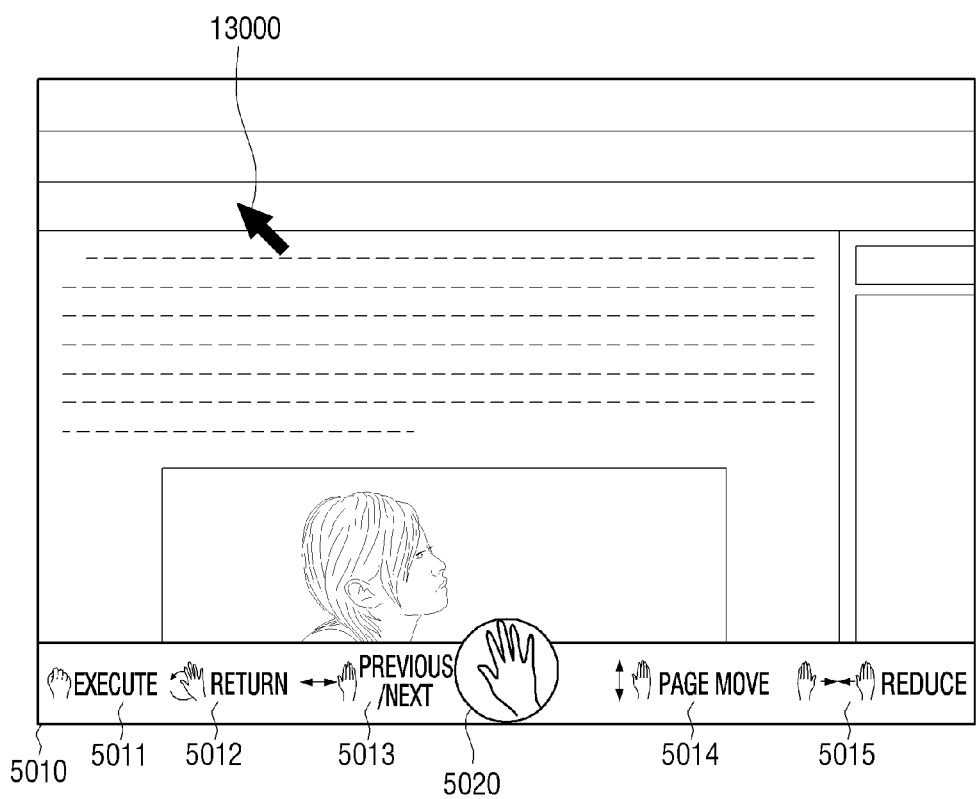
FIGS. 130 to 134 are views and a flowchart to explain performing of a task in accordance with a special gesture according to an exemplary embodiment.

If a web page is displayed and a motion start command is input through the motion input unit 120, the control unit 140 may display motion assistance information on a lower portion of the web page as shown in FIG. 130. Also, if the electronic apparatus 100 enters a motion task mode, the control unit 140 displays a pointer 13000 at a center of a display screen.

If the motion assistance information is displayed and a motion start command using both hands is input through the motion input unit 120, the control unit 140 enters a motion task mode using both hands.

Figure 131:
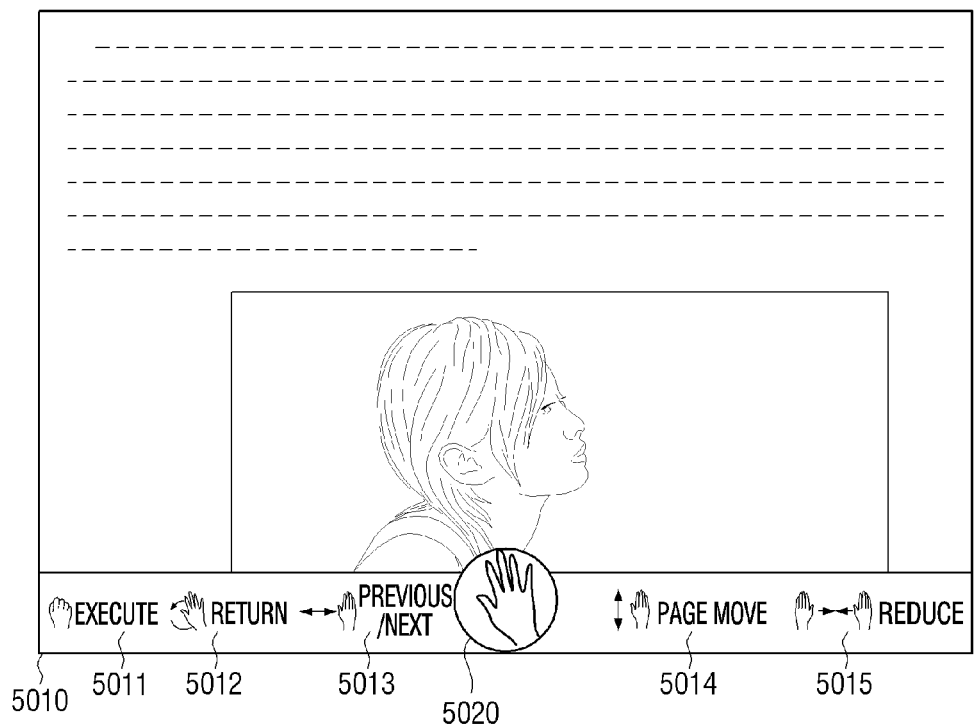

If a motion of moving both hands apart is input through the motion input unit 120 in the motion task mode using both hands, the control unit 140 enlarges a web page screen as shown in FIG. 131. When the web page screen is enlarged, the pointer may be removed.

Figure 132:
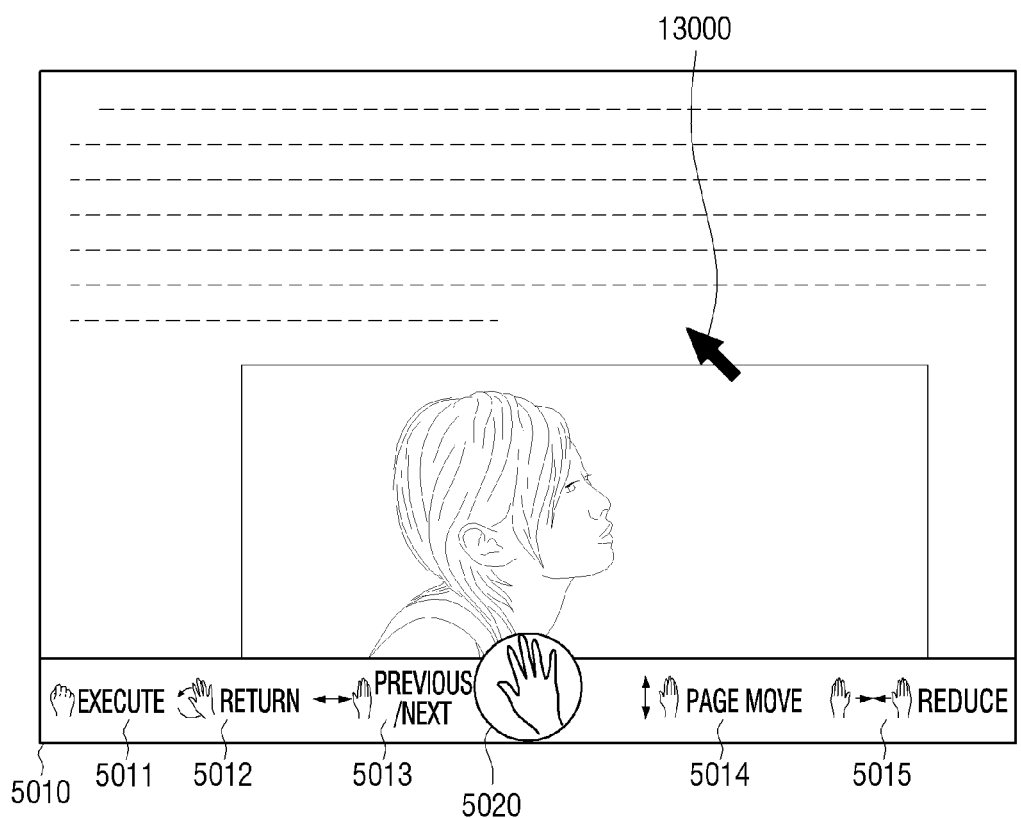

If the web page screen is enlarged, the control unit 140 displays the pointer 13000 again as shown in FIG. 132.

If the pointer 13000 is displayed and a motion of grabbing one hand and moving the grabbed hand is input through the motion input unit 120, the control unit 140 may move the display screen in accordance with the motion of grabbing one hand and moving the grabbed hand.

Figure 133:
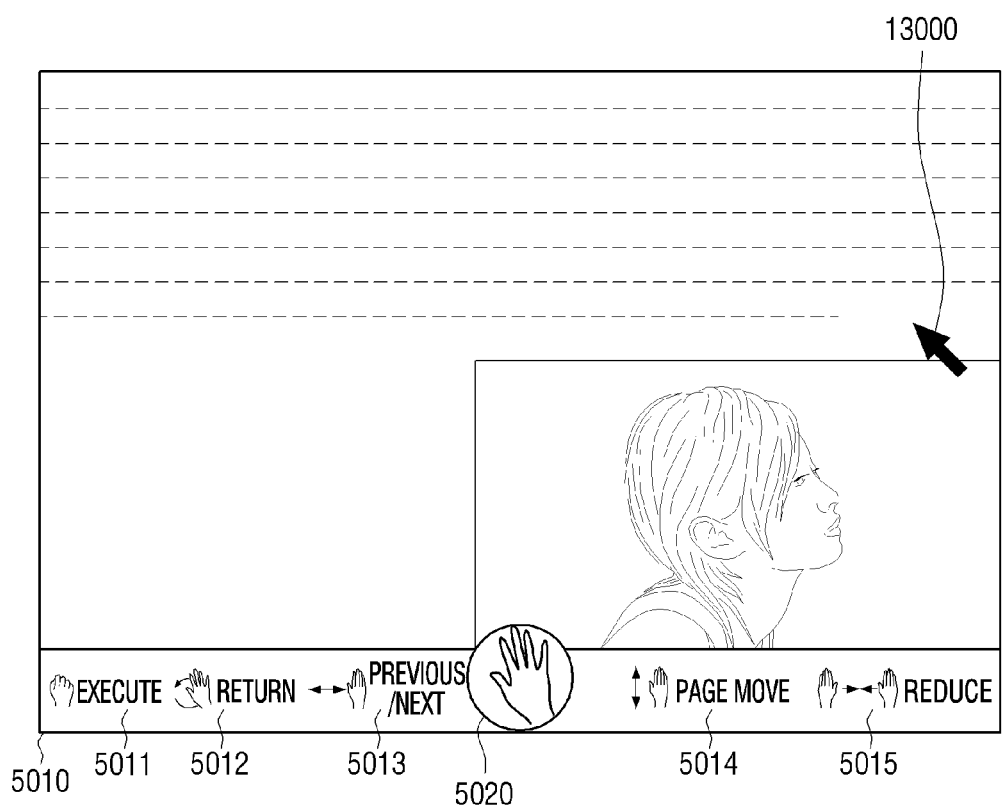

For example, if a motion of grabbing one hand and moving the grabbed hand in a rightward direction is input through the motion input unit 120, the control unit 140 may move the display screen in a rightward direction as shown in FIG. 133.

As described above, the user can move or enlarge or reduce the display screen of the electronic apparatus 100 using a user motion.

Figure 134:
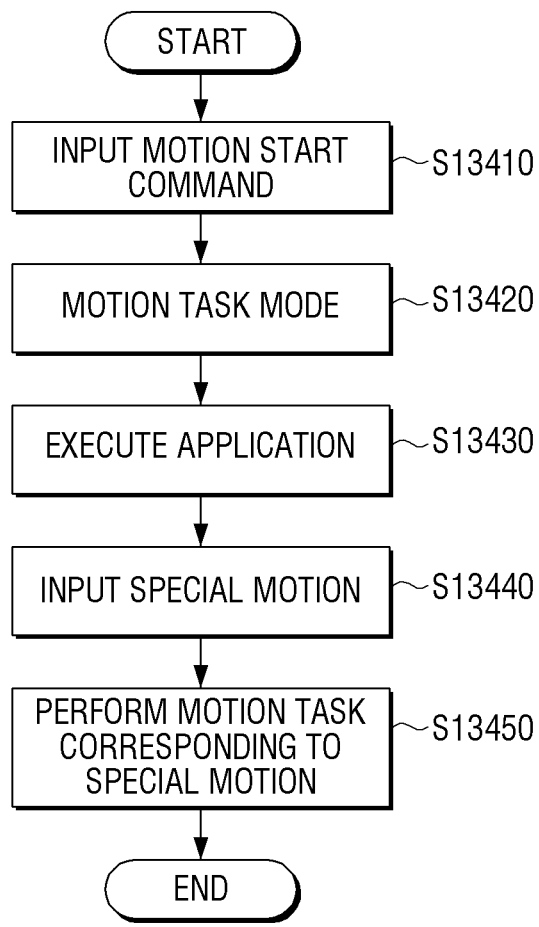

FIG. 134 is a flowchart illustrating a controlling method of the electronic apparatus 100 if a special gesture is input according to an exemplary embodiment.

The electronic apparatus 100 receives a motion start command through the motion input unit 120 (S13410).

If the motion start command is input, the electronic apparatus 100 recognizes the motion start command and changes a mode of the electronic apparatus 100 to a motion task mode (S13420). If the mode is changed to the motion task mode, the electronic apparatus 100 displays a pointer and motion assistance information to perform the motion task mode.

The electronic apparatus 100 executes an application in accordance with a user manipulation (S13430).

The electronic apparatus 100 receives input of a special motion through the motion input unit 120 (S13440). The special motion may be a motion of using both hands to enlarge or reduce a display screen or a motion of moving grabbed hand to move the display screen.

If the special motion is input, the electronic apparatus 100 performs a motion task corresponding to the special motion (S13450). For example, if a motion of pulling both hands closer to each other is input, the electronic apparatus 100 performs a task of reducing the display screen, and, if a motion of moving both hands apart is input, the electronic apparatus 100 performs a task of enlarging the display screen. If a motion of moving grabbed hand is input, the electronic apparatus 100 moves the display screen in a direction of the motion.

As described above, the user can move or enlarge or reduce the display screen using a user motion.

The control unit 140 may receive a voice start command through the voice input unit 110 included in the electronic apparatus 100 and also may receive a voice start command from an apparatus which communicates with the electronic apparatus 100.

Figure 135:
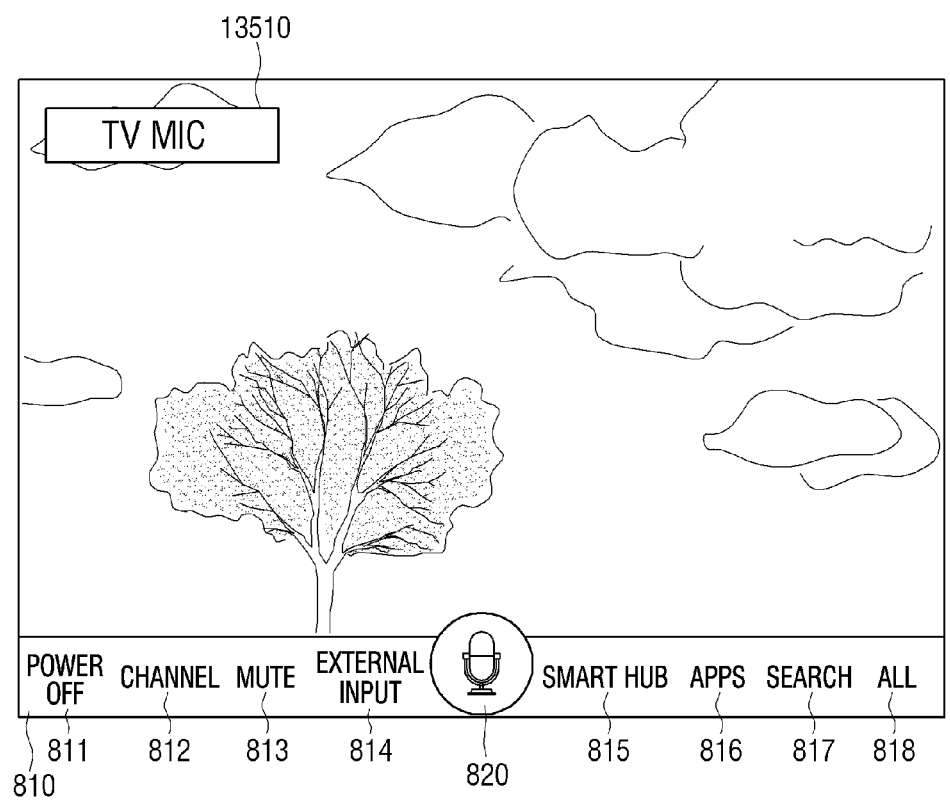
FIGS. 135 to 137 are views and a flowchart to explain an icon displayed differently depending on a voice input method according to an exemplary embodiment.

Voice recognition attained if a voice start command is input through the voice input unit 110 included in the electronic apparatus 100 is referred to as long-distance voice recognition. If the long-distance voice recognition is performed, an icon 13510 indicating the long-distance voice recognition may be displayed as shown in FIG. 135.

Specifically, if a voice start command is input from the voice input unit 110 included in the electronic apparatus 100, the control unit 140 changes a mode of the electronic apparatus 100 to a first voice task mode. The first voice task mode is a mode in which a voice task is performed in accordance with a user voice input from the voice input unit 110 included in the electronic apparatus 100. If the mode is changed to the first voice task mode, the control unit 140 may display the icon 13510 indicating the long-distance voice recognition.

If the icon indicating the long-distance voice recognition is displayed and a user voice is not input to the voice input unit 110 included in the electronic apparatus 100 for a predetermined time, the control unit 140 releases the first voice task mode and changes the mode of the electronic apparatus 100 to a remote control mode in which the electronic apparatus 100 is controlled by a remote controller.

Figure 136:
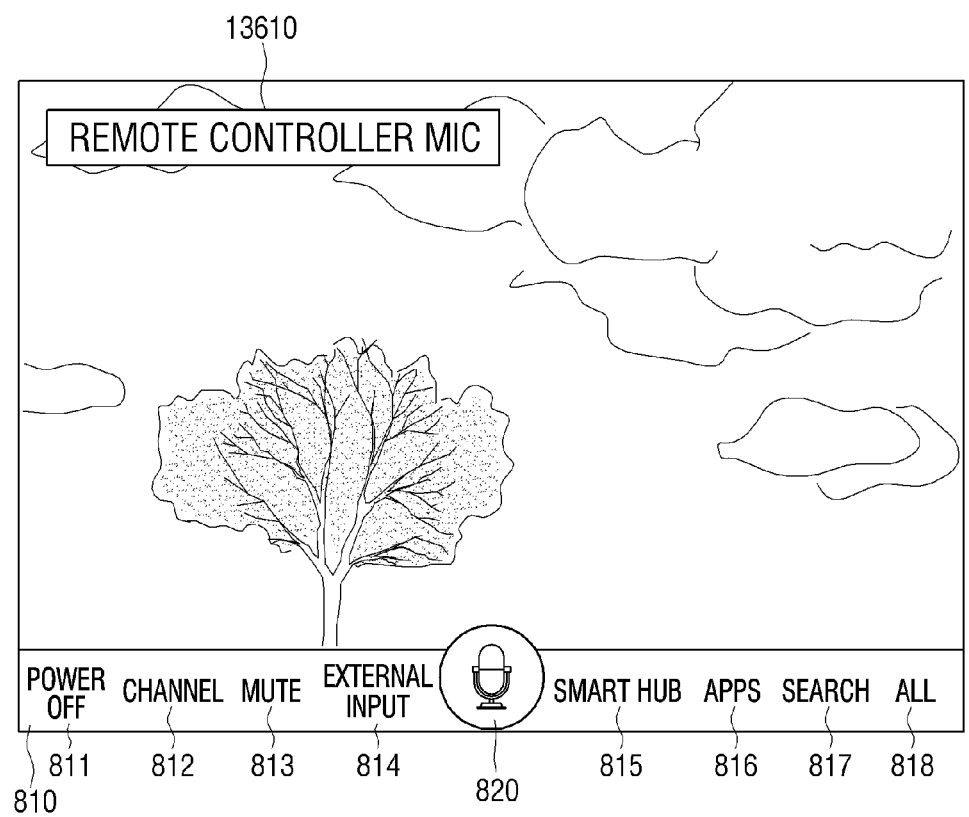

Voice recognition attained if a voice start command is input from an apparatus which communicates with the electronic apparatus 100 is referred to as short-distance voice recognition. If the short-distance voice recognition is performed, an icon 13610 indicating the short-distance voice recognition may be displayed as shown in FIG. 136. The apparatus which communicates with the electronic apparatus 100 may be, but not limited to, a remote controller or a mobile phone. The apparatus may communicate with the electronic apparatus 100 through a wired or wireless connection, over a network, etc. The apparatus may be paired with the electronic apparatus 100 through a pairing process.

The voice start command input from the apparatus which communicates with the electronic apparatus 100 may be one of a signal that corresponds to a specific button (voice task mode change button) included in the apparatus which communicates with the electronic apparatus 100 and a specific user voice that is input through a microphone included in the apparatus which communicates with the electronic apparatus 100.

If the voice start command is input from the apparatus which communicates with the electronic apparatus 100, the control unit 140 changes a mode of the electronic apparatus

100 to a second voice task mode. The second voice task mode is a mode in which a voice task is performed in accordance with a user voice input through the microphone included in the apparatus which communicates with the electronic apparatus 100. If the mode is changed to the second voice task mode, the control unit 140 may display the icon 13610 indicating the short-distance voice recognition.

If the icon indicating the short-distance voice recognition is displayed and a user voice is not input to the microphone included in the apparatus which communicates with the electronic apparatus 100 for a predetermined time, the control unit 140 releases the second voice task mode and changes the mode of the electronic apparatus 100 to a remote control mode in which the electronic apparatus 100 is controlled by a remote controller.

Figure 137:
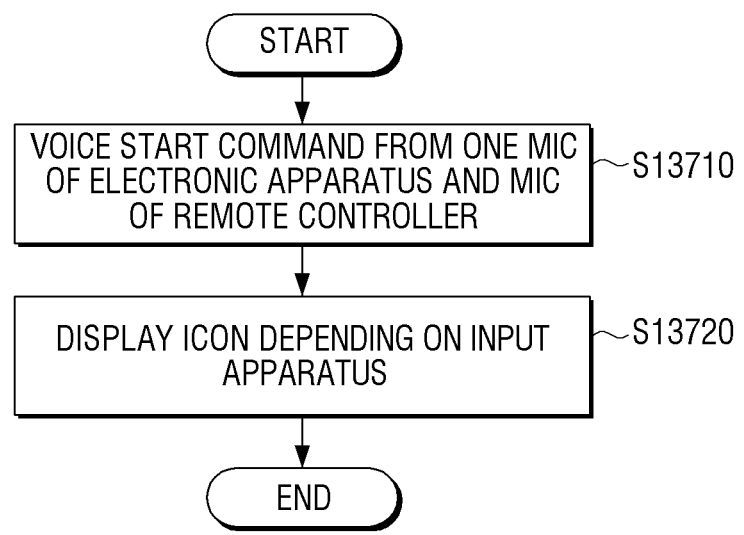

FIG. 137 is a flowchart to explain a controlling method of the electronic apparatus 100 which provides a different icon depending on a voice input method according to an exemplary embodiment.

The electronic apparatus 100 receives a voice start command from one of a microphone included in the electronic apparatus 100 and a microphone included in a remote controller (S13710). If the voice start command is input from the microphone included in the electronic apparatus 100, the electronic apparatus 100 changes a mode of the electronic apparatus 100 to a long-distance voice task mode. If the voice start command is input from the microphone included in the remote controller, the electronic apparatus 100 changes the mode of the electronic apparatus 100 to a short-distance voice task mode.

The electronic apparatus 100 may display an icon differently depending on the apparatus from which the voice start command is input (S13720). Specifically, if the voice start command is input from the microphone included in the electronic apparatus 100, the electronic apparatus 100 displays an icon indicating the long-distance voice task mode, and, if the voice start command is input from the microphone included in the remote controller, the electronic apparatus 100 displays an icon indicating the short-distance voice task mode.

As described above, the voice task mode is divided depending on the apparatus from which the voice start command is input and the different icon is displayed depending on the voice task mode, so that the user can know which apparatus should be used to perform the voice task mode.

After performing voice recognition, the control unit 140 displays a text input correction menu (for example, an input method editor (IME)) to correct a text corresponding to a recognized voice in order to recognize a voice more exactly.

For example, if a voice start command is input through the voice input unit 110, the control unit 140 displays voice assistance information to perform a voice task, which is controlled in accordance with a user voice input through the voice input unit 110.

If a first user voice to perform a task requiring text input is input, the control unit 140 displays a text input window for text input. The task requiring text input may be, but not limited to, web page surfing.

If a second user voice to input a text on the text input window is input, the control unit 140 may display a text corresponding to the input second user voice on the text input window and may display a text input menu.

The control unit 140 displays a previous screen while recognizing the user voice, and displays a text on the text input window after recognizing the second user voice to input a text on the text input window. The control unit 140 may display the text input menu.

If a plurality of candidate search words including the text input to the text input window exist, the control unit 140 displays a list of candidate search words by overlapping it with the text input menu.

If the text input on the text input window is completed or the text input on the text input window is canceled, the control unit 140 may remove the text input menu from the display screen.

Hereinafter, a method for displaying a text input menu according to an exemplary embodiment will be explained with reference to FIGS. 138 to 141.

Figure 138:
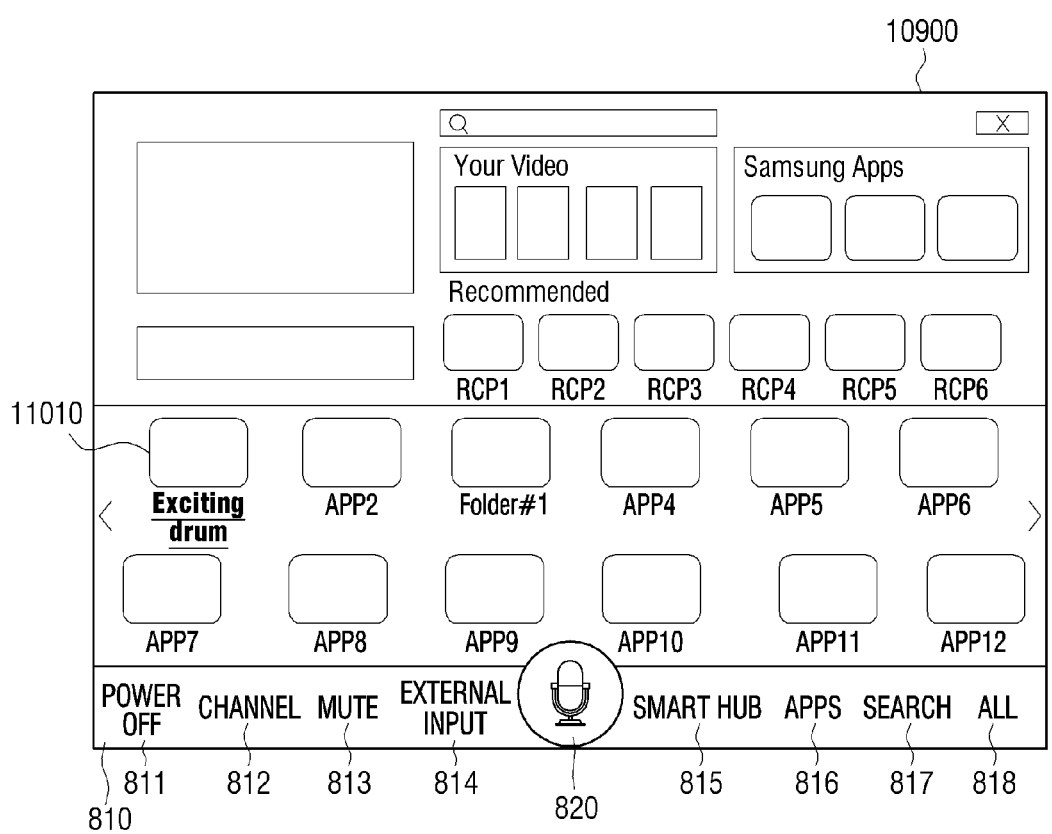
FIGS. 138 to 142 are views and a flowchart to explain a method for displaying a text input menu according to an exemplary embodiment.

If a voice start command is input through the voice input unit 110 when a web page is displayed, the control unit 140 displays voice assistance information as shown in FIG. 138.

If a user voice (for example, "search") corresponding to a "search" voice item is input through the voice input unit 110, the control unit 110 displays a text input window 13910.

Figure 139:
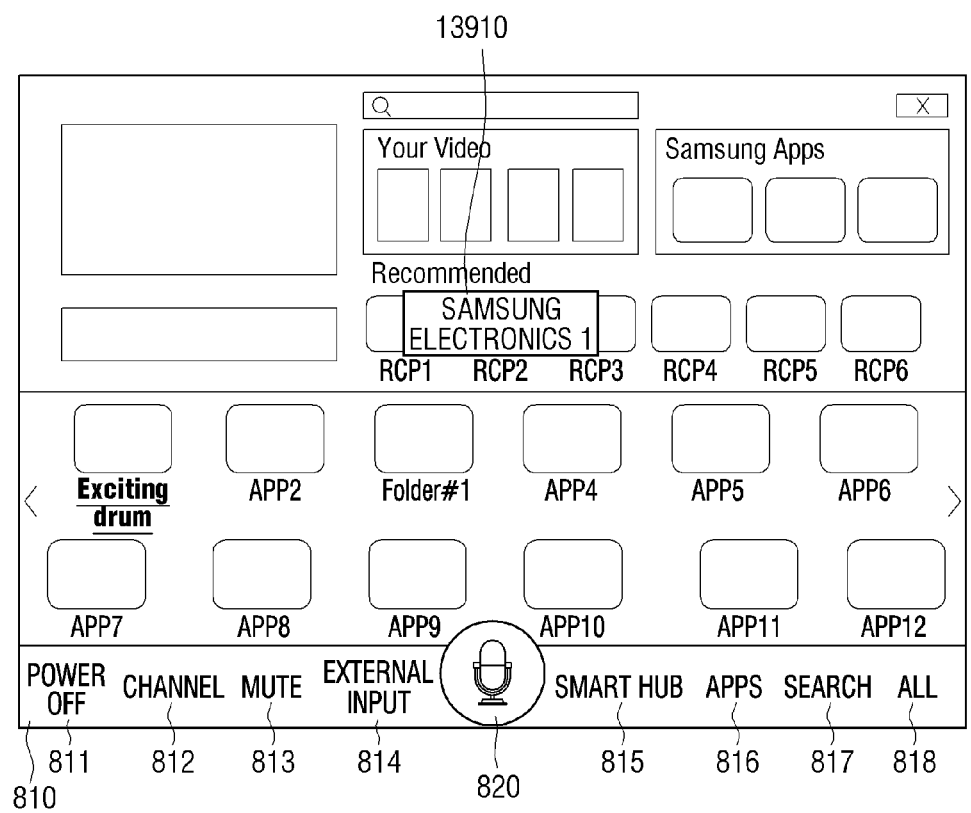

If a user voice (for example, "Samsung Electronics") to input a text on the text input window 13910 is input, the control unit 140 recognizes the user voice and displays the recognized user voice on the text input window 13910. That is, the control unit 140 inputs and displays "Samsung Electronics" in the text input window 13910 as shown in FIG. 139.

Figure 140:
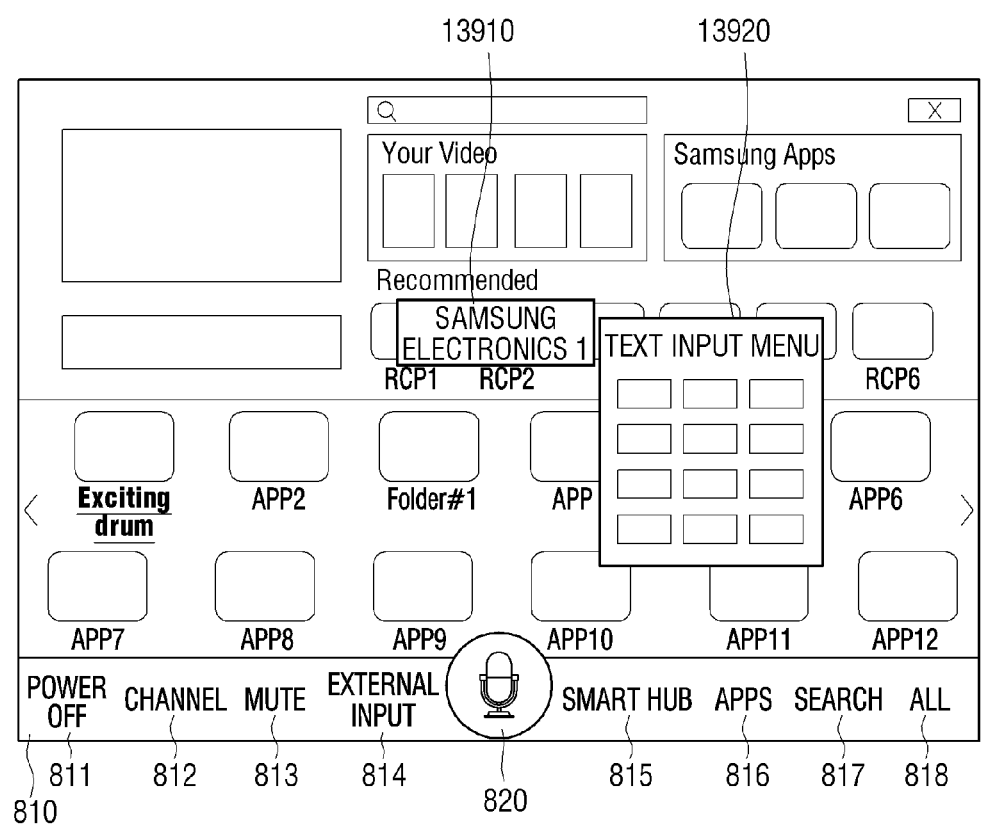

If "Samsung Electronics" is input on the text input window 13910, the control unit 140 displays a text input menu 13920 on one side of the text input window as shown in FIG. 140. The text input menu is a menu to correct a text if the text input on the text input window is not correct.

Figure 141:
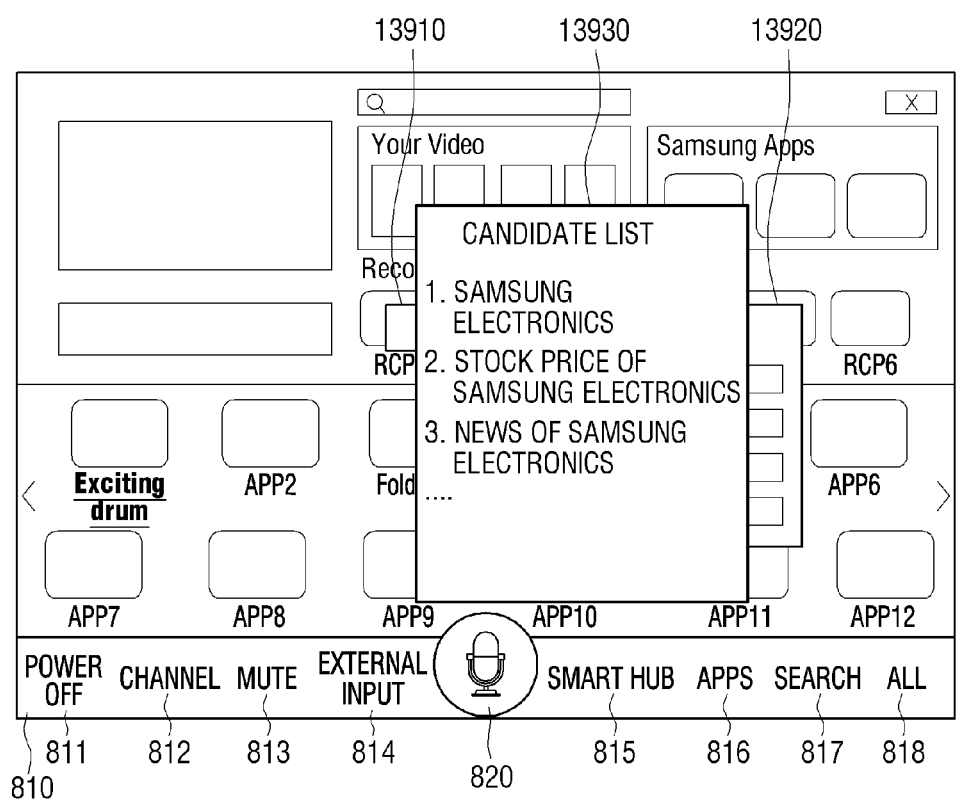

If a plurality of candidate search words including "Samsung Electronics" input on the text input window 13910 exist, the control unit 140 displays a list of candidate search words 13930. For example, if the candidate search words including "Samsung Electronics" include "Samsung Electronics", "Stock Price of Samsung Electronics", and "News of Samsung Electronics", the control unit 140 displays the list of candidate search words 13930 as shown in FIG. 141.

Figure 142:
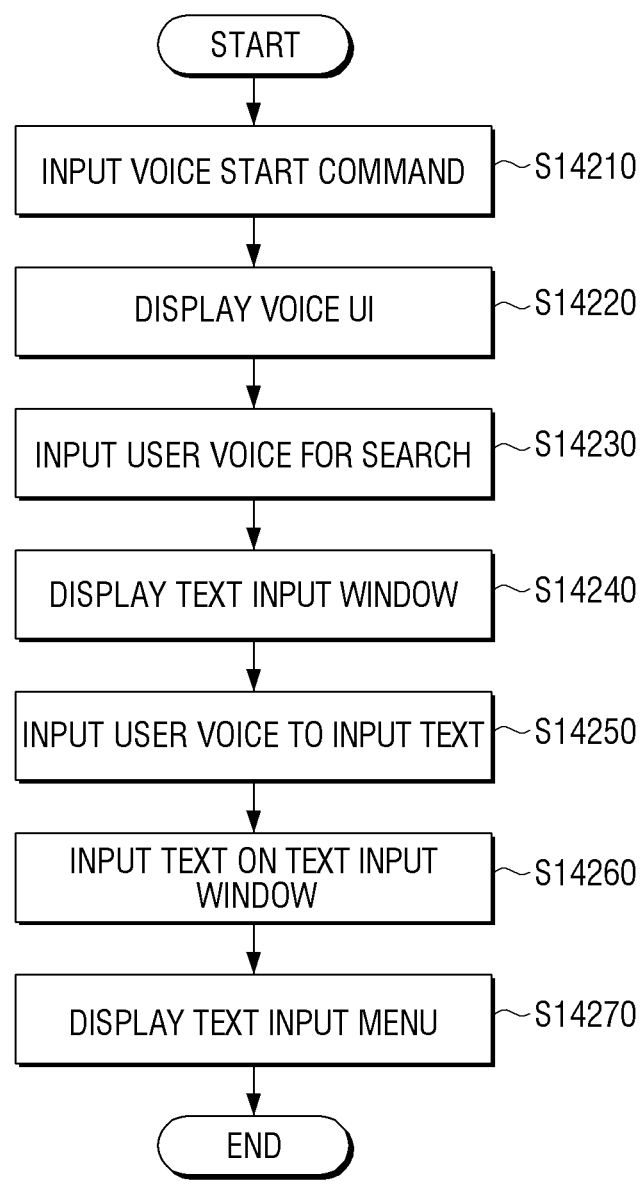

FIG. 142 is a flowchart to explain a controlling method of the electronic apparatus which displays a text input menu (IME) according to an exemplary embodiment.

The electronic apparatus 100 receives a voice start command through the voice input unit 110 (S14210). The electronic apparatus 100 may display a content list including a plurality of executable icons and a web page including a plurality of hyperlinks.

If the voice start command is input, the electronic apparatus 100 changes a mode of the electronic apparatus 100 to a voice task mode and displays voice assistance information to perform the voice task mod (S14220).

The electronic apparatus 100 receives input of a user voice to conduct a search through the voice input unit 110 (S14230).

The electronic apparatus 100 displays a text input window to conduct the search (S14240).

If the text input window is displayed, the electronic apparatus 100 receives input of a user voice to input a text on the text input window through the voice input unit 110 (S14250).

If the user voice to input a text is input, the electronic apparatus 100 inputs a text corresponding to the input user voice on the text input window (S14260).

If the text is input on the text input window, the electronic apparatus 100 displays a text input menu (S14270). The text input menu is a menu to correct the text input on the text input window if voice recognition is not clear.

Accordingly, if the user voice input to the voice input unit 110 is not perfectly recognized, the user can supplement voice recognition using the text input menu.

The control unit 140 may recognize a voice using an external apparatus.

Specifically, if a voice start command is input through the voice input unit 110, the control unit 140 displays voice assistance information to guide a voice task which is performed in accordance with a user voice input through an apparatus which communicates with the electronic apparatus 100 (for example, a remote controller). If a first voice input button included in the external apparatus which communicates with the electronic apparatus 100 is selected, the control unit 140 displays a first guide message guiding a voice search in the voice assistance information. For example, a guide message, "Please press a voice search button and then input a voice", may be displayed.

The control unit 140 recognizes a user voice through the voice input unit 110, while a second voice input button included in the external apparatus is selected. The voice input unit 110 receives a user voice input to a microphone of the external apparatus and transmits the user voice to the control unit 140. The control unit 140 displays a second guide message including information indicating that a user voice is input through the voice input unit 110 in the voice assistance information. For example, a guide message, "User voice is being recognized", may be displayed.

The control unit 140 may input the recognized user voice on a text input window as a text. The control unit 140 may perform a voice task corresponding to the recognized user voice.

If selection of the second voice input button is released, the control unit 140 may display a third guide message confirming whether input of the user voice is completed or not in the voice assistance information. The third guide message may include a message asking whether to continue to input a user voice or not, a message asking whether the input user voice is completed or not, and a message asking whether to cancel the input user voice.

If a user voice is input by selecting the second voice input button again while the third guide message is displayed, the control unit 140 may recognize the input user voice continuously in addition to the previously recognized user voice. For example, if the previously recognized user voice is "Samsung" and a user voice, "Electronics", is input by selecting the second voice input button again, the control unit 140 may input "Samsung Electronics" on the text input window.

The first voice input button is a voice input button and the second voice input button is a voice search button. The first voice input button and the second voice input button may be different from each other or may be the same button.

Figure 143:
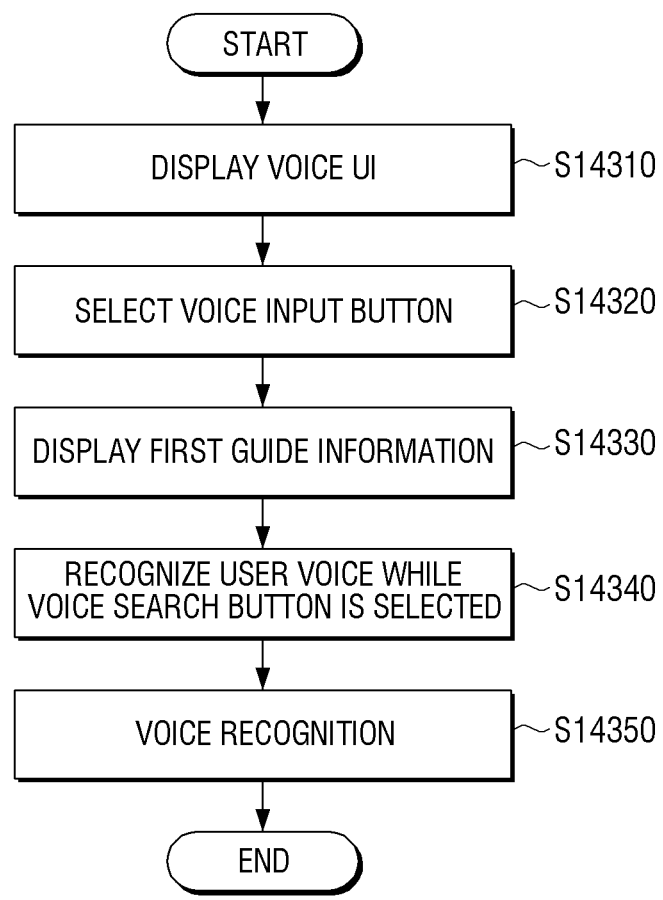
FIG. 143 is a flowchart to explain a method for performing a voice task using an external apparatus according to an exemplary embodiment.

FIG. 143 is a flowchart to explain a method for performing a voice task using an external apparatus according to an exemplary embodiment.

The electronic apparatus 100 displays voice assistance information to perform a voice task mode (S14310).

An external apparatus selects a voice input button in accordance with a user manipulation (S14320).

If the voice input button is selected, the electronic apparatus 100 displays a first guide message (S14330). The first guide message is a UI guiding a voice search in the voice assistance information.

The electronic apparatus 100 receives input of a user voice through the voice input unit 110, while a voice search button on the external apparatus is selected (S14340). The voice input unit 110 may be a communication unit that receives a user voice input from the external apparatus.

The electronic apparatus 100 recognizes the user voice input through the voice input unit 110 using the voice recognition module 130k (S14350).

In the above exemplary embodiment, the voice input button and the voice search button may be the same button.

As described above, the voice is input while the voice search button on the external apparatus is selected, so that undesirable voice recognition can be prevented.

If an utterable name is displayed on the display screen, the control unit 140 may extract the name and display it distinctively. If a name is input through the voice input unit 110, the control unit 140 performs a voice task corresponding to the name.

Specifically, if a voice start command is input through the voice input unit 110, the control unit 140 changes a mode of the electronic apparatus 100 to a voice task mode to perform a voice task in response to the input voice start command, and displays voice assistance information to perform the voice task mode.

The control unit 140 extracts texts of selectable items from the display screen. The display screen may display a content list including a plurality of executable icons for executing an application or a web page. The selectable item may be one of an executable icon included in the content list for executing an application and a hyperlink included in the web page.

If a text of a name of an item has a number of characters exceeding a predetermined number, the control unit 140 extracts only a text having a number of characters smaller than the predetermined number from among the entire text of the name of the item, and displays the text.

The control unit 140 may display the item from which the text is extracted distinctively from other items from which texts are not extracted.

If a user voice input through the voice input unit 110 is consistent with the extracted text, the control unit 140 executes the item corresponding to the text.

If the user voice input through the voice input unit 110 is consistent with the extracted text having a number of characters smaller than the predetermined number, the control unit 140 executes the item corresponding to the text having a number of characters smaller than the predetermined number.

Hereinafter, a case in which an utterable command is displayed on a display screen will be explained with reference to FIGS. 144 and 145.

The control unit 140 changes a mode of the electronic apparatus 100 to a voice task mode in response to a voice start command input through the voice input unit 110. The control unit 140 displays voice assistance information on a lower portion of the display screen.

Figure 144:
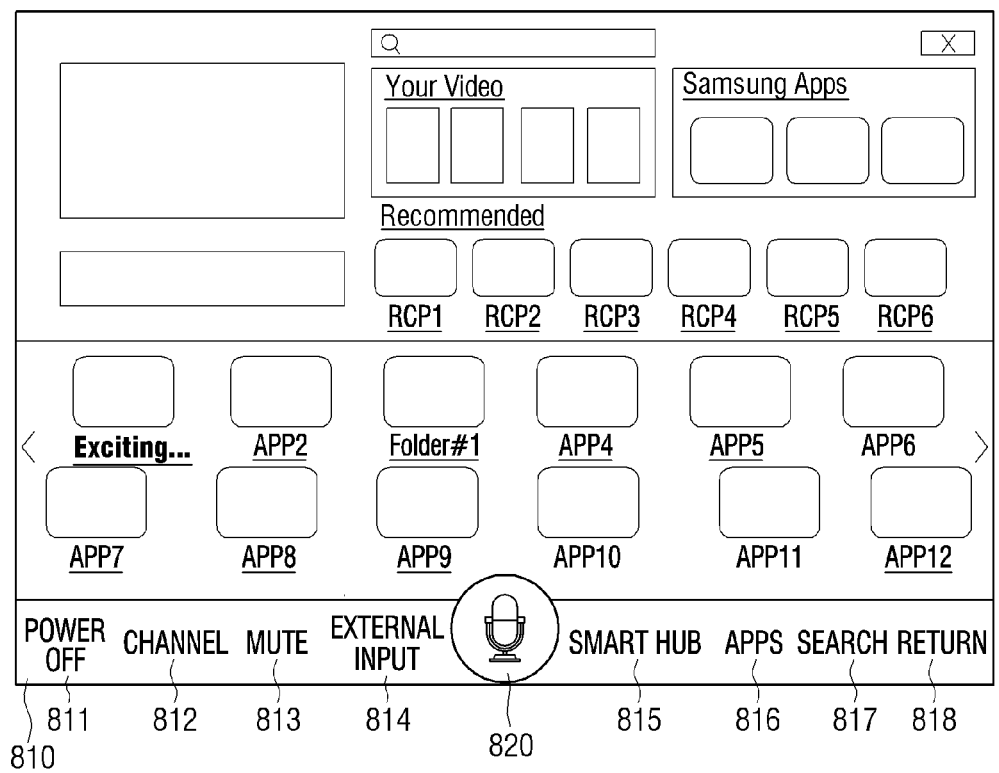

If "smart hub" is input through the voice input unit 110, the control unit 140 generates a content list including a plurality of executable icons for executing an application and displays the content list as shown in FIG. 144.

The control unit 140 extracts names of the plurality of executable icons.

If a name of an executable icon is extracted, the control unit 140 underlines the name of the executable icon as shown in FIG. 144, and, if a name of an executable icon (for example, APP10 and APP11) is not extracted, the control unit 140 does not underline the name of the executable icon.

If a name of an executable icon has a number of characters exceeding a predetermined number, the control unit 140 extracts a part of the name of the executable icon and displays the part of the name. For example, if a name of an executable icon is "Exciting Drum", the control unit 140 extracts a part of the name of the executable icon, "Exciting", and displays the part of the name as shown in FIG. 144. In order to indicate that "Exciting" is a part of the name, the control unit 140 may display " . . . " after "Exciting".

If the extracted name of the executable icon is displayed and the name of the executable icon is input through the voice input unit 110, the control unit 140 executes the executable icon. For example, if "Exciting" is input through the voice input unit 110, the control unit 140 executes the application, "Exciting Drum", as shown in FIG. 145.

Figure 146:
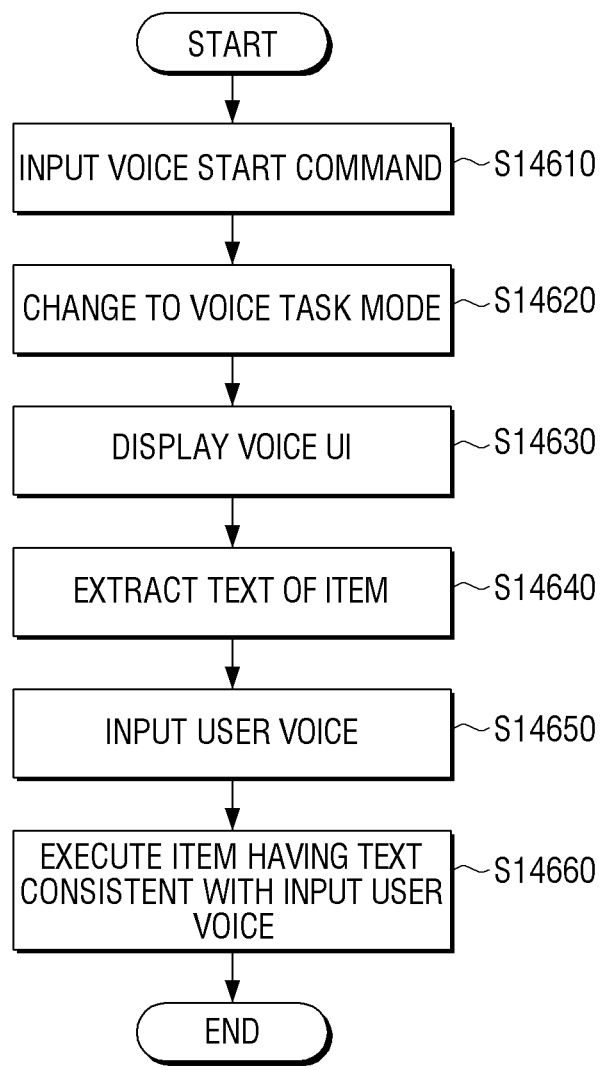

FIG. 146 is a flowchart to explain a method for performing a voice task if an utterable command is displayed on a display screen according to an exemplary embodiment.

The electronic apparatus 100 receives a voice start command through the voice input unit 110 (S14610).

The electronic apparatus 100 changes a mode of the electronic apparatus 100 to a voice task mode in response to the voice start command input through the voice input unit 110 (S14620).

The electronic apparatus 100 displays voice assistance information to perform the voice task mode on a lower portion of the display screen (S14630).

The electronic apparatus 100 extracts a text of an item included in the display screen (S14640). The item may be a name of an executable icon included in a content list or a text of a hyperlink included in a web page.

The electronic apparatus 100 receives input of a user voice through the voice input unit 110 (S14650).

If there is an item having a text consistent with the user voice input through the voice input unit 110, the electronic apparatus 100 executes the corresponding item (S14660). If only a part of the text is displayed and a user voice consistent with the part of the text is input, the control unit 140 may execute the corresponding item.

As described above, the name of the text is extracted and distinctively displayed, so that the user can use voice recognition more easily.

While a user voice is input through the voice input unit 110, if there is only one hyperlink that has a text including in the input user voice, the control unit 140 may execute the hyperlink corresponding to the text.

Specifically, if a voice start command is input through the voice input unit 110, the control unit 140 changes a mode of the electronic apparatus 100 to a voice task mode, in which the electronic apparatus 100 is controlled in accordance with a user voice input through the voice input unit 110, in response to the voice start command.

In the voice task mode, the control unit 140 extracts texts of a plurality of hyperlinks from a web page including the plurality of hyperlinks.

After extracting the texts, the control unit 140 may display the extracted texts distinctively from un-extracted texts. For example, the control unit 140 may underline the extracted text, display it thick, or highlight it.

While a user voice is input through the voice input unit 110, if there is only one hyperlink that has a text including the input user voice, the control unit 140 executes the hyperlink corresponding to the text. For example, if the user voice input through the voice input unit 110 is "Samsung Electronics" and the only text extracted from the hyperlink is "Samsung Electronics", the control unit 140 executes the hyperlink having the text "Samsung Electronics".

While a user voice is input through the voice input unit 110, if there is only one hyperlink whose text is consistent with the input user voice in part rather than in whole, the control unit 140 may execute the hyperlink corresponding to the text.

In the above exemplary embodiment, the method for executing a hyperlink included in a web page has been described. However, this is merely an example and the technical idea of the present disclosure may be applied to a method for executing an executable icon included in a content list for executing an application.

Figure 147:
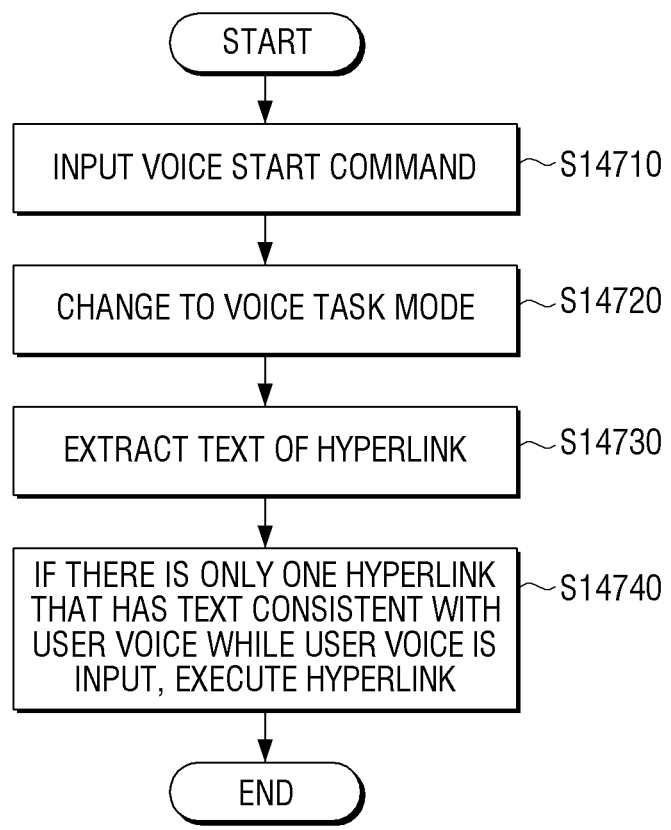
FIG. 147 is a flowchart to explain a method for recognizing a voice automatically according to an exemplary embodiment.

FIG. 147 is a flowchart to explain an auto voice recognition method according to an exemplary embodiment.

The electronic apparatus 100 receives a voice start command through the voice input unit 110 (S14710).

The electronic apparatus 100 changes a mode of the electronic apparatus 100 to a voice task mode in response to the voice start command input through the voice input unit 110 (S14720).

If a hyperlink is included in the display screen of the electronic apparatus 100, the electronic apparatus 100 extracts a text of the hyperlink (S14730).

The electronic apparatus 100 receives input of a user voice through the voice input unit 110. If there is one hyperlink that includes a text consistent with the input user voice while the user voice is input, the electronic apparatus 100 executes the corresponding hyperlink (S14740). The text consistent with the user voice may be an entire text of the hyperlink. However, this is merely an example and the text consistent with the user voice may be a part of the text of the hyperlink.

As described above, if there is only one text consistent with the user voice, the corresponding hyperlink is automatically executed, so that the user can execute the hyperlink more easily using voice recognition.

If an input user voice is recognized and there are a plurality of hyperlinks that have a text consistent with the recognized user voice, the control unit 140 displays a list of a candidate group including the hyperlinks having the text consistent with the recognized voice user.

Specifically, if a voice start command is input through the voice input unit 110, the control unit 140 changes a mode of the electronic apparatus 100 to a voice task mode, in which the electronic apparatus 100 is controlled in accordance with a user voice input through the voice input unit 110, in response to the voice start command.

The display screen displays a web page including a plurality of hyperlinks.

The control unit 140 extracts texts included in the plurality of hyperlinks included in the web page. The control unit 140 may display the extracted text distinctively from the un-extracted text. For example, the control unit 140 may underline the extracted text, display it thick, or highlight it.

If a user voice is input through the voice input unit 110, the control unit 140 recognizes the input user voice, and, if there are a plurality of hyperlinks that have a text consistent with the recognized user voice, the control unit 140 displays a list of a candidate group including the hyperlinks having the text consistent with the recognized user voice. For example, if the user voice input to the voice input unit 110 is "Samsung Electronics", the control unit 140 may generate a list of a candidate group including hyperlinks having a text including "Samsung Electronics".

If a user voice is re-input through the voice input unit 110, the control unit 140 may recognize the re-input user voice and may change the list of the candidate group based on the re-input user voice. For example, if "Samsung Electronics" is recognized and "Stock" is re-input, the control unit 140 may change the list of the candidate group to include only a hyperlink that has a text including "Samsung Electronics Stock".

If the voice task mode is released, the control unit 140 may remove the list of the candidate group from the display screen.

Figure 148:
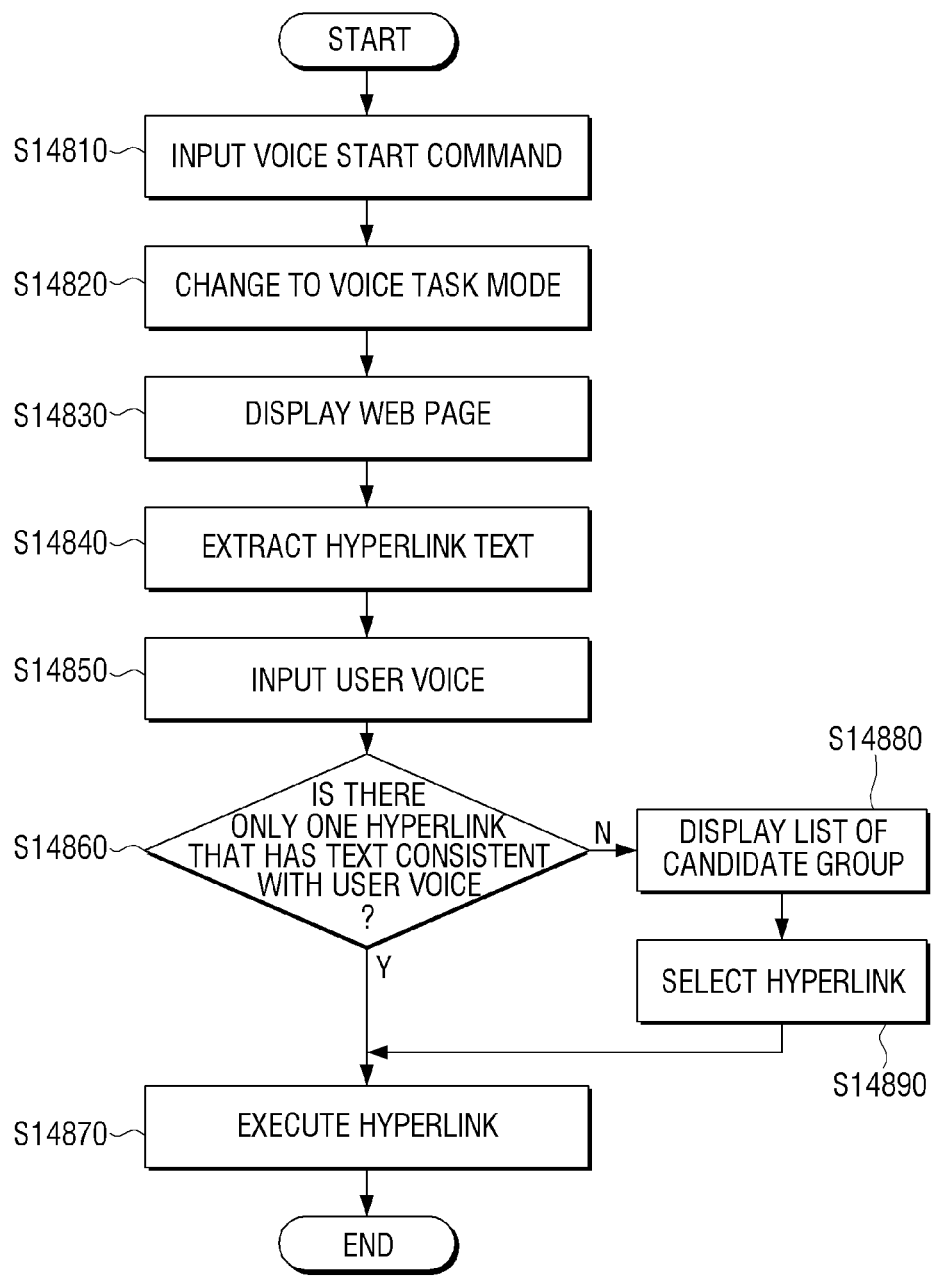

FIG. 148 is a flowchart to explain a method for displaying a list of a candidate group according to an exemplary embodiment.

The electronic apparatus 100 receives a voice start command through the voice input unit 110 (S14810).

The electronic apparatus 100 changes a mode of the electronic apparatus 100 to a voice task mode in response to the voice start command input through the voice input unit 110 (S14820).

The electronic apparatus 100 displays a web page on the display screen according to a user manipulation (S14830). The web page includes a plurality of hyperlinks.

The electronic apparatus 100 extracts texts of the hyperlinks included in the web page (S14840).

The electronic apparatus 100 receives input of a user voice through the voice input unit 110 (S14850).

The electronic apparatus 100 determines whether there is only one hyperlink that has a text consistent with the user voice (S14860).

If there is only one hyperlink that has the text consistent with the user voice (S14860-Y), the control unit 140 executes the corresponding hyperlink (S14870).

However, if there are a plurality of hyperlinks that have the text consistent with the user voice (S14860-N), the control unit 140 generates a list of a candidate group including the plurality of hyperlinks and displays the list of the candidate group (S14880). The control unit 140 selects a hyperlink according to a user manipulation (for example, inputting a text of a hyperlink as a voice) (S14890), and executes the selected hyperlink (S14870).

As described above, the list of the candidate group is generated, so that, even if there is a plurality of hyperlinks that are consistent with the user voice, the user can execute a desirable hyperlink using the list of the candidate group.

If a level of a user voice input through the voice input unit 110 is lower than a predetermined level, the control unit 140 may display a feedback UI indicating that a user voice is irrecognizable on a first area of voice assistance information.

Specifically, if a voice start command is input through the voice input unit 110, the control unit 140 changes a mode of the electronic apparatus 100 to a voice task mode, in which the electronic apparatus 100 is controlled in accordance with a user voice input through the voice input unit 110, in response to the voice start command.

In the voice task mode, the control unit 140 displays voice assistance information guiding a voice task which is performed in accordance with a user voice input through the voice input unit 110. The voice assistance information may be displayed on a lower portion of the display screen.

The voice input unit 110 receives input of a user voice.

If the user voice input through the voice input unit 110 is lower than a predetermined volume, the control unit 140 displays a feedback UI indicating that the user voice is irrecognizable on a first area of the voice assistance information. The feedback UI may include a GUI representing the predetermined volume and a volume of the user voice input through the voice input unit 110 in the form of a bar. The first area may be located on a lower portion of the voice assistance information.

Also, the control unit 140 may display a message that a user voice should be higher than the predetermined volume in the voice assistance information. For example, a message, "Please say louder", may be displayed.

Figure 149:
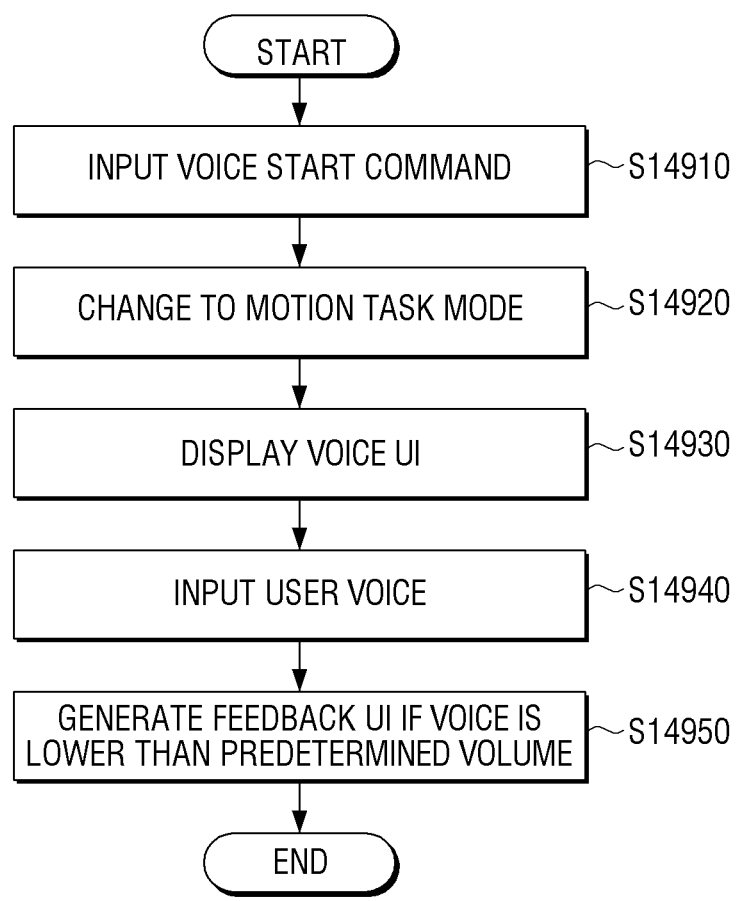

FIG. 149 is a flowchart to explain a UI to guide a voice recognition error according to an exemplary embodiment.

The electronic apparatus 100 receives a voice start command through the voice input unit 110 (S14910).

The electronic apparatus 100 changes a mode of the electronic apparatus 100 to a voice task mode in response to the voice start command input through the voice input unit 110 (S14920).

The electronic apparatus 100 displays voice assistance information to perform the voice task mode on a lower portion of the display screen (S14930).

The electronic apparatus 100 receives input of a user voice through the voice input unit 110 (S14940).

If a level of the user voice input through the voice input unit 110 is lower than a predetermined level, the electronic apparatus 100 displays a feedback UI (S14950). The feedback UI may a UI including a message that the user voice is unrecognizable because the level of the user voice is lower than a predetermined level and a message that the user should utter louder.

As described above, if the user voice is so small that the voice is unrecognizable, the electronic apparatus 100 informs that the voice is unrecognizable, so that the user can easily recognize that the voice is unrecognizable and thus can easily solve it.

As described above, the user can control the electronic apparatus 100 more efficiently and intuitively through one of the user voice and the user motion.

In the above exemplary embodiments, user motions are described (such as a user motion a motion start command which is set as a motion of shaking one hand horizontally 3~4 times). These exemplary embodiments should not be considered limiting, however, as the exemplary embodiments can be realized by any user motion.

In the above exemplary embodiments, user voice commands are described. These exemplary embodiments should not be considered limiting, however, as the exemplary embodiments can be realized by any user voice input.

In the above exemplary embodiment, the voice input unit 110 may be realized by a microphone that receives input of a user voice directly, or by an interface that receives a voice signal input to the microphone. Likewise, the motion input unit 120 may be realized by a camera that directly photographs the user, or may be realized by an interface that receives data photographed by the camera.

The electronic apparatus 100 described above may be realized by a TV. However, this should not be considered as limiting and the electronic apparatus 100 may be realized by various apparatuses such as a set-top box, a PC, a laptop computer, a tablet PC, an electronic album, an electronic book, a PDA, a mobile phone, etc.

Also, referring to FIG. 3, various software modules are stored in the storage unit 130. However, the software modules are not necessarily stored in one storage unit 130.

That is, the voice recognition module and the motion recognition module may be stored in separate storage units, respectively. Accordingly, the voice recognition module may recognize a user voice from a voice signal input from a microphone and may provide a result of the recognition to the control unit 140. Also, the motion recognition module may recognize a user motion using an image signal photographed by a camera and may provide a result of the recognition to the control unit 140.

Also, the voice recognition module and the motion recognition module may be stored in separate external apparatuses, respectively. For example, a voice recognition apparatus including a microphone may recognize a user voice using a voice recognition module and then may provide a result of the recognition to the electronic apparatus 100. Likewise, a motion recognition apparatus including a camera may recognize a user motion using a motion recognition module and then may provide a result of the recognition to the electronic apparatus 100.

A program code to perform the above-described controlling methods may be stored in various types of recording media. Specifically, the program code may be stored in various types of recording media readable by a terminal apparatus, such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, a CD-ROM, etc.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for controlling an electronic apparatus, the method comprising:
    displaying, by using a processor, voice assistance information comprising a plurality of voice items on a screen of the electronic apparatus, each of the plurality of voice items corresponding to a voice task in a voice task mode;
    recognizing, by using a processor, a first voice command corresponding to a first voice item from among the plurality of voice items;
    performing, by using a processor, a first voice task corresponding to the first voice item;
    displaying, by using a processor, motion assistance information comprising a plurality of simultaneously displayed motion items on a screen of the electronic apparatus, each of the plurality of simultaneously displayed motion items corresponding to a motion task in a motion task mode;
    recognizing, by using a processor, a first motion gesture corresponding to a first motion item from among the plurality of simultaneously displayed motion items; and
    performing, by using a processor, a first motion task corresponding to the first motion item,
    wherein the performing the first voice task comprises displaying additional item information regarding the first voice item,
    wherein the performing the first voice task further comprises recognizing a second voice command corresponding to the additional item information, and
    wherein each of the plurality of simultaneously displayed motion items includes a guide image which represents a user motion to perform a task corresponding to a motion item.

2. The method as claimed in claim 1, wherein the recognizing the first voice command comprises providing at least one of among visual feedback and auditory feedback indicating at least one of among the first voice item and the first voice task.

3. The method as claimed in claim 1, wherein the recognizing the first motion gesture comprises providing at least one of among visual feedback and auditory feedback indicating at least one of among the first motion item and the first motion task.

4. The method as claimed in claim 1, wherein the performing the first voice task comprises performing a task corresponding to both the first voice item and the recognized second voice command.

5. The method as claimed in claim 1, wherein the additional item information comprises at least one of among an additional command, a guide message, and an utterance example regarding the first voice item.

6. The method as claimed in claim 1, wherein the additional item information comprises at least one of among an image and a text which indicates a designation of one of among the voice task mode and the motion task mode.

7. The method as claimed in claim 1, wherein, if the first voice task comprises a channel shortcut, the additional item information comprises at least one of among a guide message and an utterance example regarding utterance of at least one of among an identifier of a channel, a program name, and a channel name.

8. The method as claimed in claim 7, further comprising:
    recognizing, by using a processor, a second voice command corresponding to one of among an identifier of a channel name, a program name, and a channel name;
    performing, by using a processor, a channel shortcut to reproduce a channel corresponding to the one of among the identifier of the channel, the program name and the channel name.

9. The method as claimed in claim 1, wherein, if the first voice comprises a power off, the additional item information comprises at least one of among a guide message asking a question as to whether to perform power off and an utterance example regarding an answer to the question.

10. The method as claimed in claim 1, wherein each of the plurality of voice items are utterable commands.

11. The method as claimed in claim 1, wherein each of the plurality of simultaneously displayed motion items further comprises a text which indicates a motion task corresponding the recognizable motion gesture.

12. The method as claimed in claim 1, wherein the voice assistance information comprises at least one of among an image and a text which indicates a designation of the voice task mode, and
    the motion assistance information comprises at least one of among an image and a text which indicates a designation of the motion task mode.

13. The method as claimed in claim 1, wherein the voice task mode is changed to the motion task mode in response to a motion start gesture,
    wherein the motion task mode is changed to the voice task mode in response to a voice start command,
    wherein the motion start gesture comprises a pre-set motion gesture to enter the motion task mode, and
    wherein the voice start command comprises a pre-set voice command to enter the voice task mode.

14. The method as claimed in claim 1, wherein, if the first voice command comprises at least one of among a channel name, a program name, and a channel number, the first voice task comprises a channel shortcut to reproduce a channel corresponding to the one of among the channel name, the program name and the channel number.

15. The method as claimed in claim 1, wherein:
    if the first motion gesture comprises a channel-up gesture, the first motion task comprises changing a current channel to a next channel, and
    if the first motion gesture comprises a channel-down gesture, the first motion task comprises changing the current channel to a previous channel.

16. The method as claimed in claim 1, wherein:
    if the first voice command comprises a volume level, the first task comprises changing a current volume level setting to a volume level setting corresponding to the first voice command,
    if the first motion gesture comprises a volume-up gesture, the first motion task comprises increasing the current volume level by a predetermined amount, and
    if the first motion gesture comprises a volume-down gesture, the first motion task comprises reducing the current volume by the predetermined amount.

17. The method as claimed in claim 1, if the first voice item comprises mute, the first voice task comprises performing the mute and displaying voice assistance information comprising a second voice item corresponding to unmute.

18. The method as claimed in claim 1, wherein the voice assistance information further comprises a recognition candidate comprising at least one of among a phrase similar to the first voice command, a voice command which is similar to the first voice command, a task which corresponds to the similar voice command, a motion gesture which is similar to the first motion gesture, and a motion task which corresponds to the similar motion gesture.

19. The method as claimed in claim 18, further comprising:
displaying, by using a processor, the voice assistance information including the recognition candidate;
changing, by using a processor, from the voice task mode to the motion task mode in response to a motion start command;
continuing to display, by using a processor, the recognition candidate and displaying the motion assistance information.

20. The method as claimed in claim 19, wherein the continuing to display the recognition candidate comprises displaying a focus on the recognition candidate.

21. The method as claimed in claim 1, wherein the motion assistance information further comprises a recognition candidate comprising at least one of among a phrase similar to the first voice command, a voice command which is similar to the first voice command, a voice task which corresponds to the similar voice command, a motion gesture which is similar to the first motion gesture, and a motion task which corresponds to the similar motion gesture.

22. The method as claimed in claim 21, further comprising:
displaying, by using a processor, the motion assistance information including the recognition candidate;
changing, by using a processor, from the motion task mode to the voice task mode;
continuing to display, by using a processor, the recognition candidate
and displaying, by using a processor, the voice assistance information.

23. The method as claimed in claim 22, wherein the continuing to display the recognition candidate comprises displaying an index comprising at least one of a figure and a letter corresponding to the recognition candidate.

24. The method as claimed in claim 1, wherein the displaying additional item information comprises replacing the plurality of voice items.

25. The method as claimed in claim 24, wherein the displaying additional item information further comprises omitting driving of a timer to stop the voice task mode.

26. An electronic apparatus comprising:
a display unit which displays voice assistance information and additional item information on a screen of the electronic apparatus;
a controller which:
controls the display unit to display voice assistance information comprising a plurality of voice items on a screen of the electronic apparatus;
recognizes a first voice command corresponding to a first voice item from among the plurality of voice items;
controls the display unit to display additional item information regarding the first voice item on a screen of the electronic apparatus;
recognizes a second voice command corresponding to the additional item information;
performs a first voice task corresponding to the first voice item and the second voice command; and displays motion assistance information comprising a plurality of simultaneously displayed motion items on a screen of the electronic apparatus, each of the plurality of simultaneously displayed motion items corresponding to a motion task in a motion task mode,
wherein each of the plurality of simultaneously displayed motion items includes a guide image which represents a user motion to perform a task corresponding to a motion item.

27. A method for controlling an electronic apparatus, the method comprising:
in a voice task mode in which a plurality of voice tasks are performed, each of the plurality of voice tasks in response to a voice command, displaying, by using a processor, voice assistance information comprising a plurality of items on a screen of the electronic apparatus;
recognizing, by using a processor, a first voice command corresponding to a first voice item from among the plurality of voice items;
displaying, by using a processor, additional item information regarding the first voice item on a screen of the electronic apparatus;
recognizing, by using a processor, a second voice command corresponding to the additional item information;
performing, by using a processor, a first voice task corresponding to the first voice item and the second voice command; and
in a motion task mode in which a plurality of motion tasks are performed, displaying, motion assistance information comprising a plurality of simultaneously displayed motion items on a screen of the electronic apparatus, each of the plurality of simultaneously displayed motion items corresponding to a motion task in a motion task mode,
wherein each of the plurality of simultaneously displayed motion items includes a guide image which represents a user motion to perform a task corresponding to a motion item.

28. An electronic apparatus comprising:
a display which:
in a voice task mode, displays voice assistance information comprising a plurality of voice items on a screen of the electronic apparatus, each of the plurality of voice items corresponding to a voice task; and
in a motion task mode, displays motion assistance information comprising a plurality of simultaneously displayed motion items on a screen of the electronic apparatus, each of the plurality of simultaneously displayed motion items corresponding to a motion task; and
a controller which:
recognizes a first voice command corresponding to a first voice item from among the plurality of voice items, and performs a first voice task corresponding to the first voice item,
recognizes a first motion gesture corresponding to a first motion item from among the plurality of simultaneously displayed motion items, and performs a first motion task corresponding to the first motion item,
wherein the controller controls the display to display additional item information regarding the first voice item,
wherein the controller recognizes a second voice command corresponding to the additional item information, and
wherein each of the plurality of simultaneously displayed motion items includes a guide image which represents a user motion to perform a task corresponding to a motion item.

29. The electronic apparatus as claimed in claim 28, wherein each of the plurality of simultaneously displayed motion items further comprises a text which indicates a motion task corresponding the recognizable motion gesture.

30. The electronic apparatus as claimed in claim 28, wherein the voice assistance information comprises at least one of among an image and a text which indicates a designation of the voice task mode, and the motion assistance information comprises at least one of among an image and a text which indicates a designation of the motion task mode.

\* \* \* \* \*